(12) United States Patent
Moon et al.

(10) Patent No.: US 9,723,349 B2
(45) Date of Patent: *Aug. 1, 2017

(54) VIDEO DISPLAY DEVICE, TERMINAL DEVICE, AND METHOD THEREOF

(71) Applicant: LG ELECTRONICS INC., Seoul (KR)

(72) Inventors: Kyoungsoo Moon, Seoul (KR); Jaehee Chung, Seoul (KR); Hyeonjae Lee, Seoul (KR); Jinpil Kim, Seoul (KR); Aettie Ji, Seoul (KR); Kyungho Kim, Seoul (KR); Sanghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,952

(22) Filed: Jul. 2, 2015

(65) Prior Publication Data
US 2015/0382043 A1    Dec. 31, 2015

Related U.S. Application Data

(63) Continuation of application No. 13/567,620, filed on Aug. 6, 2012, now Pat. No. 9,113,188.
(Continued)

(30) Foreign Application Priority Data

Jun. 14, 2012 (KR) .......................... 10-2012-0063968

(51) Int. Cl.
*H04N 7/16* (2011.01)
*H04N 21/41* (2011.01)
(Continued)

(52) U.S. Cl.
CPC ....... *H04N 21/4122* (2013.01); *H04N 21/222* (2013.01); *H04N 21/4104* (2013.01);
(Continued)

(58) Field of Classification Search
CPC ............. H04N 21/4122; H04N 21/441; H04N 21/64322; H04N 21/4126; H04N 21/43615; H04N 21/4722; H04N 21/4753
(Continued)

(56) References Cited

U.S. PATENT DOCUMENTS 5,831,664 A    11/1998    Wharton et al.
6,122,403 A    9/2000    Rhoads
(Continued)

FOREIGN PATENT DOCUMENTS

CN    101374090 A    2/2009
CN    101472159 A    7/2009
(Continued)

OTHER PUBLICATIONS

Office Action of Chinese Patent Office in Appl'n. No. 201280045048.3, dated Jul. 21, 2016.
(Continued)

*Primary Examiner* — Nnenna Ekpo
(74) *Attorney, Agent, or Firm* — Dentons US LLP

(57) ABSTRACT

A terminal device acquires a part of an audio-visual content regenerated by a video display apparatus. The terminal device acquires contents information of the audio-visual content based on the part of the audio-visual content. The terminal device acquires the available enhanced service based on the contents information and regenerates the available enhanced service.

4 Claims, 96 Drawing Sheets

Related U.S. Application Data

(60) Provisional application No. 61/525,835, filed on Aug. 21, 2011, provisional application No. 61/543,288, filed on Oct. 4, 2011, provisional application No. 61/549,236, filed on Oct. 20, 2011.

(51) Int. Cl.

| | | |
|---|---|---|
| *H04N 21/222* | (2011.01) | |
| *H04N 21/4367* | (2011.01) | |
| *H04N 21/4627* | (2011.01) | |
| *H04N 21/472* | (2011.01) | |
| *H04N 21/4722* | (2011.01) | |
| *H04N 21/475* | (2011.01) | |
| *H04N 21/4788* | (2011.01) | |
| *H04N 21/482* | (2011.01) | |
| *H04N 21/81* | (2011.01) | |
| *H04N 21/8358* | (2011.01) | |
| *H04N 21/436* | (2011.01) | |
| *H04N 21/441* | (2011.01) | |
| *H04N 21/643* | (2011.01) | |
| *H04N 21/426* | (2011.01) | |
| *H04N 21/478* | (2011.01) | |

(52) U.S. Cl.
CPC ..... *H04N 21/4126* (2013.01); *H04N 21/4263* (2013.01); *H04N 21/4367* (2013.01); *H04N 21/43615* (2013.01); *H04N 21/441* (2013.01); *H04N 21/4627* (2013.01); *H04N 21/478* (2013.01); *H04N 21/4722* (2013.01); *H04N 21/4753* (2013.01); *H04N 21/4756* (2013.01); *H04N 21/4758* (2013.01); *H04N 21/4788* (2013.01); *H04N 21/47217* (2013.01); *H04N 21/482* (2013.01); *H04N 21/64322* (2013.01); *H04N 21/8126* (2013.01); *H04N 21/8166* (2013.01); *H04N 21/8173* (2013.01); *H04N 21/8358* (2013.01)

(58) Field of Classification Search
USPC ..................................... 725/25, 30, 141, 153
See application file for complete search history.

(56) References Cited

U.S. PATENT DOCUMENTS

| | | |
|---|---|---|
| 8,108,887 B2 | 1/2012 | Lee |
| 2002/0059597 A1 | 5/2002 | Kikinis et al. |
| 2002/0162120 A1* | 10/2002 | Mitchell ................ H04N 7/165 725/135 |
| 2003/0051254 A1 | 3/2003 | Weidenfeller |
| 2003/0188322 A1 | 10/2003 | Bontempi |
| 2004/0117831 A1 | 6/2004 | Ellis et al. |
| 2005/0262548 A1 | 11/2005 | Shimojo et al. |
| 2007/0130581 A1* | 6/2007 | Del Sesto ............. H04N 7/088 725/36 |
| 2008/0134245 A1 | 6/2008 | Dacosta |
| 2008/0208839 A1* | 8/2008 | Sheshagiri ........ G06F 17/30796 |
| 2008/0235731 A1* | 9/2008 | Bryant ............... H04N 5/44543 725/44 |
| 2009/0158361 A1 | 6/2009 | Tsusaka et al. |
| 2010/0064307 A1 | 3/2010 | Malhotra et al. |
| 2010/0122174 A1 | 5/2010 | Snibbe et al. |
| 2010/0205628 A1 | 8/2010 | Davis et al. |
| 2012/0117511 A1 | 5/2012 | Agnihotri et al. |
| 2012/0254928 A1 | 10/2012 | Oztaskent et al. |
| 2012/0289213 A1 | 11/2012 | Levien et al. |
| 2012/0291059 A1 | 11/2012 | Roberts et al. |
| 2012/0296938 A1 | 11/2012 | Koishida et al. |
| 2012/0324504 A1 | 12/2012 | Archer et al. |
| 2013/0097625 A1 | 4/2013 | Thorwirth et al. |
| 2013/0340011 A1* | 12/2013 | Rodriguez ............ G06Q 30/02 725/62 |

FOREIGN PATENT DOCUMENTS

| | | |
|---|---|---|
| JP | 2004-328109 A | 11/2004 |
| JP | 2009-267954 A | 11/2009 |
| JP | 2011-085865 A | 4/2011 |
| WO | 2007/011889 A2 | 1/2007 |
| WO | 2007/093597 A1 | 8/2007 |
| WO | 2009144536 A1 | 12/2009 |
| WO | 2010/022000 A2 | 2/2010 |

OTHER PUBLICATIONS

Office Action of the U.S. Patent Office in U.S. Appl. No. 14/554,687, dated Aug. 4, 2016.

* cited by examiner

FIG.22
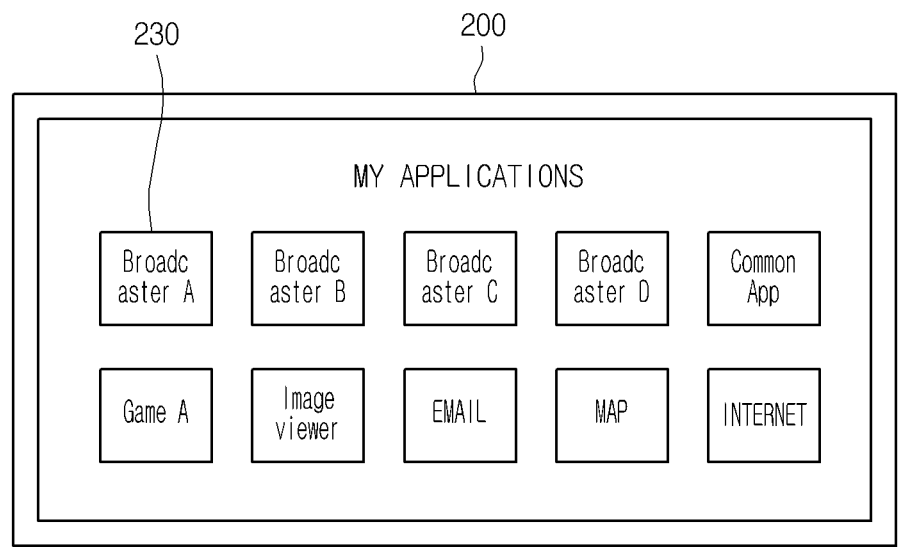
(A)
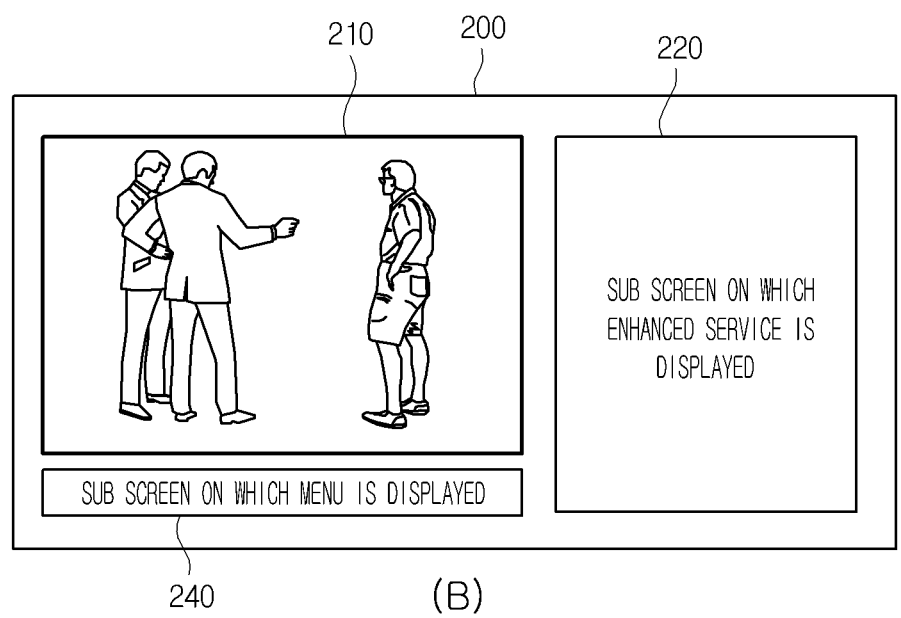
(B)

FIG.55
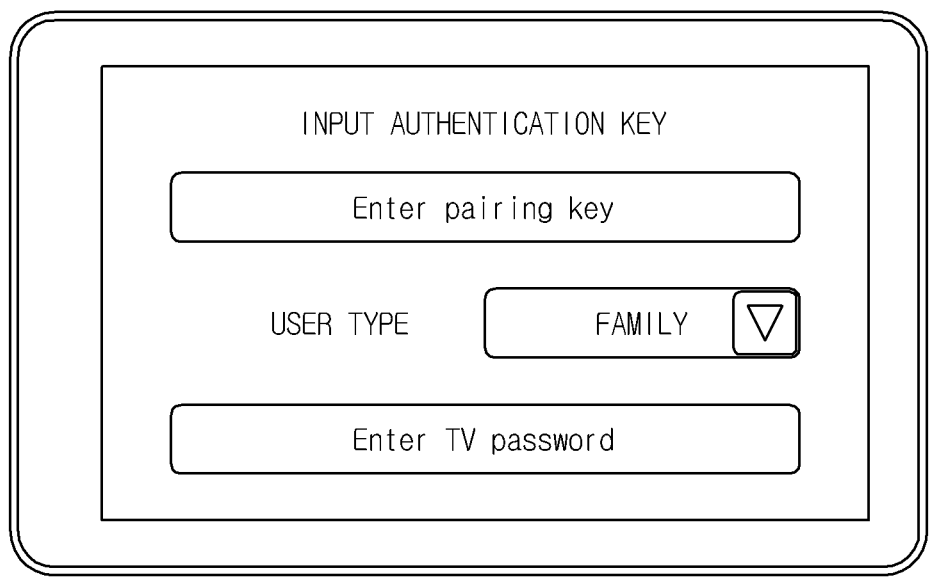
(A)
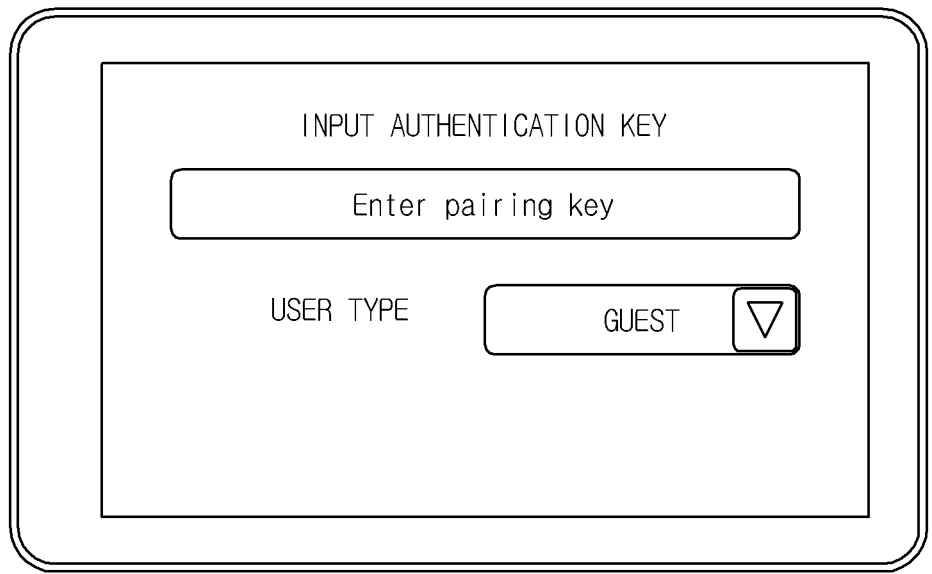
(B)

FIG.63
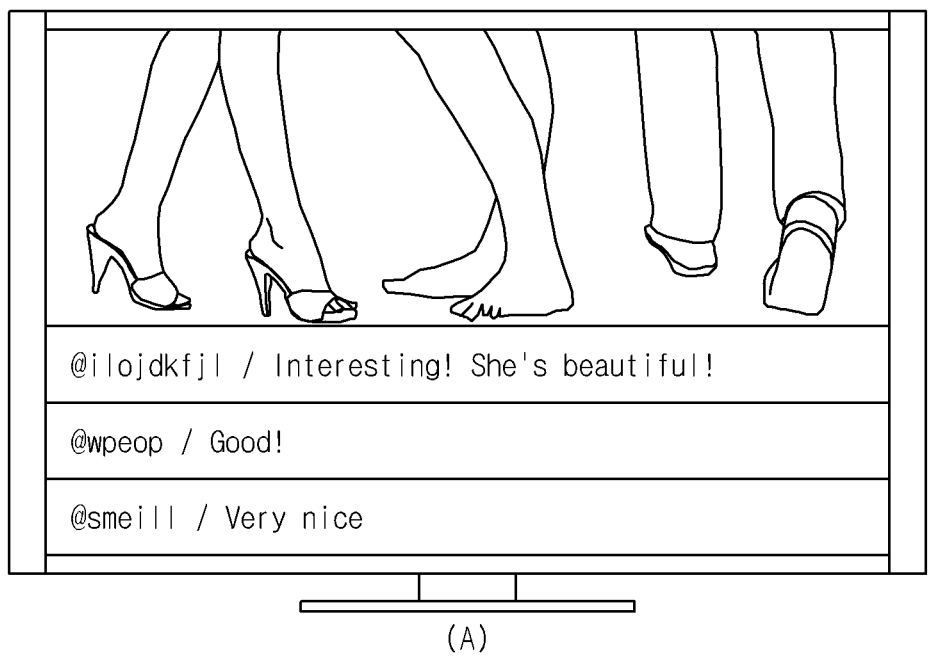
(A)
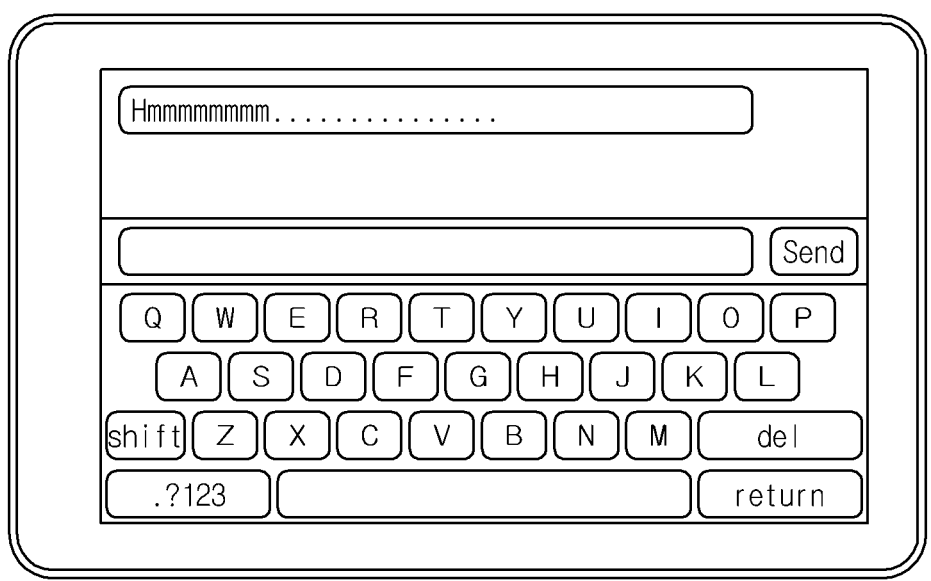
(B)

FIG.65
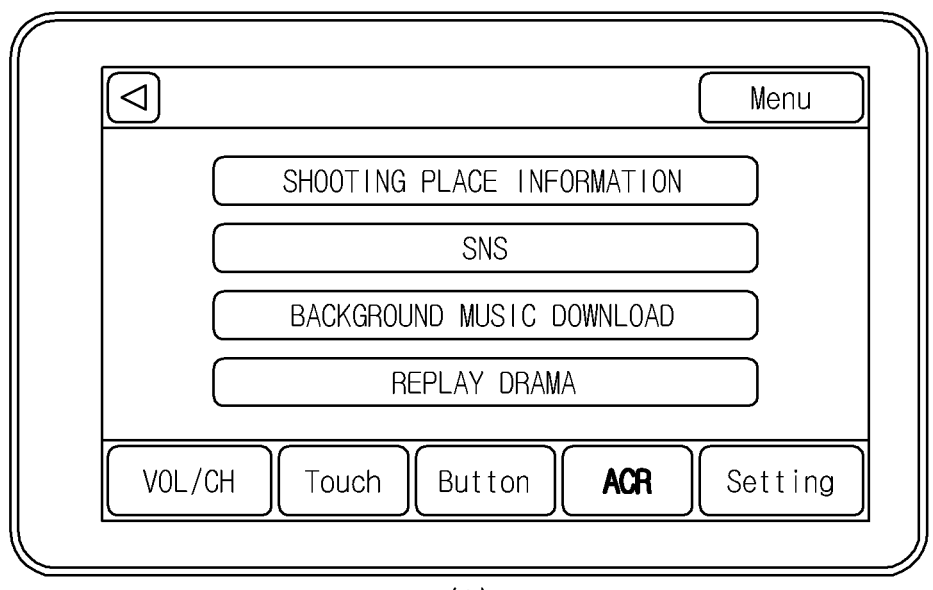
(A)
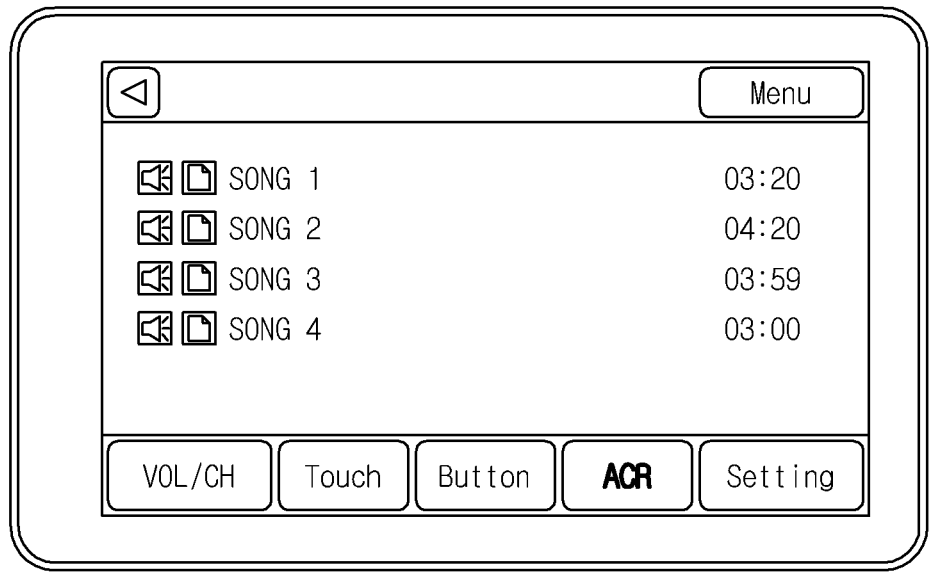
(B)

FIG.80

| ACR Application | ACR History | |
|---|---|---|
| ☐ | ACR Application History | 🏛 |
| ☑ Application Title    Content Title    Launched time | http://appurl.com ▷ | 🏛 |
| ☐ Application Title    Content Title    Launched time | http://appurl.com ▷ | 🏛 |
| ☐ Application Title    Content Title    Launched time | http://appurl.com ▷ | 🏛 |

VIDEO DISPLAY DEVICE, TERMINAL DEVICE, AND METHOD THEREOF

CROSS-REFERENCE TO RELATED APPLICATIONS

The present application is a Continuation of application Ser. No. 13/567,620 filed on Aug. 6, 2012, which claims priority under 35 U.S.C. 119 and 35 U.S.C. 365 to U.S. Patent Applications No. 61/525,835 (filed on Aug. 21, 2011), No. 61/543,288 (filed on Oct. 4, 2011), No. 61/549,236 (filed on Oct. 20, 2011), and Korean Patent Application No. 10-2012-0063968 (filed on Jun. 14, 2012), each of which is hereby incorporated by reference in its entirety.

BACKGROUND

The present invention relates to a video display device, a terminal device, and method thereof.

As digital broadcasting is paving the way for its extensive spread, a broadcasting station transmits both main audio-visual (AV) contents and enhanced service data, which may be linked to the main AV contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting station may serve to provide AV contents but may not provide enhanced services led by the broadcasting station.

Since the broadcast receiving device extracts main AV data from signal received from the MVPD and provides only uncompressed audio-visual data to a video display device, only enhanced services provided from the broadcast receiving device not the video display device are available. Furthermore, the broadcasting station may not provide enhanced services led by itself.

Additionally, even when the broadcasting station provides enhanced services through wireless channels, the enhanced services may not be provided enough due to bandwidth limitation.

Additionally, when an enhanced service led by a broadcasting station is provided, it is displayed on a portion of a display unit of a video display device. Therefore, it may cause inconvenience for a user to watch contents.

SUMMARY

Embodiments provide an image display, a terminal device, and an operating method thereof, which provide an available enhanced service led by a broadcasting station without causing inconvenience for a user to watch contents.

In one embodiment, an operating method of a terminal device includes: obtaining a portion of AV content that the video display device plays; obtaining content information on the AV content on the basis of part of the AV content; obtaining an available enhanced service on the basis of the content information; and playing the available enhanced service.

In further embodiment, a terminal device includes: a display unit; a camera; a mike; a first communication unit communicating with an internet protocol (IP) based network; a second communication unit communicating with the video display device; and a control unit. The control unit obtains a portion of AV content that the video display device plays through the camera, the mike, or the second communication unit, obtains content information on the AV content on the basis of the portion of the AV content, obtains an available enhanced service on the basis of the content information through the first communication unit, and plays the available enhanced service to the display unit.

In further another embodiment, an operating method of a video display device including a display unit includes pairing with a terminal device; obtaining AV content; playing the AV content through the display unit; and obtaining an available enhanced service from the terminal device obtaining the available enhanced service for the AV content on the basis of a portion of the AV content.

The details of one or more embodiments are set forth in the accompanying drawings and the description below. Other features will be apparent from the description and drawings, and from the claims.

BRIEF DESCRIPTION OF THE DRAWINGS

FIG. 22 is a screen when a content provider application is executed according to an embodiment.

FIG. 55 is an authentication number input window according to an embodiment.

FIG. 63 is a view when an enhanced service is executed in a video display device and a terminal device according to another embodiment.

FIG. 65 is a front view of a terminal device where an enhanced service is executed according to another embodiment.

FIG. 80 is a front view of a terminal device where an interworking application is executed according to another embodiment.

DETAILED DESCRIPTION OF THE EMBODIMENTS

Hereinafter, embodiments relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

Figure 1:
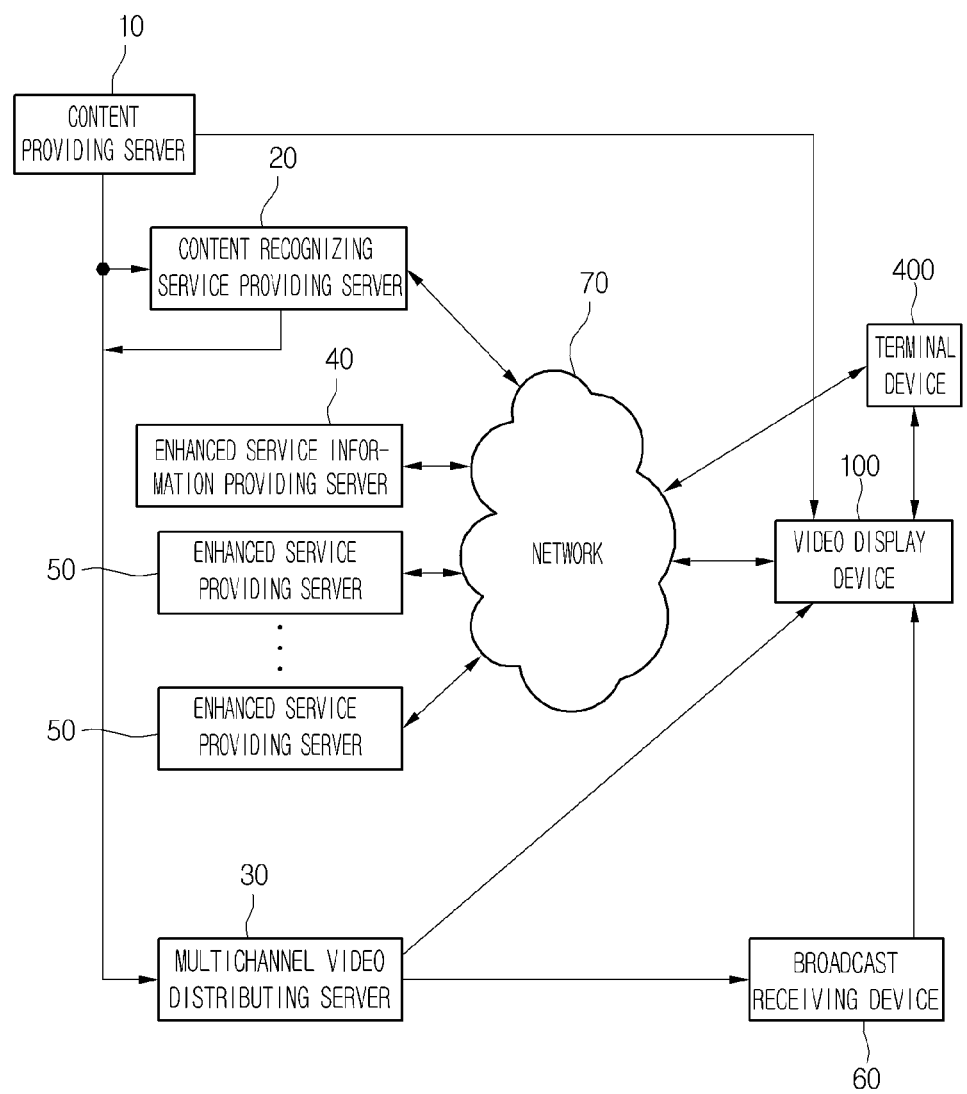
FIG. 1 is a block diagram illustrating the network topology according to the embodiment.

FIG. 1 is a block diagram illustrating the network topology according to the embodiment.

As shown in FIG. 1, the network topology includes a content providing server 10, a content recognizing service providing server 20, a multi-channel video distributing server 30, an enhanced service information providing server 40, a plurality of enhanced service providing servers 50, a broadcast receiving device 60, a network 70, a video display device 100, and a terminal device 400.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, enhanced data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts characteristic information from a part of frames or a part of audio samples of the main audio-visual content and stores it. This characteristic information is called signature.

The multi-channel video distributing server 30 receives and multiplexes broadcast signals from a plurality of broadcasting stations and provides the multiplexed broadcast signals to the broadcast receiving device 60. Especially, the multi-channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi-channel video distributing server 30 may exclude the extracted enhanced service or may add another enhanced service, a broadcasting station may not provide services led by it. There may be at least one multi-channel video distributing server.

The broadcasting device 60 may tune a channel selected by a user and receives a signal of the tuned channel, and then, performs demodulation and channel decoding on the received signal to extract a main audio-visual content. The broadcasting device decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. The enhanced service information providing server 40 and the video display device can communicate through the network 70. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server. The enhanced service providing server 50 and the video display device 100 may communicate with each other through the network 70.

The network 70 may be an IP based network.

The video display device 100 may be a television, a notebook computer, a hand phone, and a smart phone, each including a display unit. The video display device 100 may receive an uncompressed main AV content through an external input port from the broadcast receiving device 60, and receive a broadcast signal including an encoded main AV content through a broadcast network from the contents providing server 10 or the multi-channel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content through the network 70 from the enhanced service providing server 50.

The terminal device 400 may be a mobile terminal device (such as a notebook computer, a mobile phone, and a smart phone) or another video display device.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 2:
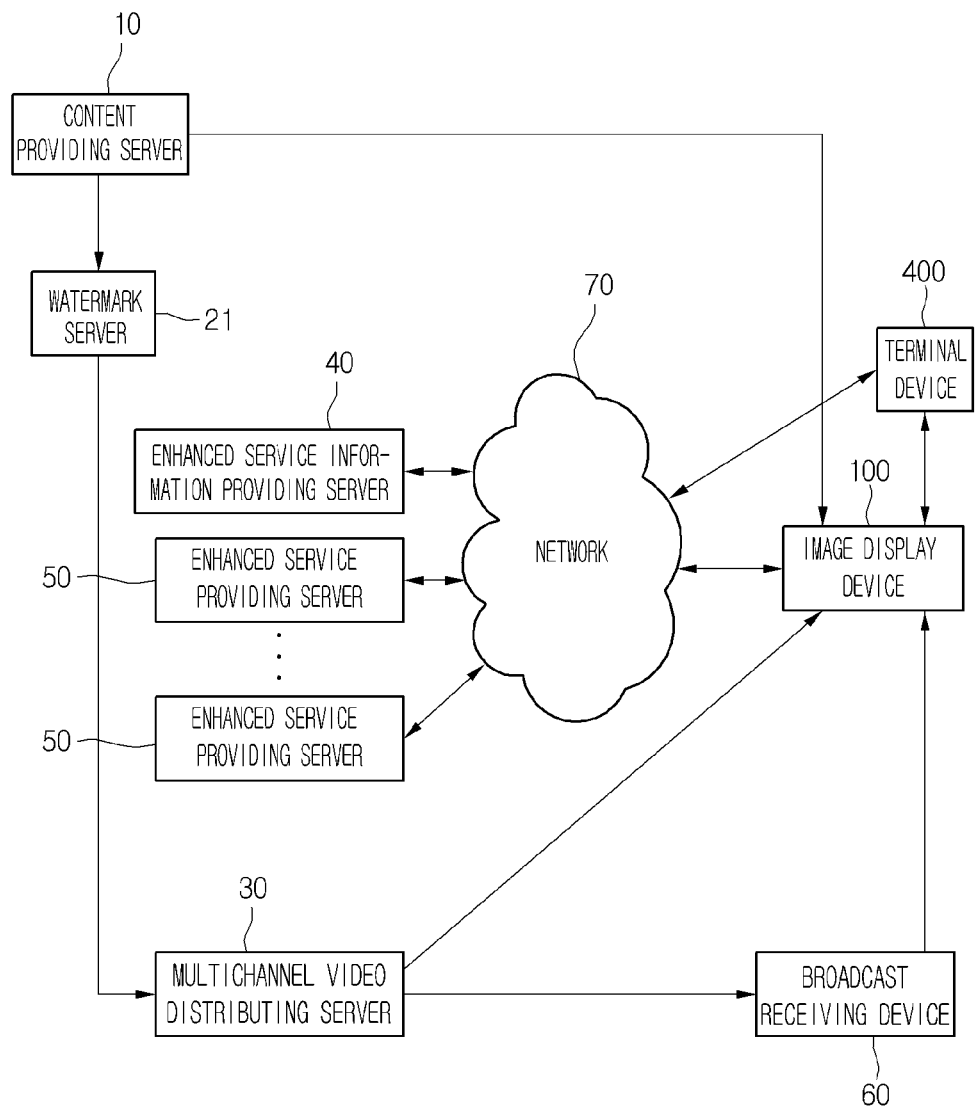
FIG. 2 is a block diagram illustrating a watermark based network topology according to an embodiment.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include enhanced information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 3:
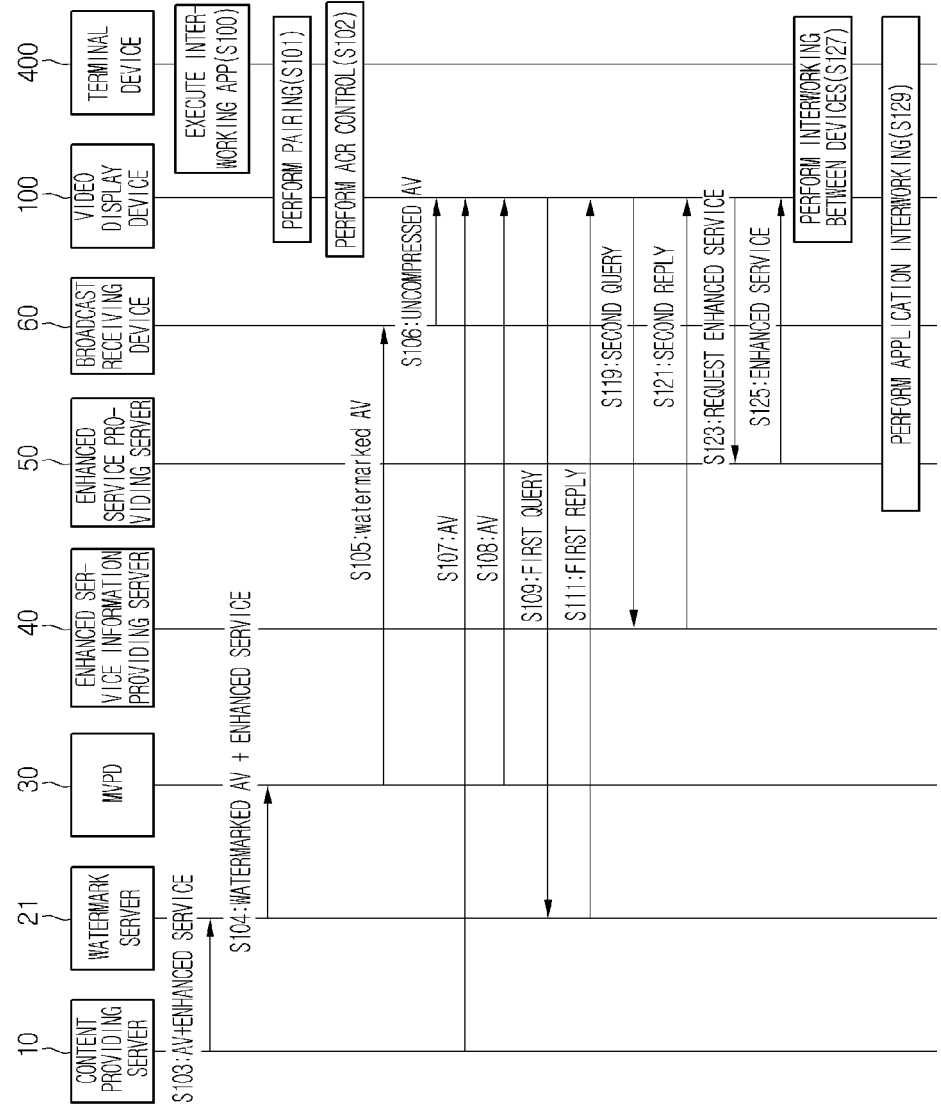
FIG. 3 is a ladder diagram illustrating a data flow in a watermark based network topology according to an embodiment.

FIG. 3 is a ladder diagram illustrating a data flow in a watermark based network topology according to an embodiment.

First, the terminal device 400 executes an interworking application in step S100. Once the interworking application is executed, the terminal device 400 may perform an interworking operation with the video display device 100.

The video display device 100 and the terminal device 400 perform a pairing operation to form a pairing session in step S101. A detailed pairing process will be described later.

Then, the video display device 100 and the terminal device 400 perform an ACR control through the pairing session in step S102. A detailed ACR control process will be described layer.

First, the content providing server 10 transmits a broadcast signal including a main AV content and an enhanced service in step S103.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in step S104.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where characteristic information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information on the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with the IP network or an Advanced Television Systems Committee—Mobile/Handheld channel (an ATSC M/H channel). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in step S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in step S106.

Moreover, the content providing server 10 also broadcasts a broadcast signal including a main AV content through a wireless channel in step S107.

Additionally, the MVPD 30 may directly transmit a broadcast signal including a main AV content to the video display device 100 without going through the broadcast receiving device 60 in step S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from a part of frames or a part of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in step S109.

The watermark server 21 provides a first reply to the first query in step S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in step S119.

The enhanced service information providing server 40 searches at least one available enhanced service relating to the content information on the second query. Later, the enhanced service information providing server 40 provides to the video display device 100 enhanced service information for at least one available enhanced service as a second reply to the second query in step S121.

Thus, according to an embodiment, the video display device 100 may obtain content information from watermarking information of watermarked AV content and may obtain information on available enhanced service through query/replay on the basis of the obtained content information.

Additionally, according to an embodiment, the video display device 100 may obtain information on available enhanced service from the content providing server 10 through a broadcast network. The broadcast network may be a network using an MPEG-2 transport stream based broadcast technique through a physical layer such as DVB-T, DVB-S or DVB-C. Obtaining available enhanced service through a broadcast network will be described later.

Moreover, according to another embodiment, the video display device 100 may obtain information on available enhanced service through an IP based network on the basis of Service discovery and selection (SD&S). Obtaining enhanced service information through an IP based network will be described later.

Furthermore, according to another embodiment, the terminal device 400 captures AV content that the video display device 100 plays, obtains content information from the watermarking information on the captured AV content, and provides the obtained content information to the video display device 100. The video display device 100 may obtain information on available enhanced service through query/replay on the basis of the content information obtained from the terminal device 400.

If the video display device 100 obtains at least one available enhanced service address through the watermark information, the first reply, or the second reply, it accesses the at least one available enhanced service address to request enhanced service in step S123, and then, obtains the enhanced service in step S125.

Then, the video display device 100 and the terminal device 400 perform an interworking process between the devices through the pairing session or through push notification mechanism in step S127. The interworking process between the devices and the push notification mechanism will be described later.

The terminal device 400 performs an enhanced service interworking process with the enhanced service providing server 500 in step S129. The terminal device 400 may perform an enhanced service interworking process with the enhanced service providing server 500 according to an interworking process. This enhanced service interworking process will be described in more detail later.

Figure 4:
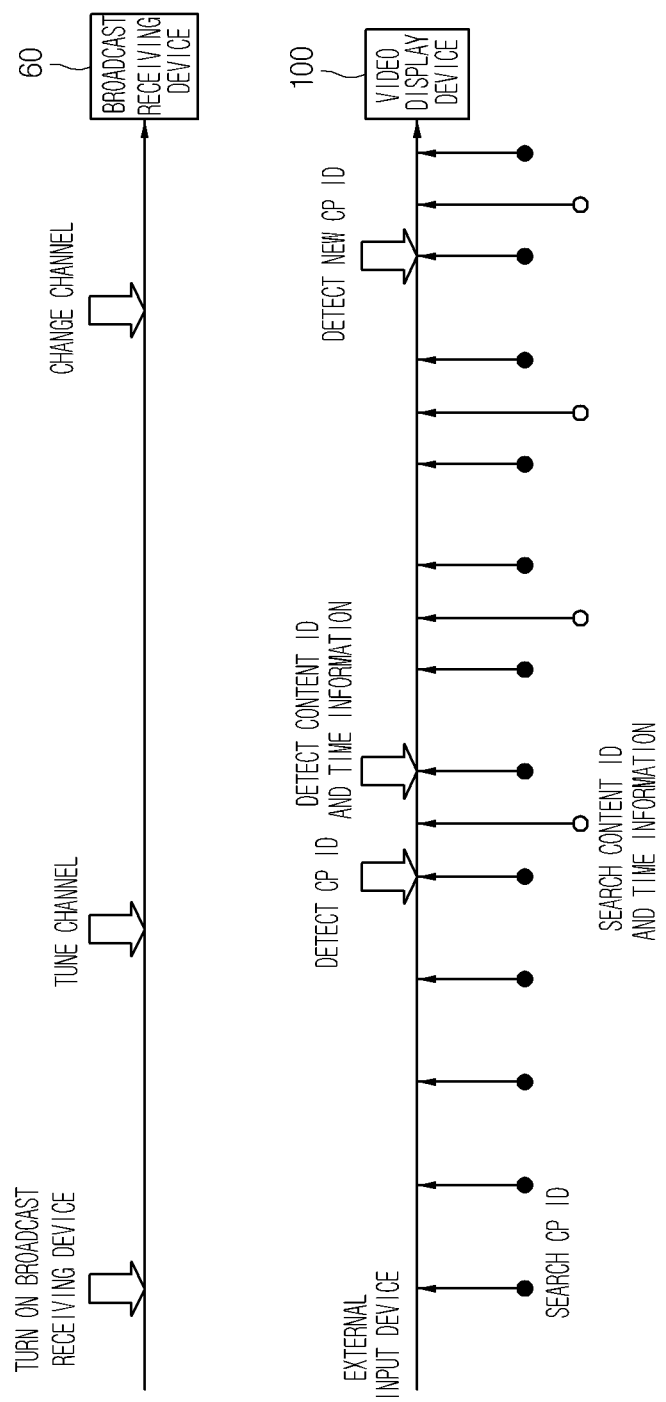
FIG. 4 is view illustrating a watermark based content recognition timing according to an embodiment.

FIG. 4 is a view illustrating a watermark based content recognition timing according to an embodiment.

As shown in FIG. 4, when the broadcast receiving device 60 is turned on and tunes a channel, and also, the video display device 100 receives a main AV content of the turned channel from the broadcast receiving device 60 through an external input port 111, the video display device 100 may sense a content provider identifier (or a broadcasting station identifier) from the watermark of the main AV content. Then, the video display device 100 may sense content information from the watermark of the main AV content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

Figure 5:
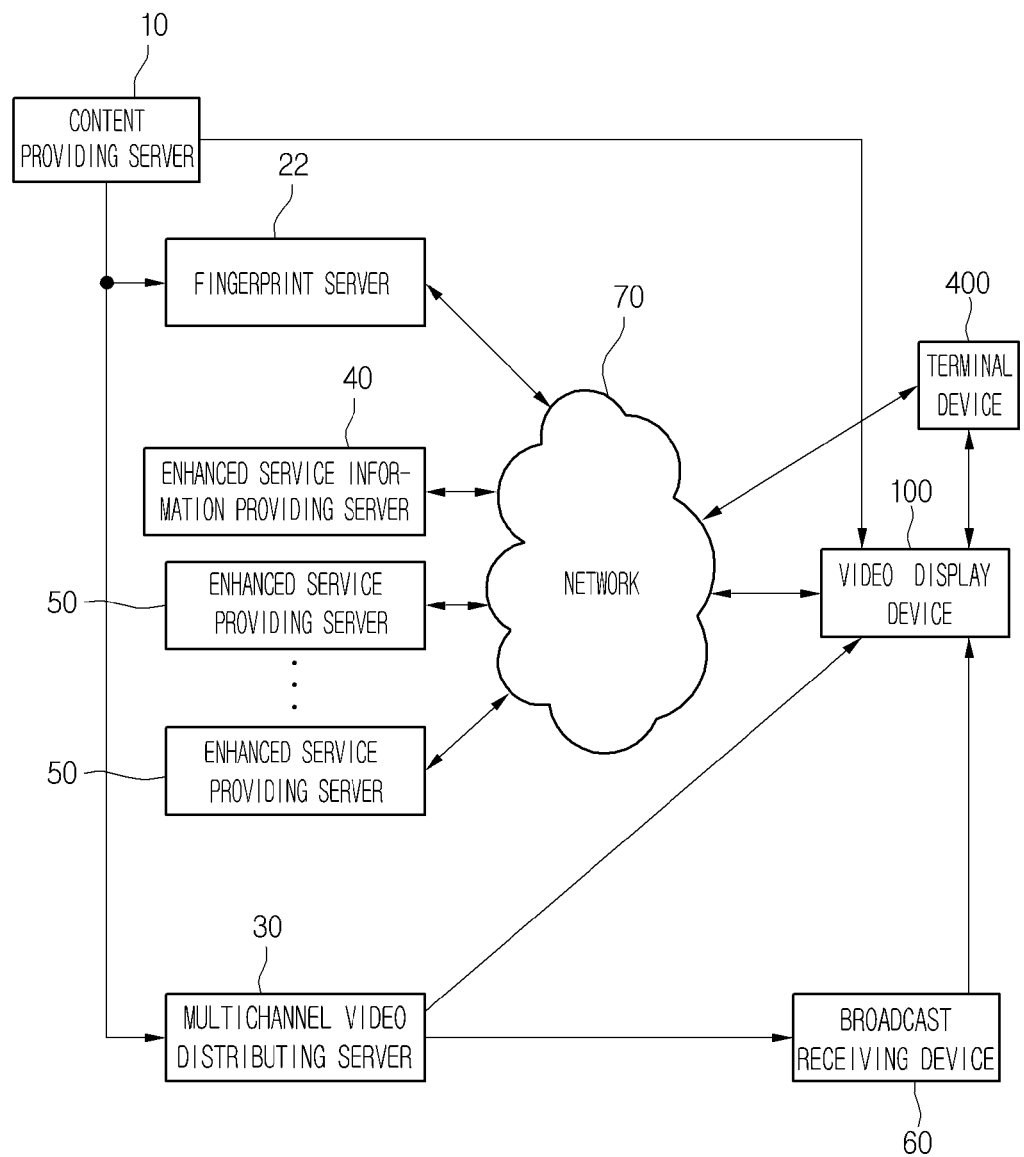
FIG. 5 is a block diagram illustrating a fingerprint based network topology according to an embodiment.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main AV content, but extracts characteristic information from a part of frames or a part of audio samples of the main AV content and stores the extracted characteristic information. Then, when receiving the characteristic information from the video display device 100, the fingerprint server 22 provides an identifier and time information on an AV content corresponding to the received characteristic information.

Figure 6:
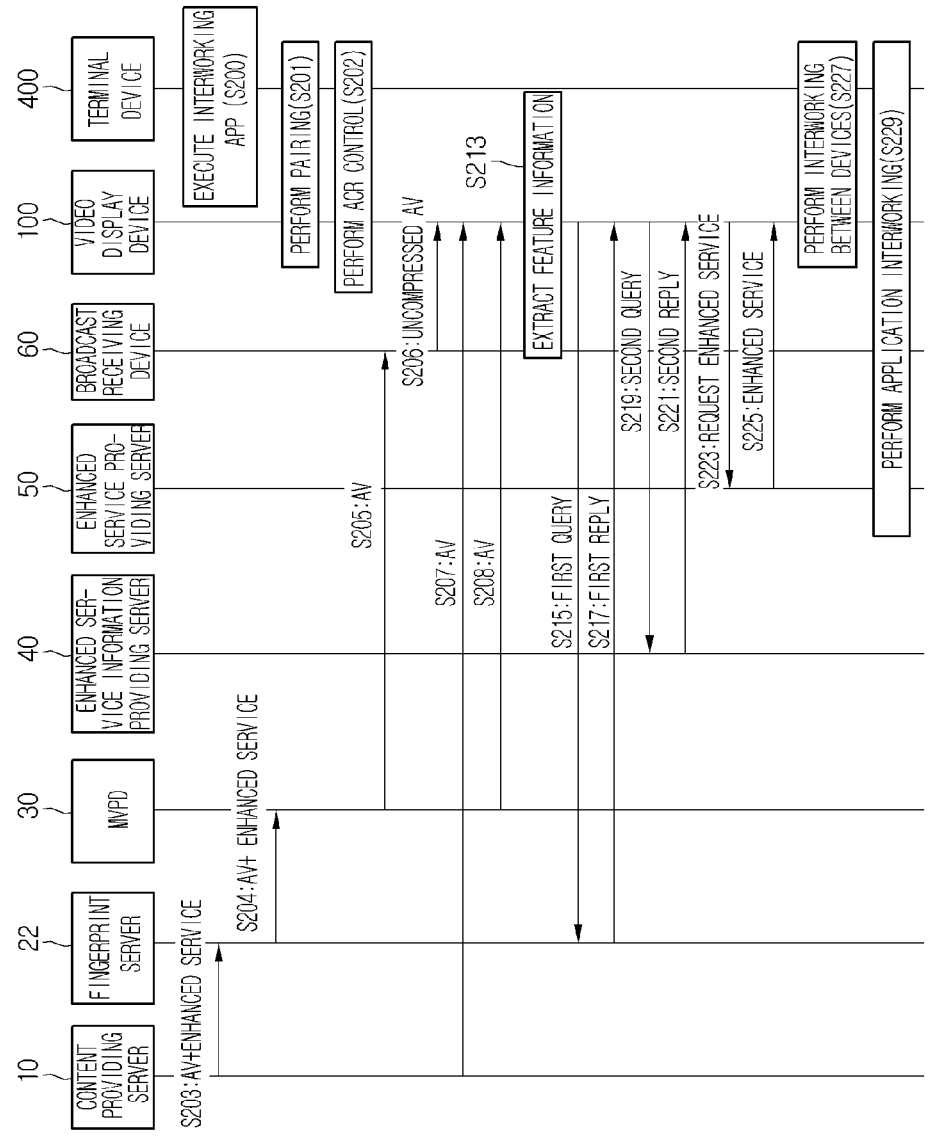
FIG. 6 is a ladder diagram illustrating a data flow in a fingerprint based network topology according to an embodiment.

FIG. 6 is a ladder diagram illustrating a data flow in a fingerprint based network topology according to an embodiment.

First, the terminal device 400 executes an interworking application in step S200. Once the interworking application is executed, the terminal device 400 may perform an interworking operation with the video display device 100.

The video display device 100 and the terminal device 400 perform a pairing operation in order to form a pairing session in step S201. A detailed pairing process will be described later.

Then, the video display device 100 and the terminal device 400 perform an ACR control through a pairing session in step S202.

First, the content providing server 10 transmits a broadcast signal including a main AV content and an enhanced service in step S203.

The fingerprint server 22 receives a broadcast signal that the content providing server 10, extracts a plurality of pieces of characteristic information from a plurality of frame sections or a plurality of audio sections of the main AV content, and establishes a database for a plurality of query results corresponding to the plurality of characteristic information in step S204. The query result may include at least one of content information, enhanced service information, and an available enhanced service.

The MVPD 30 receives broadcast signals including a main AV content and enhanced service and generates a multiplexed signal to provide it to the broadcast receiving device 60 in step S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in step S206.

Moreover, the content providing server 10 also broadcasts a broadcast signal including a main AV content through a wireless channel in step S207.

Additionally, the MVPD 30 may directly transmit a broadcast signal including a main AV content to the video display device 100 without going through the broadcast receiving device 60.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts characteristic information from a part of frames or a part of audio samples of the obtained main AV content in step S213.

The video display device 100 accesses the fingerprint server 22 corresponding to the predetermined fingerprint server address to transmit a first query including the extracted characteristic information in step S215.

The fingerprint server 22 provides a query result as a first reply to the first query in step S217. If the first reply corresponds to fail, the video display device 100 accesses the fingerprint server 22 corresponding to another fingerprint server address to transmit a first query including the extracted characteristic information.

The fingerprint server 22 may provide Extensible Markup Language (XML) document as a query result. Examples of the XML document containing a query result will be described with reference to FIG. 7 and Table 1.

Figure 7:
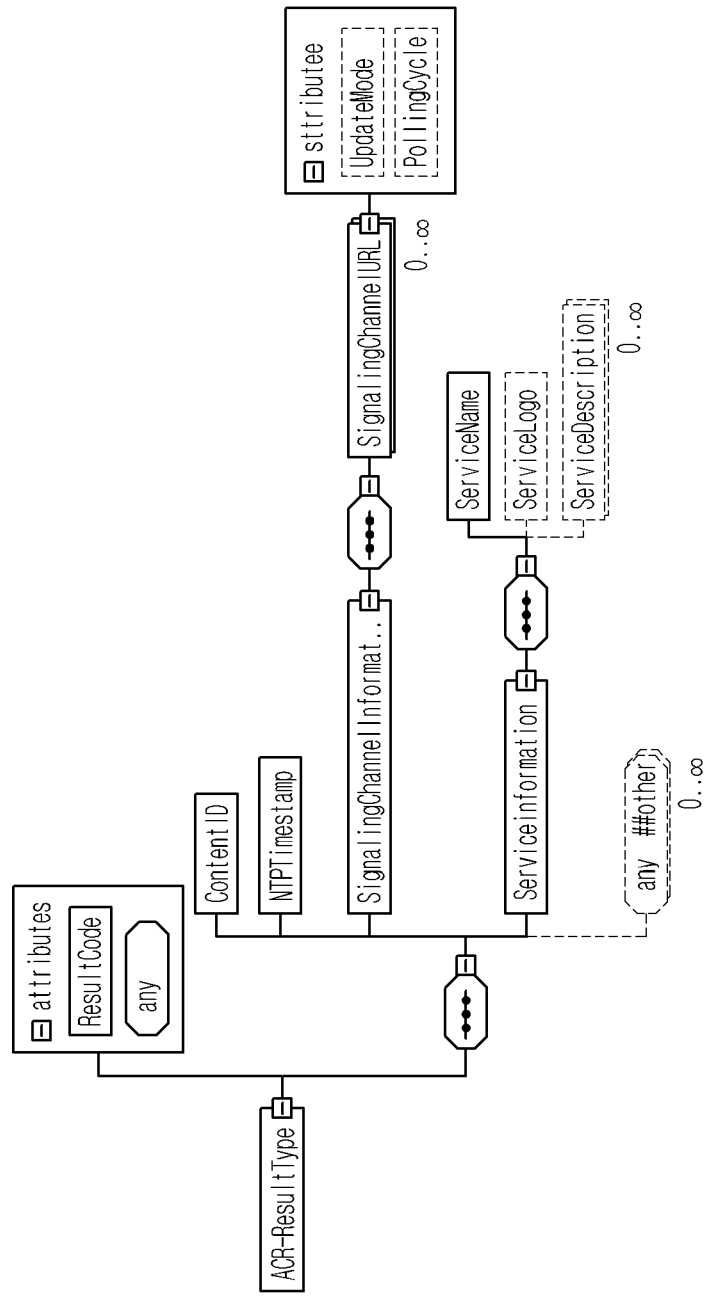
FIG. 7 is a view illustrating an XML schema diagram of ACR-Resulttype containing a query result according to an embodiment.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTP-Timestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 illustrates an XML schema of ACR-ResultType containing the query result.

TABLE 1

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL"
                        maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                        type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
```

TABLE 1-continued

```
    <xs:complexType>
      <xs:sequence>
        <xs:element name="ServiceName" type="xs:string"/>
        <xs:element name="ServiceLogo" type="xs:anyURI"
        minOccurs="0"/>
        <xs:element name="ServiceDescription" type="xs:string"
minOccurs="0" maxOccurs="unbounded"/>
      </xs:sequence>
    </xs:complexType>
  </xs:element>
  <xs:any namespace="##other" processContents="skip"
minOccurs="0" maxOccurs ="unbounded"/>
  </xs:sequence>
  <xs:attribute name="ResultCode" type="xs:string" use="required"/>
  <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_identifier( ) { | | |
|   TSID | 16 | uimsbf |
|   reserved | 2 | bslbf |
|   end_of_day | 5 | uimsbf |
|   unique_for | 9 | uimsbf |
|   content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major >69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:100.200

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major >69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in step S219.

The enhanced service information providing server 40 searches at least one available enhanced service relating to the content information on the second query. Later, the enhanced service information providing server 40 provides to the video display device 100 enhanced service information for at least one available enhanced service as a second reply to the second query in step S221.

If the video display device 100 obtains at least one available enhanced service address through the first reply or the second reply, it accesses the at least one available enhanced service address to request enhanced service in step S223, and then, obtains the enhanced service in step S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Then, the video display device 100 and the terminal device 400 perform an interworking process between the devices through a pairing session or push notification mechanism in step S227. The interworking process between the devices and the push notification mechanism will be described later.

The terminal device 400 performs an enhanced service interworking process with the enhanced service providing server 500 in step S229. The terminal device 400 may perform an enhanced service interworking process with the enhanced service providing server 500 according to an interworking process. This enhanced service interworking process will be described in more detail later.

Figure 8:
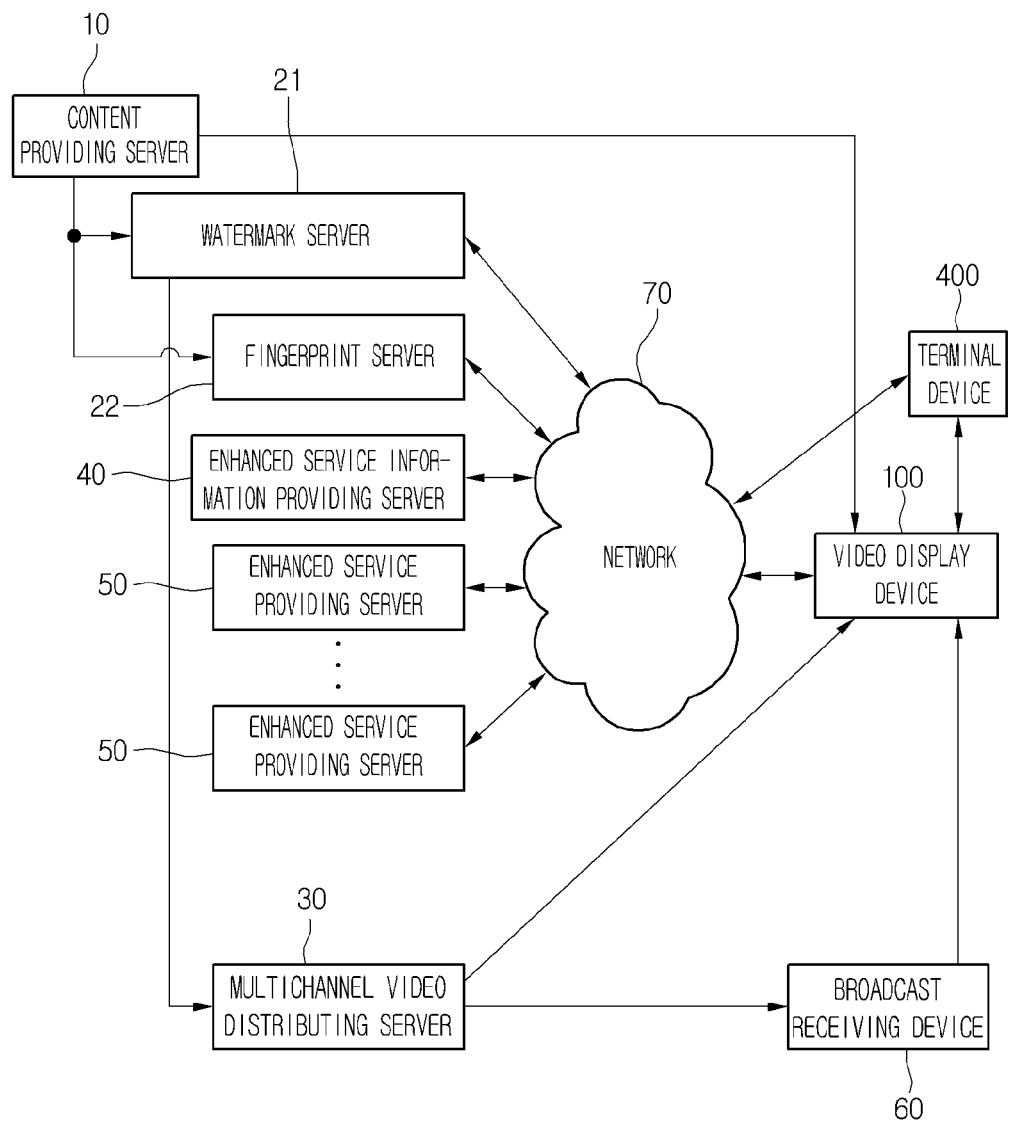
FIG. 8 is a block diagram illustrating a watermark and fingerprint based network topology according to an embodiment.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts characteristic information from a part of frames or a part of audio samples of the main AV content and stores the extracted characteristic information. Then, when receiving the characteristic information from the video display device 100, the fingerprint server 22 provides an identifier and time information on an AV content corresponding to the received characteristic information.

Figure 9:
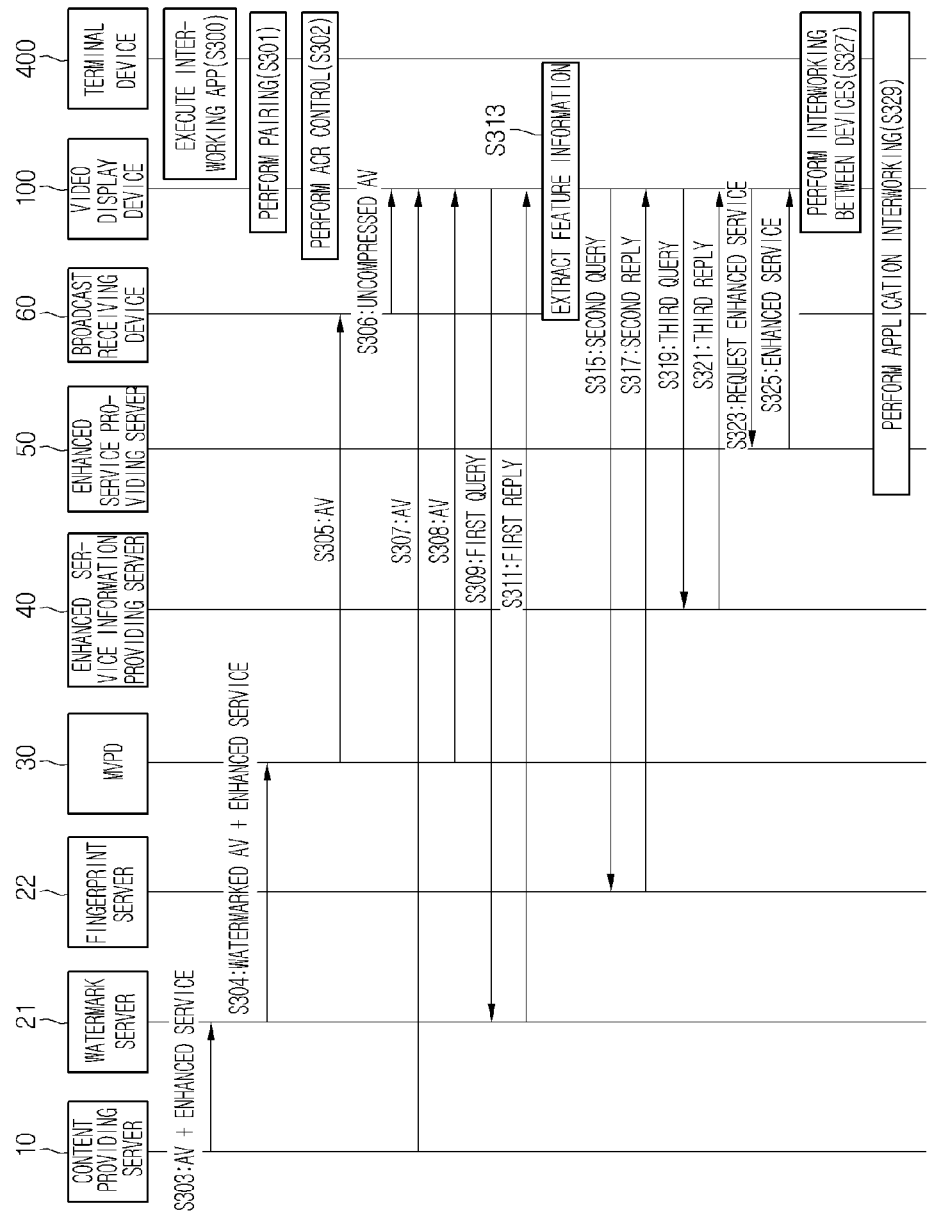
FIG. 9 is a ladder diagram illustrating a data flow in a watermark and fingerprint based network topology according to an embodiment.

FIG. 9 is a ladder diagram illustrating a data flow in a watermark and fingerprint based network topology according to an embodiment.

First, the terminal device 400 executes an interworking application in step S300. Once the interworking application is executed, the terminal device 400 may perform an interworking operation with the video display device 100.

The video display device 100 and the terminal device 400 perform a pairing operation in order to form a pairing session in step S301. A detailed pairing process will be described later.

Then, the video display device 100 and the terminal device 400 perform an ACR control through a pairing session in step S302. A detailed ACR control process will be described later.

First, the content providing server 10 transmits a broadcast signal including a main AV content and an enhanced service in step S303.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in step S304. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in step S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in step S306.

Moreover, the content providing server 10 also broadcasts a broadcast signal including a main AV content through a wireless channel in step S307.

Additionally, the MVPD 30 may directly transmit a broadcast signal including a main AV content to the video display device 100 without going through the broadcast receiving device 60 in step S308.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from a part of frames or a part of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in step S309.

The watermark server 21 provides a first reply to the first query in step S311. The first reply may include at least one of a fingerprint server address, content information, enhanced service information, and an available enhanced service. The content information and enhanced service information are described above.

If the watermark information and the first reply include a fingerprint server address, the video display device 100 extracts characteristic information from a part of frames or a part of audio samples of the main AV content in step S313.

The video display device 100 accesses the fingerprint server 22 corresponding to the fingerprint server address in the first reply to transmit a second query including the extracted characteristic information in step S315.

The fingerprint server 22 provides a query result as a second reply to the second query in step S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in step S319.

The enhanced service information providing server 40 searches at least one available enhanced service relating to the content information on the third query. Later, the enhanced service information providing server 40 provides to the video display device 100 enhanced service information for at least one available enhanced service as a third reply to the third query in step S321.

If the video display device 100 obtains at least one available enhanced service address through the first reply, the second reply, or the third reply, it accesses the at least one available enhanced service address to request enhanced service in step S323, and then, obtains the enhanced service in step S325.

Then, the video display device 100 and the terminal device 400 perform an interworking process between the devices through a pairing session or push notification mechanism in step S327. The interworking process between the devices and the push notification mechanism will be described later.

The terminal device 400 performs an enhanced service interworking process with the enhanced service providing server 500 in step S329. The terminal device 400 may perform an enhanced service interworking process with the enhanced service providing server 500 according to an interworking process. This enhanced service interworking process will be described in more detail later.

Then, referring to FIGS. 10 and 18, the video display device 100 will be described according to an embodiment.

Figure 10:
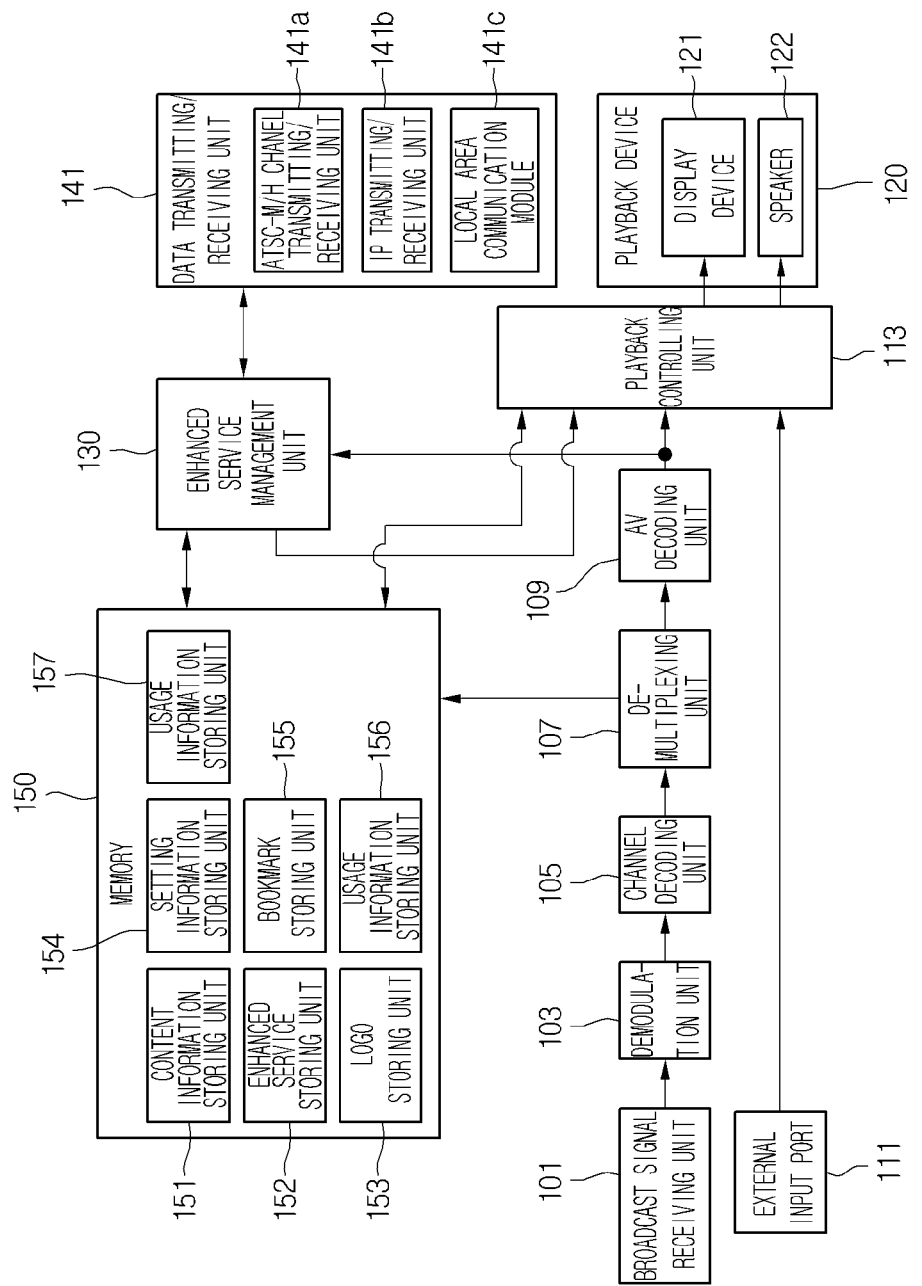
FIG. 10 is a block diagram illustrating the video display device according to the embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a playback controlling unit 113, a playback device 120, an enhanced service management unit 130, a data transmitting/receiving unit 141, and a memory 150.

The broadcast signal receiving unit 101 receives a broadcast signal through the broadcast network from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The playback controlling unit 113 controls the playback device 120 to playback at least one of an uncompressed main AV content that the AV decoding unit 109 generates and an uncompressed main AV content received from the external input port 111 according to a user's selection.

The playback device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information on the main AV content and obtains available enhanced service on the basis of the obtained content information. Especially, as described above, the enhanced service management unit 130 may obtain the identification information on the main AV content on the basis of a part of frames or a part of audio samples the uncompressed main AV content. This is called automatic contents recognition (ACR) in this specification.

The data transmitting/receiving unit 141 may include an Advanced Television Systems Committee—Mobile/Handheld (ATSC-M/H) channel transmitting/receiving unit 141a, an IP transmitting/receiving unit 141b, and a local area communication module 141c.

An ATSC-M/H channel transmitting/receiving unit 141a communicates with another device through an ATSC-M/H channel.

An IP transmitting/receiving unit 141b communicates with another device or a server through an IP based network.

The local area communication module 141c is a module for local area communication. A local area communication technique may include WiFi, Bluetooth, Radio Frequency Identification (RFID), infrared Data Association (IrDA), Ultra Wideband (UWB), and ZigBee. The local area communication module 141c of the image display unit 100 performs a pairing process with the local area communication module 414 of the terminal device 400 in order to form a pairing session.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of characteristic information.

The enhanced service storage unit 152 may store a plurality of enhanced services corresponding to a plurality of characteristic information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one among one or more pieces of account information for one or more services, regional information, family member information, preferred genre information, video display device information, and a usage information range. The at least one account information may include account information for a usage information measuring server and account information on social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main AV content watching information and enhanced service usage information within the set range. The usage information range may be set in each virtual channel. Additionally, the usage information measurement allowable range may be set over an entire physical channel.

The usage information providing unit 157 stores the main AV content watching information and the enhanced service usage information, which are collected by the video display device 100. Additionally, the video display device 100 analyzes a service usage pattern on the basis of the collected main AV content watching information and enhanced service usage information, and stores the analyzed service usage pattern in the usage information storage unit 157.

The enhanced service management unit 130 may obtain the content information on the main AV content from the fingerprint server 22 or the content information storage unit 151. If there is no content information or sufficient content information, which corresponds to the extracted characteristic information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Hereinafter, referring to FIGS. 11 and 18, the enhanced service management unit 130 will be described according to various embodiments.

Figure 11:
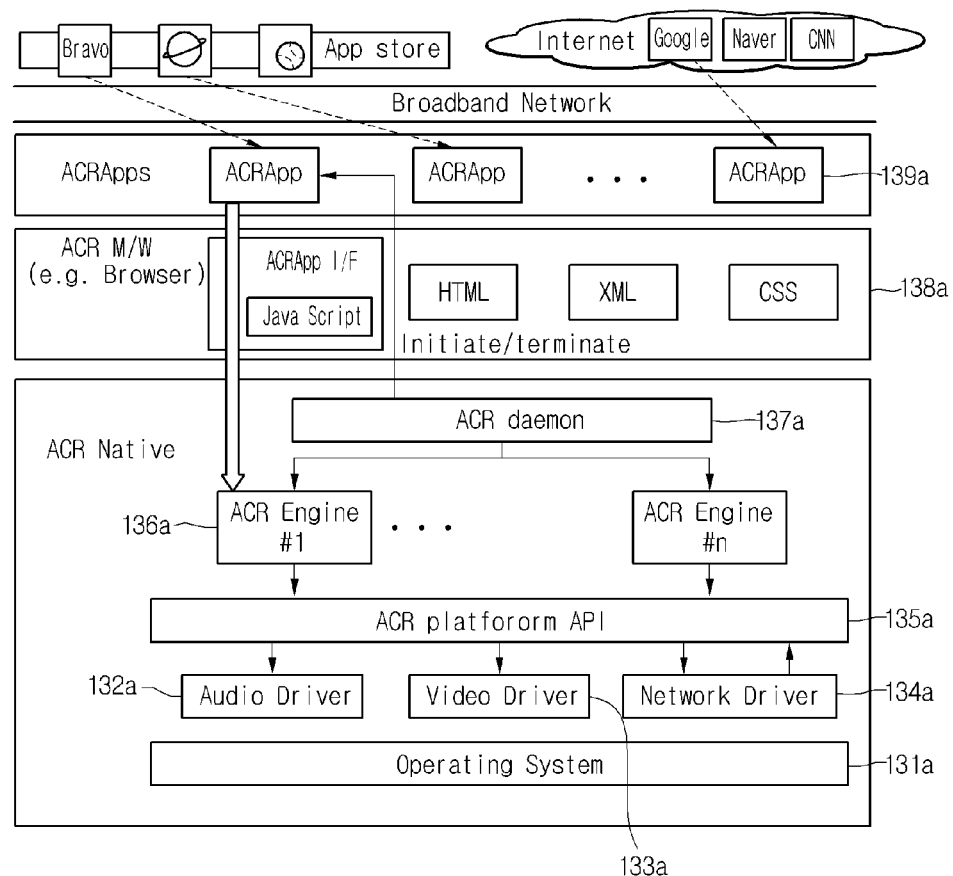
FIG. 11 is a hierarchy diagram of an enhanced service management unit according to an embodiment.

FIG. 11 is a hierarchy diagram of an enhanced service management unit according to an embodiment.

As shown in FIG. 11, the enhanced service management unit 130 may include an operating system 131a, an audio driver 132a, a video driver 133a, a network driver 134a, an ACR platform application program interface (API) 135a, at least one ACR engine 136a, an ACR daemon 137a, an ACR middleware 138a, and at least one ACR application 139a.

When the enhanced service management unit 130 is used as shown in FIG. 11, a user doesn't need to necessarily recognize a channel or content and an ACR operation may be performed always.

The enhanced service management unit 130 may access an application store through the data transmitting/receiving unit 141 to download application.

The audio driver 132a may access an audio buffer used for audio fingerprint or audio watermark.

The video driver 133a may access a video buffer used for video fingerprint or video watermark.

The network driver 134a allows the ACR engine 136a to access the data transmitting/receiving unit 141.

The platform API 135a provides API to allow the ACR engine 136a to access the audio driver 132a, the video driver 133a, and the network driver 134a.

Since a plurality of broadcasting stations or content providers use respectively different content recognizing services, the video display device 100 may include a plurality of ACR engines 136a. That is, the video display device 100 may include an ACR engine for at least one of a plurality of video watermark extraction algorithms, a plurality of audio watermark extraction algorithms, a plurality of video signature extraction algorithms, and a plurality of audio signature extraction algorithms. The watermark based ACR engine 136a may extract watermark information, and then, may obtain at least one of a watermark purpose, content information, enhanced service information, and an available enhanced service from the extracted watermark information. The fingerprint based ACR engine 136a may extract characteristic information on a certain section of a main AV content, and then, may obtain at least one of content information, enhanced service information, and an available enhanced service on the basis of the extracted characteristic information.

The ACR daemon 137a manages at least one ACR engine 136a. The daemon is executed continuously to process a periodic service request. The daemon appropriately delivers the collected requests to allow another program to process them. The ACR daemon 137a may manage the execution and termination of the ACR engine 136a. The ACR daemon 137a searches an ACR engine matching to a current main AV content among a plurality of ACR engines 136a. Especially, if a system resource is consumed greatly because several ACR engines are executed, the ACR daemon 137a sequentially executes the plurality of ACR engines 136a one by one according to a specific rule or priority to confirm whether content recognition is successful. Additionally, if one of the plurality of ACR engines 136a is successful in content recognition, the ACR daemon 137a obtains and executes an ACR application 139a corresponding to an enhanced service for the recognized content. While the ACR engine 136a performs the content recognition successfully, if contents are not recognized any more due to a channel change, the ACR daemon 137a may terminate the ACR application 139a.

The ACR middleware 138a serves as a browser for at least one ACR application 139a.

The ACR application 139a may provide user experience enhanced by ACR to a user. The ACR application 139a may be an application downloaded from an application store or the Internet or may be a simple Uniform Resource Locator (URL). The ACR application 139a may provide content target advertisement, a content provider portal service, a program specific service such as electronic program guide (EPG), or a content provider specific service. While the ACR application 139a interact with the ACR engine 136a through the ACR application, it receives content information or signature from the ACR engine 136a and additionally obtains an enhanced service corresponding to the content information or signature to playback them in the playback device 120. For this, an ACR application interface that the ACR application 139a uses is shown in Table 3 below.

TABLE 3

|  | Name | description |
|---|---|---|
| Method | String getContentID( ) | Return recognized content id, or undefined if content has not been recognized. |
|  | Date getTiming( ) | Return time stamp, or undefined if content has not been recognized or time stamp is unavailable. |
|  | String getSignature( ) | Return the signature captured, or undefined if capturing of the signature has failed. |

Figure 12:
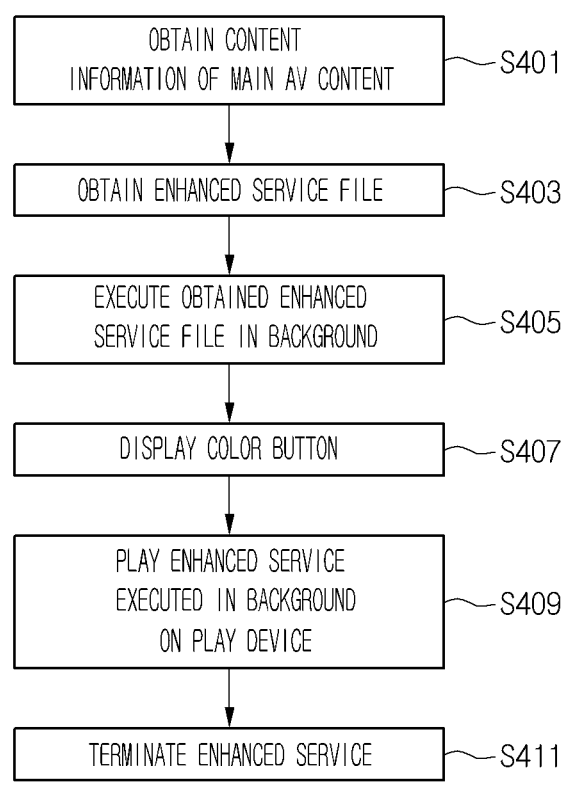
FIG. 12 is a flowchart illustrating an operation of an enhanced service management unit according to an embodiment.

FIG. 12 is a flowchart illustrating an operation of an enhanced service management unit according to an embodiment.

When the broadcast receiving device 60 and the video display device 100 are turned on and the external input port 111 of the video display device 100 is selected, the ACR daemon 137a obtains the content information on a main AV content broadcasted in a tuned channel through at least one ACR engine 136a in step S401.

Then, the ACR daemon 137a obtains an available enhanced service relating to the content information in step S403.

The ACR daemon 137a executes the obtained enhanced service in background in step S405.

The ACR daemon 137a displays a color button on the display unit 121 to notify a user that enhanced service is available in step S407.

When the ACR daemon 137a receives the use of the enhanced service, it plays the enhanced service executed in background in the playback device 120 in step S409.

If a change or main AV content is changed, the ACR daemon 137a recognizes a change through at least one ACR engine 136a and terminates the enhanced service in step S411.

Figure 13:
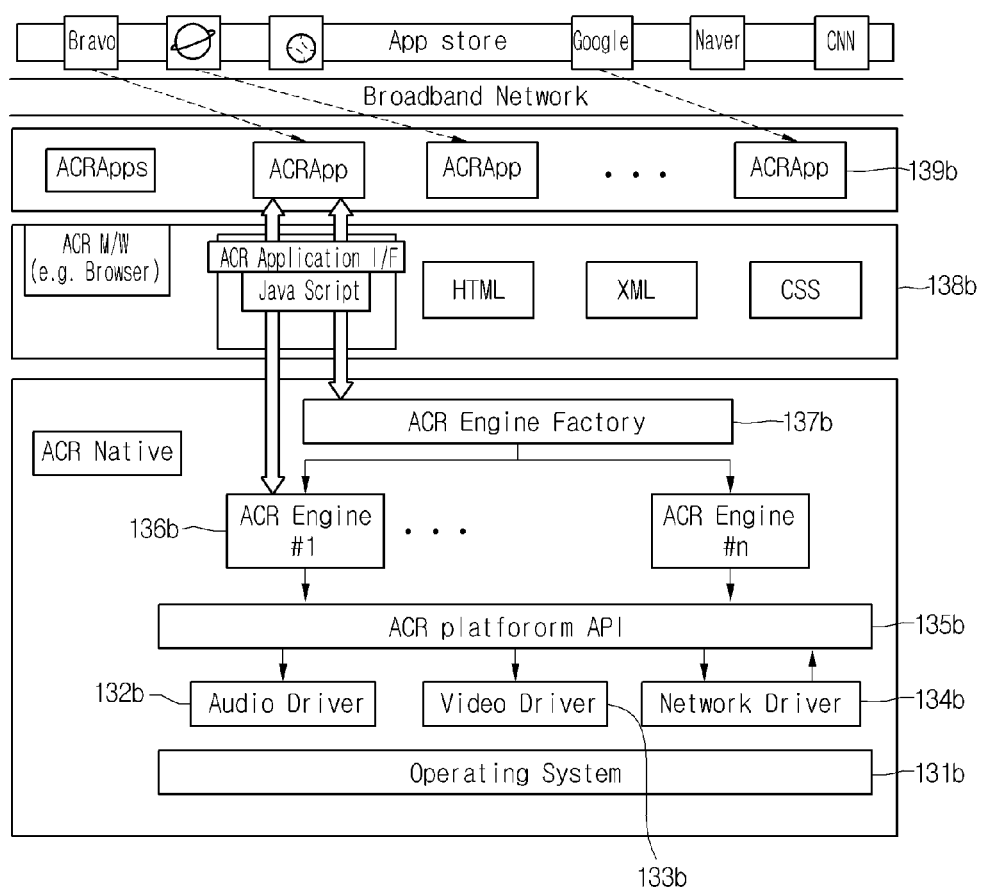
FIG. 13 is a hierarchy diagram of an enhanced service management unit according to an embodiment.

FIG. 13 is a hierarchy diagram of an enhanced service management unit according to an embodiment.

As shown in FIG. 13, the enhanced service management unit 130 may include an operating system 131b, an audio driver 132b, a video driver 133b, a network driver 134b, an ACR platform application program interface (API) 135b, at least one ACR engine 136b, an ACR engine management unit 137b, an ACR middleware 138b, and at least one ACR application 139b.

When the enhanced service management unit 130 is used as shown in FIG. 13, a user may need to necessarily recognize a channel or content. However, since the number of queries for ACR may be reduced, server overhead may be decreased.

The audio driver 132b, the video driver 133b, the network driver 134b, the ACR platform API 135b, the at least one ACR engine 136b, and the ACR middleware 138b in the enhanced service management unit 130 of FIG. 13 are identical or similar to those 132a, 133a, 134a, 135a, 136a, and 138a in the enhanced service management unit 130 FIG. 11. Therefore, their detailed descriptions will be omitted.

The ACR engine management unit 137b manages a list of at least one ACR engine 136b and provides a selection interface of the ACR engine 136b to the ACR application 139b.

The ACR application 139b may provide user experience enhanced by ACR to a user. The ACR application 139b may be an application downloaded from an application store or the Internet or may be a simple Uniform Resource Locator (URL). The ACR application 139b may provide content target advertisement, a content provider portal service, a program specific service such as electronic program guide (EPG), or a content provider specific service.

While the ACR application 139b interacts with the ACR engine management unit 137b through the ACR application interface of the ACR middleware 138b, it may select the ACR engine 136b to be used. For this, the ACR application interface that the ACR application 139b uses is shown in Table 4 and Table 5 below.

TABLE 4

|  | Name | description |
|---|---|---|
| Property | readonly ACRCollection acrCollection | List of ACR engines installed in the Receiver |
| Method | ACR getACR(String acrId) | Return an ACR object matched with ACR Id, or undefined if no item matched is found. The argument acrid means the unique identifier of the ACR engine/solution. |
|  | ACRCollection getAllACR( ) | Return the whole set of ACR objects installed in the Receiver, or undefined if no ACR is present at the Receiver. |

TABLE 5

|  | Name | description |
|---|---|---|
| Property | readonly Integer length | The number of ACR engines in the collection |
| Method | ACR item(Integer index) | Return the ACR object at position index in the collection, or undefined if no item is present at that position. The argument index means the index of the item that shall be returned. |

While the ACR application 139b interacts with the ACR engine 136b through the ACR application interface of the ACR middleware 138b, it controls the ACR engine 136b, and receives content information or signature from the ACR engine 136b to additionally obtain an enhanced service corresponding to the content information or signature. Then, the ACR application 139b plays them in the playback device 120. For this, the ACR application interface that the ACR application 139b uses is shown in Table 6 below.

TABLE 6

|  | Name | description |
|---|---|---|
| Property | readonly String acrId | the unique id of the ACR engine |
|  | readonly String name | short name of ACR engine |
|  | readonly String description | Description of ACR engine |
|  | readonly Integer acrType | FP or WM |
|  | readonly Integer acrComponent | components used for ACR (audio, video and both) |
|  | readonly String contentId | for WM |
|  | readonly Date timing | for WM |
|  | function onSignatureCaptured(String signature) |  |
| Constant | ACR_FINGERPRINT = 1 | ACR done by fingerprint technology |
|  | ACR_WATERMARK = 2 | ACR done by watermark technology |
|  | ACR_AUDIO = 1 | Audio component is used for the content recognition. |
|  | ACR_VIDEO = 2 | Video component is used for the content recognition. |
|  | ACR_AUDIO_VIDEO = 3 | Both audio/video components are used. |
| Method | Boolean Initialize( ) | Initialize the ACR object. |
|  | Boolean Finalize( ) | Destroy the ACR object. |
|  | Boolean startACR( ) | Start ACR engine in order to get ready to content recognition. |
|  | Boolean stopACR( ) | Stop the ACR engine. |
|  | Boolean getSignature( ) | for FP |
|  | String getContentId( ) | for WM |
|  | String getTiming( ) | for WM |
|  | String getALSURL( ) | for WM |
|  | Boolean setAudioAlgorithm (Integer audioNumCh, Interget audioSampleRate, Integer audioNumSamples, Integer audioBitPerSample) |  |
|  | Boolean setVideoAlgorithm (Integer videoNumFrames, RECT screenRect) |  |

Thus, one example of a fingerprint sample code of a content provider related application using such an ACR application interface is shown in Table 7.

TABLE 7

```
<HEAD>
<title>NBCU app</title>
<meta name="acr " content="zeitera-fp-audio"/>
<meta name="appAttribute" content="CP"/>
<object type="application/x-acr" id="ACRSol" / >
<object type="application/x-acrfactory" id="ACRFac" / >
<script type="text/javascript">
var aspfpURL= "www.zeitera.com/fp-audio";
var acrSol = get ElementbyID(ACRSol);
var acrFac = get ElementbyID(ACRFac);
acrSol=acrFac.getACR("zeitera-fp-audio");
if(acrSol == null) return;
acrSol.Initiailize( );
while ( ) { // for FP
    var signature = acrSol.getSignature( );
    if (signature == null) continue;
```

TABLE 7-continued

```
    var res = sendRequest(aspfpURL, signature); // 1st query
        if (res.contentID.substring(0, 3) == "NBCU" ) { // CP matching success
            var res2 = sendRequest(res.alsURL) ; // 2nd query
            if (res2.asURL) {
                // launch specific app application with this appURL
            }
        }
}
</script>
</HEAD>
<BODY>
...
</BODY>
```

Thus, one example of a fingerprint sample code of a content provider related application using such an ACR application interface is shown in Table 8.

TABLE 8

```
<HEAD>
<title>NBCU Heros app</title>
<meta name="acr " content="zeitera-fp-audio"/>
<meta name="appAttribute" content="Program"/>
<object type="application/x-acr" id="ACRSol" / >
<object type="application/x-acrfactory" id="ACRFac" / >
<script type="text/javascript">
var aspfpURL= "www.zeitera.com/fp-audio";
var acrSol = get ElementbyID(ACRSol);
var acrFac = get ElementbyID(ACRFac);
acrSol=acrFac.getACR("zeitera-fp-audio");
if(acrSol == null) return;
acrSol.Initiailize( );
while ( ) { // for FP
    var signature = acrSol.getSignature( );
    if (signature == null) continue;
    var res = sendRequest(aspfpURL, signature); // 1st query
        if (res.contentID.substring(0, 9) == "NBCU-Heros" ) { // Program matching success
            var res2 = sendRequest(res.alsURL, res.contentID, res.timing); // 2nd query
            if (res2.asURL) {
                // launch specific app application with this appURL
            }
        }
}
</script>
</HEAD>
<BODY>
</BODY>
```

Thus, one example of a watermarking sample code of a content provider related application using such an ACR application interface is shown in Table 9.

TABLE 9

```
<HEAD>
<title>NBCU app</title>
<meta name="acr " content="nielsen-wm-audio"/>
<meta name="appAttribute" content ="CP"/>
<object type="application/x-acr" id="ACRSol" / >
<object type="application/x-acrfactory" id="ACRFac" / >
<script type="text/javascript">
var aspfpURL= "www.nielsen.com/wm-audio";
var acrSol = get ElementbyID(ACRSol);
var acrFac = get ElementbyID(ACRFac);
acrSol=acrFac.getACR("nielsen-wm-audio");
if(acrSol == null) return;
acrSol.Initiailize( );
while ( ) { // for WM
    var contentId = acrSol.getContentId( );
    if (contentId == null) continue;
    var alsURL = acrSol.getALSURL( );
    if (contentId.substring(0, 3) == "NBCU" ) { // CP matching success
        var res = sendRequest(alsURL); // 2nd query
```

TABLE 9-continued

```
            if (res.asURL) {
                // launch specific app application with this appURL
            }
        }
    }
</script>
</HEAD>
<BODY>
    ...
</BODY>
```

Thus, one example of a watermarking sample code of a content provider related application using such an ACR application interface is shown in Table 10.

TABLE 10

```
<HEAD>
<title>NBCU Heros app</title>
<meta name="acr " content="nielsen-wm-audio"/>
<meta name="appAttribute" content="Program"/>
<object type="application/x-acr" id="ACRSol" / >
<object type="application/x-acrfactory" id="ACRFac" / >
<script type="text/javascript">
var aspfpURL= "www.nielsen.com/wm-audio";
var acrSol = get ElementbyID(ACRSol);
var acrFac = get ElementbyID(ACRFac);
acrSol=acrFac.getACR("nielsen-wm-audio");
if(acrSol == null) return;
acrSol.Initiailize( );
while ( ) { // for WM
    var contentId = acrSol.getContentId( );
    if (contentId == null) continue;
    var timing = acrSol.getTiming( );
    var alsURL = acrSol.getALSURL( );
    if (contentId.substring(0, 9) == "NBCU-Heros" ) { // Program
matching success
        var res = sendRequest(alsURL, contentId, timing); // 2nd query
        if (res.asURL) {
            // launch specific app application with this appURL
        }
    }
}
</script>
</HEAD>
<BODY>
    ...
</BODY>
```

Figure 14:
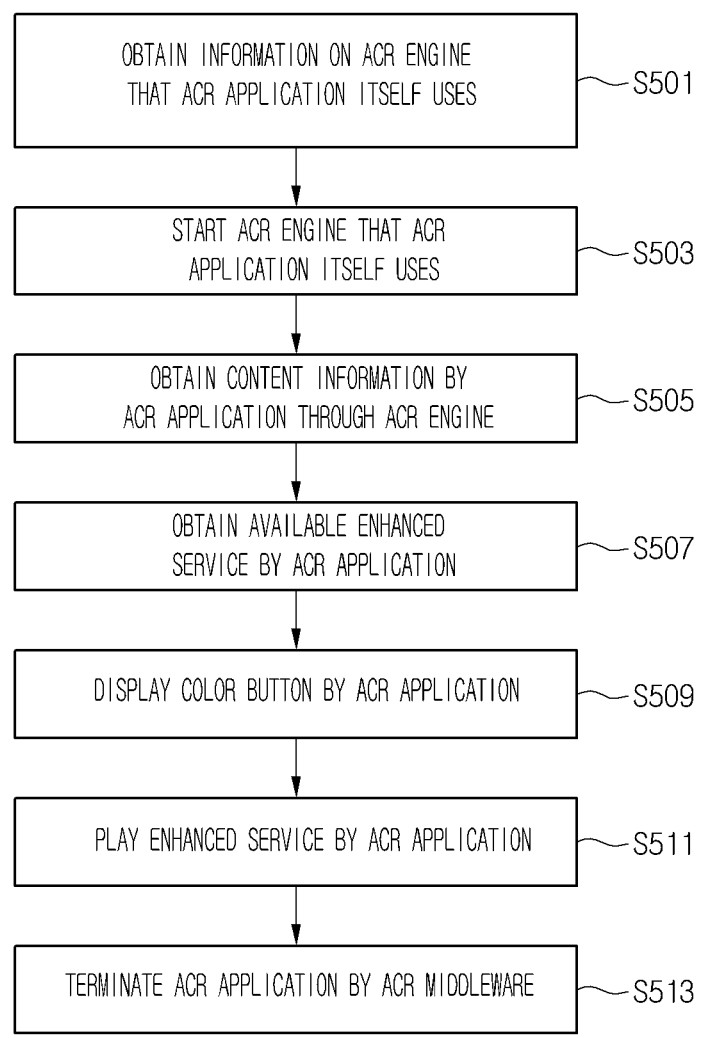
FIG. 14 is a flowchart illustrating an operation of an enhanced service management unit according to an embodiment.

FIG. 14 is a flowchart illustrating an operation of an enhanced service management unit according to an embodiment.

Although the broadcast receiving device 60 and the video display device 100 are turned on and the external input port 111 of the video display device 100 is selected, the video display device 100 may not perform automatic content recognition before the ACR application 139b is executed.

Once the corresponding channel related ACR application 139b is executed by a user recognizing a channel of a main AV content, the ACR application 139b queries and information on the ACR engine 136b that it uses to the ACR engine management unit 137b and receives it in step S501.

Then, the ACR application 139b starts the ACR engine 136b that it uses in step S503 and obtains content information through the ACR engine 136b in step S505.

The ACR application 139b obtains an available enhanced service relating to a main AV content through the obtained content information in step S507, and displays a color button on the display unit 121 to notify a user that an enhanced service is available in step S509.

When the ACR application 139b receives the use of the enhanced service, it plays the enhanced service in the playback device 120 in step S511.

When the ACR middleware 138b receives a user input relating to the termination of the ACR application 139b, it terminates the ACR application 139b in step S513.

Figure 15:
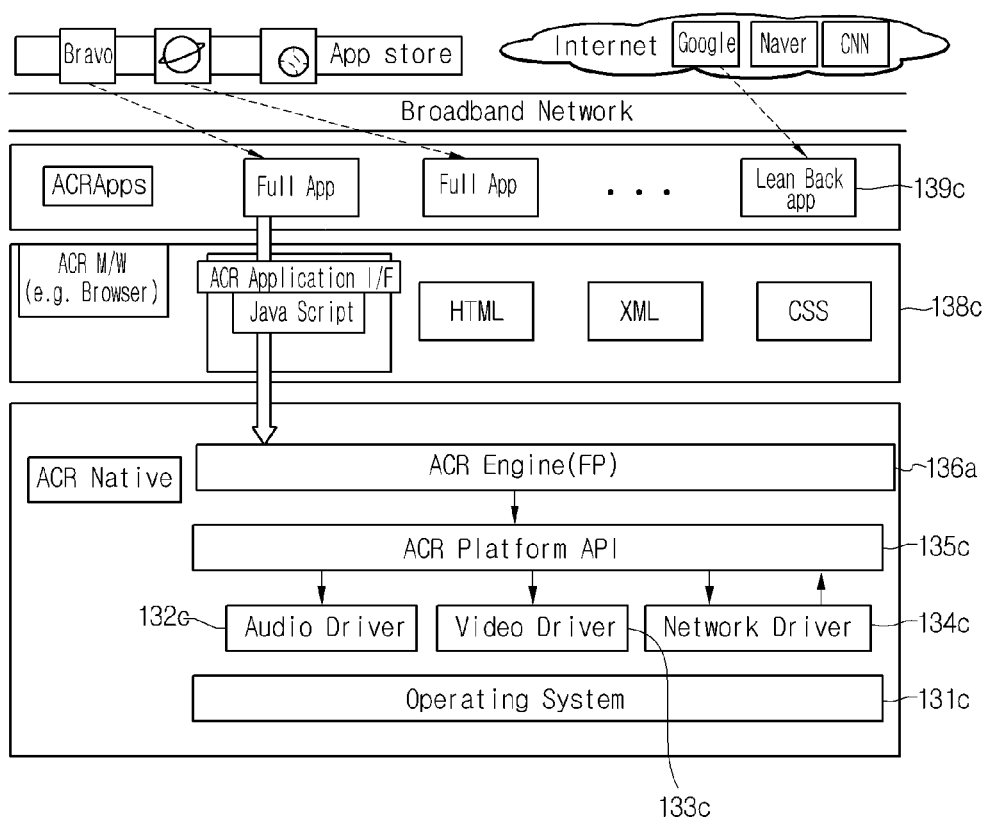
FIG. 15 is a hierarchy diagram of an enhanced service management unit according to an embodiment.

FIG. 15 is a hierarchy diagram of an enhanced service management unit according to an embodiment.

As shown in FIG. 15, the enhanced service management unit 130 may include an operating system 131c, an audio driver 132c, a video driver 133c, a network driver 134c, an ACR platform API 135c, an ACR engine 136c, an ACR middleware 138c, and at least one ACR application 139c.

When the enhanced service management unit 130 is used as shown in FIG. 15, a user may need to necessarily recognize a channel or content. However, since the number of queries for ACR may be reduced, server overhead may be decreased.

The audio driver 132c, the video driver 133c, the network driver 134c, the ACR platform API 135c, and the ACR middleware 138c in the enhanced service management unit 130 of FIG. 15 are identical or similar to those 132a, 133a, 134a, 135a, and 138a in the enhanced service management unit 130 FIG. 11. Therefore, their detailed descriptions will be omitted.

The ACR engine 136c extracts characteristic information from a part of frames or a part of audio samples of a main AV content to transmit a query including the extracted characteristic information to an ACR adjustment server (not shown). The ACR adjustment server may transmit a fingerprint server address in response to the query. Additionally, the ACR adjustment server may transmit content information corresponding to the characteristic information together with the fingerprint server address.

When receiving the fingerprint server address from the ACR engine 136c, the ACR application 139c directly transmit a query, which includes the characteristic information that the ACR engine 136c extracts, to the fingerprint server corresponding to the fingerprint server address. For this, the ACR application interface that the ACR application 139c uses is shown in Table 11 below.

TABLE 11

| | Name | Description |
|---|---|---|
| Property | Readonly String signature | For fingerprint, |
| | function (String signature) onSignatureCaptured | For fingerprint, function pointer: pointed function will return signature value from lower ACREngine, event driven |
| Method | Boolean getSignature( ) | For fingerprint, asynchronous call to get signature, will use onSignatureCaptured |
| | Boolean getContentID( ) | For watermark, Return recognized content id, or undefined if content has not been recognized. |
| | Boolean resetACREngine( ) | when getSignature fails several times(ch change), app will give control to ACREngine to query back to ACRCoordinator. |
| | String getACRBackend( ) | Return ACRBackend URL |

Thus, one example of a fingerprint sample code using such an ACR application interface is shown in Table 12.

TABLE 12

```
<HEAD>
<title>CP app</title>
<object type="application/x-acr" id="ACRSol" / >
```

TABLE 12-continued

```
<script type="text/javascript">
var acrSol = get ElementbyID(ACRSol);
acrSol.onSignatureCaptured = returnSignature;
var acrBE = acrSol.getACRBackend( );
function doACR( ) {
   acrSol.getSignature( );
   setTimer("acrTimeout", 1000);
}
function acrTimeout( ) {
   timeout++;
   if(timeout > 3)
      acrSol.resetACREngine( );
}
function returnSignature(signature) {
   timeout = 0;
   doSpecificJob(signature);
}
function doSpecificJob(signature) {
   // do specific work regarding this time
}
</script>
</HEAD>
<BODY onload="doACR( )">
...
</BODY>
```

Figure 16:
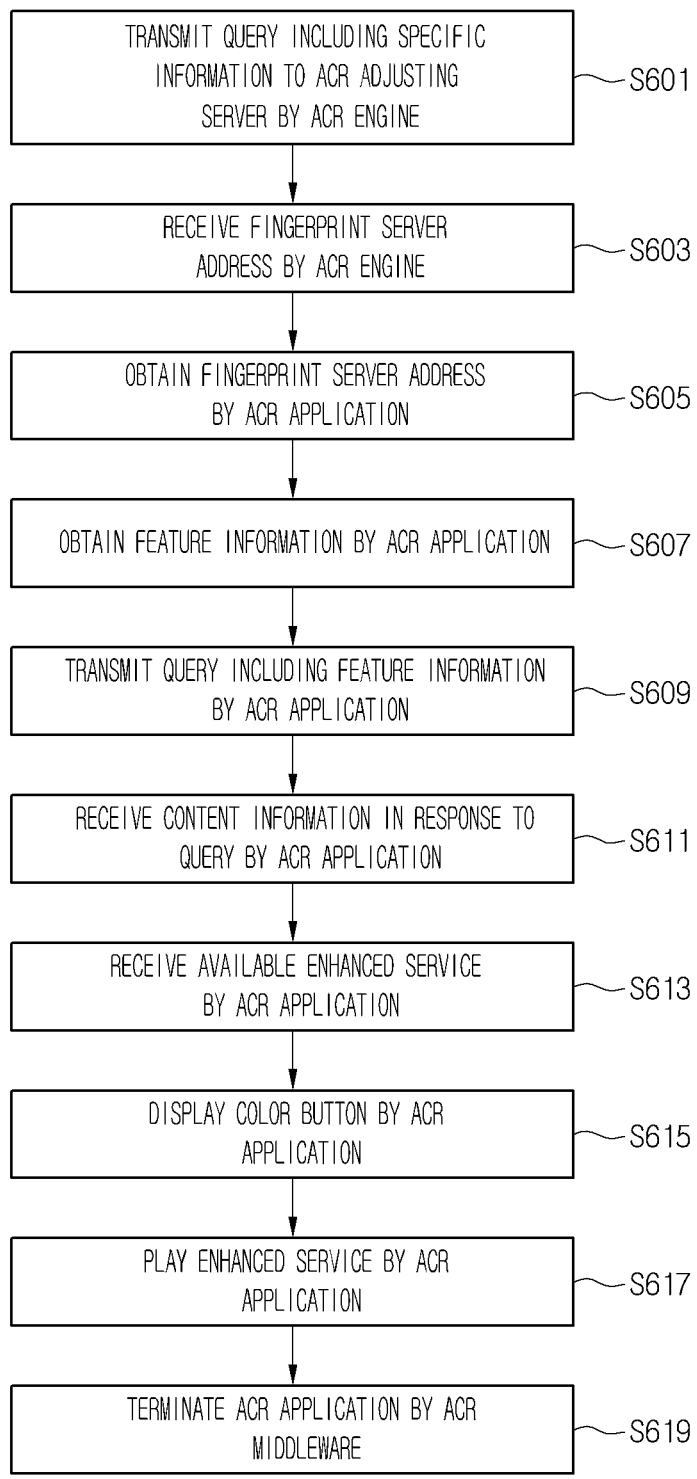
FIG. 16 is a flowchart illustrating an operation of an enhanced service management unit according to an embodiment.

FIG. 16 is a flowchart illustrating an operation of an enhanced service management unit according to an embodiment.

When the broadcast receiving device 60 and the video display device 100 are turned on and the external input port 111 of the video display device 100 is selected, the ACR engine 136c extracts characteristic information from a part of frames or a part of audio samples of a main AV content to transmit a query including the extracted characteristic information to an ACR adjustment server (not shown) in step S601.

The ACR engine 136c receives a fingerprint server address in response to the query in step S603.

The ACR application 139c obtains the fingerprint server address from the ACR engine 136c through a getACRBackend( ) method.

The ACR application 139c obtains characteristic information on a certain video frame section or a certain audio section of a main AV content from the ACR engine 136c through a getSignature( ) method in step S607.

The ACR application 139c transmits a query, which includes the obtained characteristic information, to a fingerprint server corresponding to the obtained fingerprint server address in step S609.

The ACR application 139c receives content information in response to the query in step S611.

The ACR application 139c obtains an available enhanced service on the basis of the obtained content information in step S613, and displays a color button on the display unit 121 to notify a user that an enhanced service is available in step S615.

When the ACR application 139c receives the use of the enhanced service, it plays the enhanced service in the playback device 120 in step S617.

When the ACR middleware 138c receives a user input relating to the termination of the ACR application 139c, it terminates the ACR application 139c in step S619.

Figure 17:
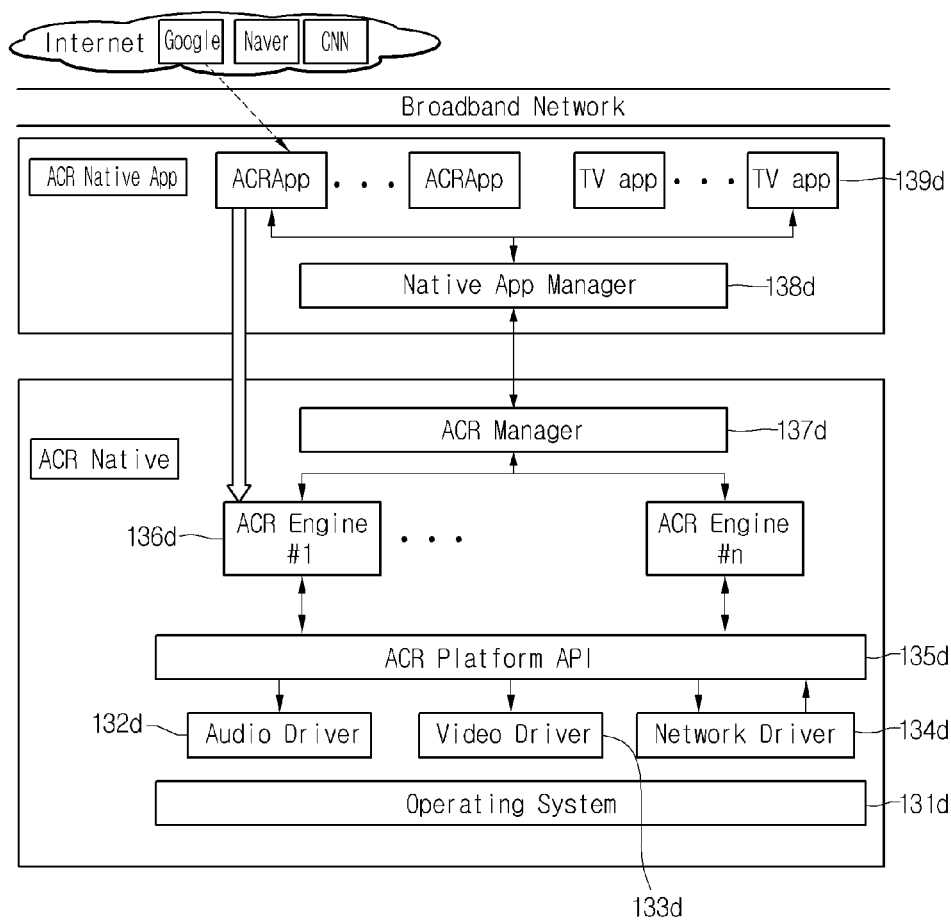
FIG. 17 is a hierarchy diagram of an enhanced service management unit according to an embodiment.

FIG. 17 is a hierarchy diagram of an enhanced service management unit according to an embodiment.

As shown in FIG. 17, the enhanced service management unit 130 may include an operating system 131d, an audio driver 132d, a video driver 133d, a network driver 134d, an ACR platform API 135d, at least one ACR engine 136d, an ACR engine management unit 137d, an application management unit 138d, and at least one ACR application 139d.

When the enhanced service management unit 130 is used as shown in FIG. 17, a user doesn't need to necessarily recognize a channel or content and an ACR operation may be performed always.

The audio driver 132d, the video driver 133d, the network driver 134d, the ACR platform API 135d, and the plurality of ACR engines 136d in the enhanced service management unit 130 of FIG. 17 are identical or similar to those 132a, 133a, 134a, 135a, and 136a in the enhanced service management unit 130 FIG. 11. Therefore, their detailed descriptions will be omitted.

The ACR engine management unit 137d confirms that the ACR engine 136d matches to the main AV content received from the external input port 111 and confirms that the ACR engine 136d matches to the application 139d. At this point, the ACR engine management unit 137d controls the plurality of ACR engines 136d to simultaneously or sequentially perform watermark extraction or query transmission. The ACR engine management unit 137d controls the plurality of ACR engines 136d through priority. If one of the plurality of ACR engines 136d is successful in recognizing a main AV content, the ACR engine management unit 137d puts the remaining ACR engines in sleep mode and obtains the content information on the main AV content from the operating ACR engine.

While the application management unit 138d interacts with the ACR engine management unit 137d, it controls generation, start, stop, sleep, and termination of the ACR application.

The ACR application 139d may be a built-in application. The ACR application 139d may control the ACR engine 136b through functions shown in Table 13.

TABLE 13

| | Name |
|---|---|
| Function calls | char *getContentID( )<br>Date getTiming( )<br>char *getSignature( )<br>Boolean registerEventListener(EvtType evtType, Boolean (*eventListener)(EvtType evtType, char *contentId, Date *timing, char *signature)); |
| Data Structure | struct Date {<br>   int year;<br>   int month;<br>   int day;<br>   int hour;<br>   int minute;<br>   int second;<br>   int msecond;<br>};<br>typedef enum EvtType {<br>   EVT_PROGRAM_CHANGED,<br>   EVT_CHANNEL_CHANGED,<br>   EVT_ALL }; |

Figure 18:
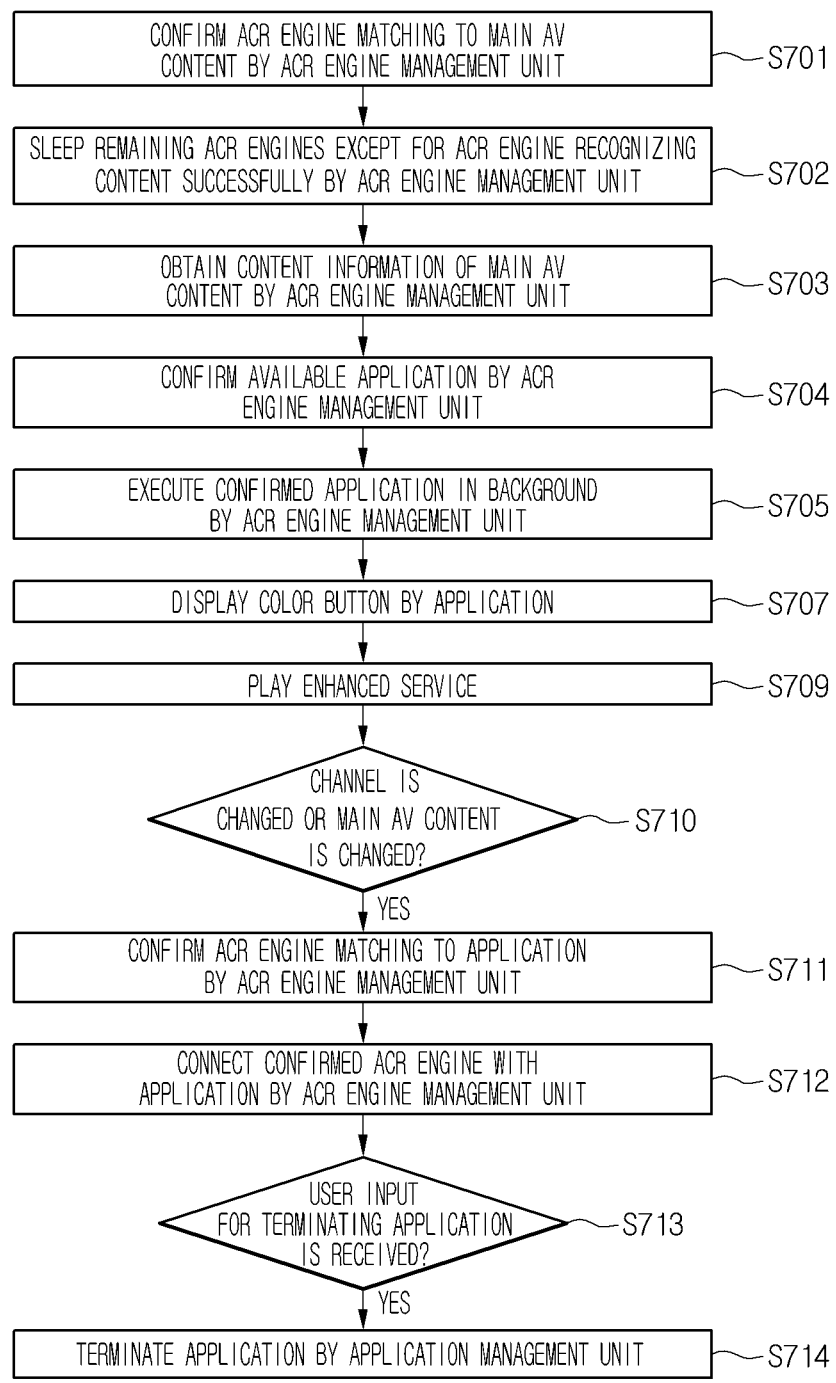
FIG. 18 is a flowchart illustrating an operation of an enhanced service management unit according to an embodiment.

FIG. 18 is a flowchart illustrating an operation of an enhanced service management unit according to an embodiment.

When the broadcast receiving device 60 and the video display device 100 are turned on and the external input port 111 of the video display device 100 is selected, the ACR engine management unit 137d confirms that the ACR engine 136a matches to the main AV content received from the external input port 111 in step S701. At this point, the ACR engine management unit 137d controls the plurality of ACR engines 136d to simultaneously or sequentially perform watermark extraction or query transmission. The ACR engine management unit 137*d* controls the plurality of ACR engines 136*d* through priority.

If one of the plurality of ACR engines 136*d* is successful in recognizing a main AV content, the ACR engine management unit 137*d* puts the remaining ACR engines in sleep mode in step S702, and obtains the content information on the main AV content from the operating ACR engine in step S703.

Then, the ACR engine management unit 137*d* confirms an available application relating to content information in step S704, and requests the execution of the confirmed application 139*d* to the application management unit 138*d*.

The application management unit 138*d* executes the confirmed application 139*d* in background in step S705.

The application 139*d* executed in background displays a color button on the display unit 121 to notify a user that enhanced service is available in step S707.

When the application 139*d* executed in background receives the use of the enhanced service from a user, it plays the enhanced service in the playback device 120 in step S709.

If a channel or main AV content is changed in step S710, the ACR engine management unit 137*d* confirms the ACR engine 136*a* matching to the application 139*d* and connects the confirmed ACR engine 136*a* to the application 139*d* in step S711. At this point, the ACR engine management unit 137*d* controls the plurality of ACR engines 136*d* to simultaneously or sequentially perform watermark extraction or query transmission.

If the application management unit 138*d* receives a user input for the termination of the application 139*d* in step S712, it terminates the application 139*d* in step S713.

Then, referring to FIGS. 19 and 20, a method of synchronizing a playback time of a main AV content with a playback time of an enhanced service according to an embodiment will be described.

Figure 19:
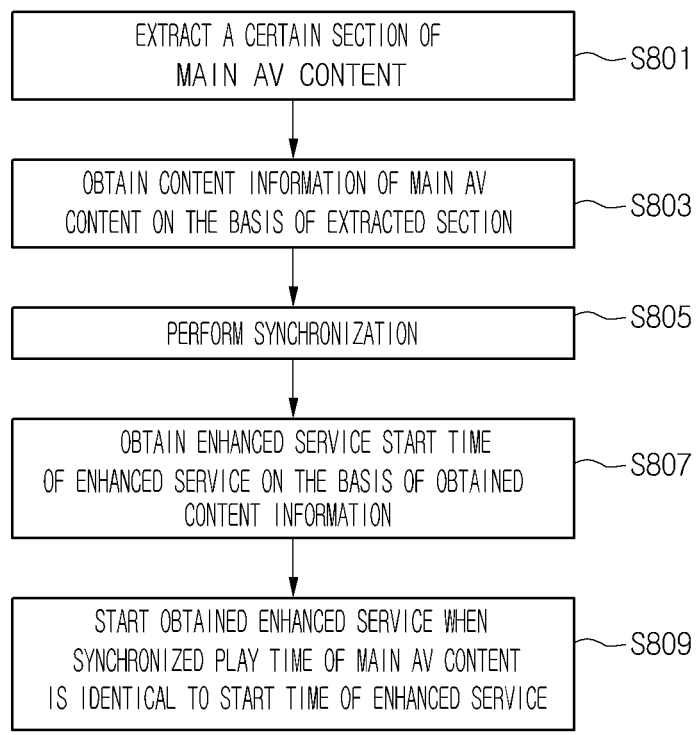
FIG. 19 is a flowchart illustrating a method of synchronizing a playback time of a main AV content with a playback time of an enhanced service according to an embodiment.

FIG. 19 is a flowchart showing a method of synchronizing a playback time of a main AV content with a playback time of an enhanced service according to an embodiment.

The enhanced service information may include a start time of an enhanced service. At this point, the video display device 100 may need to start the enhanced service at the start time. However, since the video display device 100 receives a signal transmitting an uncompressed main AV content with no time stamp, the reference time of a plying time of the main AV content is different from that of a start time of the enhanced service. Although the video display device 100 receives a main AV content having time information, the reference time of a plying time of the main AV content may be different from that of a start time of the enhanced service, like rebroadcast. Accordingly, the video display device 100 may need to synchronize the reference time of the main AV content with that of the enhanced service. Especially, the video display device 100 may need to synchronize the playback time of the main AV content with the start time of the enhanced service.

First, the enhanced service management unit 130 extracts a section of a main AV content in step S801. The section of the main AV content may include at least one of a part of video frames or a part of audio samples of the main AV content. Time that the enhanced service management unit 130 extracts the section of the main AV content is designated as Tn.

The enhanced service management unit 130 obtains content information on a main AV content on the basis of the extracted section. In more detail, the enhanced service management unit 130 decodes information encoded with invisible watermark in the extracted section to obtain content information. Additionally, the enhanced service management unit 130 may extract characteristic information in the extracted section, and obtain the content information on the main AV content from the fingerprint server 22 or the content information storage unit 151 on the basis of the extracted characteristic information. Time that the enhanced service management unit 130 obtains the content information is designated as Tm.

Moreover, the content information includes a start time Ts of the extracted section. After the content information acquisition time Tm, the enhanced service management unit 130 synchronizes the playback time of the main AV content with the start time of the enhanced service on the biases of Ts, Tm, and Tn. In more detail, the enhanced service management unit 130 regards the content information acquisition time Tm as a time Tp calculated by the following Equation 1.

$$Tp=Ts+(Tm-Tn)$$ [Equation 1]

Additionally, the enhanced service management unit 130 regards a time of when Tx elapses after the content information acquisition time as Tp+Tx.

Then, the enhanced service management unit 130 obtains an enhanced service and its start time Ta on the obtained content information in step S807.

If the synchronized playback time of the main AV content is identical to the start time Ta of the enhanced service, the enhanced service management unit 130 starts the obtained enhanced service in step S809. In more detail, the enhanced service management unit 130 may start the enhanced service when the following Equation 2 is satisfied.

$$Tp+Tx=Ta$$ [Equation 2]

Figure 20:
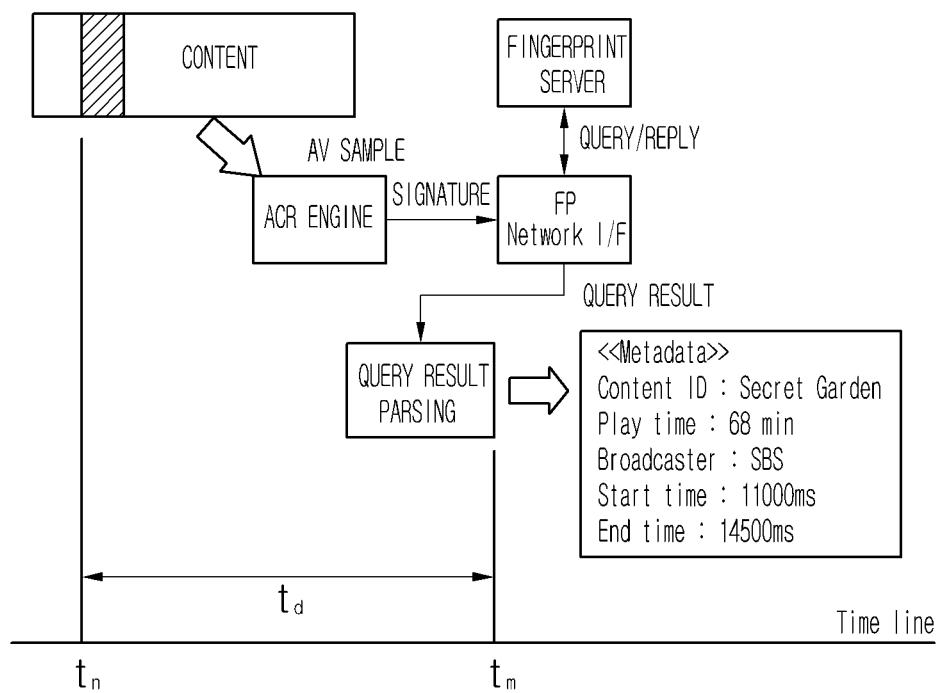
FIG. 20 is a conceptual diagram illustrating a method of synchronizing a playback time of a main AV content with a playback time of an enhanced service according to an embodiment.

FIG. 20 is a conceptual diagram illustrating a method of synchronizing a playback time of a main AV content with a playback time of an enhanced service according to an embodiment.

As shown in FIG. 20, the video display device 100 extracts an AV sample during a system time Tn.

The video display device 100 extracts characteristic information from the extracted AV sample, and transmits a query including the extracted characteristic information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed according to Equation 1 as Ts+(Tm−Tn), so that, after that, the playback time of the main AV content may be synchronized with the start time of the enhanced service.

Next, an ACR application will be described according to various embodiments with reference to FIGS. 21 to 50.

The ACR application may include an auto playing application, a content provider application, and an image display manufacturer application.

Figure 21:
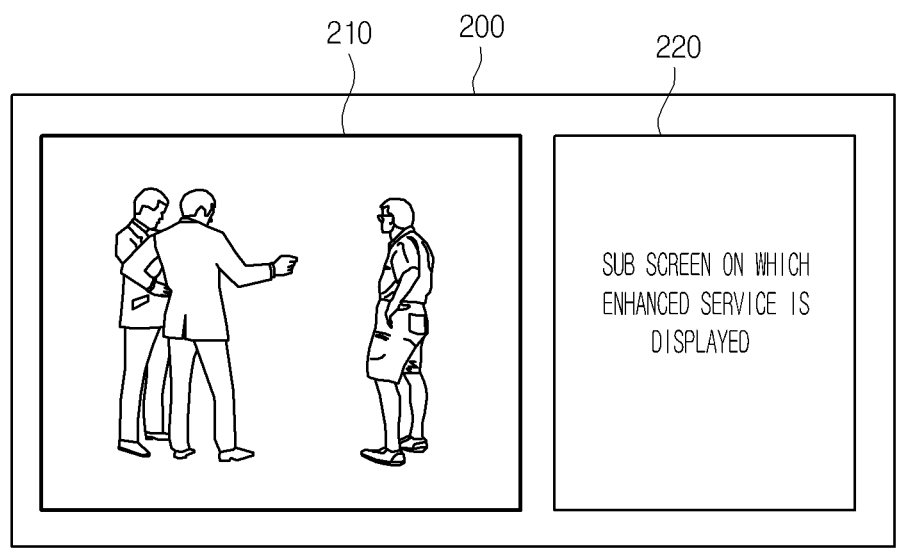
FIG. 21 is a screen when an auto playing application is executed according to an embodiment.

FIG. 21 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main AV content according to a playback time of the main AV content, without a user input. That is, a content provider or broadcasting station entirely controls the auto playing application.

As shown in FIG. 21, once the auto playing application is executed, the screen 200 may include a sub screen 210 where a reduced main AV content is played and a sub screen 220 where enhanced information is displayed. The sub screen 200 where enhanced information is displayed may be spatially separated from the sub screen 210 where a main AV content is played.

Moreover, when an auto playing application is executed, an area where enhanced information is displayed may be semi-transparent. In this case, the area where enhanced information is displayed may overlay on an area where a main AV content played.

FIG. 22 is a screen when a content provider application is executed according to an embodiment.

In this specification, the content provider application is designated as a full interactive application.

As shown in FIG. 22 (A), the video display device 100 downloads and stores a plurality of applications. FIG. 22 (A) illustrates icons 230 of the applications. A content provider application among the plurality of applications is an application created and distributed by a content provider, and thus, may be under control of the content provider.

A user of the video display device 100 may download a content provider application from an application store and determines whether to execute the downloaded content provider application.

FIG. 22 (B) is a screen when a content provider application is executed. As shown in FIG. 22 (B), the screen 200 may include the sub screen 210 where a reduced main AV content is played and the sub screen 220 where enhanced information is displayed.

Hereinafter, a video display device manufacturer application will be described according to an embodiment with reference to FIGS. 23 to 50.

The video display device manufacturer application is created and controlled by a video display device manufacturer, and may be stored in advance when the video display device 100 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 100 may determine whether to execute the video display device manufacturer application.

The video display device manufacturer application may have two types.

The video display device manufacturer application of the first type has a resizing user interface. The video display device manufacturer application having the resizing user interface reduces the size of an area where a main AV content is displayed to display all the main AV content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main AV content is displayed, and overlaps an area where an application is displayed on the main AV content. Since the area where an application is displayed covers the main AV content, an application area may be semi-transparent.

Figure 23:
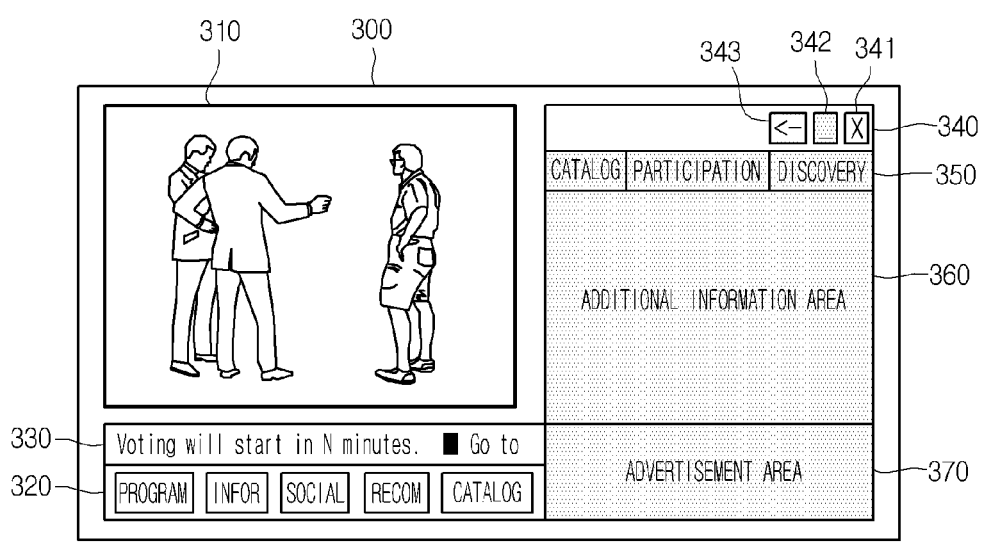
FIG. 23 is a screen when a video display device manufacturer application having a resizing user interface is executed according to an embodiment.

FIG. 23 is a screen when a video display device manufacturer application having a resizing user interface is executed according to an embodiment.

As shown in FIG. 23, the screen 300 of when a video display device manufacturer application having a resizing user interface is executed includes a main content area 310 where a main AV content is displayed, a main menu area 320 where a main menu is displayed, a notification area 330 where a notification message is displayed, a control button area 340 where a control button is displayed to control the video display device manufacturer application, a sub menu area 350 where a sub menu is displayed, an enhanced information area 360 where enhanced information is displayed, and an advertisement area 370 where advertisement is displayed.

The control button area 340 includes an ending button 341 for ending the video display device manufacturer application, a hiding button 342 for hiding the video display device manufacturer application, and a back button 343 for returning to previous information.

In the video display device manufacturer application having the resizing user interface, the main AV content area 310 is disposed on the top-left of the screen 300; the main menu area 320 and the notification area 330 is disposed on the bottom of the main AV content area 310; the control button area 340 is disposed on the top-left; the sub menu area 350 is disposed between the control button area 340 and the enhanced information area 360; the advertisement area 370 is disposed on the bottom-right; and the enhanced information area 360 is disposed between the sub menu area 350 and the advertisement area 370. However, their positions may vary.

Figure 24:
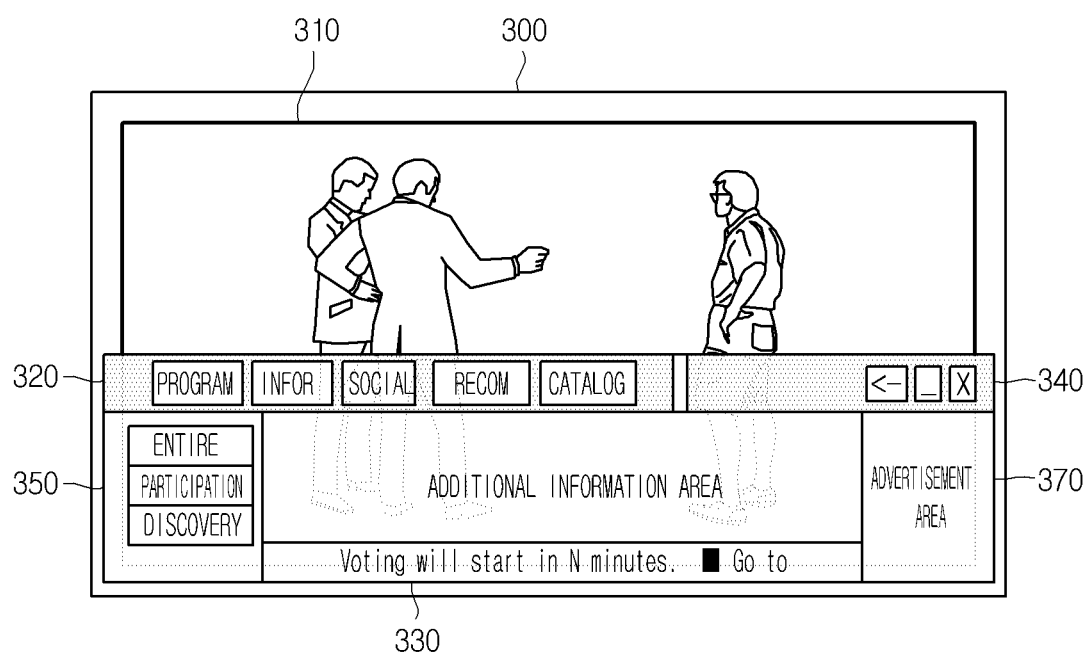
FIG. 24 is a screen when a video display device manufacturer application having an overlay user interface is executed according to an embodiment.

FIG. 24 is a screen when a video display device manufacturer application having an overlay user interface is executed according to an embodiment.

As shown in FIG. 24, like the video display device manufacturer application having the resizing user interface, the screen 300 of when the video display device manufacturer application having the overlay user interface is executed includes a main content area 310 where a main AV content is displayed, a main menu area 320 where a main menu is displayed, a notification area 330 where a notification message is displayed, a control button area 340 where a control button is displayed to control the video display device manufacturer application, a sub menu area 350 where a sub menu is displayed, an enhanced information area 360 where enhanced information is displayed, and an advertisement area 370 where advertisement is displayed.

In the video display device manufacturer application having the overlay user interface, the main AV content area 310 is disposed on the top-left of the screen 300; the main menu area 320 and the notification area 330 is disposed on the bottom of the main AV content area 310; the control button area 340 is disposed on the top-left; the sub menu area 350 is disposed between the control button area 340 and the enhanced information area 360; the advertisement area 370 is disposed on the bottom-right; and the enhanced information area 360 is disposed between the sub menu area 350 and the advertisement area 370. However, their positions may vary.

Hereinafter, a video display device manufacturer application having a resizing user interface will be mainly described.

The video display device manufacturer application receives necessary information from an ACR engine built in the video display device 100 and has two types of menus largely according to its character.

The first type menu is for a time insensitive enhanced service. That is, when a menu relating to the time insensitive enhanced service is selected, the video display device 100 obtains an identifier of a main AV content that is currently played on a screen, obtains an enhanced service on the basis of the obtained identifier, and displays the obtained enhanced service on the enhanced information area 360. Examples of such a time insensitive enhanced service includes titles, genres, actors, directors, and other people's evaluations, short clips, and short explanations. Through this basic information, the video display device 100 may search enhanced information, link to a social network service such as Facebook and Twitter, or provide a recommended service and a related advertisement.

The second type menu is for a time sensitive enhanced service. That is, when a menu relating to the time sensitive enhanced service is selected, the video display device 100 obtains an identifier and playback time information on a main AV content that is currently played on a screen, obtains a time sensitive enhanced service on the basis of the obtained identifier and playback time information, and displays the obtained enhanced service on the enhanced information area 360.

The main menu of the video display device manufacturer application includes a program menu, an information menu, a social menu, a recommendation menu, and a catalogue menu. Among these, the time insensitive menu includes the information menu, the social menu, the recommendation menu, and the catalogue menu, and the time sensitive menu includes the program menu. If the time insensitive menu is selected, the time sensitive application may be called. Other than these five main menus, other main menus may be added. If each main menu is selected, a sub menu of the selected main menu is displayed on the sub menu area 350.

Figure 25:
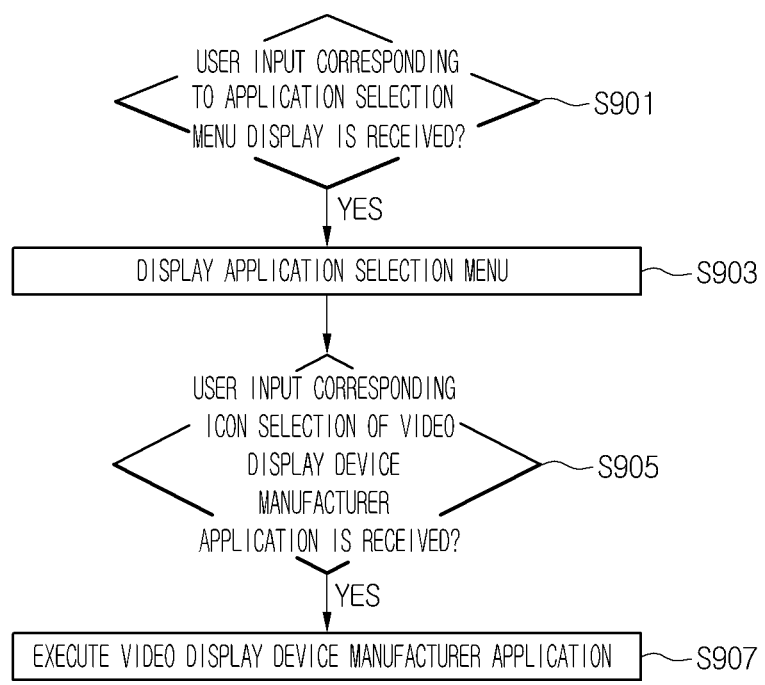
FIG. 25 is a flowchart illustrating a method of executing a video display device manufacturer application according to an embodiment.

FIG. 25 is a flowchart illustrating a method of executing a video display device manufacturer application according to an embodiment.

Figure 26:
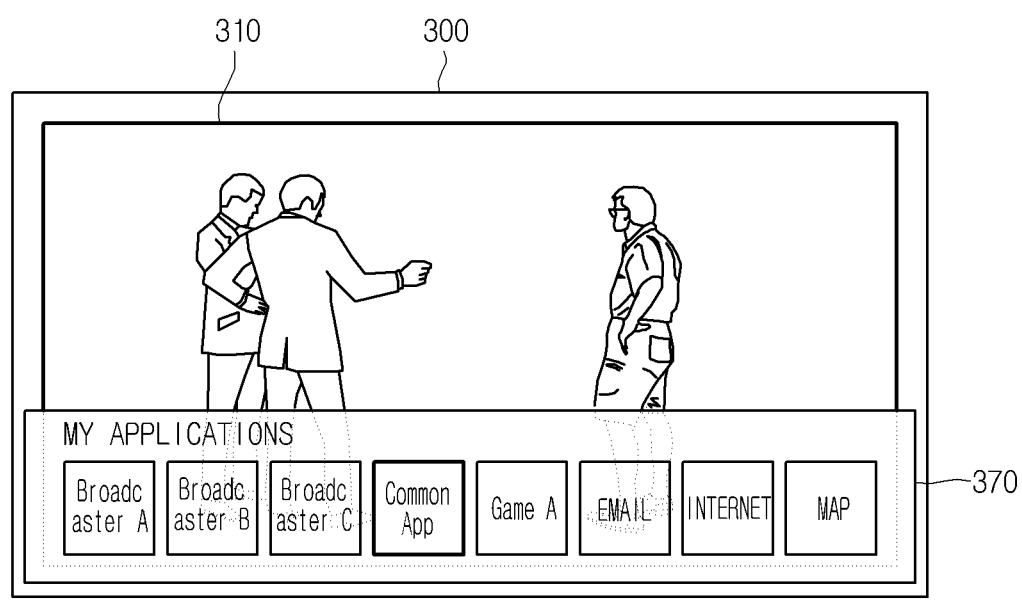
FIG. 26 is a screen when an application selection menu is displayed according to an embodiment.

When receiving a user input corresponding to an application selection menu display through pressing of a specific key of a remote controller, shaking of a motion remote controller in a downward direction, zooming of the cursor of a motion remote controller in the bottom direction of the screen while a main AV content is played in step S901, the video display device 100 displays an application selection menu of FIG. 26 in step S903.

FIG. 26 is a screen when an application selection menu is displayed according to an embodiment.

As shown in FIG. 26, the application selection menu 380 is disposed at the bottom of the screen 300. The application selection menu 380 may be semi-transparent.

The application selection menu 380 includes execution icons of a plurality of applications installed in the video display device 100. One icon of the displayed execution icons corresponds to the execution icon of the video display device manufacturer application.

When receiving a user input corresponding to an icon selection of the video display device manufacturer application through manipulating of the left and right arrow keys in a remote controller or moving of the cursor according to a movement of a motion remote controller in step S905, the video display device 100 executes the video display device manufacturer application in step S907. Through this, a user may immediately execute the application if he/she wants without access to an application store while watching a main AV content.

Once the video display device manufacturer application is executed, its main menu is displayed. If a program menu is selected by default, its sub menu is displayed on the sub menu area 350. An all sub menu is selected by default among the sub menus of the program menu. Focus is made on the all sub menu. As time elapses, an enhanced service displayed on the enhanced information area 360 is automatically updated. The ← button is used for returning to a previous menu and the X button is used for returning to an entire screen after closing the video display device manufacturer application.

Then, a video display device manufacturer application will be described according to an embodiment with reference to FIGS. 27 to 29.

The program main menu is a menu for displaying an application, which is time-related to a main AV content that is being played, on the enhanced information area 360. enhanced service information for displaying an application linking with the main AV content may be provided from a content owner such as TV broadcasters. The video display device 100 analyzes the enhanced service information to display a corresponding application in the enhanced information area 360 at the right timing. UI in a screen is shown in the drawing below.

The program menu includes an all sub menu, a participation sub menu, and a discovery sub menu.

The all sub menu is a menu for displaying all applications related to the participation sub menu and discovery sub menu on the enhanced information area 360. The participation sub menu is a menu for displaying an application inducing program participation such as voting in a program. The discovery sub menu is a menu for displaying an application such as scene related information. The sub menu of the program menu may be added or edited according to contents of an application that a content owner wants.

Figure 27:
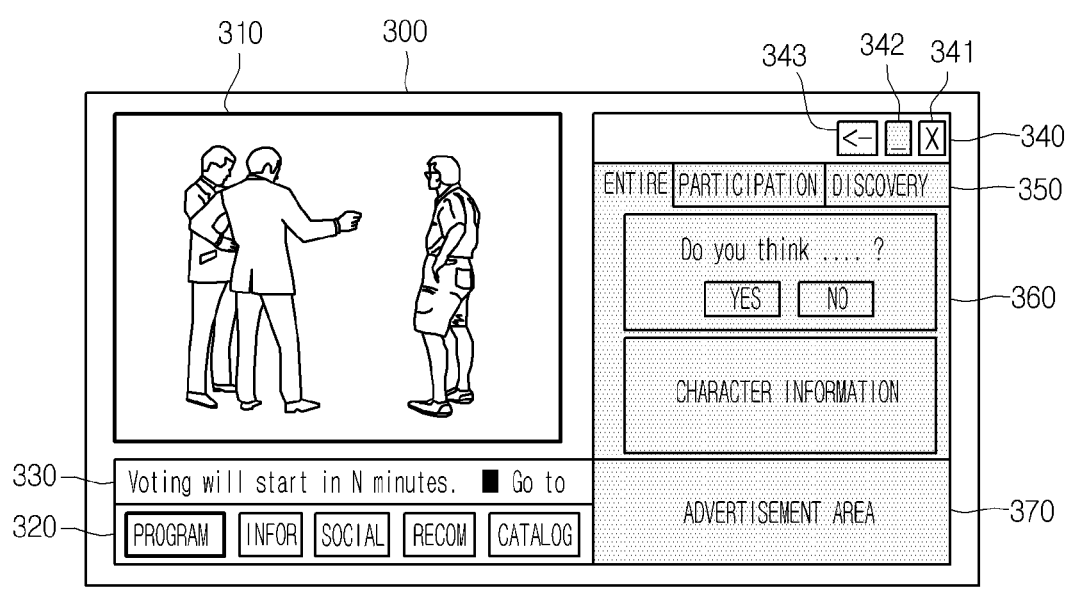
FIG. 27 is a screen when an all sub menu of a program main menu in a video display device manufacturer application is selected according to an embodiment.

FIG. 27 is a screen when an all sub menu of a program main menu in a video display device manufacturer application is selected according to an embodiment.

When the all sub menu, i.e., the first sub menu of the program main menu, is selected, the video display device 100 displays all applications related to the participation sub menu and display sub menu on the enhanced information area 360.

When the all sub menu is selected, the video display device 100 displays an application or event synchronized with a specific time on the enhanced information area 360. If there is no application synchronized with a specific time, the video display device 100 may leave the enhanced information area 350 as empty space. However, since the empty space may not give motivation for additional interaction to a user, if there is no application synchronized with a specific time, the video display device 100 may gather applications or events that occur prior to now in order to display a history.

When a user enters into the video display device manufacturer application, it may be seen that the user may have an intention to perform an interactive application related to a main AV content while watching the main AV content. While navigating several menus, a user may not watch an event at a specific time. Especially, when a user navigates menus for time insensitive enhanced services, the above case may likely occur. Therefore, after entering into the video display device manufacturer application, if a time sensitive event occurs during navigation, the video display device 100 displays a notification message for this on the notification area 330 to notify a user that there is a special event at the current time broadcasted from a broadcasting station.

While a user confirms music information or place information through the video display device manufacturer application, a time linked application occurs, the video display device 100 displays a notification message on the notification area 330. When receiving a user input corresponding to the Go To button press, the video display device 100 enters into a sub menu related to an occurring time linked application and displays the occurring time linked application on the enhanced information area 360. The notification message may be a text message. Additionally, the video display device 100 may display an amount of the delivered application as a number. The notification message may be delivered to a viewer in a Push method.

Figure 28:
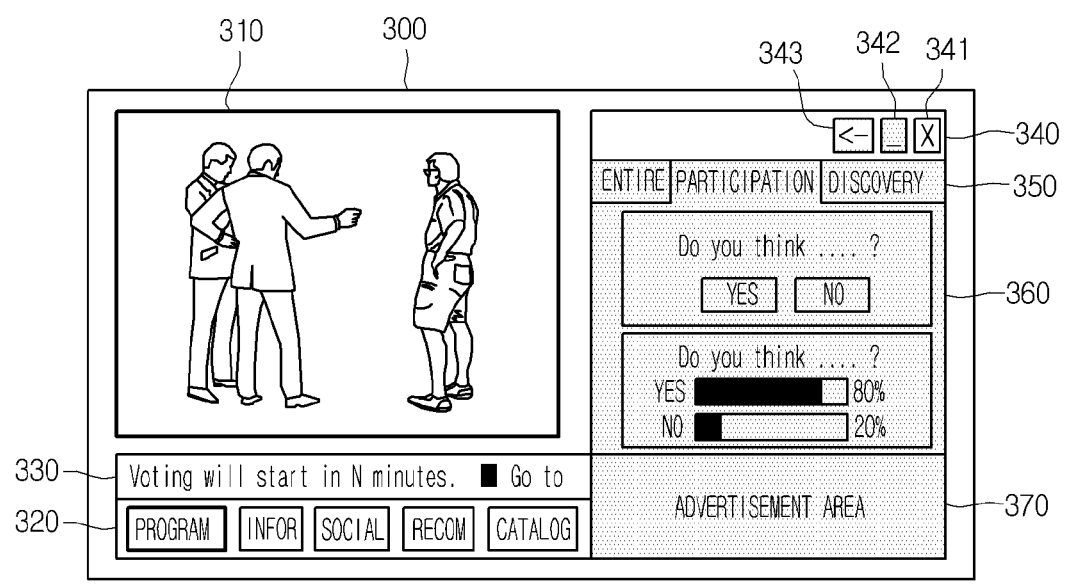
FIG. 28 is a screen when a participation sub menu of a program main menu in a video display device manufacturer application is selected according to an embodiment.

FIG. 28 is a screen when a participation sub menu of a program main menu in a video display device manufacturer application is selected according to an embodiment.

As shown in FIG. 28, once the participation sub menu is selected, the video display device 100 displays an application inducing viewer participation such as voting on the enhanced information area 360. If a viewer participation application occurs, the video display device 100 displays it on the enhanced information area 360. If the viewer participation application is voting, the video display device 100 may display voting questions and voting results. Moreover, the video display device 100 displays current events and also previous events that the viewer participates on the bottom of the current event, for the viewer's convenience.

Figure 29:
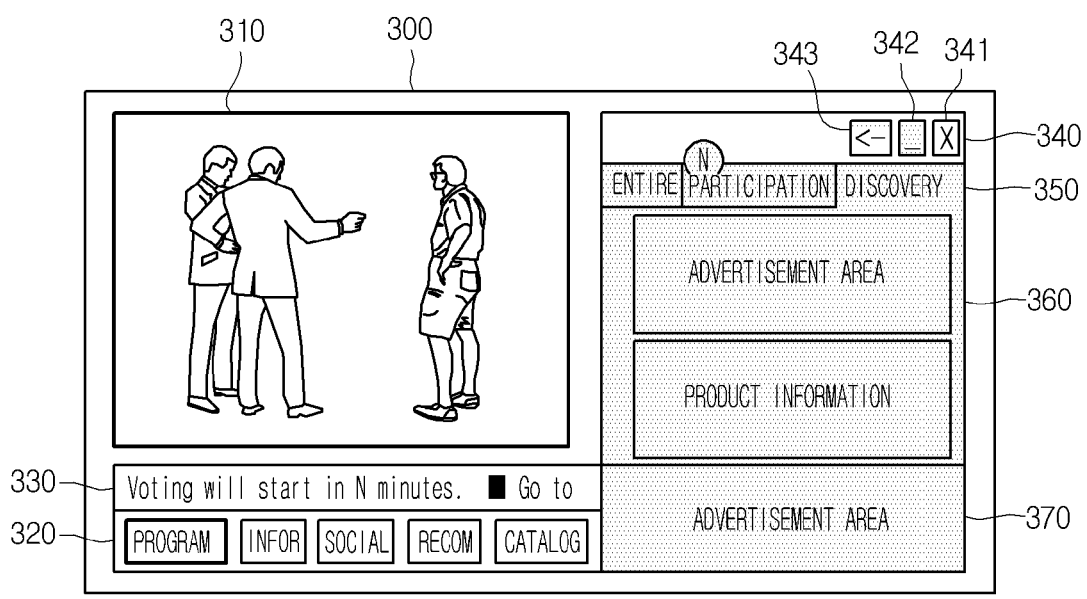
FIG. 29 is a screen when a discovery sub menu of a program main menu in a video display device manufacturer application is selected according to an embodiment.

FIG. 29 is a screen when a discovery sub menu of a program main menu in a video display device manufacturer application is selected according to an embodiment.

As shown in FIG. 29, once the discovery sub menu is selected, the video display device 100 displays all time linked applications besides a viewer participation application on the enhanced information area 360. For example, the video display device 100 displays scene related information on products or places shown in a main AV content. The video display device 100 may display current scene related information and previous scene related information simultaneously.

Moreover, the video display device 100 may display a notification message that there is a time linked application or event on a sub menu. For example, if a viewer participation application occurs, the video display device 100 displays an icon having a flashing N on the participation sub menu to induce viewer participation. If a user does not respond to the notification for a predetermined time, the video display device 100 may remove the notification.

Hereinafter, an information main menu of a video display device manufacturer application will be described according to an embodiment with reference to FIGS. 30 to 36.

The information main menu corresponds to a time insensitive area. Like the UI of the program main menu, the information main menu does not operate in a UI manner that an application is automatically displayed and disappears at a specific time. Of course, although the above-mentioned time linked application may be displayed through this menu, when a main menu other than the program main menu is selected, a second service such as search service or Twitter service may be linked.

The information main menu includes a search sub menu, a Twitter sub menu, and a news sub menu.

Then, a search sub menu of an information main menu in a video display device manufacturer application will be described according to an embodiment with reference to FIGS. 30 to 32.

Figure 30:
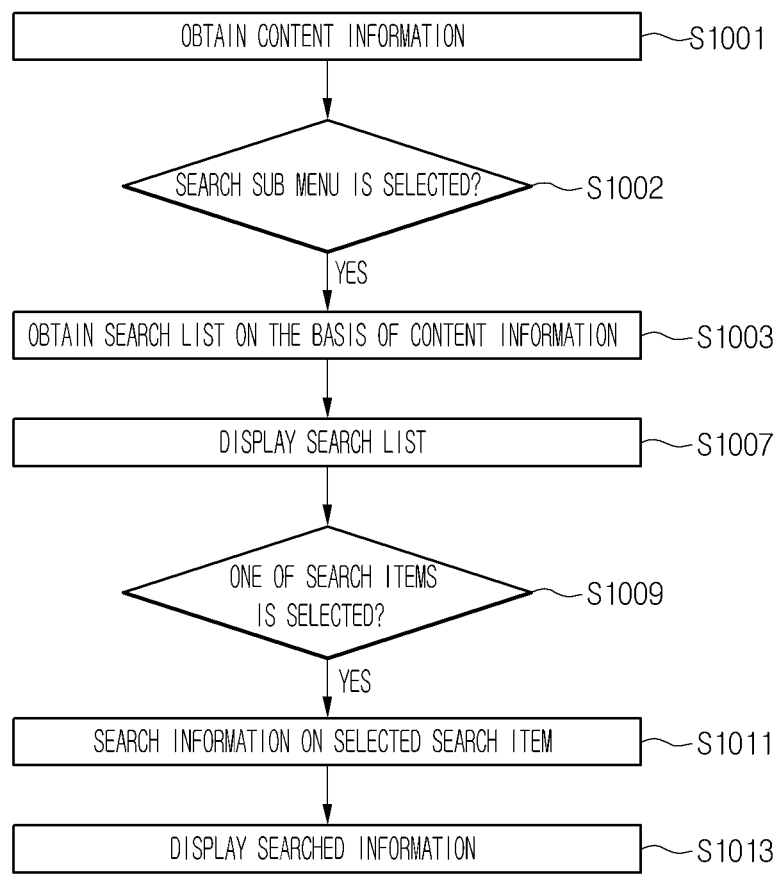
FIG. 30 is flowchart illustrating a searching method according to an embodiment.

FIG. 30 is flowchart illustrating a searching method according to an embodiment.

The video display device 100 extracts a certain section of a main AV content and obtains content information on the basis of the extracted section.

Once the search sub menu of an information main menu in a video display device manufacturer application is selected in step S1002, the video display device 100 obtains a search list including a plurality of search items corresponding to an enhanced service on the basis of the obtained content information in step S1003. The search list includes at least one of genres, actors, directors, places, and products.

The video display device 100 displays the search list on the enhanced information area 360 in step S1007. A display example of the search list will be described with reference to FIG. 30.

Figure 31:
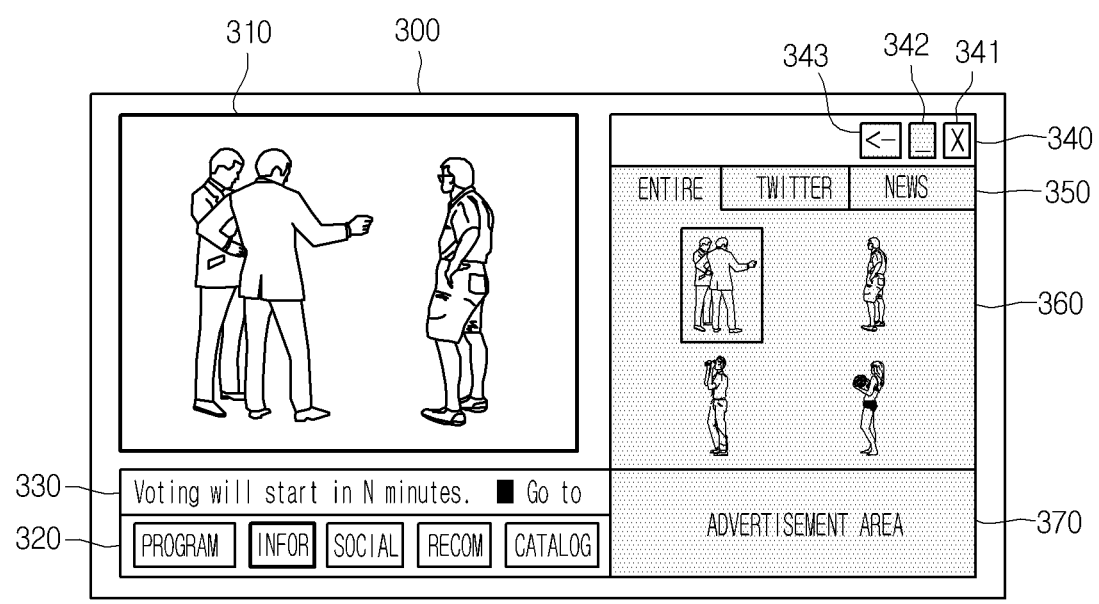
FIG. 31 is a screen when a search sub menu of an information main menu in a video display device manufacturer application is selected according to an embodiment.

FIG. 31 is a screen when a search sub menu of an information main menu in a video display device manufacturer application is selected according to an embodiment.

As shown in FIG. 31, the search list includes characters of a main AV content. The video display device 100 may display at least one of pictures or names of a search item on the enhanced information area 360.

When one of a plurality of search items is selected through the cursor of a remote controller in step S1009, the video display device 100 searches information on the selected search item in step S1011. At this point, the video display device 100 may use an internet search engine such as Google. Moreover, the video display device 100 may use information such as Tribune media or IMDb.

The video display device 100 displays the searched information on the enhanced information area 360 in step S1013. Since the searched result is automatically retrieved through programming such as Open API of a service provider, time for a screen design may be greatly saved. A display example of the search information will be described with reference to FIG. 32.

Figure 32:
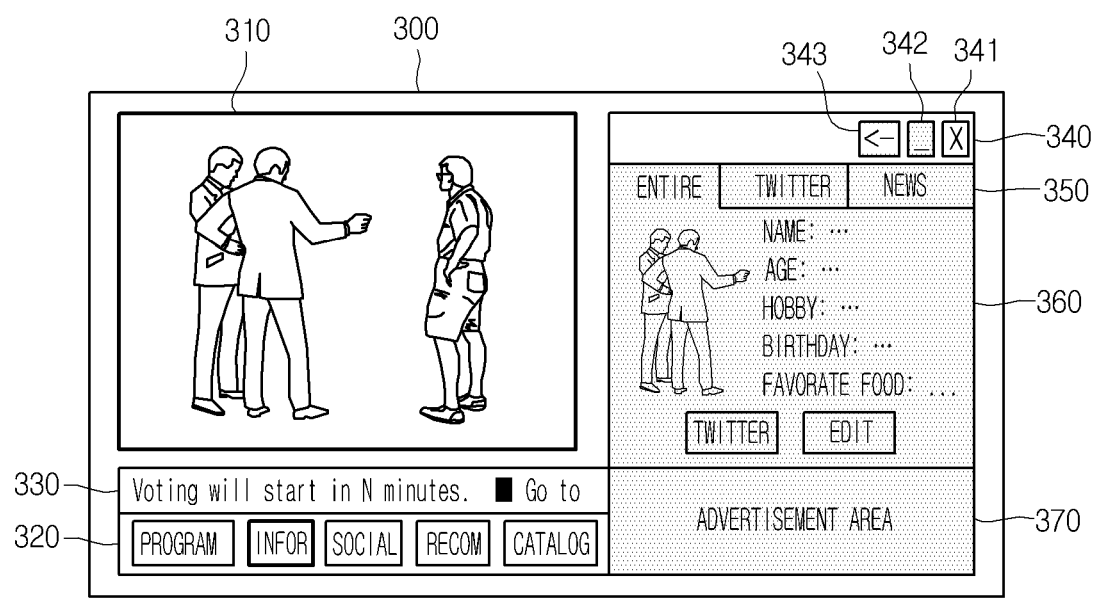
FIG. 32 is another screen when a search sub menu of an information main menu in a video display device manufacturer application is selected according to an embodiment.

FIG. 32 is another screen when a search sub menu of an information main menu in a video display device manufacturer application is selected according to an embodiment.

As shown in FIG. 32, the video display device 100 displays a search result for the selected search item on the enhanced information area 360. Moreover, the video display device positions a Twitter button and an edit button on the enhanced information area 360 to follow an actor's Twitter or edit an actor's profile such as filmography or biography.

Like this, if the searching method according to an embodiment is used, information related to a main AV data may be searched through one click, so that an effort to input a search word may be reduced.

Next, a Twitter sub menu of an information main menu in a video display device manufacturer application will be described according to an embodiment with reference to FIGS. 33 to 34.

Figure 33:
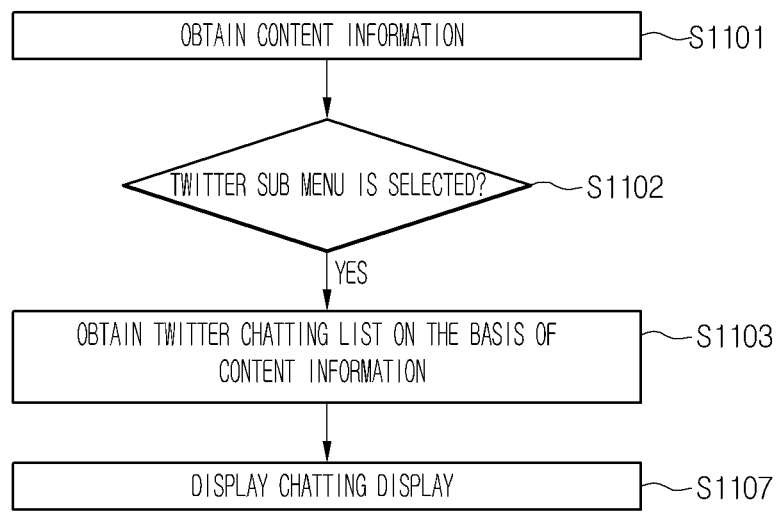
FIG. 33 is flowchart illustrating a chatting window displaying method according to an embodiment.

FIG. 33 is flowchart illustrating a chatting window displaying method according to an embodiment.

The video display device 100 extracts a certain section of a main AV content and obtains content information on the basis of the extracted section in step S1101.

Once a Twitter sub menu of an information main menu in a video display device manufacturer application is selected in step S1102, the video display device 100 obtains a Twitter chatting list corresponding to an enhanced service on the basis of the obtained content information in step S1103. The video display device 100 writes a program name on Hashtag of Twitter to load a Twitter chatting list related to the program. This chatting list is linked to Twitter and is continuously updated in real time.

The video display device 100 displays one chatting window in the Twitter chatting list on the enhanced information area 360 through a user selection or automatically in step S1107. A display example of the chatting window will be described with reference to FIG. 34.

Figure 34:
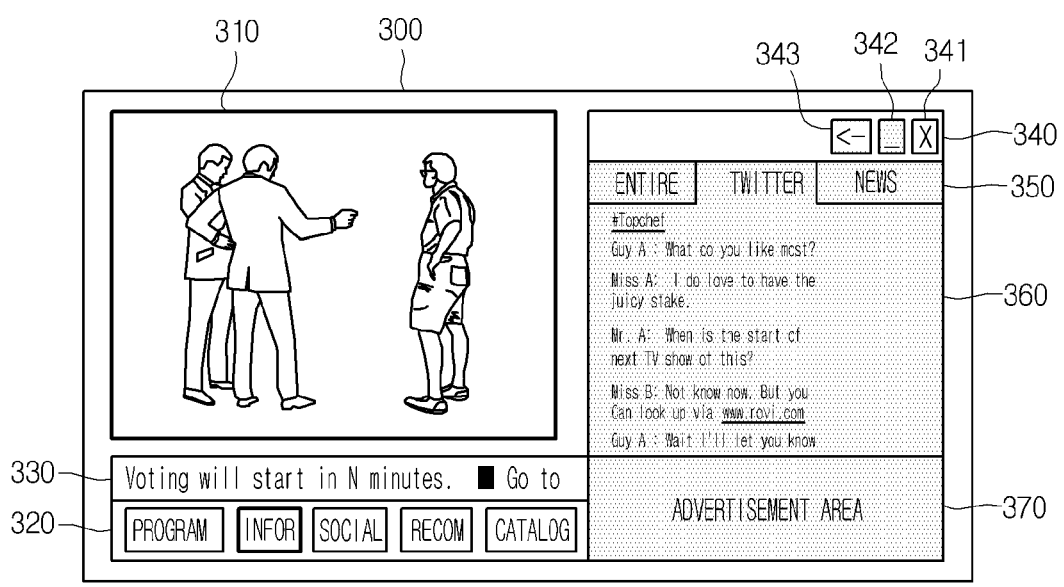
FIG. 34 is a screen when a Twitter sub menu of an information main menu in a video display device manufacturer application is selected according to an embodiment.

FIG. 34 is a screen when a Twitter sub menu of an information main menu in a video display device manufacturer application is selected according to an embodiment.6

As shown in FIG. 34, the video display device 100 displays a chatting window on the enhanced information area 360 to support chatting between viewers watching the same program.

When a program is broadcasted, a user of the program may directly write a message in a chatting room actually. If the video display device 100 has a log in mechanism like Smart TV, a user of the video display device 100 may immediately start chatting with his own ID in a logged in state when entering into a menu. If it is inconvenient to make an input to the video display device 100 through a remote controller, the video display device 100 may display only a chatting message. If the video display device 100 is linked to a second device such as Smart Phone or tablet, a message may be typed using the input device of the second device. Although information in Hashtag is a program name basically, it may be selected as a tag of actors or directions, i.e., the above-mentioned another basic information, so that a user may selectively participate in chatting of a corresponding subject.

Next, a news sub menu of an information main menu in a video display device manufacturer application will be described according to an embodiment with reference to FIGS. 35 to 36.

Figure 35:
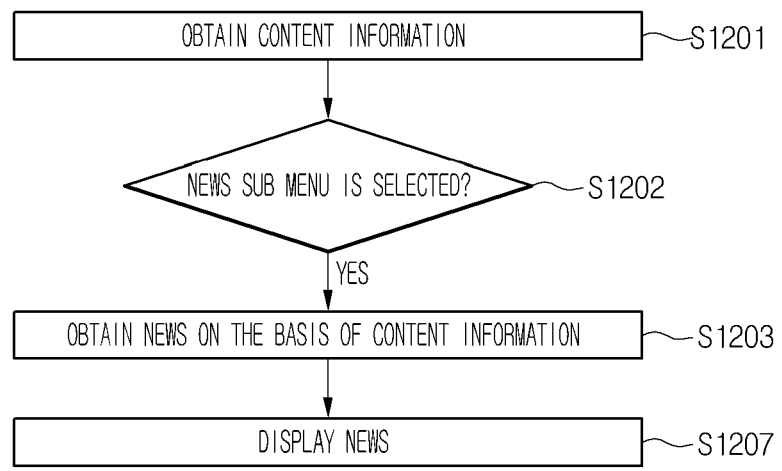
FIG. 35 is a flowchart illustrating a news obtaining method according to an embodiment.

FIG. 35 is a flowchart illustrating a news obtaining method according to an embodiment.

The video display device 100 extracts a certain section of a main AV content and obtains content information on the basis of the extracted section in step S1201.

Once the news sub menu of an information main menu in a video display device manufacturer application is selected in step S1202, the video display device 100 obtains news corresponding to an enhanced service on the basis of the obtained content information in step S1203. At this point, the news may or may not relate to a main AV content. Or, the news may be provided from a broadcaster of a main AV content. If the broadcaster does not provide news through Open API, the video display device 100 may receive news through News feeds of an internet service such as Google or Yahoo.

The video display device 100 displays the obtained news on the enhanced information area 360 in step S1207. A display example of news will be described with reference to FIG. 36.

Figure 36:
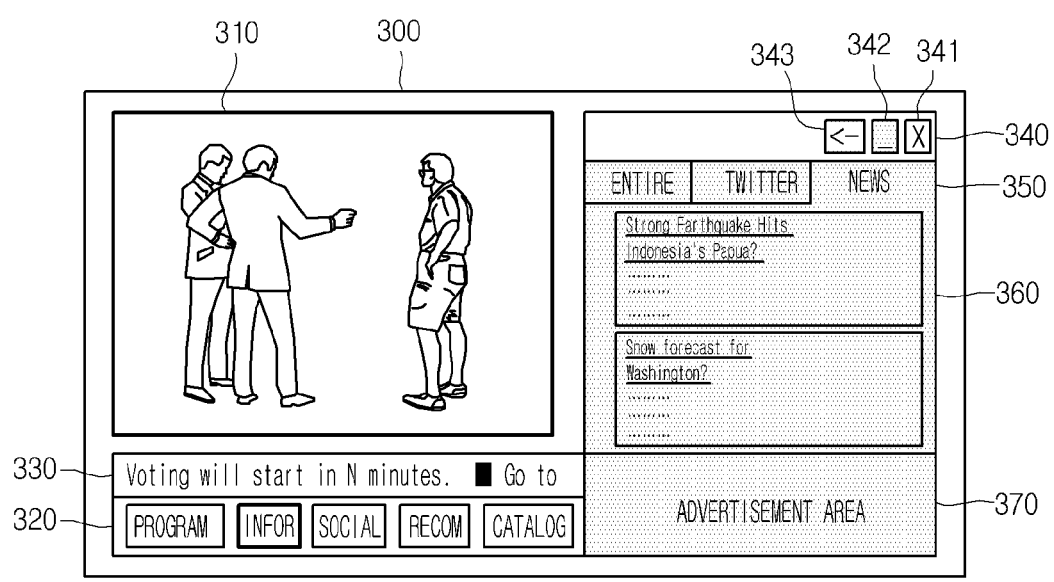
FIG. 36 is a screen when a news sub menu of an information main menu in a video display device manufacturer application is selected according to an embodiment.

FIG. 36 is a screen when a news sub menu of an information main menu in a video display device manufacturer application is selected according to an embodiment.

As shown in FIG. 36, the video display device 100 may display the obtained news on the enhanced information area 360.

Hereinafter, a social main menu of a video display device manufacturer application will be described according to an embodiment with reference to FIGS. 37 to 42.

The social main menu corresponds to a time insensitive area. Like the UI of the program main menu, the social main menu does not operate in a UI manner that an application is automatically displayed and disappears at a specific time. Of course, although the above-mentioned time linked application may be displayed through this menu, when a main menu other than the program main menu is selected, a second service such as Facebook may be linked.

The social main menu includes a viewer list sub menu and a preference display sub menu.

Then, a viewer list sub menu of a social main menu in a video display device manufacturer application will be described according to an embodiment with reference to FIGS. 37 to 40.

Figure 37:
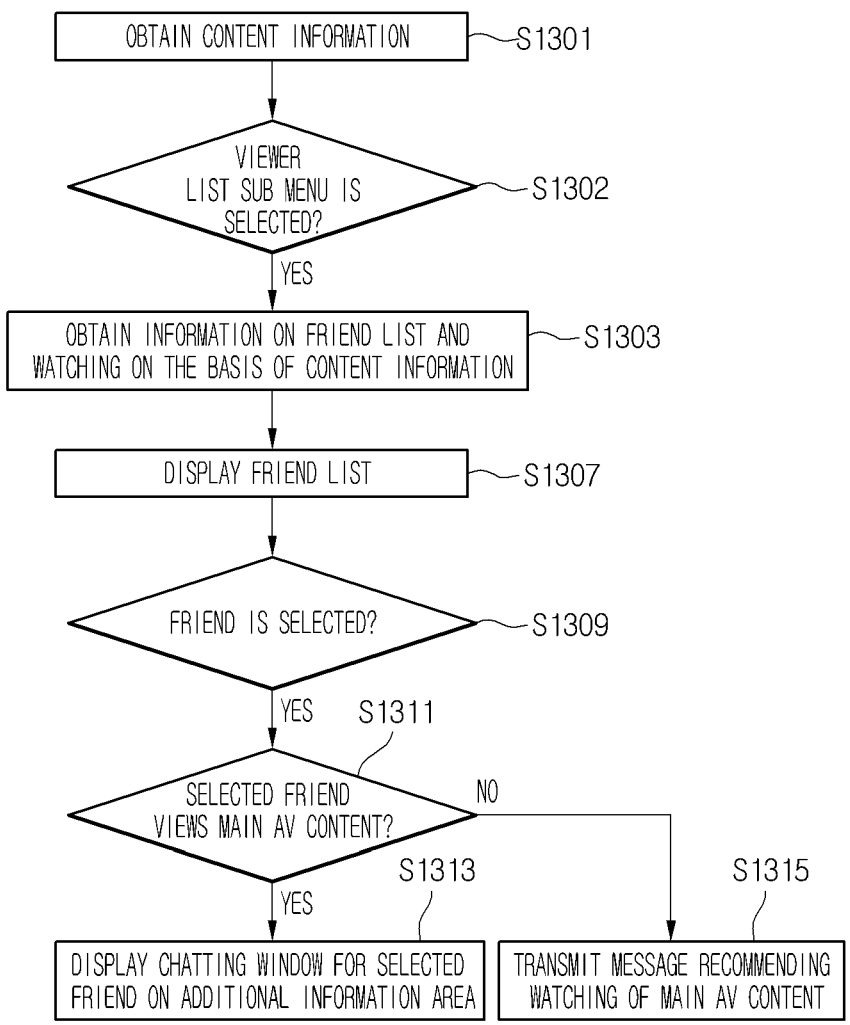
FIG. 37 is flowchart illustrating a viewer list displaying method according to an embodiment.

FIG. 37 is flowchart illustrating a viewer list displaying method according to an embodiment.

The video display device 100 extracts a certain section of a main AV content and obtains content information on the basis of the extracted section in step S1301.

Once a viewer list sub menu of a social main menu in a video display device manufacturer application is selected in step S1302, the video display device 100 obtains information on a friends list and whether each friend watches a main AV content on the basis of the obtained content information in step S1303. The video display device 100 may be linked with a social network service such as Facebook to obtain a list of friends watching a main AV content.

The video display device 100 displays the obtained viewer list on the enhanced information area 360 in step S1307. A display example of the viewer list will be described with reference to FIG. 38.

Figure 38:
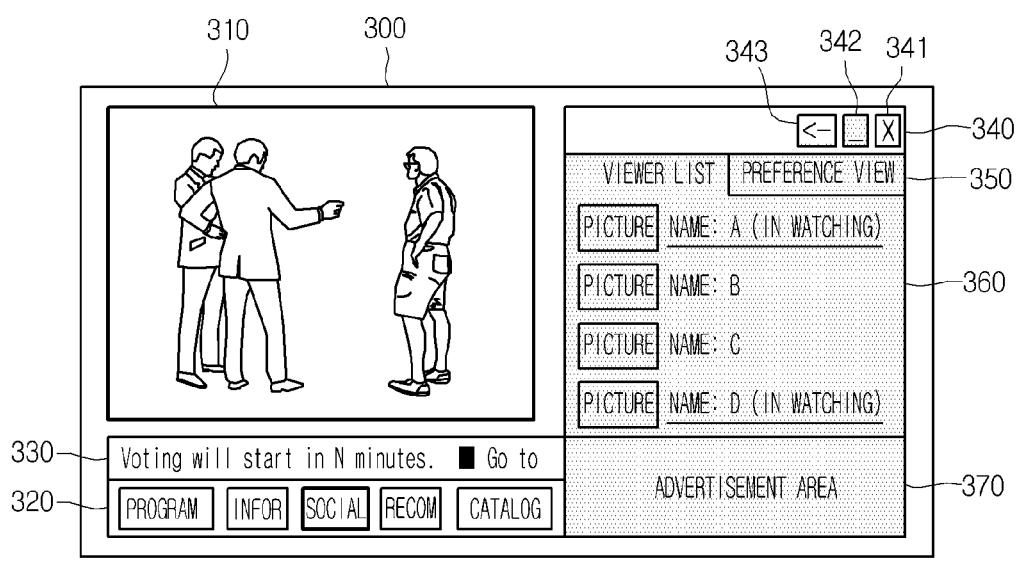
FIG. 38 is a screen when a viewer list sub menu of a social main menu in a video display device manufacturer application is selected according to an embodiment.

FIG. 38 is a screen when a viewer list sub menu of a social main menu in a video display device manufacturer application is selected according to an embodiment.

As shown in FIG. 38, the video display device 100 may display the pictures and names of the viewers corresponding to the obtained viewer list on the enhanced information area 360.

Especially, the video display device 100 may display a friends list together with whether each friend watches contents or only a list of friends watching contents currently.

When one friend is selected from the displayed friends list in step S1309, the video display device 100 confirms whether the selected friend watches a main AV content in step S1311.

If the selected friend watches the main AV content, the video display device 100 displays the chatting window of the selected friend on the enhanced information are 360 in step S1313.

Additionally, if the selected friend does not watch the main AV content, the video display device 100 sends a message recommending watching the main AV content to the e-mail or mobile phone of the selected friend in step S1315. Even if the selected friend does not watch the main AV content, the video display device 100 may display the chatting window of the selected friend on the enhanced information are 360.

For chatting, a user may use the remote controller of the video display device 100 or the input device of the second device connected to the video display device 100, and may chat with friends through a social network service application of a smart phone regardless of the video display device 100. In any cases, a chatting screen of the social network service may be displayed on the screen of the video display device 100. Through buttons for evaluating a program, a user may send his/her intention to friends. For example, a user may notify friends that he/she currently watches a main AV content and may recommend friends who do not watch the main AV content currently to watch it through a "good" button.

Like this, the video display device 100 automatically realizes who is watching which program by using an ACR technique through a viewer list sub menu. In order to confirm who is watching which program, a user needs to log in. Once an account for log in is registered in the video display device 100, each time the video display device 100 is turned on, a user may log in automatically. Therefore, the video display device 100 may realize who is watching a main AV content.

Figure 39:
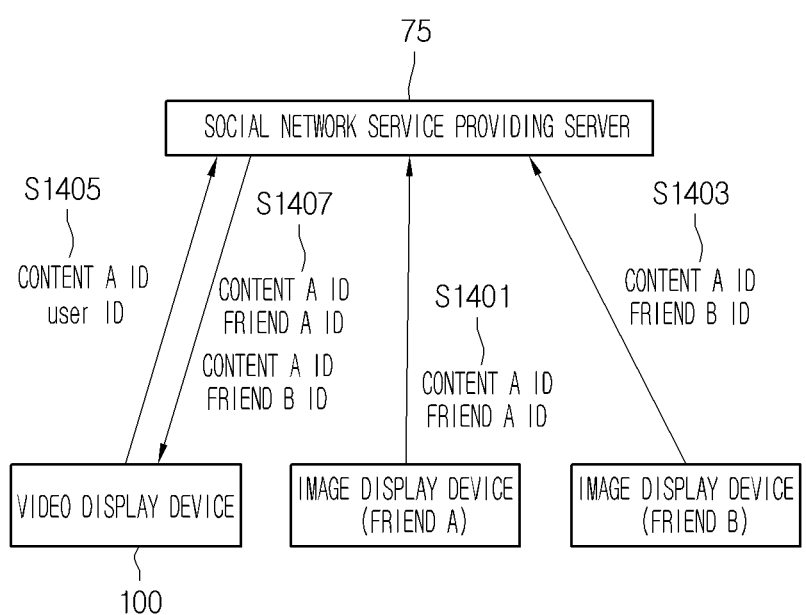
FIG. 39 is a signal flow when a video display device obtains a friends list and watching information according to an embodiment.

FIG. 39 is a signal flow when a video display device obtains a friends list and watching information according to an embodiment.

As shown in FIG. 39, if a video display device of a friend A plays a main AV content A, it transmits an identifier of the main AV content A and an identifier of the friend A to the SNS providing server 75 in step S1401.

Additionally, if a video display device of a friend B plays the main AV content A, it transmits an identifier of the main AV content A and an identifier of the friend B to the SNS providing server 75 in step S1403.

If the video display device 100 plays the main AV content A, it transmits a user ID and an identifier of the main AV content A to the SNS providing server 75 in step S1405.

The SNS providing server 75 confirms information on a friends list of the video display device 100 and whether each friend watches a main AV content on the basis of the friend relationship information and received content identifiers in step S1407.

Figure 40:
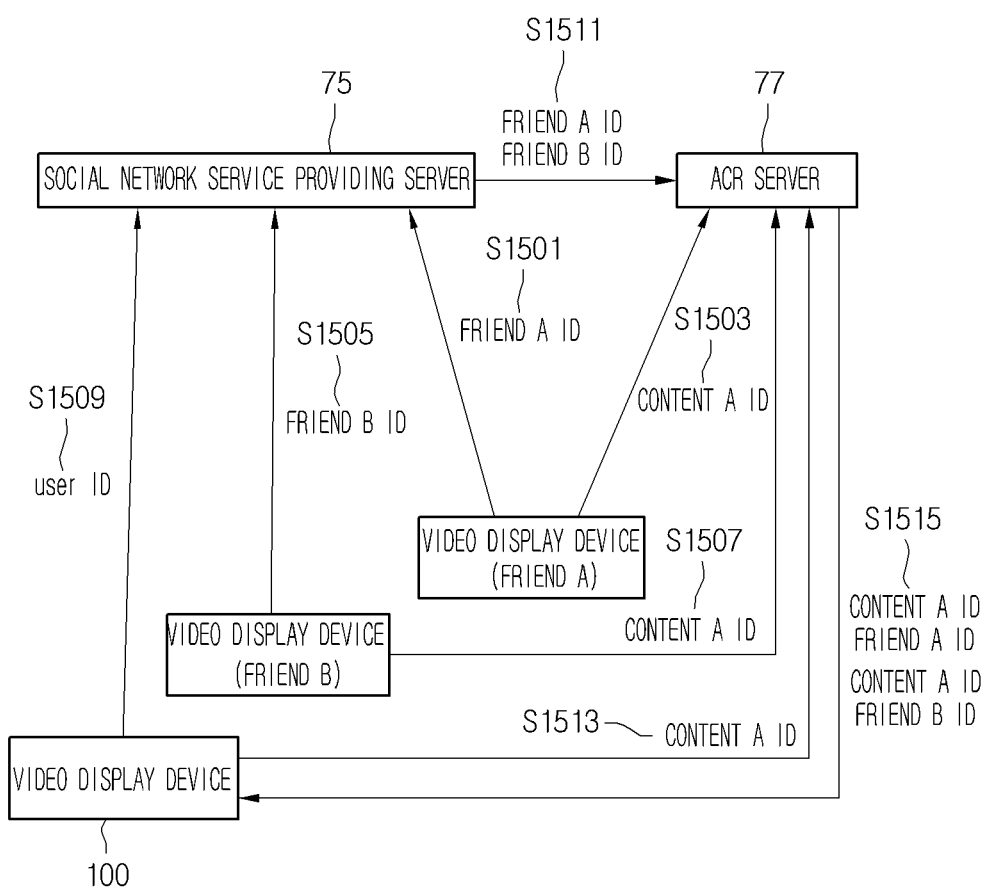
FIG. 40 is a signal flow when a video display device obtains a friends list and watching information according to another embodiment.

FIG. 40 is a signal flow when a video display device obtains a friends list and watching information according to another embodiment.

As shown in FIG. 40, if a video display device of a friend A plays a main AV content A, it transmits an identifier of the friend A to the SNS providing server 75 in step S1501, and transmits the main AV content A to the ACR sever in step S1503. The ACR server 77 may be one of a watermark server 21, a fingerprint server 22, an enhanced service information providing server 40, and an enhanced service providing sever 50.

Additionally, if a video display device of a friend B plays the main AV content A, it transmits an identifier of the friend B to the SNS providing server 75 in step S1505, and transmits the main AV content A to the ACR sever 77 in step S1507.

The video display device 100 transmits a user ID to the SNS providing server 75 in step 1509.

Then, the SNS providing server 75 provides a friend list corresponding to the user ID to the ACR server 75 in step S1511.

Moreover, if the video display device 100 plays the main AV content A, it transmits a user ID and an identifier of the main AV content A to the ACR server 75 in step S1513.

The ACR server 75 confirms information on the friends list of the video display device 100 and whether each friend watches a main AV content on the basis of the friends list corresponding to the user ID and content identifier, and then, provides the confirmed information to the video display device 100 in step S1515.

Then, a preference display sub menu of a social main menu in a video display device manufacturer application will be described according to an embodiment with reference to FIGS. 41 to 42.

Figure 41:
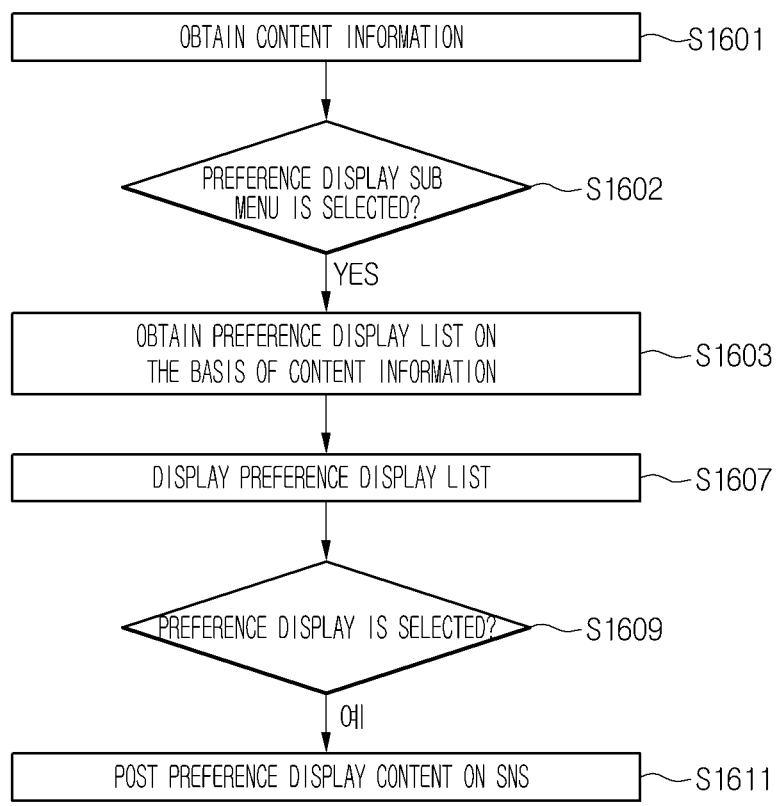
FIG. 41 is flowchart illustrating a preference displaying method according to an embodiment.

FIG. 41 is flowchart illustrating a preference displaying method according to an embodiment.

The video display device 100 extracts a certain section of a main AV content and obtains content information on the basis of the extracted section in step S1601.

Once a preference display sub menu of a social main menu in a video display device manufacturer application is selected in step S1602, the video display device 100 obtains a preference display list including a plurality of preference display items on the basis of the obtained content information in step S1603. Here, the preference display item may include preview or a preview address. The preview may be an image or a short video. The preview may be directly provided from a broadcaster through Open API, or may be obtained by a search engine of an internet service, or obtained by extracting only a necessary portion from an internet server of a broadcaster. Images corresponding to core scenes of a time interval corresponding to several minutes may be provided or one image for one program may be provided.

The video display device 100 displays the obtained preference display list on the enhanced information area 360 in step S1607. A display example of the viewer list will be described with reference to FIG. 42.

Figure 42:
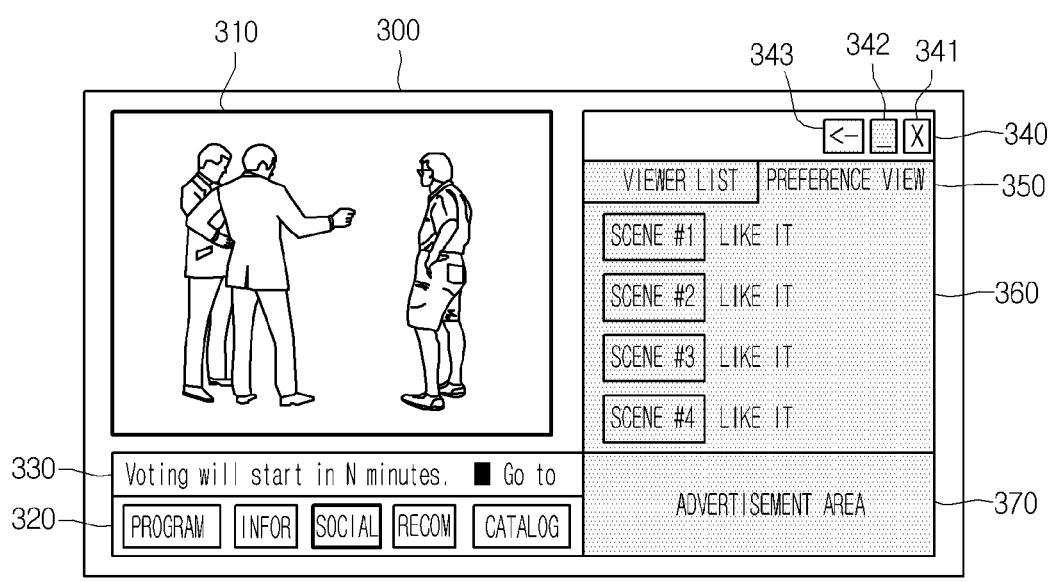
FIG. 42 is a screen when a preference display sub menu of a social main menu in a video display device manufacturer application is selected according to an embodiment.

FIG. 42 is a screen when a preference display sub menu of a social main menu in a video display device manufacturer application is selected according to an embodiment.

As shown in FIG. 42, the video display device 100 may display previews in a preference display list and "Like it" buttons for preference display on the enhanced information area 360.

Once the "Like it" button corresponding to one preference display item is selected in step S1609, the video display device 100 posts a preview and simple text corresponding to the selected preference display item on SNS such as Facebook in step S1611. Here, the simple text may be automatically generated, or may be inputted through a remote controller or an input device of a second device.

Hereinafter, a recommendation main menu of a video display device manufacturer application will be described according to an embodiment with reference to FIGS. 43 to 46.

The recommendation main menu corresponds to a time insensitive area. Like the UI of the program main menu, the recommendation main menu does not operate in a UI manner that an application is automatically displayed and disappears at a specific time. Of course, through this menu, the above-mentioned time linked application may be displayed but if a recommendation menu is selected, another service may be linked.

The recommendation main menu may include a previous episode sub menu, a VOD sub menu, and an application sub menu.

Figure 43:
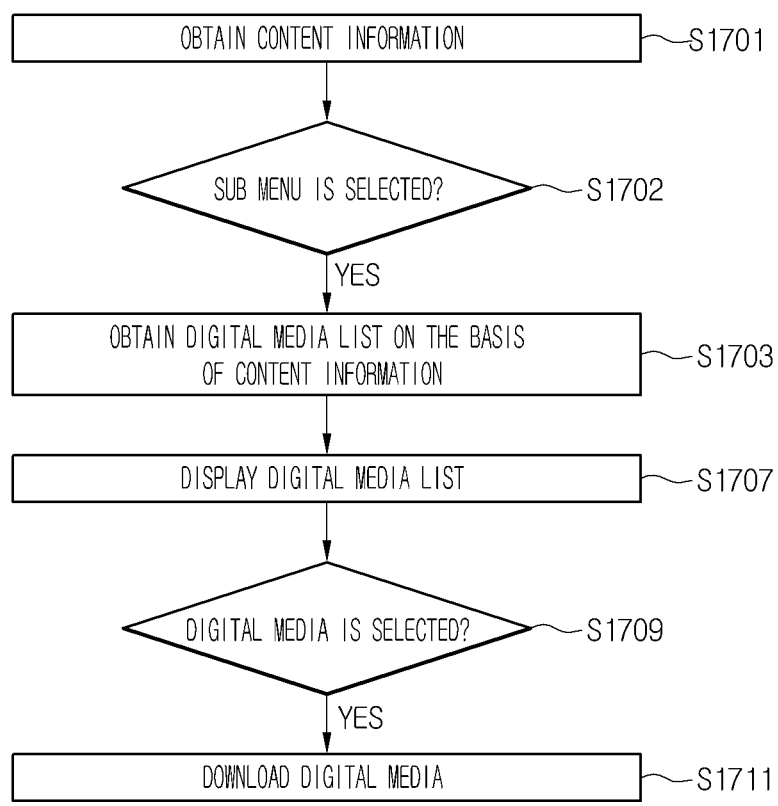
FIG. 43 is flowchart illustrating a digital media downloading method according to an embodiment.

FIG. 43 is flowchart illustrating a digital media downloading method according to an embodiment.

The video display device 100 extracts a certain section of a main AV content and obtains content information on the basis of the extracted section in step S1701.

Once a recommendation main menu of a video display device manufacturer application is selected in step S1702, the video display device manufacturer application obtains a digital media list on the basis of the obtained content information in step S1703. If the previous episode sub menu is selected, the video display device 100 obtains a previous episode list. If the VOD sub menu is selected, the video display device 100 obtains a VOD list that relates to a main AV content or a provider of the main AV content recommends. If the application sub menu is selected, the video display device 100 obtains a VOD list that relates to a main AV content or a provider of the main AV content recommends. Here, the digital media list may include a preview, a preview address, and an icon related image.

The video display device manufacturer application displays the obtained digital media list on the enhanced information enhanced information area 360 in step S1707.

An example of a previous episode list is described with reference to FIG. 44.

Figure 44:
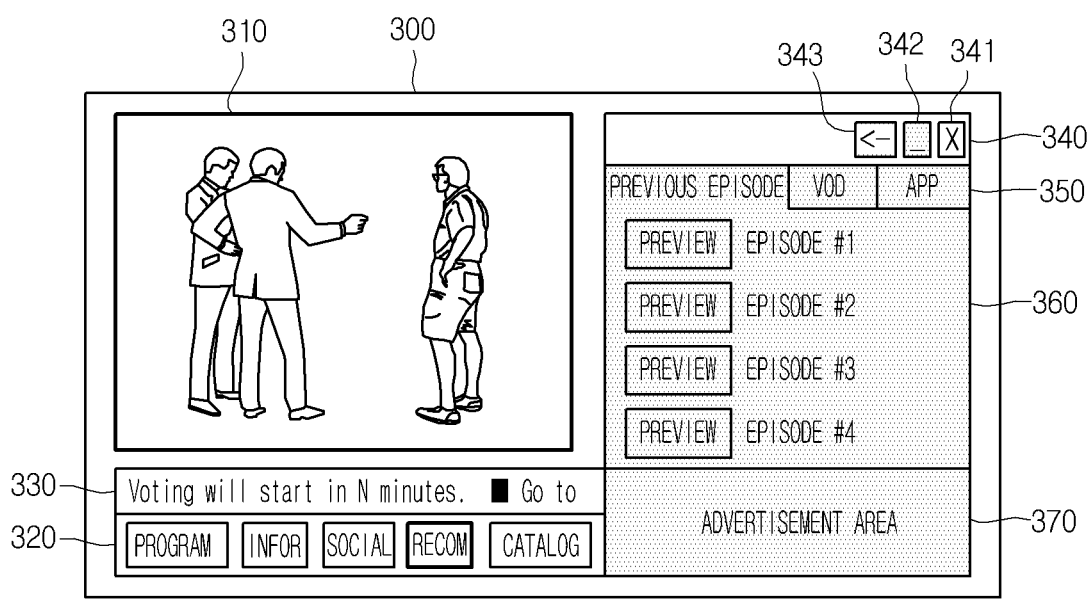
FIG. 44 is a screen when a previous episode sub menu of a recommendation main menu in a video display device manufacturer application is selected according to an embodiment.

FIG. 44 is a screen when a previous episode sub menu of a recommendation main menu in a video display device manufacturer application is selected according to an embodiment.

As shown in FIG. 44, the video display device 100 displays previews and titles of a previous episode list on the enhanced information area 360. Like this, according to an embodiment, the video display device 100 may automatically search and display a previous episode without user's manipulation.

A display example of the VOD list will be described with reference to FIG. 45.

Figure 45:
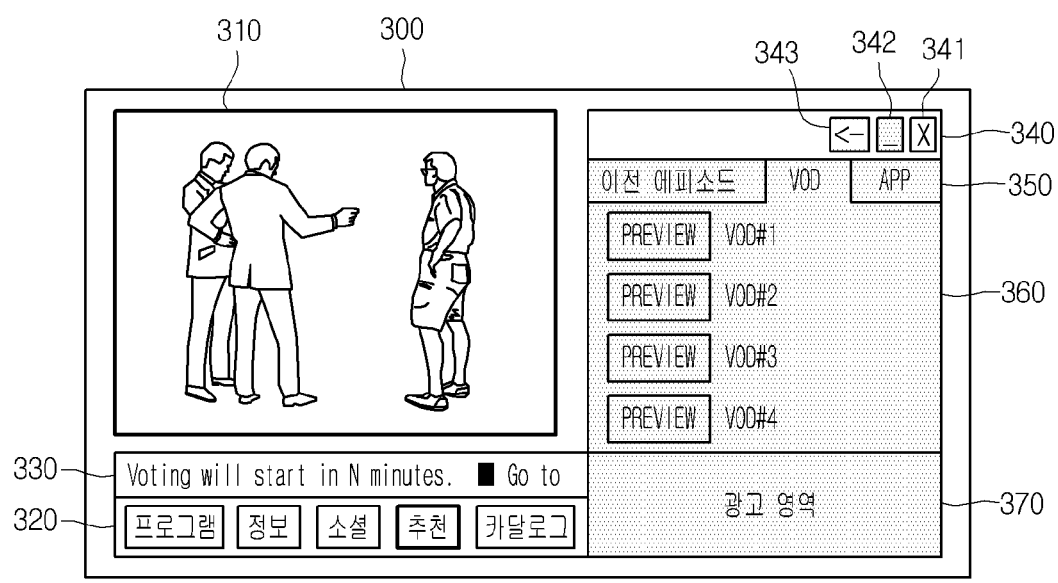
FIG. 45 is a screen when a VOD sub menu of a recommendation main menu in a video display device manufacturer application is selected according to an embodiment.

FIG. 45 is a screen when a VOD sub menu of a recommendation main menu in a video display device manufacturer application is selected according to an embodiment.

As shown in FIG. 45, the video display device 100 displays previews and titles of a VOD list on the enhanced information area 360. Like this, according to an embodiment, the video display device 100 may automatically search and display VOD related to a main AV content without user's manipulation.

A display example of the application list will be described with reference to FIG. 46.

Figure 46:
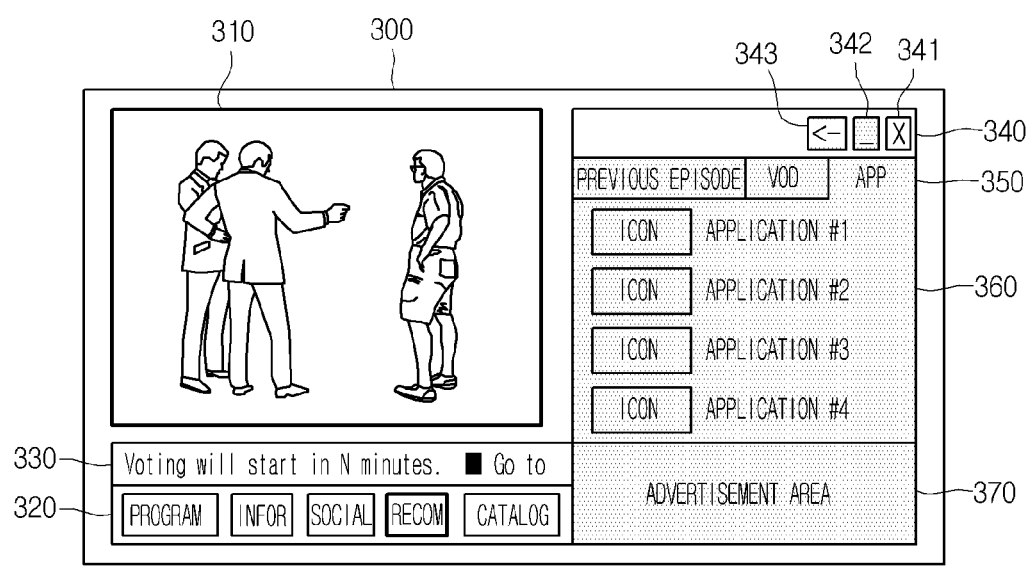
FIG. 46 is a screen when an application sub menu of a recommendation main menu in a video display device manufacturer application is selected according to an embodiment.

FIG. 46 is a screen when an application sub menu of a recommendation main menu in a video display device manufacturer application is selected according to an embodiment.

As shown in FIG. 46, the video display device 100 displays icons and application names of the application list on the enhanced information area 360. Like this, according to an embodiment, the video display device 100 may automatically search and display applications related to a main AV content without user's manipulation.

Once one item is selected from the digital media list in step S1709, the video display device manufacturer application downloads a digital media corresponding to the selected item in step S1711. At this point, the video display device 100 may download the digital media after payment. If the selected item is a previous episode or VOD, the video display device 100 may playback the downloaded digital media. If the selected item is an application, the video display device may automatically playback the downloaded application or may playback it through a user's selection.

Like this, according to an embodiment, the video display device may download digital media through simple manipulation.

Hereinafter, a catalog main menu of a video display device manufacturer application will be described according to an embodiment with reference to FIGS. 47 to 50.

The catalog main menu corresponds to a time insensitive area. Like the UI of the program main menu, the catalog main menu does not operate in a UI manner that an application is automatically displayed and disappears at a specific time. Of course, through this menu, the above-mentioned time linked application may be displayed but if a catalog menu is selected, another service may be linked.

The catalog main menu may include a style sub menu, a music sub menu, and another sub menu.

Figure 47:
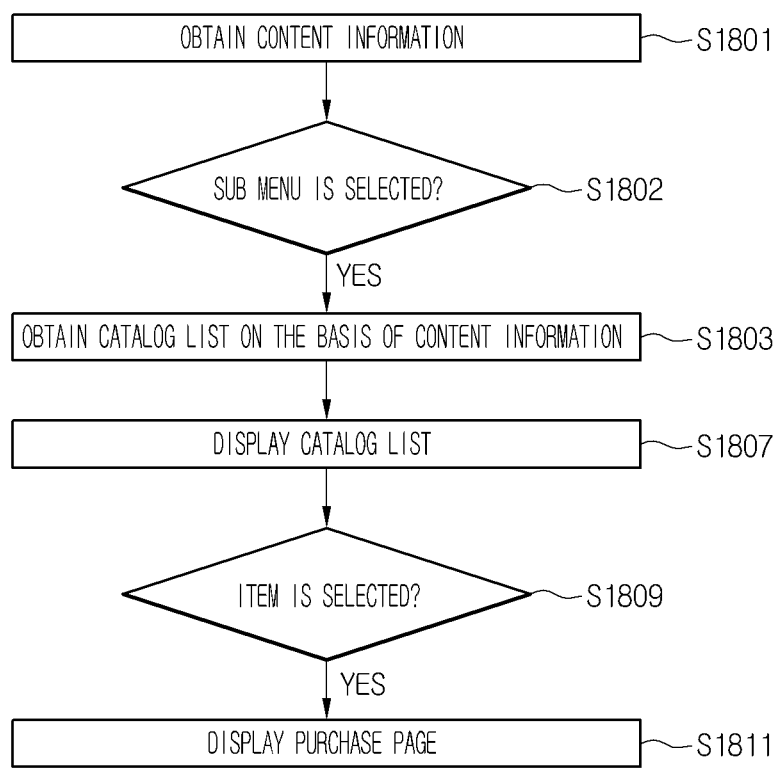
FIG. 47 is flowchart illustrating a catalog displaying method according to an embodiment.

FIG. 47 is flowchart illustrating a catalog displaying method according to an embodiment.

The video display device 100 extracts a certain section of a main AV content and obtains content information on the basis of the extracted section in step S1801.

Once a sub menu of a catalog main menu in a video display device manufacturer application is selected in step S1802, the video display device manufacturer application obtains a catalog list on the basis of the obtained content information in step S1803. If the style sub menu is selected, the video display device 100 obtains a clothing catalog list that relates to a main AV content or a provider of the main AV content recommends. If the music sub menu is selected, the video display device 100 obtains a music catalog list that relates to a main AV content or a provider of the main AV content recommends. If the other sub menu is selected, the video display device 100 obtains a products or places catalog list that relates to a main AV content or a provider of the main AV content recommends. Here, the digital media list may include a related image, price information, description, and coupon. The coupon may be numbers or QR codes. The video display device 100 may display coupons only when a user watches a main AV content, or may allow a user to use it during the available period after storing it on the memory 150.

The video display device manufacturer application displays the obtained catalog list on the enhanced information area 360 in step S1807.

A display example of the clothing catalog list will be described with reference to FIG. 48.

Figure 48:
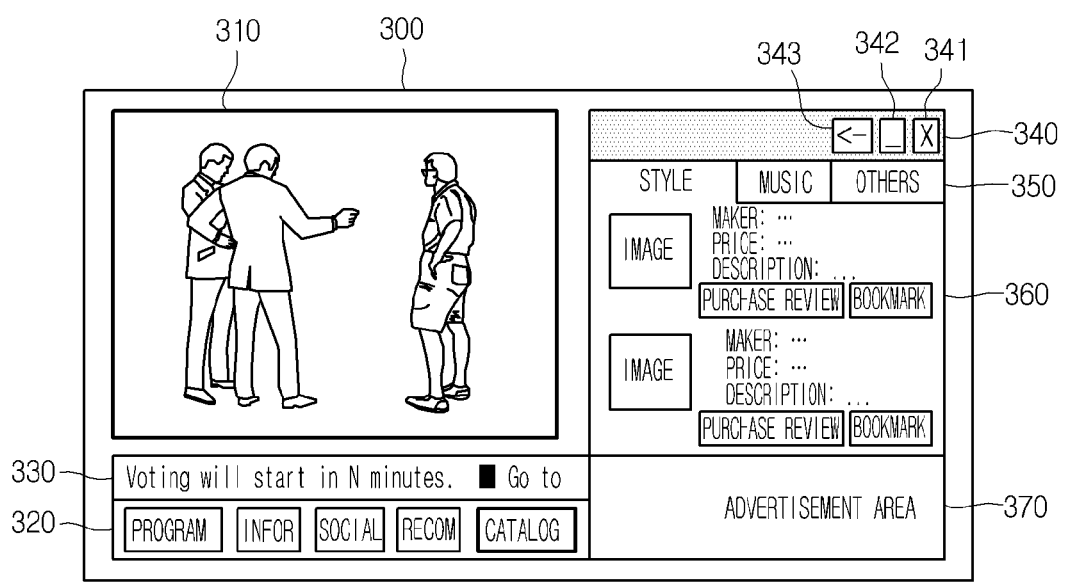
FIG. 48 is a screen when a style sub menu of a recommendation main menu in a video display device manufacturer application is selected according to an embodiment.

FIG. 48 is a screen when a style sub menu of a recommendation main menu in a video display device manufacturer application is selected according to an embodiment.

As shown in FIG. 48, the video display device 100 displays maker information, price information, of description information on clothing related to a main AV content on the enhanced information area 360. Like this, according to an embodiment, the video display device 100 may automatically search and display a clothing catalog related to a main AV content without user's manipulation.

An example of a music catalog list is described with reference to FIG. 49.

Figure 49:
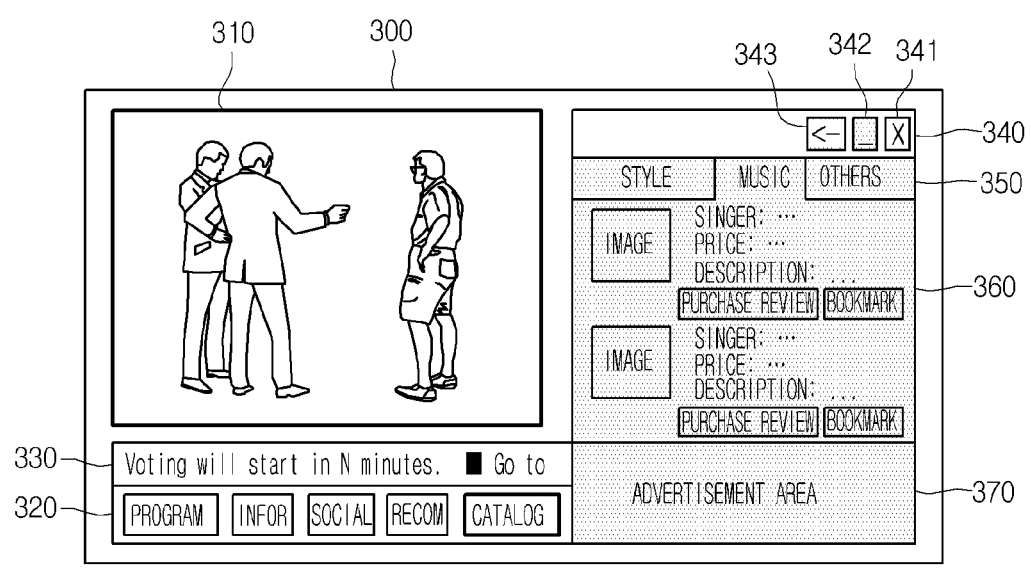
FIG. 49 is a screen when a music sub menu of a recommendation main menu in a video display device manufacturer application is selected according to an embodiment.

FIG. 49 is a screen when a music sub menu of a recommendation main menu in a video display device manufacturer application is selected according to an embodiment.

As shown in FIG. 49, the video display device 100 displays singer information, price information, and description information on music related to a main AV content on the enhanced information area 360. Like this, according to an embodiment, the video display device 100 may automatically search and display a music catalog related to a main AV content without user's manipulation.

A display example of another catalog list will be described with reference to FIG. 50.

Figure 50:
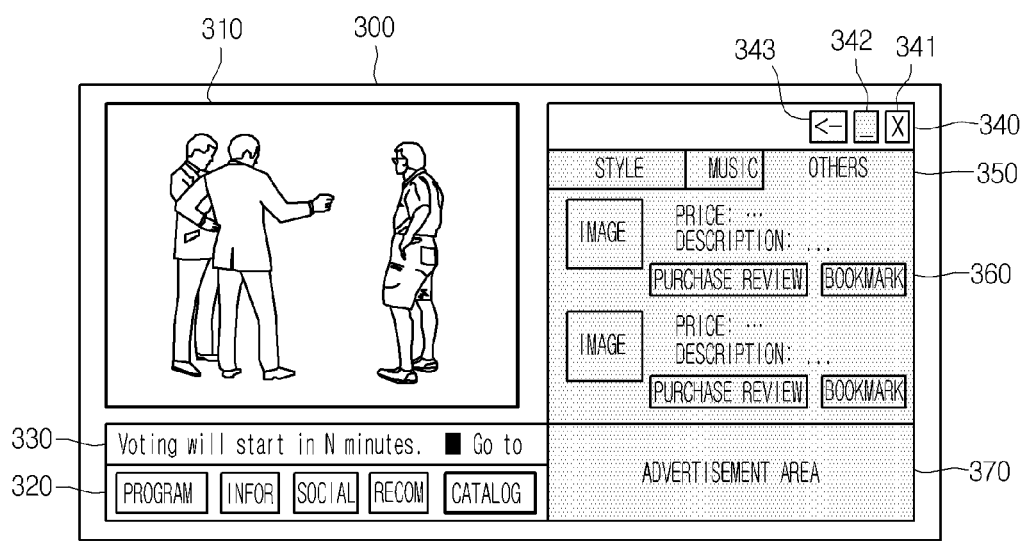
FIG. 50 is a screen when another sub menu of a recommendation main menu in a video display device manufacturer application is selected according to an embodiment.

FIG. 50 is a screen when another sub menu of a recommendation main menu in a video display device manufacturer application is selected according to an embodiment.

As shown in FIG. 50, the video display device 100 displays price information and description information on products and places related to a main AV content on the enhanced information area 360. Like this, according to an embodiment, the video display device 100 may automatically search and display a products or places catalog related to a main AV content without user's manipulation.

Once one item is selected from the catalog list in step S1809, the video display device manufacturer application displays a purchase item corresponding to the selected item in step S1811.

Like this, according to an embodiment, a user may purchase products through simple manipulation.

A post purchase review button and a bookmark button may be disposed at each item in the catalog list.

Once the post purchase review button is selected, the video display device 100 may display a post use review of a product on the enhanced information are 360. Additionally, a user may write a post purchase review.

Additionally, after bookmarking a specific item through the bookmark button, a user may recommend the bookmarked item through a viewer list sub menu of a social main menu.

In this case, the video display device 100 may provide bookmark item information to the ACR server 77 or SNS providing server 75.

Then, the video display device 100 of a user receiving the recommendation obtains content information on the basis of the extracted section from a main AV content, and may display a recommendation message such as "this product is recommended by a friend U" if the main AV content corresponds to an advertisement of the recommended item on the basis of the obtained content information. Additionally, instead of a recommendation message, a short video may be displayed.

Then, an on/off control of an ACR function will be described according to an embodiment with reference to FIGS. 51 and 52.

Figure 51:
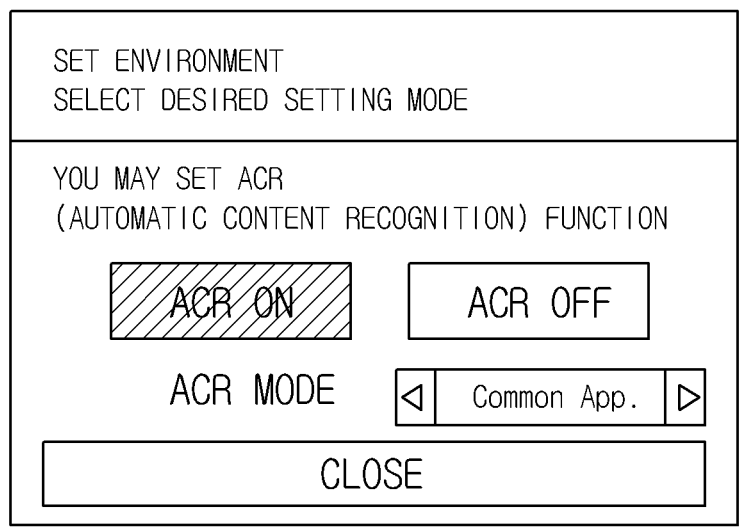
FIG. 51 is a view of a user interface for controlling an ACR function according to an embodiment.

FIG. 51 is a view of a user interface for controlling an ACR function according to an embodiment.

As shown in FIG. 51, the playback controlling unit 113 displays an ACR function setting window. A user may activate or deactivate the ACR function through the ACR function setting window.

When the ACR function is activated, a user may select an ACR mode. The ACR mode may be set with one of an auto playing application mode, a content provider application mode, and an image display manufacturer application mode.

When the ACR function mode is set in the above manner, the playback controlling unit 113 stores setting information on a setting information storage unit 154.

Figure 52:
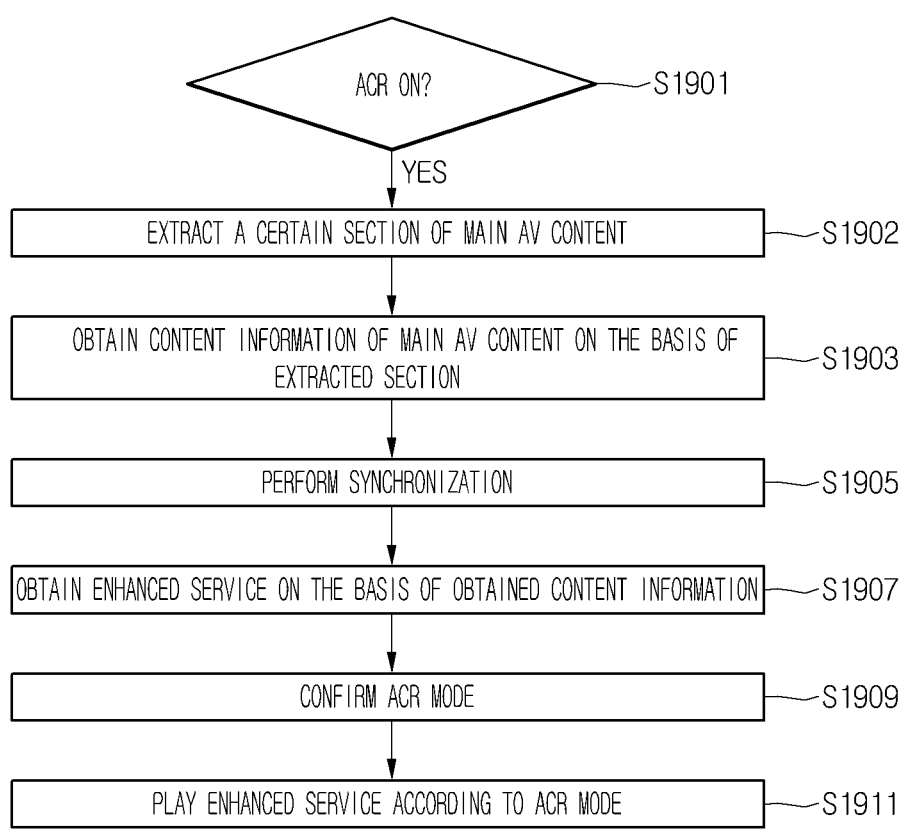
FIG. 52 is a flowchart illustrating a method of controlling a video display device according to the embodiment.

FIG. 52 is a flowchart illustrating a method of controlling a video display device according to the embodiment.

The enhanced service management unit 130 confirms whether the ACR function is turned on in step S1901.

If the ACR function is deactivated, the enhanced service management unit 130 does not perform a content information obtaining procedure any more.

If the ACR function is activated, the enhanced service management unit 130 extracts a certain section of a main AV content in step S1902.

The enhanced service management unit 130 obtains content information on the main AV content on the basis of the extracted section in step S1903.

The enhanced service management unit 130 synchronizes the reference time of the main AV content with the reference time of an alternative advertisement in step S1905.

The enhanced service management unit 130 obtains an enhanced service on the basis of the obtained content information in step S1907. The enhanced service management unit 130 obtains enhanced service information on the basis of the content information, and then obtains an enhanced service on the basis of the enhanced service information.

Then, the enhanced service management unit 130 confirms the ACR mode in step S1909.

The enhanced service management unit 130 plays the enhanced service according to the ACR mode in step S1911.

In more detail, if the ACR mode is an automatic playback application mode, the enhanced service management unit 130 executes an automatic playback application, and the executed automatic playback application plays the obtained enhanced service.

If the ACR mode is the content provider application mode, the enhanced service management unit 130 executes a content provider application corresponding to the obtained content information in background. The enhanced service management unit 130 displays a content provider application when receiving a user input corresponding to an enhanced service use. This content provider application may playback the obtained enhanced service. Instead that the content provider application is automatically executed in background, it may be executed by a user input.

If the ACR mode is the video display device manufacturer application mode, the enhanced service management unit 130 executes its video display device manufacturer application in background. The enhanced service management unit 130 displays the video display device manufacturer application when receiving a user input corresponding to an enhanced service use. This video display device manufacturer application may playback the obtained enhanced service. Instead that the video display device manufacturer application is automatically executed in background, it may be executed by a user input.

Next, a pairing procedure according to an embodiment will be described with reference to FIG. 53.

Figure 53:
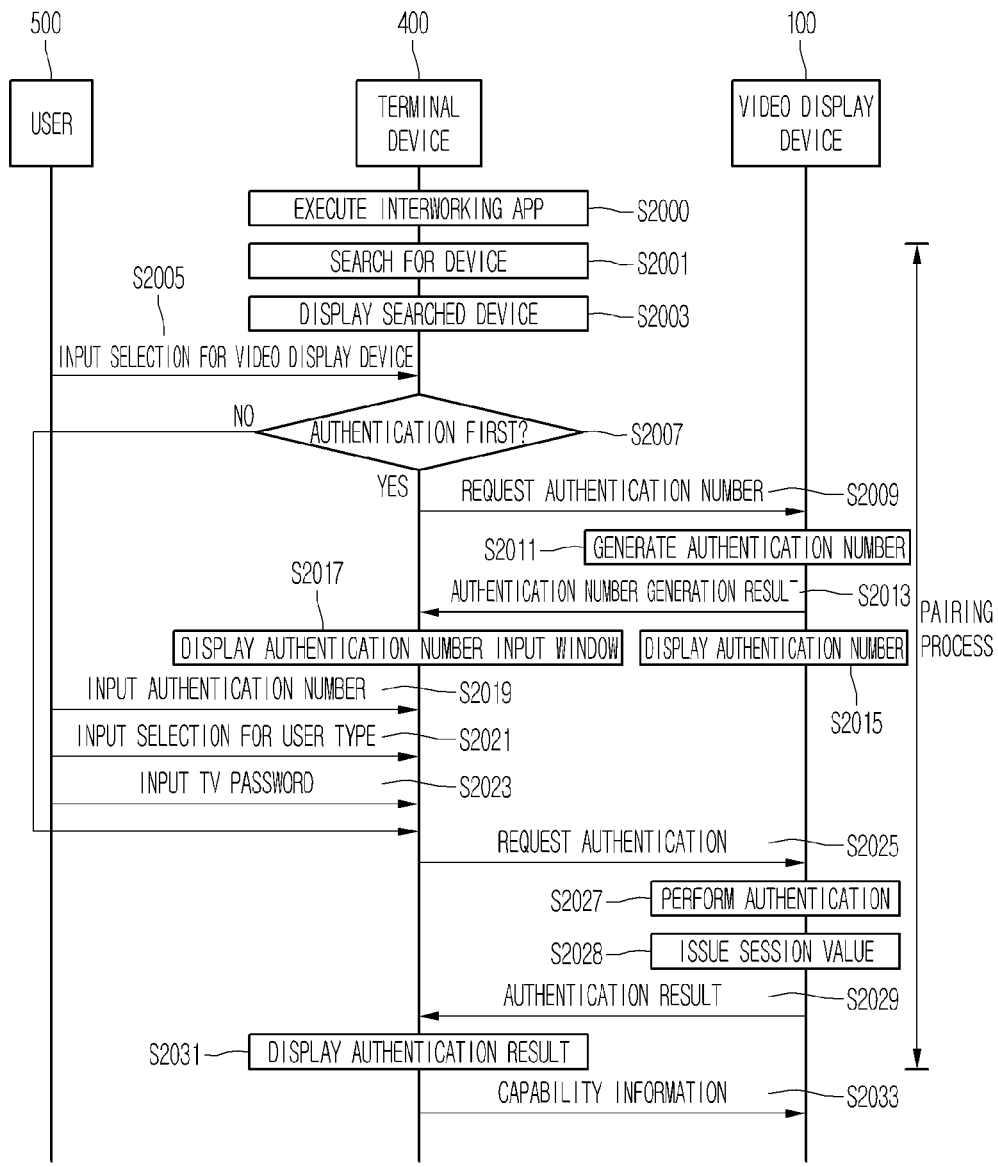
FIG. 53 is a ladder diagram illustrating a pairing procedure according to an embodiment.

FIG. 53 is a ladder diagram illustrating a pairing procedure according to an embodiment.

First, the terminal device 400 executes an interworking application in step S2000. The interworking application may be provided from a manufacturer of the video display device 100. When an interworking protocol between the terminal device 400 and the video display device 100 is public, a broadcaster, a content provider, a third party may manufacture and provide the interworking application.

The interworking application will be described with reference to FIG. 54.

Figure 54:
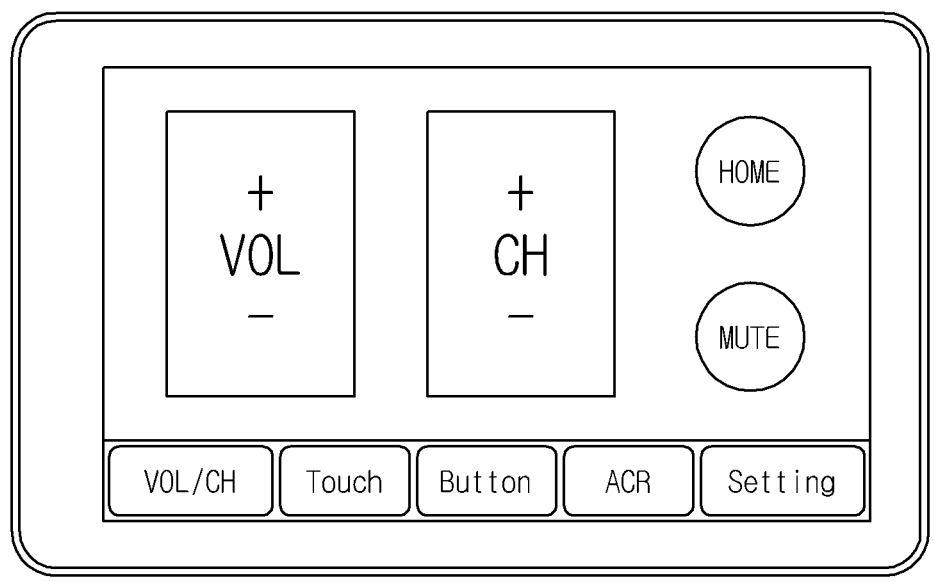
FIG. 54 is a front view of a terminal having an interworking application executed according to an embodiment.

FIG. 54 is a front view of a terminal device having an interworking application executed according to an embodiment.

As shown in FIG. 54, the interworking application displays a video display device control UI. At this point, the video display device control UI includes various function buttons for controlling the video display device 100 at the top and a plurality of tap change buttons at the bottom. The video display device control UI includes a VOL/CH tap change button for controlling the volume and channel of the video display device 100, an ACR tap change button, and a setting tap change button for changing the setting of the interworking application. Once the VOL/CH tap change button is clicked, the video display device control UI may display as a function button a volume increase button, a volume decrease button, a channel number increase button, a channel number decrease button, a mute button, and a home button.

FIG. 53 is described again.

The terminal device 300 searches for devices to be paired in step S2001, and displays the searched devices in step S2003. The terminal device 400 searches for devices connected to a network through Digital Living Network Alliance (DLNA), Bonjour, universal plug and playback (UPnP) or an original search method of a manufacturer, and then, confirms services that the searched devices provide.

A user 500 selects one of the searched devices, and the terminal device 400 recognizes the selected one of the searched devices in step S2005. At this point, it is assumed that the video display device 100 is selected.

When entering an authentication procedure, the terminal device 400 confirms whether this authentication procedure is first in step S2007. For example, the terminal device 400 confirms whether authentication information is stored in an authentication information storage unit. If it is stored, the terminal device 400 determines that this is not the first authentication, and if it is not stored, determines that this is the first authentication.

If the authentication procedure is first, the terminal device 400 request an authentication number of the video display device 100 in step S2009. For this, the terminal device 400 may transmit HTTP request of Table 14 to the video display device 100.

TABLE 14

```
POST /acr/api/auth HTTP/1.1
Host: target_ip:8080
Content-Type: application/atom+xml
<?xml version="1.0" encoding="utf-8"?>
<auth>
<type>AuthKeyRequest</type>
</auth>
```

As shown in Table 14, an authentication number request message includes an auth element for indicating authentication. The auth element includes a type element for indicating a message type. HTTP request where a value of the type element is AuthKeyRequest indicates an authentication number request message.

The video display device 100 which receives the authentication number request generates an authentication number in step S2011, and then, transmits an authentication number generation result to the terminal device 400 in step S2013. The authentication number generation result may not include the generated authentication number but may include information on success or failure. For example, if the number of terminals connectable to the video display device 100 is limited and the maximum number terminals are being connected to the video display device 100, even when the terminal device 400 transmits the authentication number request, the video display device 100 may transmit the authentication number generation result, which includes information indicating a failure, to the terminal device 400.

The authentication number generation result message may have a format of HTTP response as shown in Table 15 and Table 16.

TABLE 15

```
HTTP/1.1 200 OK
Content-Type: application/atom+xml; charset=utf-8
<?xml version="1.0" encoding="utf-8"?>
<auth>
<result>200</result>
<resultDetail>OK</resultDetail>
</auth>
```

As shown in Table 15, the authentication number generation result message includes an auth element for indicating that this HTTP response relates to authentication. The auth element includes a result element containing information on the authentication number generation result and a resultDetail element containing detailed information on the authentication number generation result. A result element, a list of values that a resultDetail element may contain, and description of each value are shown in Table 16.

TABLE 16

| result | resultDetail | description |
|---|---|---|
| 200 | OK | Process completion |
| 400 | Bad Request | Wrong format request |

TABLE 16-continued

| result | resultDetail | description |
|---|---|---|
| 402 | Unauthorized | Authentication fail, request from authorized session ID |
| 406 | Not Acceptable | Wrong URL |
| 409 | Conflict | Support unavailable due to different protocol or service version |
| 500 | Internal Server Error | Internal error occurs during processing in host device |
| 503 | Service Unavailable | Requested command is unavailable in current service |

As shown in Table 16, after successfully processing a request from the terminal 400, the video display device 100 may transmit an authentication number generation result message, which includes a result element having a value of 200 and a resultDetail element having a value of "OK", to the terminal device 400.

As shown in Table 16, after successfully processing a request from the terminal 400, the video display device 100 may transmit an authentication number generation result message, which includes a result element having a value of 400 and a resultDetail element having a value of "OK", to the terminal device 400.

When the video display device 100 fails in authentication because the authentication number request message is a request from an unauthorized session identifier, it may transmit an authentication number generation result message, which includes a result element having a value of 401 and a resultDetail element having a value of "Unauthorized", to the terminal device 400.

If URL is wrong, the video display device 100 may transmit an authentication number generation result message, which includes a result element having a value of 406 and a resultDetail element having a value of "Not Acceptable", to the terminal device 400.

If the image display 100 cannot support a request from the terminal device 400 due to a protocol or service version difference, it may transmit an authentication number generation result message, which includes a result element having a value of 409 and a resultDetail element having a value of "Conflict", to the terminal device 400.

If internal errors occur while the video display device 100 processes a request from the terminal device 400, the video display device 100 may transmit an authentication number generation result message, which includes a result element having a value of 500 and a resultDetail element having a value of "Internal Server Error", to the terminal device 400.

If a request from the terminal device 400 is not available in a current service, the video display device 100 may transmit an authentication number generation result message, which includes a result element having a value of 503 and a resultDetail element having a value of "Service Unavailable", to the terminal device 400.

The video display device 100 displays a generated authentication number in step S2015.

The terminal device 400, which receives an authentication number generation result including information indicating success, displays an authentication number input window in step S2017.

FIG. 55 is an authentication number input window according to an embodiment.

As shown in FIG. 55 (A), the authentication number input window includes a text box for inputting an authentication key, a combo box for inputting a user type, and a text box for inputting the password of the video display device 100.

For example, the combo box for inputting a user type may include a 'family' item and a 'guest' item. If the 'guest' item is selected, the text box for inputting the password of the video display device may disappear. The video display device 100 may assign a usage authorization of an enhanced service according to a user type. According to an embodiment, the video display device 100 may assign a relatively high authorization to the terminal device 400 paired with a 'family' user type, and a relatively low authorization to the terminal 400 paired with a 'guest' user type. According to another embodiment, the video display device 100 may assign a unrestricted authorization to the terminal device 400 paired with a 'family' user type, and only a view authorization to the terminal 400 paired with a 'guest' user type in order to use an enhanced service.

FIG. 53 is described again.

When the user 500 views an authentication number displayed on the video display device 100 and inputs an authentication number to the terminal device 400, the terminal device 400 receives the authentication number through the displayed authentication number input window in step S2019, and then stores the received authentication number in the authentication information storage unit.

Additionally, the terminal device 400 receives a user type through the displayed authentication number input window in step S2021, and stores the received user type in the authentication information storage unit.

Additionally, the terminal device 400 receives the password of the video display device 100 through the displayed authentication number input window in step S2023, and stores the received password in the authentication information storage unit. If 'guest' is selected as the user type, the terminal device 400 may not receive the password of the video display device 100.

The terminal device 400 transmits an authentication request in addition to the authentication number, the user type, and the password of the video display device 100 to the video display device 100 in step S2025. The authentication request message may have an HTTP request format as shown in Table 17.

TABLE 17

POST /acr/api/auth HTTP/1.1
Host: target_ip:8080
Content-Type: application/atom+xml
<?xml version="1.0" encoding="utf-8"?>
<auth>
<type>AuthRequest</type>
<key>AABBCC</key>
<userType>Family</userType>
<pwd>abcde</pwd>
</auth>

As shown in Table 17, the authentication request message includes an auth element for indicating that this HTTP request relates to authentication. The auth element includes a type element for indicating a message type, a key element containing an authentication number, a userType element containing a user type, and a pwd element containing the password of the video display device 100. If HTTP request where a value of the type element is AuthRequest indicates an authentication request message. As mentioned above, the userType element may have a 'Family' value or a 'Guest' value. If a value of the userType element is 'Guest', the authentication request message may not have the pwd element.

The video display device 100 performs an authentication process on the basis of an authentication number, a user type, and a password, which are received together with an authentication request, in step S2027. If the received authentication number is identical to a generated authentication number and the received password is identical to a stored password, the video display device 100 determines that authentication is successful in relation to the received user type. If the received authentication number is not identical to a generated authentication number or the received password is not identical to a stored password, the video display device 100 determines that authentication is failed in relation to the received user type.

If the video display device 100 performs authentication successfully, it issues a session value for the terminal device 400 in step S2028.

After performing the authentication, the video display device 100 transmits an authentication result to the terminal device 400 in step S2029. The authentication result message may have an HTTP response format as shown in Table 18.

TABLE 18

HTTP/1.1 200 OK
Content-Type: application/atom+xml; charset=utf-8
<?xml version="1.0" encoding="utf-8"?>
<auth>
<result>200</result>
<resultDetail>OK</resultDetail>
<session>12345</session>
</auth>

As shown in Table 18, the authentication result message includes an auth element for indicating that this HTTP response relates to authentication. The auth element includes a result element containing authentication result information, a resultDetail element containing detailed information on the authentication result, and a session element containing a session value. A result element, a list of values that a resultDetail element may contain, and description of each value are shown in Table 16. A session value that the session element contains is used in an interworking process. When a session value in a message is not identical to a session value that the video display device 100 issues during an interworking process, errors occur.

The terminal device 400 displays the received authentication result in step S2031.

in step S2033, the terminal device 400 transmits a capability information response message including capability information on the terminal device 400 to the video display device 100 in response to an authentication result message including a positive authentication result or a capability information request message. The capability information response message may include a deviceCapability element. The deviceCapability element may include a resolution element containing resolution information on the terminal device 400. The deviceCapability element may include an element containing a CPU specification and a remaining available memory. The video display device 100 may store and manage a list of paired terminal devices and capacity information on each terminal device on the list.

Additionally, the video display device 100 may transmit a message including capacity information on the video display device 100 to the terminal device 400. The video display device 100 may transmit a message including capacity information on the video display device 100 to the terminal device 400 in response to a capacity information response message or an additional capacity information request message in step S2033. Additionally, the authentication result message in step S2029 may include capability information on the video display device 100.

Moreover, if an authentication procedure is not the first, the terminal device 400 transmits an authentication request in addition to the authentication number, the user type, and the password of the video display device 100, which are stored in the authentication information storage unit, to the video display device 100 in step S2025, and then performs a following procedure.

The pairing procedure was described above, and HTTP request and HTTP response are used in the pairing procedure. However, a UDP or TCPO based packet may be used, or a message having other formats may be used.

Like this, an interworking between devices may be performed after a pairing procedure between the video display device 100 and the terminal device 400. However, after storing information on the terminal device 400 in a pairing state, even if the video display device 100 is not paired with the terminal device 400, the video display device 100 may deliver a message necessary for an interworking process between devices to the terminal device 400. Also, after storing information on the video display device 100 in a pairing state, even if the pairing state ends, the terminal device 400 may deliver a message necessary for an interworking process between devices to the video display device 100.

The video display device 100 stores information on the terminal device 400 in a pairing state, and then, transmits a message for an interworking process between devices to the terminal device 400 through push notification mechanism on the basis of the stored information in an unpaired state.

Additionally, the terminal device 400 stores information on the video display device 100 in a pairing state, and then, transmits a message for an interworking process between devices to the video display device 100 through push notification mechanism on the basis of the stored information in an unpaired state.

Next, an ACR control method according to an embodiment will be described with reference to FIG. 56.

Figure 56:
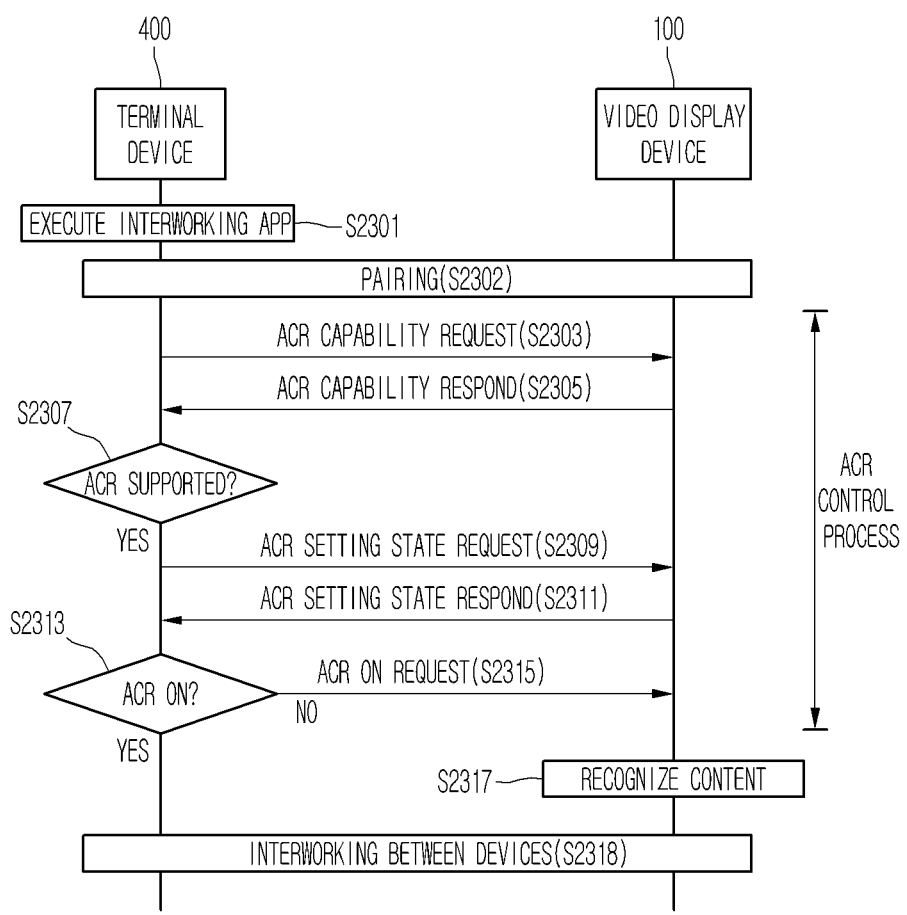
FIG. 56 is a ladder diagram illustrating an ACR control method according to an embodiment.

FIG. 56 is a ladder diagram illustrating an ACR control method according to an embodiment.

An embodiment shown in FIG. 56 will be described based on HTTP request and HTTP response. However, a UDP or TCP based packet may be used, or other various formats of messages may be used.

First, the terminal device 400 executes an interworking application in step S2301.

The interworking application of the terminal device 400 and the video display device 100 perform a pairing process in step S2302.

Then, the interworking application of the terminal device 400 transmits an ACR capability request message to the video display device 100 in step S2303 in order to inquire whether the video display device 100 supports ACR. The capability request message may have an HTTP request format as shown in Table 19.

TABLE 19

POST /acr/api/cmd HTTP/1.1
Host: target_ip:8080
Content-Type: application/atom+xml
<?xml version="1.0" encoding="utf-8"?>

TABLE 19-continued

<acrCommand>
<session>12345<session>
<name>ACRSupportRequest</name>
</acrCommand>

As shown in Table 19, the ACR capability request message includes an acrCommand element (or a command element) for indicating that the terminal device 400 transmits a command to the video display device 100 through this HTTP request. This acrCommand element includes a session element containing a session value that the video display device 100 issues, and a name element containing 'ACRSupportRequest', which is a text value indicating that the HTTP request is an ACR capability request message.

The video display device 100 transmits an ACR capability response message to the terminal device 400 in response to the ACR capability request message in step S2305. The ACR capability response message includes information on whether the video display device 100 supports ACR. The ACR capability response message may have an HTTP request format as shown in Table 20.

TABLE 20

HTTP/1.1 200 OK
Content-Type: application/atom+xml; charset=utf-8
<?xml version="1.0" encoding="utf-8"?>
<acrResponse>
<session>12345<session>
<name>ACRSupportRequest</name>
<acrSupport>Support</acrSupport>
</acrResponse>

As shown in Table 20, the ACR capability request message includes an acrResponse element (or a response element) for indicating that the video display device 100 transmits a response to the terminal device 400 through the HTTP response. This acrResponse element includes a session element containing a session value that the video display device 100 issues, a name element containing 'ACRSupportRequest', which is a text value indicating that the HTTP request is an ACR capability response message, and an acrSupport element containing information on whether the video display device 100 supports ACR. An acrSupport element having a 'Support' value indicates that the video display device 100 supports ACR, and an acrSupport element having a 'NotSupport' value indicates that the video display device 100 does not support ACR.

Then, the interworking application of the terminal device 400 determines whether the video display device 100 supports ACR on the basis of an ACR capability response message in step S2307.

If the video display device 100 does not support ACR, the interworking application of the terminal device 400 may not proceed to the following operation.

According to another embodiment, if the video display device 100 does not support ACR, the terminal device 400 may perform ACR like the video display device 100 supporting ACR on the basis of captured some intervals of video or audio that the video display device 100 outputs. This will be described.

When the video display device 100 supports ACR, the interworking application of the terminal device 400 transmits an ACR setting state request message to the video display device 100 in step S2309 in order to inquire whether the video display device 100 turns on an ACR function.

The video display device 100 transmits an ACR setting state response message to the terminal device 400 in response to the ACR setting state request message in step S2311. The ACR setting state response message includes information on whether the video display device 100 turns on an ACR function. If ACR is turned on, it is divided into a manufacturer app mode and a broadcaster app mode. In the manufacturer app mode, an automatic playback application of a broadcaster cannot be driven and only an application of a video display device's manufacturer can be driven. In the broadcaster app mode, both an automatic playback application and an application of a video display device's manufacturer can be driven.

The interworking application of the terminal device 400 determines whether the video display device 100 turns on an ACR function on the basis of an ACR setting state response message in step S2313.

If the video display device 100 does not turn on the ACR function, the interworking application of the terminal device 400 transmits an ACR ON request message to the video display device 100 in step S2315. The interworking application of the terminal device 400 provides UI in order to turn on/off the ACR function of the video display device 100. When a user input for turning on/off the ACR function is received through the UI, the interworking application transmits an ACR ON request message to the video display device 100 in order to allow the video display device 100 to turn on the ACR function.

Once ACR is turned on, the video display device 100 performs an automatic content recognition in order to obtain content information on main AV content in step S2317. As mentioned above, the video display device 100 may obtain the content information on the main AV content on the basis of the automatic content recognition. The video display device 100 may perform another content recognition in addition to the automatic content recognition in order to obtain the content information on the main AV content.

Like this, according to an embodiment, the video display device 100 may obtain content information on the basis of a portion of the main AV content. Moreover, according to another embodiment, the video display device 100 receives and obtains the content information on the main AV content from the content providing server 10 through a broadcast network. Furthermore, according to another embodiment, the terminal device 400 captures a portion of the AV content that the video display device 100 plays, obtains the content information on the basis of the captured portion of the AV content, and provides the obtained content information to the video display device 100.

Then, the interworking application of the terminal device 400 and the video display device 100 perform an interworking process between devices in step S2318.

Hereinafter, interworking processes between devices according to various embodiments will be described with reference to FIGS. 57 to 89.

Figure 57:
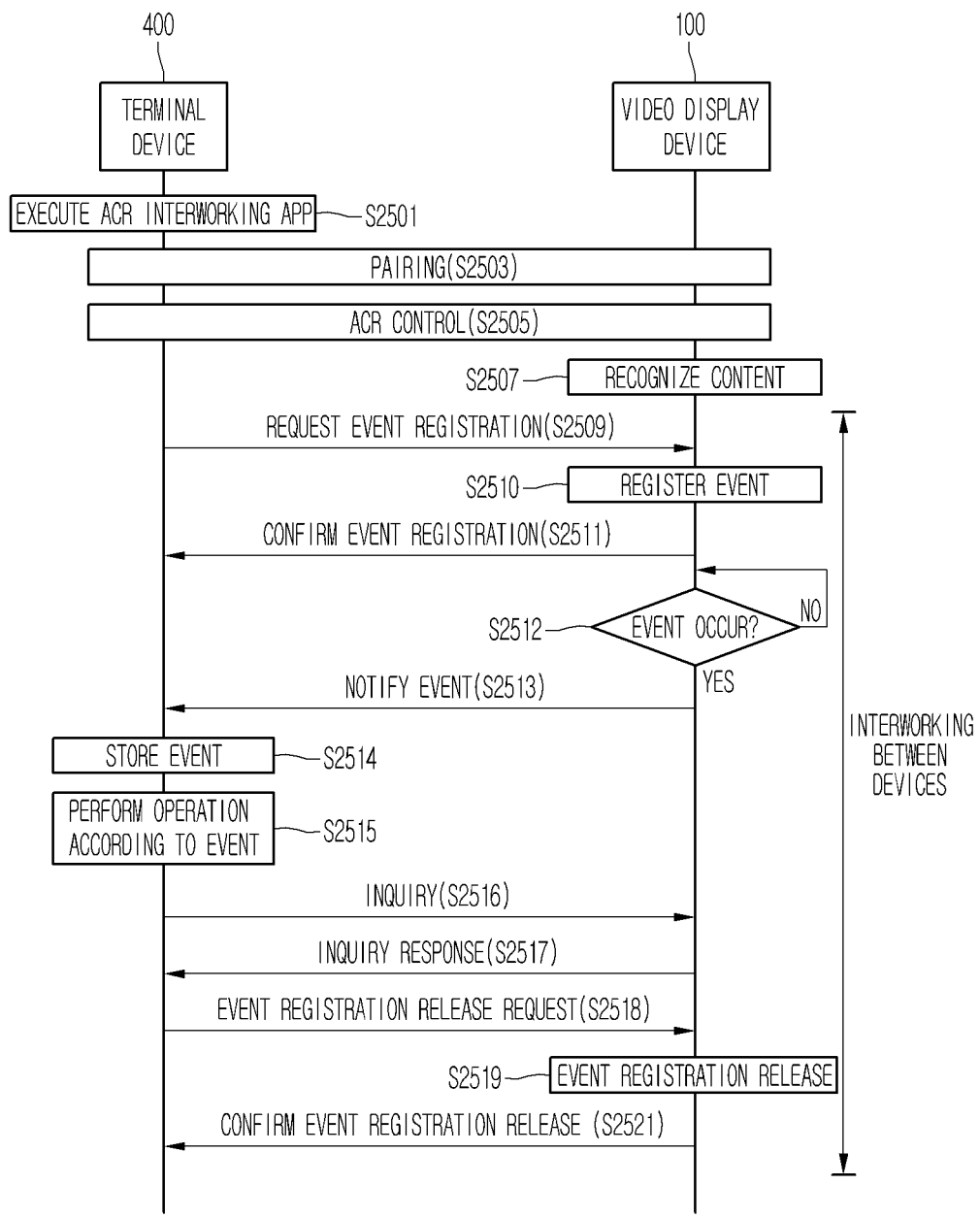
FIG. 57 is a ladder diagram illustrating an interworking process between devices according to an embodiment.

FIG. 57 is a ladder diagram illustrating an interworking process between devices according to an embodiment.

First, the terminal device 400 executes an interworking application in step S2501.

The interworking application of the terminal device 400 and the video display device 100 perform the above-mentioned pairing process in step S2503.

The interworking application of the terminal device 400 and the video display device 100 perform the above-mentioned ACR control process in step S2505.

When the ACR function of the video display device 100 is turned on, the video display device 100 performs the above-mentioned automatic content recognition in step S2507.

Moreover, the interworking application of the terminal device 400 transmits an event registration request message for requesting the registration of an event that is to be received to the paired video display device 100 in step S2509. According to an embodiment, a content recognition state change event, an available enhanced service notification event, an application execution/termination event in the video display device 100, an event occurring in an application executed in the video display device 100, a conflict event before control function, an URL start event, and an application event of a video display device's manufacturer may be used. The interworking application of the terminal device 400 may determine an event that is to be received on the basis of a user input.

The event registration request message may have an HTTP request format as shown in Table 21. Especially, Table 21 shows a format of an event registration request message of an application execution/termination event according to an embodiment.

TABLE 21

POST /hdcp/api/dtv_wifirc HTTP/1.1
Host: target_ip:8080
Content-Type:application/atom+xml
<?xml version= "1.0" encoding= "utf-8" ?>
<command>
<session>session id</session>
<name>RegisterAppOnOffStatusEvent</name>
<value>true</value>
</command>

As shown in Table 21, the event registration request message includes a command element for indicating that the terminal device 400 transmits a command to the video display device 100 through this HTTP request. This command element includes a session element containing a session value that the video display device 100 issues, and a name element containing 'RegisterAppOnOffStatusEvent', which is a text value indicating that the HTTP request is an event registration request message of the application execution/termination event.

The video display device 100 registers an event corresponding to the event registration request message in step S2510, and transmits an event registration confirmation message including an event registration result to the terminal device 400 in step S2511.

When an event that the terminal device 400 registers occurs in step S2512, the video display device 100 transmits an event notification message notifying event occurrence to the terminal device 400 in step S2513.

The event may be transmitted through HTTP request and may be posted to URL below.

http://target_ip:8080/hdcp/api/event

At this point, target_ip is an IP address of a terminal device that registers an event reception.

When the content recognition state change event is registered and the video display device 100 performs an automatic content recognition operation and recognizes that main AV content is changed, the video display device 100 may transmit an event notification message on the content recognition state change event to the terminal device 400. When the identifier or current time information on the main AV content that the video display device 100 obtains is changed, the video display device 100 may transmit a content recognition state change event notification message including changed information to the terminal device 400. The event notification message regarding a content recognition state change event may include an identifier of main AV content, a current time of main AV content, an URL of an available application.

When an available enhanced service notification event is registered and the video display device 100 confirms an available enhanced service related to main AV content, the video display device 100 may transmit an event notification message on an available enhanced service notification event to the terminal device 400.

When an application execution/termination event is registered in the video display device 100 and the video display device 100 executes an application, the video display device 100 may transmit an application execution/termination event to the terminal device 400 in order to notify the fact that the video display device 100 executes the application. Especially, when obtaining and executing an available application related to main AV content through automatic content recognition, the video display device 100 may transmit an application event to the terminal device 400. When the video display device 100 terminates the application, it may transmit an application termination event to the terminal device 400 in order to notify the fact that the video display device 100 terminates the application. The application execution/termination event may include the URL of an application for the terminal device 400. The URL of application for the terminal device 400 may be identical to or different from that for the video display device 100. Especially, if the URL of application for the terminal device 400 is different from that for the video display device 100, the video display device 100 may secure of the URL of an application appropriate for the terminal device 400, and then, may provide it to the terminal device 400. Additionally, the video display device 100 provides the URL of an application for the video display device 100 to the terminal device 400, and the terminal device 400 searches a lookup table on the basis of the URL and may recognize a URL appropriate for the terminal device 400. The application execution/termination event may have an HTTP response format as shown in Table 22.

TABLE 22

POST /hdcp/api/event HTTP/1.1
Host: target_ip:8080
Content-Type:application/atom+xml
<?xml version= "1.0" encoding= "utf-8" ?>
<event>
<session>session id</session>
<name>AppOnOffStatus</name>
<appId>App0001</appId>
<status>off</status>
</event>

As shown in Table 22, the application execution/termination event message includes an event element for indicating that this message is an event message that the video display device 100 transmits to the terminal device 400. This event element includes a session element containing a session value that the video display device 100 issues, and a name element containing 'AppOnOffStatus', which is a text value indicating that the HTTP request is the application execution/termination event message. Additionally, the event element includes an appId element and a status element. The appId element contains the identifier of an application executed/terminated in the video display device 100. The status element contains information on whether the application identified by the appId element value is executed or terminated. The status element having a value of on indicates that the application identified by the value of the appId element is executed, and the status element having a value of off indicates that the application identified by the value of the appId element is terminated. The application execution/termination event message may include the URL of an application.

When an event occurring in an application executed by the video display device 100 is registered and the event occurs in an application executed in the video display device 100, the video display device 100 may transmit the event in the application to the terminal device 400 in order to notify that the event occurs in the application. Especially, an event in an application may be generated by user's selection.

According to an embodiment, as described with reference to FIGS. 30 to 32, once information on a selected search item is searched, the video display device 100 transmits an event related thereto to the terminal device 400, and the terminal device 400 obtains and displays the search result. Based on this, a user may perform additional search. Through this, a user may use search service freely without experiencing inconvenience such as limited input of a TV remote controller and a TV browser that blocks a viewing screen.

According to another embodiment, an application executed in the video display device 100 may provide information on a place related to main AV content and a map on the basis of a user's selection while the main AV content is played. At this point, the video display device 100 transmits an event related to the above to the terminal device 400, and thus, the terminal device 400 obtains and displays map data of a place related to the main AV content. Moreover, the terminal device 400 may additionally display detailed position information related to the main AV content on the map.

According to another embodiment, once a chatting service in a video display device's manufacturer applications selected, the video display device 100 transmits an event related to the selection to the terminal device 400, and thus, the terminal device 400 obtains and displays a control function of the video display device's manufacturer application. At this point, the control function of the video display device's manufacturer application may be a keyboard or a keypad displayed on a touch screen.

According to another embodiment, the terminal device 400 may use upload service. Once an upload service in a video display device's manufacturer application is selected, the video display device 100 transmits an event related to the selection to the terminal device 400, and thus, the terminal device 400 obtains and displays an upload service related application. The terminal device 400 may upload program related information or reported content into the content providing server 10 and the enhanced service providing server 50 through the upload service application.

According to another embodiment, when a download service in a video display device's manufacturer application is selected, the video display device 100 transmits an event related to the selection to the terminal device 400, and thus, the terminal device 400 downloads the selected item, and then, stores, manages, and plays it. Examples of the download service include music, last broadcast VODs, coupons, product catalogs, and upload information. A user may download various services while watching the video display device 100, and may use a downloaded service while moving around.

When a control function transfer conflict event is registered and the video display device 100 confirms the control function transfer conflict, the video display device 100 may transmit an event notification message on the conflict event before a control function to the terminal device 400.

When a URL start event is registered and the video display device 100 confirms the URL start, the video display device 100 may transmit an event notification message on the URL start event to the terminal device 400. The video display device 100 may notify the terminal device 400 that a specific URL is clicked through the URL start event. If the URL is a typical Web URL and the video display device 100 cannot properly display a page corresponding to the clicked URL, the video display device 100 transmits the URL start event including the clicked URL to the terminal device in order for the terminal device 400 to display a page corresponding to the clicked URL.

When the URL is an ACR application URL, the video display device 100 may perform a process for resolving a version of the ACR application URL for the video display device 100 into a version of the ACR application URL for the terminal device 400. For example, when a display function of an ACR application function is executed in the video display device 100 and a control function of an ACR application is executed in the terminal device 400, the video display device 100 may provide an ACR application URL for the control function of the ACR application to the terminal device 100.

When a video display device's manufacturer application event is registered and the video display device 100 executes or terminates a video display device's manufacturer application, the video display device 100 may transmit an event notification message on the video display device's manufacturer application event to the terminal device 400. The terminal device 400 may confirm whether the video display device's manufacturer application is executed in the video display device 100 through the video display device's manufacturer application event. If it is confirmed that a video display device's manufacturer application event is executed in the video display device 100, the terminal device 400 may request the video display device 100 not to display the video display device's manufacturer application by terminating, deactivating, or hiding it and to allow the terminal device 400 to execute the video display device's manufacturer application.

The interworking application of the terminal device 400 may store a notified event in a history form in step S2514. Then, the terminal device 400 may display a list of events stored by a user's selection. Items on a list of stored events may be visited again, or may be deleted. When visiting one of the items on the list of stored events is selected, the terminal device 400 may perform an operation according to an event corresponding to the selected item.

The interworking application of the terminal device 400 may perform an operation according to a notified event.

Additionally, the terminal device 400 may transmit a message for inquiring a state of the video display device 100 to the video display device 100 when the state of the video display device 100 is required under a specific condition in step S2516. For example, when an enhanced service executed in the video display device 100 is transferred to the terminal device 400, the terminal device 100 inquiries the video display device 100 about a UI state of the enhanced service executed in the video display device 100, and maintains the UI state of the transferred enhanced service like the UI state executed in the video display device 100. That is, the UI state of the enhanced service executed in the video display device 100 may continuously change. However, if the enhanced service is not transferred to the terminal device 400, the terminal device 400 may not necessarily receive a notification a UI change each time it changes.

The interworking application of the terminal device 400 transmits a query message through HTTP Get, and the query message may have the following URL format.

http://target_ip:8080/hdcp/api/data?<query>

At this point, target_ip may be the IP address of the video display device 100 receiving a query message. <query> may include query terms having a pair of Key-values in the HTTP GET format.

According to an embodiment, when the terminal device 400 inquires a current state of a specific application of the video display device 100, a query message may have the following URL format as shown in Table 23.

TABLE 23

URL: http://target_ip:8080/hdcp/api/data?
target=GetCommonAppState&session=session_id The video display device 100 transmits a query response message to the terminal device 400 in response to the query message in step S2517. When the terminal device 400 inquires a state of the video display device 100, the video display device 100 may transmit a query response message including information on the state of the video display device 100 to the terminal device 400. Especially, when the terminal device 400 inquires a UI state of an enhanced service executed in the video display device 100, the video display device 100 may transmit a query response message including information on the UI state of the enhanced service executed in the video display device 100 to the terminal device 400. The query response message may have the following format as shown in Table 24.

TABLE 24

<?xml version="1.0" encoding="utf-8"?>
<envelope>
<HDCPError>error code</HDCPError>
<HDCPErrorDetail>message</HDCPErrorDetail>
<session>session id</session>
<data>
<value>state</value>
</data>
<envelope>

Moreover, the interworking application of the terminal device 400 transmits an event unregistration request message for requesting the unregistration of an event that is not to be received to the paired video display device 100 in step S2518. According to an embodiment, a content recognition state change event, an available enhanced service notification event, a control function transfer conflict event, a URL start event, and a video display device's manufacturer application event may be used. The interworking application of the terminal device 400 may determine an event that is to be received on the basis of a user input.

The video display device 100 unregisters an event corresponding to the event unregistration request message in step S2519, and transmits an event unregistration confirmation message including an event unregistration result to the terminal device 400 in step S2521.

Figure 58:
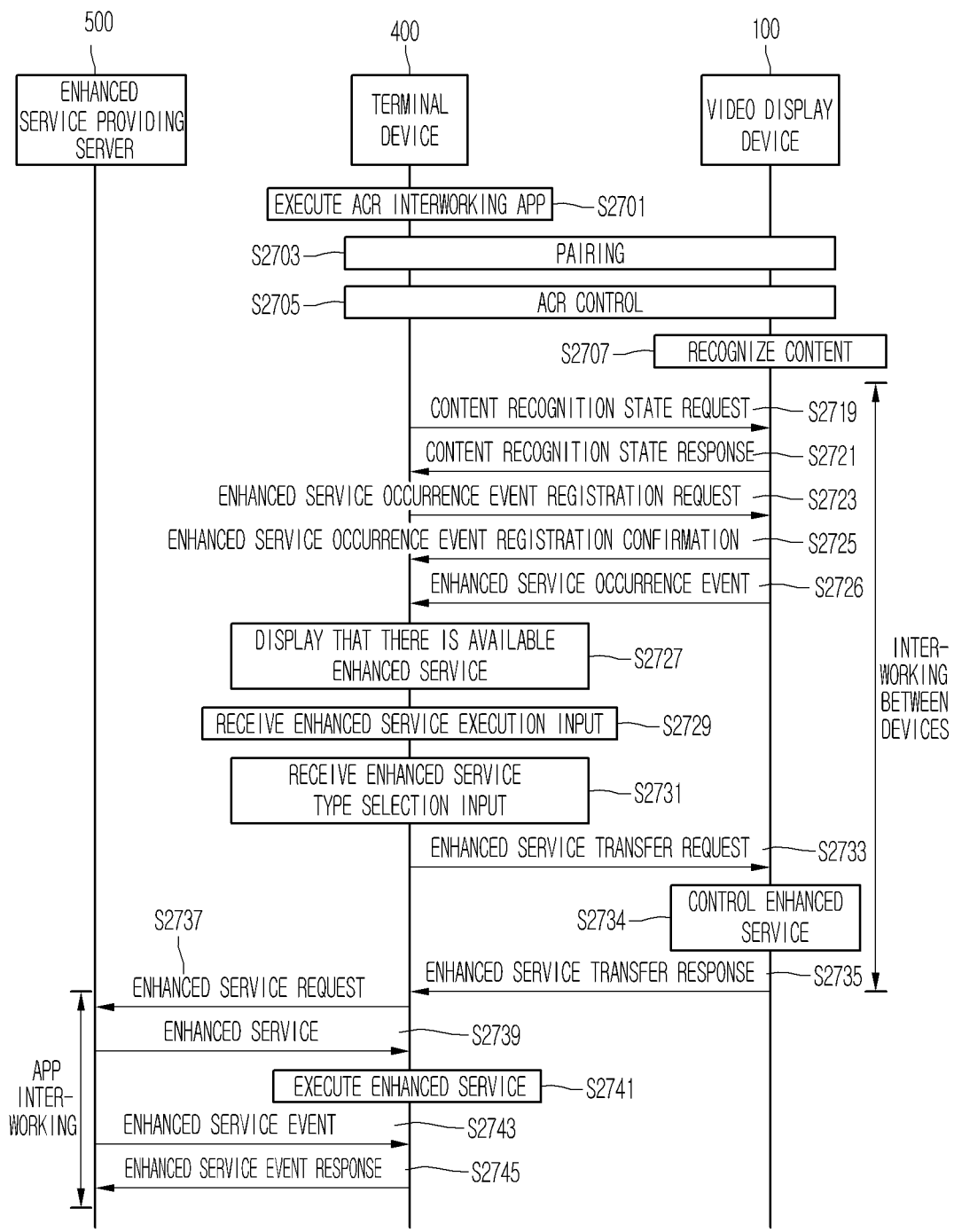
FIG. 58 is a ladder diagram illustrating an interworking process between devices according to another embodiment.

FIG. 58 is a ladder diagram illustrating an interworking process between devices according to another embodiment.

First, the terminal device 400 executes an interworking application in step S2701.

The interworking application of the terminal device 400 and the video display device 100 perform the above-mentioned pairing process in step S2703.

The interworking application of the terminal device 400 and the video display device 100 perform the above-mentioned ACR control process in step S2705.

When the ACR function of the video display device 100 is turned on, the video display device 100 performs the above-mentioned automatic content recognition in step S2707.

Moreover, the interworking application of the terminal device 400 transmits a content recognition state request message to the video display device 100 in step S2719. The content recognition state request message may have an HTTP request format as shown in Table 25.

TABLE 25

POST /acr/api/cmd HTTP/1.1
Host: target_ip:8080
Content-Type: application/atom+xml
<?xml version="1.0" encoding="utf-8"?>
<acrCommand>
<session>12345<session>
<name>CheckACRStatus</name>
<repeat>Once</repeat>
</acrCommand>

As shown in Table 25, the content recognition state request message includes an acrCommand element (or a command element) for indicating that the terminal device 400 transmits a command to the video display device 100 through this HTTP request. The acrCommand element includes a session element, a name element, and a repeat element. The session element contains a session value that the video display device 100 issues to the terminal device 400. The name element contains "CheckACRStatus", which is a text value indicating that this message is a content recognition state request message. The repeat element contains information on how often the video display device 100 transmits the content recognition state response message to the terminal device 400. For example, if a value of the repeat element is once, the video display device 100 transmits a content recognition state response message to the terminal device 400 only once in response to the content recognition state request message. For example, if a value of the repeat element is always, the video display device 100 transmits a content recognition state response message to the terminal device 400 each time an ACR recognition state is changed after receiving the content recognition state request message.

The video display device 100 transmits a content recognition state response message to the terminal device 400 in response to the content recognition state request message in step S2721. The content recognition state response message may have an HTTP response format as shown in Table 26.

TABLE 26

HTTP/1.1 200 OK
Content-Type: application/atom+xml: charset=utf-8
<?xml version="1.0" encoding="utf-8"?>
<acrResponse>
<session>12345<session>
<name>CheckACRStatus</name>
<recognition>Found</recognition>
<contentId>American Idol</contentId>
<mediaTime>210</mediaTime>
</acrResponse>

As shown in Table 26, the content recognition state response message includes an acrResponse element (or a response element) for indicating that the video display device 100 transmits a response to the terminal device 400 through the HTTP response. The acrResponse element includes a session element, a name element, a recognition element, a contentId element, and a mediaTime element. The session element contains a session value that the video display device 100 issues to the terminal device 400. The name element contains "CheckACRStatus", which is a text value indicating that this message is a content recognition state response message.

The recognition element includes information on whether the video display device 100 identifies main AV content in order to obtain content information. The recognition element having a "found" value indicates that the video display device 100 identifies main AV content in order to obtain content information. The recognition element having a "Notfound" value indicates that the video display device 100 does not identify main AV content and thus does not obtain content information. If a value of the recognition element is "Found", the acrResponse element may have a contentID element and a mediaTime element. A value of the contentID element corresponds to main AV content identification information that the video display device 100 obtains. A value of the mediaTime element corresponds to a time of a content interval used for content information acquisition or a current time of main AV content. For example, as shown in Table 26, a value of the mediaTime element is 210. This means that 210 sec elapse after a time of a content interval used for content information acquisition or a current time of main AV content starts.

If a value of the repeat element in the content recognition state request message is always, the video display device 100 transmits a content recognition state response message to the terminal device 400 each time a value of the contentID element or a value of the mediaTime element is changed after receiving the content recognition state request message.

The content recognition state response message may additionally include an available application URL, an automatic playback application URL, and a backend URL.

Then, the interworking application of the terminal device 400 transmits an enhanced service occurrence event registration request message to the video display device 100 in step S2303 in order to request a notification on whether there is an available enhanced service related to main AV content from the video display device 100. The enhanced service occurrence event registration request message may have an HTTP request format as shown in Table 27.

TABLE 27

POST /acr/api/cmd HTTP/1.1
Host: target_ip:8080
Content-Type: application/atom+xml
<?xml version="1.0" encoding="utf-8"?>
<acrCommand>
<session>12345<session>
<name>RegisterAppNotifyEvent</name>
<value>true</true>
</acrCommand>

As shown in Table 27, the enhanced service occurrence event registration request message includes an acrCommand element (or a command element) for indicating that the terminal device 400 transmits a command to the video display device 100 through this HTTP request. The acrCommand element includes a session element, and a name element. The session element contains a session value that the video display device 100 issues to the terminal device 400. The name element contains "RegisterAppNotifyEvent", which is a text value indicating that this message is an enhanced service occurrence event registration request message.

The video display device 100 transmits an enhanced service occurrence event registration response message to the terminal device 400 in response to the enhanced service occurrence event registration request message in step S2725.

Then, if an available enhanced service related to current main AV content occurs, the video display device 100 transmits an enhanced service occurrence event message to the terminal device 400.

The enhanced service occurrence event message may have an HTTP response format as shown in Table 28.

TABLE 28

HTTP/1.1 200 OK
Content-Type: application/atom+xml; charset=utf-8
<?xml version="1.0" encoding="utf-8"?>
<acrResponse>
  <session>12345<session>
  <name>RegisterAppNotifyEvent</name>
  <app>
    <appId>A123</appId>
    <appName>Chat with superstars</appName>
    <appType>controller</appType>
    <maxController>1</maxController>
    <appType>appTransfer</appType>
  </app>
</acrResponse>

As shown in Table 28, the enhanced service occurrence event message includes an acrResponse element (or a response element) for indicating that the video display device 100 transmits a response to the terminal device 400 through the HTTP response. The acrResponse element includes a session element, a name element, and at least one app element. The session element contains a session value that the video display device 100 issues to the terminal device 400. The name element contains "RegisterAppNotifyEvent", which is a text value indicating that this message is an enhanced service occurrence event message.

The app element includes an appId element, an appName element, and at least one addType element. A value of the appId element is the identifier of an available enhanced service related to main AV content; a value of the appName element is the name of an available enhanced service related to main AV content; and a value of the appType element is the type of an available enhanced service related to main AV content. A value of the appType element is one of "controller" and "appTransfer". The appType element having a value of "controller" indicates that a display function among functions of an enhanced service corresponding to the app element is executed in the video display device 100 and a control function is executed in the terminal device 400. The appType element having a value of "appTransfer" indicates that an enhanced service corresponding to the app element is terminated, deactivated, or hidden in the video display device 100 and is executed in the terminal device 400.

If a value of the appType element is 'controller', the app element may further include a maxController element. A value of the maxController element indicates the maximum number of terminal devices to which the control function of an enhanced service can be transferred. For example, if a value of the maxController element is 1, only one terminal device may have the control function of an enhanced service executed in the video display device 100.

For example, if a value of the maxController element is 2, the maximum two terminal devices may have the control function of an enhanced service executed in the video display device 100. For example, if an enhanced service is a war game for two users, two terminal devices are paired with the video display device 100 in order to control two characters, respectively.

If a value of the maxController element is N and N+1 terminal devices request the control function of an enhanced service executed in the video display device 100, conflict may occur. A method of adjusting the above conflict will be described later.

When a value of the appType element is "appTransfer", the number of terminal devices executing an enhanced service linked with the video display device 100 is not limited. Each of a plurality of terminal devices executing an enhanced service may be separately linked with the video display device 100.

Like this, according to an embodiment, the terminal device 400 transmits the enhanced service occurrence event registration request message to the video display device 100 in order to receive an enhanced service occurrence event.

According to another embodiment, the terminal device 400 transmits an enhanced service notification request message to the video display device 100 in order to receive an enhanced service response event. The enhanced service occurrence event registration request message may be an enhanced service notification request message and the enhanced service occurrence event may be an enhanced service notification response message.

When the terminal device 400 transmits an enhanced service notification request message to the video display device 100, the video display device 100 may transmit information on the identifiers, types, and execution times of all available enhanced services to the terminal device 400 through an enhanced service notification response message. In this case, when it reaches the execution time of an enhanced service, the terminal device 400 may display UI indicating that the enhanced service can be executed or may execute the enhanced service.

When the terminal device 400 transmits an enhanced service notification request message to the video display device 100, the video display device 100 may transmit information on the identifiers, types, and execution times of all available applications to the terminal device 400 through an enhanced service notification response message when the all available applications occur. In this case, on receiving the enhanced service notification response message, the terminal device 400 may display UI indicating that the enhanced service can be executed or may execute the enhanced service.

The interworking application of the terminal device 400 recognizes that there is an available enhanced service related to main AV content on the basis of the enhanced service occurrence event message, and displays an enhanced service notification UI indicating that there is an available enhanced service in step S2727.

If the number of available enhanced services is one, an enhanced service notification UI may include UI for inquiring whether to execute the available enhanced service in the terminal device 400. If the number of available enhanced services is in plurality, an enhanced service notification UI may include UI for selecting one of the plurality of available enhanced services. If an available enhanced service has a plurality of types, an enhanced service notification UI may include UI for selecting one of the plurality of types. The interworking application of the terminal device 400 may generate a haptic event such as vibration, an audible event such as alarm sound, and a visual event such as flickering or color changing in addition to displaying an enhanced service notification UI.

The interworking application of the terminal device 400 may display an enhanced service notification UI indicating that there is an available enhanced service on the basis of an enhanced service execution/termination event message.

Next, an enhanced service notification UI according to an embodiment will be described with reference to FIGS. 59 and 60.

Figure 59:
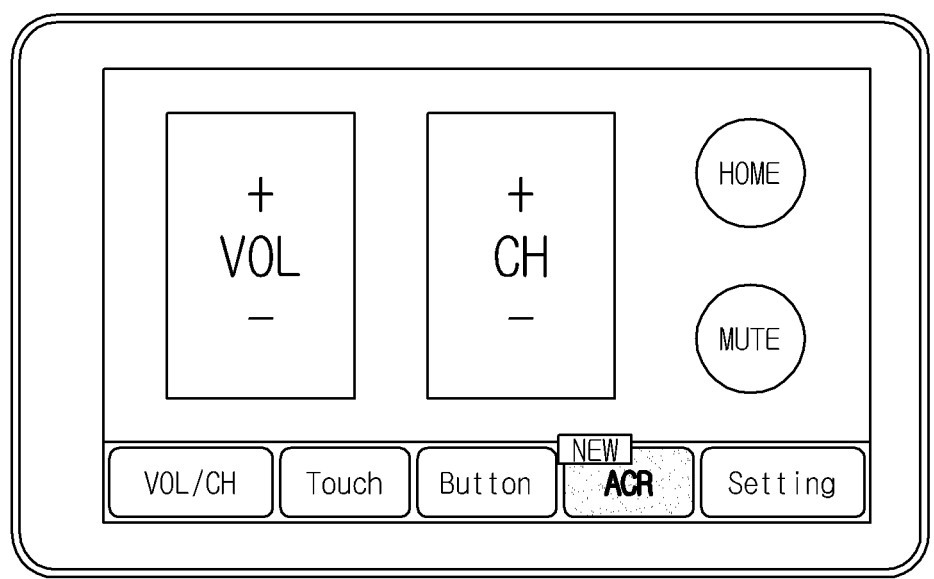
FIG. 59 is a front view of a terminal device displaying an enhanced service notification UI according to an embodiment.

FIG. 59 is a front view of a terminal device displaying an enhanced service notification UI according to an embodiment.

As shown in FIG. 59, when the interworking application of the terminal device 400 receives an enhanced service occurrence event message including information that there is an available enhanced service, the interworking application changes the color or brightness of an ACR tap change button in order to notify a user that there is an available enhanced service related to main AV content.

Figure 60:
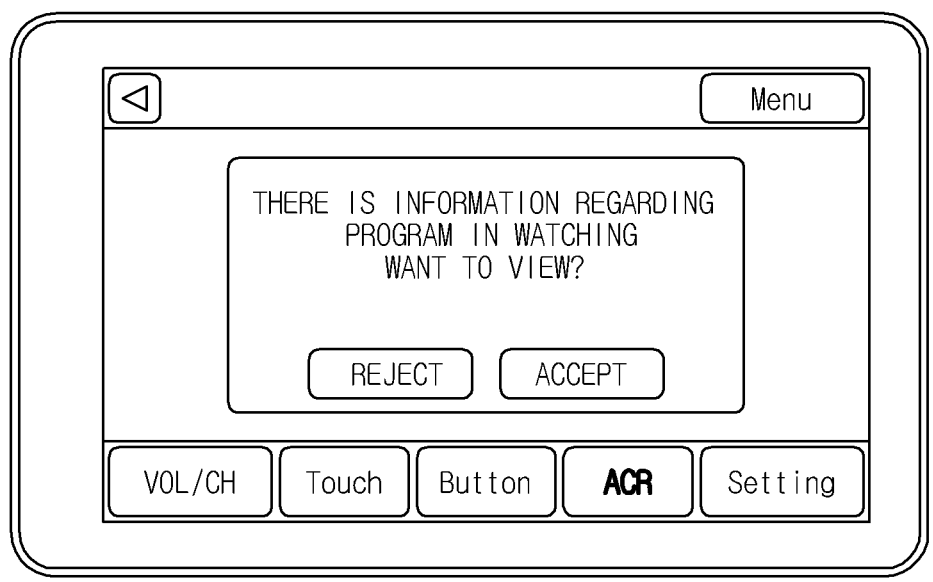
FIG. 60 is a front view of a terminal device displaying an enhanced service notification UI according to another embodiment.

FIG. 60 is a front view of a terminal device displaying an enhanced service notification UI according to another embodiment.

As shown in FIG. 60, the interworking application of the terminal device 400 may display UI in order to inquire whether to execute an available enhanced service in the terminal device 400. If a user accepts enhanced service execution, whether to accept it is no more inquired while the interworking application is executed, FIG. 61 is a front view of a terminal device displaying an enhanced service notification UI according to another embodiment.

Figure 61:
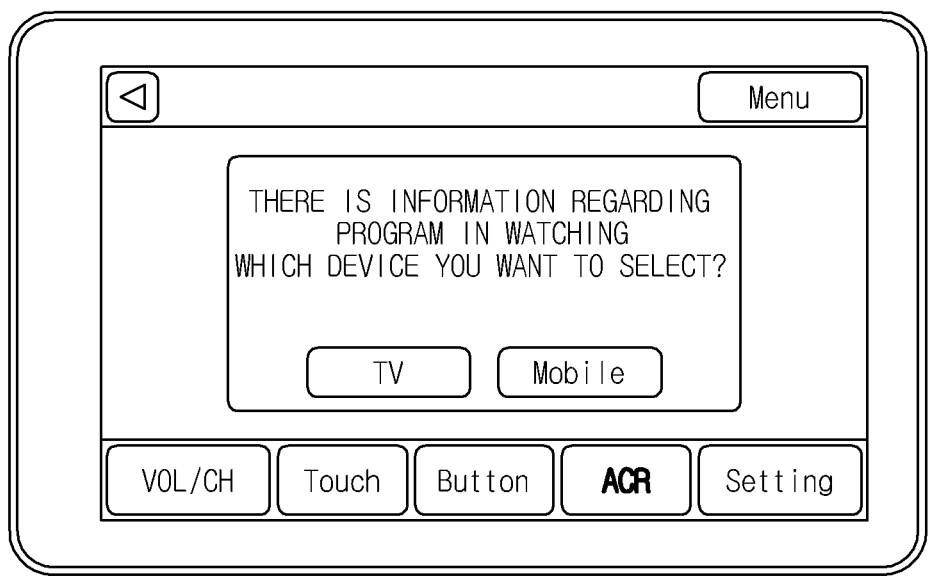
FIG. 61 is a front view of a terminal device displaying an enhanced service notification UI according to another embodiment.

As shown in FIG. 61, the interworking application of the terminal device 400 may display UI in order to select one of a plurality of enhanced service types. If a TV button is selected in FIG. 61, the terminal device 400 may recognize the execution type of an enhanced service as a control function transfer type. If a Mobile button is selected, the terminal device 400 may recognize the execution type of an enhanced service as an enhanced service transfer type.

FIG. 58 is described again.

The terminal device 400 receives a user input related to the execution of an available enhanced service through the enhanced service notification UI in step S2729.

If an available enhanced service has a plurality of types, the terminal device 400 receives a user input related to the type selection of the available enhanced service through the enhanced service notification UI in step S2731.

The terminal device 400 transmits an enhanced service transfer request message for requesting the transferring of the selected enhanced service to the video display device 100 in step S2733. The enhanced service transfer request message may have an HTTP request format as shown in Table 29.

TABLE 29

```
POST /acr/api/cmd HTTP/1.1
Host: target_ip:8080
Content-Type: application/atom+xml
<?xml version="1.0" encoding="utf-8"?>
<acrCommand>
<session>12345<session>
<name>ACRAppRequest</name>
```

TABLE 29-continued

```
<appId>A123</appId>
<type>controller</type>
<deviceCapability>
    <resolution>960x540</resolution>
</deviceCapability>
</acrCommand>
```

As shown in Table 29, the enhanced service transfer request message includes an acrCommand element (or a command element) for indicating that the terminal device 400 transmits a command to the video display device 100 through this HTTP request. The acrResponse element includes a session element, a name element, an appId element, a type element, and a device Capability element. The session element contains a session value that the video display device 100 issues to the terminal device 400. The name element contains "ACRAppRequest", which is a text value indicating that this message is an enhanced service transfer request message.

The appId element contains the identifier of an enhanced service that a user wants.

The type element contains information indicating a transfer type that a user wants. A value of the appType element is one of "controller" and "appTransfer". The type element having a value of "controller" means a transfer request on the control function of an enhanced service and the type element having a value of "appTransfer" means a transfer registration of an entire enhanced service.

The deviceCapability element contains information on the capability of the terminal device 400. The deviceCapability element may include a resolution element containing resolution information on the terminal device 400. The deviceCapability element may further include an element containing a CPU specification and a remaining available memory. When the terminal device 400 delivers capability information to the video display device 100 in advance after authentication, the enhanced service transfer request message may not include the deviceCapability element.

The video display device 100 may control an enhanced service according to the enhanced service transfer request message.

When the terminal device 400 request the transferring of the control function of an enhanced service, the video display device 100 activates a display function of the requested enhanced service, and generates an enhanced service transfer response message including an enhanced service URL corresponding to the control function of the requested enhanced service, the requested enhanced service type, and the capability of the terminal device 400. The video display device 100 may activate or deactivate the requested control function of the enhanced service.

When the terminal device 400 request the transferring of an enhanced service, the video display device 100 deactivates, hides, or terminates the requested enhanced service in order not to display the enhanced service, displays main AV content on a full screen, and generates an enhanced service transfer response message including an enhanced service URL corresponding to the requested enhanced service, the requested enhanced service type, and the capability of the terminal device 400.

The video display device 100 transmits an enhanced service transfer response message to the terminal device 400 in step S2735. The enhanced service transfer response message may have an HTTP response format as shown in Table 30.

TABLE 30

```
HTTP/1.1 200 OK
Content-Type: application/atom+xml; charset=utf-8
<?xml version="1.0" encoding="utf-8"?>
<acrResponse>
  <session>12345<session>
  <name>ACRAppRequest</name>
  <appId>App001</appId>
  <type>controller</type>
  <appURL>http://hello.com/chat_mobile</appURL>
  <result>OK</result>
</acrResponse>
```

As shown in Table 30, the enhanced service transfer response message includes an acrResponse element (or a response element) for indicating that the video display device 100 transmits a response to the terminal device 400 through the HTTP response. The acrResponse element includes a session element, a name element, a type element, an appURL element, and a result element. The session element contains a session value that the video display device 100 issues to the terminal device 400. The name element contains "ACRAppRequest", which is a text value indicating that this message is an enhanced service transfer response message.

The type element includes information indicating a response for what type of an enhanced service is requested by the enhanced service request message When receiving an enhanced service request message in which a value of the type element is "controller", in response thereto, the video display device 100 transmits an enhanced service transfer response message in which a value of the type element is "controller". When receiving an enhanced service request message in which a value of the type element is "appTransfer", in response thereto, the video display device 100 transmits an enhanced service transfer response message in which a value of the type element is "appTransfer".

The appURL element includes an enhanced service URL corresponding to the requested enhanced service, the requested enhanced service type, and the capability of the terminal device 400.

A value of the appType element is one of OK, NotOK, and Conflict. If the enhanced service request of the terminal device 400 is successfully performed, the video display device 100 transmits an enhanced service transfer response message including the result element whose value is OK to the terminal device 400. If the enhanced service request of the terminal device 400 is unsuccessfully performed, the video display device 100 transmits an enhanced service transfer response message including the result element whose value is NotOK to the terminal device 400. Under the conditions that the maximum number of terminal devices to which the control function of an enhanced service can be transferred is N and the number of terminal devices that is executing the control function of the enhanced service is N, when the video display device 100 receives an enhanced service request message in which a value of the type element is "controller", it transmits an enhanced service transfer response message including the result element whose value is Conflict to the terminal device 400.

When receiving an enhanced service request message in which a value of the type element is "controller", the video display device 100 transmits an enhanced service transfer response message including a control command such as a key position or a touch position to the terminal device 400 instead of transmitting an enhanced service URL, and thus, the terminal device 400 may create control UI through the control command instead of creating control UI through the enhanced service URL.

The terminal device 400 may confirm the URL of an available enhanced service on the basis of an enhanced service response of the video display device 100. Additionally, instead of basing an enhanced service response of the video display device 100, the terminal device 400 may confirm the URL of an available enhanced service by transmitting a query including a content identifier and a content time of a content recognition state response of the video display device 100 to the enhanced service information providing server 40.

The enhanced service transfer response message may include state information on an enhanced service executed in the video display device 100.

The terminal device 400 transmits an enhanced service request message for requesting an enhanced service corresponding to an enhanced service URL to the enhanced service providing server 50 in step S2737. Information exchange between the terminal device 400 and the enhanced service providing server 50 may be directly accomplished without the video display device 100.

The enhanced service providing server 50 provides an enhanced service to the terminal device 400 in step S2739.

The terminal device 400 executes the enhanced service provided by the enhanced service providing server 50 in step S2741. If the enhanced service transfer response message includes state information on an enhanced service executed in the video display device 100, the interworking application of the terminal device 400 may provide service continuously by executing the enhanced service according to the state information.

Execution of an enhanced service will be described with reference to FIGS. 62 to 68.

Figure 62:
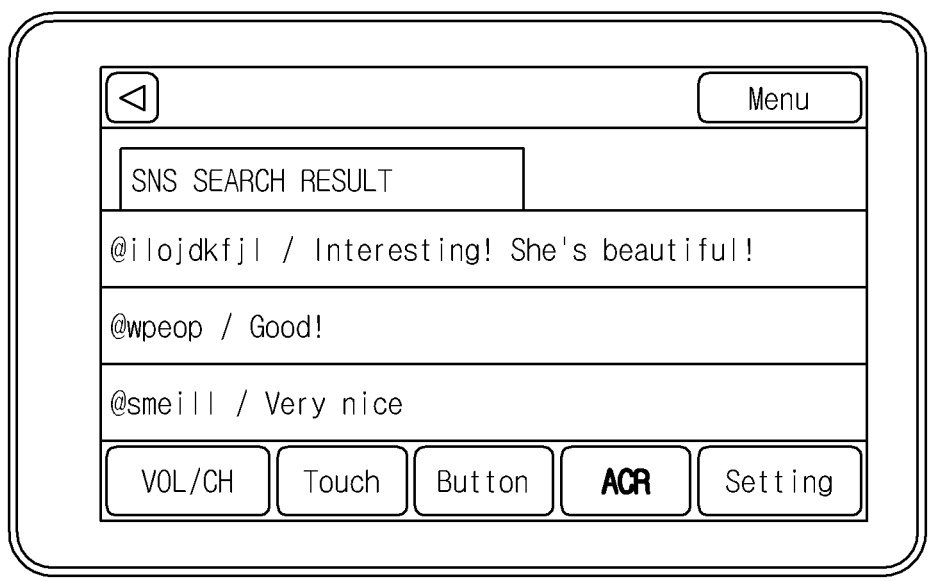
FIG. 62 is a front view of a terminal device where an enhanced service is executed according to an embodiment.

FIG. 62 is a front view of a terminal device where an enhanced service is executed according to an embodiment.

Especially, FIG. 62 is a view when the terminal device 400 requests a chatting enhanced service of an enhanced service transfer type from the video display device 10 in order to execute the obtained chatting enhanced service. Since the terminal device 400 requests the chatting enhanced service of the enhanced service transfer type from the video display device 100, the video display device 100 may deactivate, hide, or terminate the requested enhanced service in order not to display the enhanced service, and then, may display main AV content on a full screen. A viewer may watch the main AV content without interruption.

FIG. 63 is a view when an enhanced service is executed in a video display device and a terminal device according to another embodiment.

Especially, FIG. 63 is a view when the terminal device 400 requests a chatting enhanced service of a control function transfer type from the video display device 10 and executes the obtained chatting enhanced service. Since the terminal device 400 requests the chatting enhanced service of the control function transfer type from the video display device 100, the video display device 100 performs a display function of the requested enhanced service as shown in FIG. 63(A), and executes the requested control function of the enhanced service as shown in FIG. 63(B). By doing so, the video display device 100 may be controlled through various input means of the terminal device 400.

Figure 64:
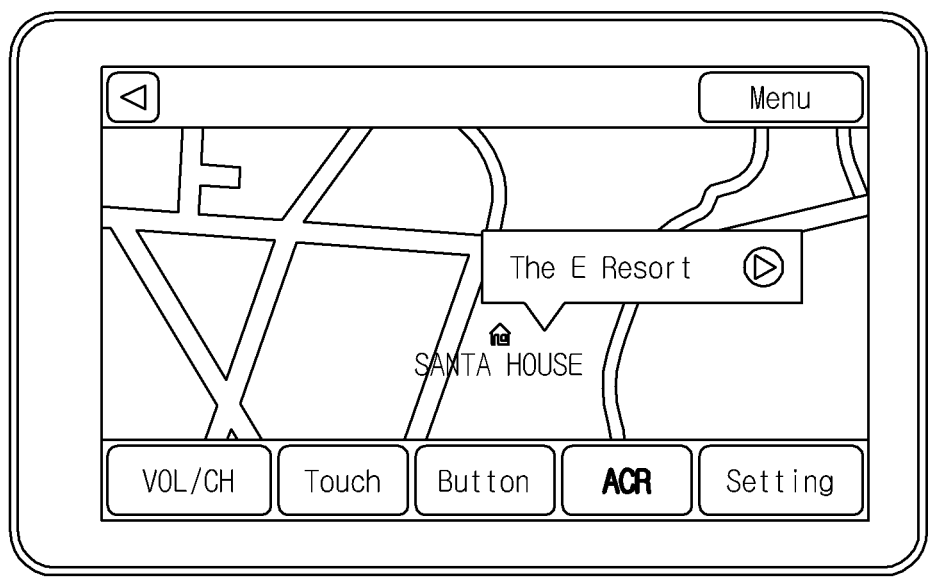
FIG. 64 is a front view of a terminal device where an enhanced service is executed according to another embodiment.

FIG. 64 is a front view of a terminal device where an enhanced service is executed according to another embodiment.

As shown in FIG. 64, the terminal device 400 may execute a service for showing a shooting place.

FIG. 65 is a front view of a terminal device where an enhanced service is executed according to another embodiment.

As shown in FIG. 65(A), the obtained enhanced service may include various sub services such as a service for showing a shooting place, SNS, background music download service, and a drama replay service. According to an embodiment, the terminal device 400 determines an exposure priority according to an intention of a content provider or a user preference, and display the sub service having the highest priority first. According to another embodiment, the terminal device 400 may display UI for selecting a plurality of sub services as shown in FIG. 65(A) and may display the selected sub service.

As shown in FIG. 65(B), the terminal device 400 may execute a music providing service related to main AV content.

FIG. 58 is described again.

The enhanced service providing server 50 provides an enhanced service event to the terminal device 400 in step S2743. For example, if an enhanced service corresponds to a chatting application, the enhanced service event may correspond to new dialog text data. When the chatting application of the terminal device 400 obtains new dialog text data, it updates a dialog window.

The terminal device 400 transmits an enhanced service event response to the enhanced service providing server 50 in step S2745. For example, when the enhanced service event corresponds to new dialog text data, the enhanced service event response may correspond to a normal reception response ACK with respect to the new dialog text data.

The video display device 100 maintains and manages information on an enhanced service that the paired terminal device 400 executes, and after obtaining enhanced data for the enhanced service through a broadcast network or an IP based network, transmits the obtained enhanced data to the terminal device 400 through the enhanced service event. The enhanced service event may include the identifier of a target enhanced service related to enhanced data and the enhanced data. The identifier of a target enhanced service may be assigned through the AppID element. The terminal device 400 receiving the enhanced service event delivers a corresponding event to the enhanced service assigned with AppID as it is, so that the assigned enhanced service may process the event. Fields constituting each event may be designated without restriction according to an event, and then may be used.

Figure 66:
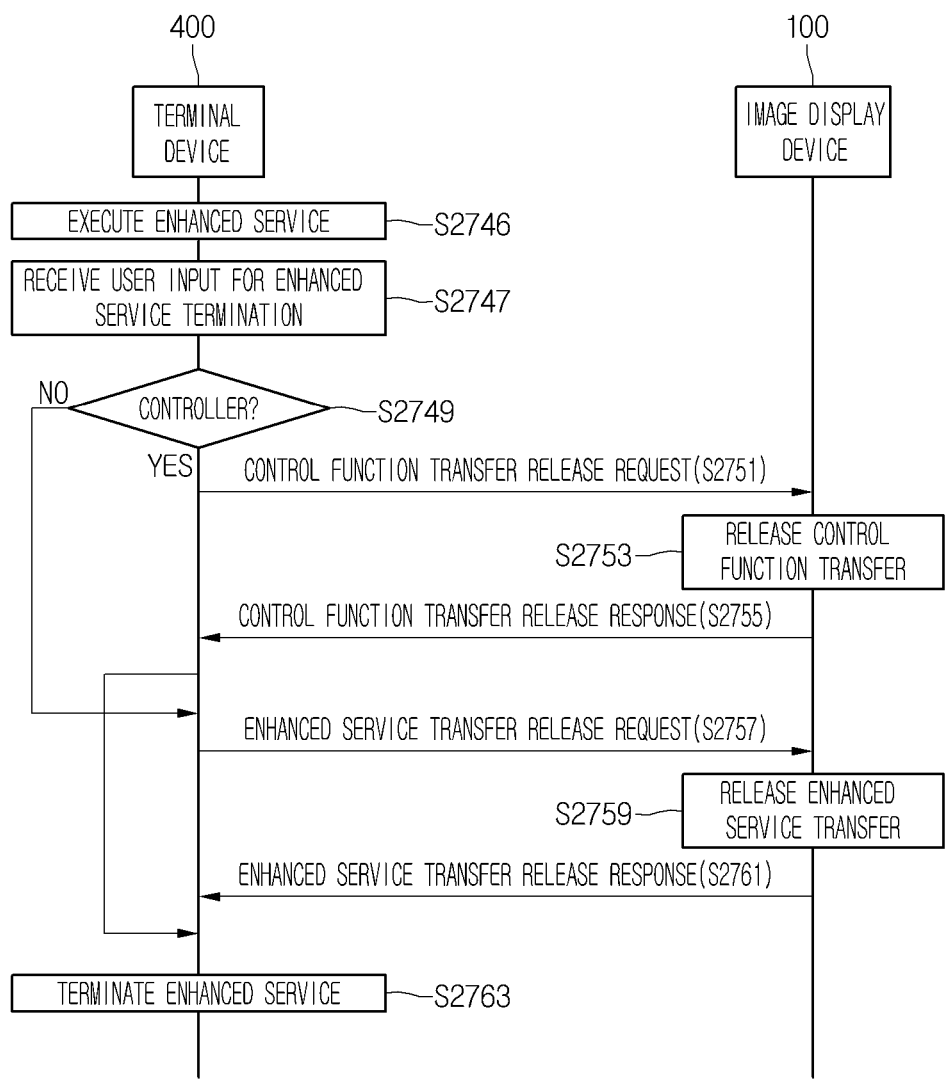
FIG. 66 is a ladder diagram illustrating an interworking process between devices according to another embodiment.

FIG. 66 is a ladder diagram illustrating an interworking process between devices according to another embodiment.

The terminal device 400 executes an enhanced service that the enhanced service providing server 50 provides in step S2746.

Then, when the terminal device 400 receives a user input for terminating the executed enhanced service in step S2747, the terminal device 400 confirms the type of the executed enhanced service in step S2749.

When the type of the executed enhanced service corresponds to a control function transfer, the terminal device 400 transmits a control function transfer release request message to the video display device 100 in step S2751. The control function transfer release message may have an HTTP request format as shown in Table 31.

TABLE 31

POST /acr/api/cmd HTTP/1.1
Host: target_ip:8080
Content-Type: application/atom+xml
<?xml version="1.0" encoding="utf-8"?>
<acrCommand>
   <session>12345<session>
   <name>UnregisterController </name>
   <appId>A123</appId>
</acrCommand>

As shown in Table 31, the control function transfer release request message includes an acrCommand element (or a command element) for indicating that the terminal device 400 transmits a command to the video display device 100 through this HTTP request. The acrCommand element includes a session element, a name element, and an appId element. The session element contains a session value that the video display device 100 issues to the terminal device 400. The name element contains "UnregisterController", which is a text value indicating that this message is a control function transfer release request message. The appId element contains the identifier of an enhanced service corresponding to a control function transfer release.

The video display device 100 releases the control function transfer for the terminal device 400 that transmits the control function transfer release request message in step S2753. The video display device 100 may reduce the number of terminal devices registered due to the control function transfer by one. The video display device 100 may activate the control function of an enhanced service, which is transferred to the terminal device 100.

Then, the video display device 100 transmits a control function transfer release response message including a control function transfer release result to the terminal device 400 in response to the control function transfer release request message in step S2755. The control function transfer release response message may have an HTTP response format as shown in Table 32.

TABLE 32

HTTP/1.1 200 OK
Content-Type: application/atom+xml; charset=utf-8
<?xml version="1.0" encoding="utf-8"?>
<acrResponse>
   <session>12345<session>
   <name>UnregisterController </name>
   <appId>A123</appId>
   <result>OK</result>
</acrResponse>

As shown in Table 32, the enhanced service transfer release response message includes an acrResponse element (or a response element) for indicating that the video display device 100 transmits a response to the terminal device 400 through the HTTP response. The acrResponse element includes a session element, a name element, an appID element, and a result element. The session element contains a session value that the video display device 100 issues to the terminal device 400. The name element contains "UnregisterController", which is a text value indicating that this message is a control function transfer release request message. The appId element contains the identifier of an enhanced service corresponding to a control function transfer release. The result element contains a control function transfer release result as a response. A value of the result element may be one of OK representing that the control function transfer release is successfully completed or NotOK representing that it is not.

When the type of the executed enhanced service corresponds to a control function transfer, the terminal device 400 transmits an enhanced service transfer release request to the video display device 100 in step S2757. The enhanced service transfer request message may have an HTTP request format as shown in Table 33.

TABLE 33

POST /acr/api/cmd HTTP/1.1
Host: target_ip:8080
Content-Type: application/atom+xml
<?xml version="1.0" encoding="utf-8"?>
<acrCommand>
   <session>12345<session>
   <name>UnregisterAppTransfer</name>
   <appId>A123</appId>
</acrCommand>

As shown in Table 33, the enhanced service transfer release request message includes an acrCommand element (or a command element) for indicating that the terminal device 400 transmits a command to the video display device 100 through this HTTP request. The acrCommand element includes a session element, a name element, and an appId element. The session element contains a session value that the video display device 100 issues to the terminal device 400. The name element contains "UnregisterAppTransfer", which is a text value indicating that this message is a control function transfer release request message. The appId element contains the identifier of an enhanced service corresponding to an enhanced service transfer release. If there is no appId element or a value thereof is empty (i.e. <appId></appId>), an enhanced service corresponding to an enhanced service transfer release may be all enhanced services transferred to the terminal 400.

The video display device 100 releases an enhanced service transfer with respect to the terminal device 400 that transmits the enhanced service transfer release request in step S2759. The video display device 100 may reduce the number of terminal devices registered due to the enhanced service transfer by one. The video display device 100 may activate, replay, or display the enhanced service transferred to the terminal device 100.

Then, the video display device 100 transmits an enhanced service transfer release response message including an enhanced service transfer release result to the terminal device 400 in response to the enhanced service transfer release request in step S2761. The enhanced service transfer release response message may have an HTTP response format as shown in Table 34.

TABLE 34

HTTP/1.1 200 OK
Content-Type: application/atom+xml; charset=utf-8
<?xml version="1.0" encoding="utf-8"?>
<acrResponse>
<session>12345<session>
   <name>UnregisterAppTransfer</name>
   <appId>A123</appId>
   <result>OK</result>
</acrResponse>

As shown in Table 34, the enhanced service transfer release response message includes an acrResponse element (or a response element) for indicating that the video display device 100 transmits a response to the terminal device 400 through the HTTP response. The acrResponse element includes a session element, a name element, an appID element, and a result element. The session element contains a session value that the video display device 100 issues to the terminal device 400. The name element contains "UnregisterAppTransfer", which is a text value indicating that this message is an enhanced service transfer release response message. The appId element contains the identifier of an enhanced service corresponding to an enhanced service transfer release. The result element contains an enhanced service transfer release result as a response. A value of the result element may be one of OK representing that the enhanced service transfer release is successfully completed or NotOK representing that it is not.

The terminal device 400 terminates the executed enhanced service when receiving a control function transfer release response message of a positive registration release result or an enhanced service transfer release response message of a positive registration release result in step S2763.

Figure 67:
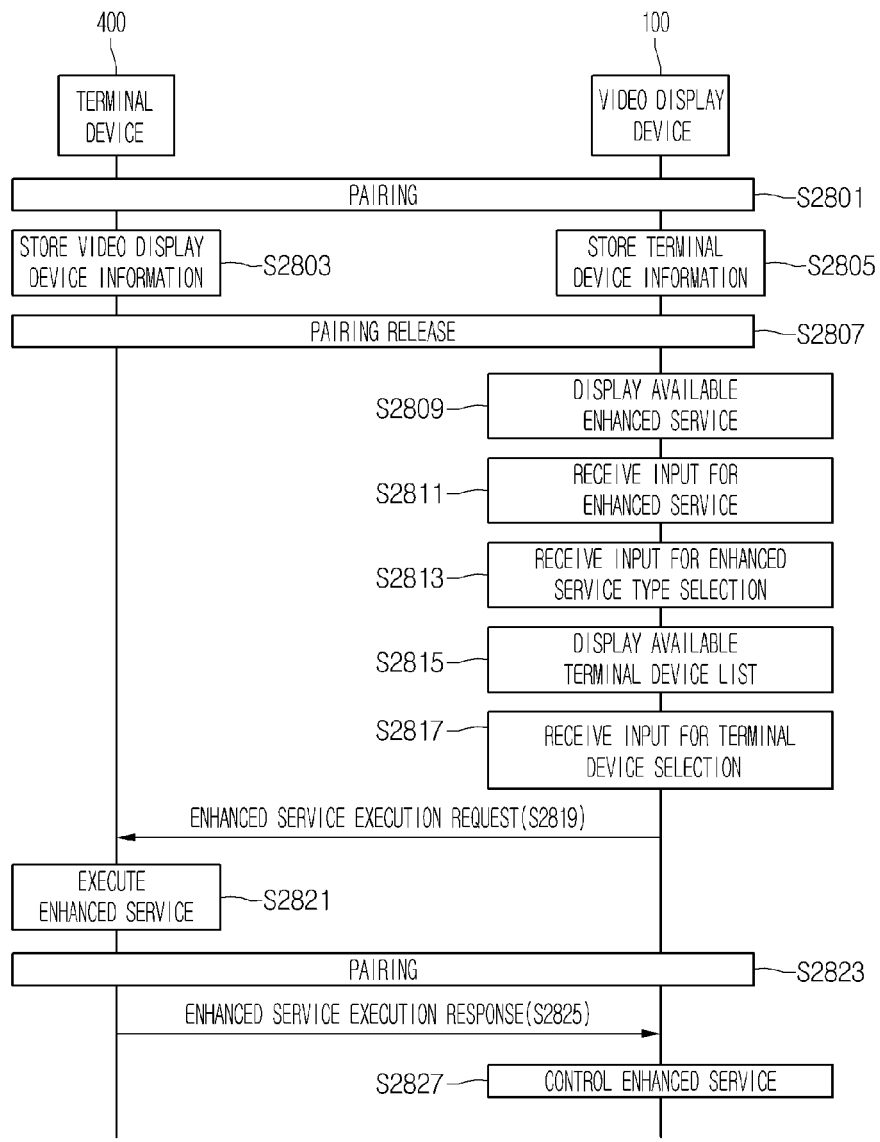
FIG. 67 is a ladder diagram illustrating an interworking process between devices according to another embodiment.

FIG. 67 is a ladder diagram illustrating an interworking process between devices according to another embodiment.

The video display device 100 and the terminal device 400 perform a pairing process in step S2801.

The terminal device 400 stores information on the video display device 100 in order to transmit a message to the video display device 100 during a pairing release state in step S2803.

Additionally, the video display device 100 stores information on the terminal device 400 in order to transmit a message to the terminal device 400 during a pairing release state in step S2805.

Then, the pairing state between the video display device 100 and the terminal device 400 may be released in step S2807.

The video display device 100 recognizes that there is an available enhanced service related to main AV content, and displays an enhanced service notification UI indicating that there is an available enhanced service in step S2809.

According to an embodiment, the video display device 100 obtains content information from part of main AV content and obtains information on an available enhanced service through query/response on the basis of the obtained content information in order to recognize that there is an enhanced service related to the main AV content.

According to another embodiment, the video display device 100 obtains information on an available enhanced service from the content providing server 10 through a broadcast network, and then recognizes that there is an enhanced service related to the main AV content.

According to another embodiment, the video display device 100 obtains information on an available enhanced service on the basis of Service discovery and selection (SD&S) through an IP based network, and then recognizes that there is an enhanced service related to the main AV content. The video display device 100 may obtain and execute an available enhanced service.

According to another embodiment, the terminal device 400 obtains enhanced service information on the basis of capture data of main AV content played in the video display device 100, and the video display device 100 obtains available enhanced service after inquiring an available enhanced service from the terminal device 400 or another terminal device.

The video display device 100 receives a user input related to the execution of an available enhanced service through the enhanced service notification UI in step S2811. The video display device 100 receives a user input related to the execution of an available enhanced service through a remote controller.

If an available enhanced service has a plurality of types, the video display device 100 receives a user input for type selection of an available enhanced service through an enhanced service notification UI in step S2813. The video display device 100 may receive a user input for type selection of an available enhanced service through a remote controller. The type may be an enhanced service transfer type or a control function transfer type.

The video display device 100 obtains a list of available terminal devices and displays it in step S2815. As one example, the video display device 100 obtains a list of paired terminal devices and displays it.

Table 35 and Table 36 show APU used of obtaining a video display device's manufacturer's application executed in the video display device 100 or a list of terminal devices paired with an application such as automatic execution application.

An application executed in the video display device 100 may use a DeviceList getPairedDeviceList( ) function. The DeviceList getPairedDeviceList( ) function returns a list of paired terminal devices.

Table 35 shows the definition of a list DeviceList of a paired terminal device.

typedef collection<Device> DeviceList

TABLE 35

| | Name |
|---|---|
| Property | Readonly Integer length // the number of Devices |
| Method | Device item (Integer index) // return Device in corresponding index |

Table 36 shows a Device class, i.e. an individual instance in the list DeviceList of a paired terminal device.

TABLE 36

| | Name |
|---|---|
| Property | Integer id // separator of paired Device<br>String name // name of paired device<br>String type // Type of paired Device: phone, pad, etc<br>String resolution // resolution: 1920 × 1080, 720 × 480, etc |

As shown in Table 36, an application executed in the video display device 100 calls a getPairedDeviceList( ) function in order to obtain the identifier, name, type, and resolution of a paired terminal device.

The video display device 100 may receive a user input for terminal device selection through UI. The video display device 100 may receive a user input for terminal device selection through a remote controller.

Then, the video display device 100 transmits an execution request message of a selected enhanced service having a selected enhanced service type to the terminal device 400 in step S2819. The execution request message may include the address of an enhanced service. The execution request message may include the address of an enhanced service. The execution request message may include information on a selected enhanced service type. Additionally, the execution request message includes information on a plurality of enhanced service types, so that the terminal device 400 may select an enhanced service type.

At this point, the selected terminal device 400 may be or may not be paired with the video display device 100. During an unpaired state, the video display device 100 may transmit an execution request message to a terminal device through push notification mechanism on the basis of stored terminal device information.

An application executed in the video display device 100 calls a Boolean transferApp(DeviceParamList deviceList) function in order to transmit an execution request message to a terminal device.

An application executed in the video display device 100 may transmit URL to at least one terminal device through a deviceList parameter.

Table 37 shows the definition of DeviceParamList.

typedef collection<DeviceParam> DeviceParamList

TABLE 37

| | Name |
|---|---|
| Property | readonly Integer length // the number of Devices |
| Method | DeviceParam item (Integer index) // return DeviceParam in corresponding index |

Table 38 shows the property of a DeviceParam class.

TABLE 38

| | Name |
|---|---|
| Property | Integer id // separator of paired Device<br>String url // App URL or Web URL<br>Boolean bApp // if true, url is App URL, if false, url is Web URL |

As shown in Table 38, the video display device 100 may deliver APP URL or Web URL to a terminal device identified by an id parameter.

After obtaining content information from part of main AV content and obtaining information on an available enhanced service through query/response on the basis of the obtained content information, if the video display device 100 recognizes that there is an available enhanced service related to the main AV content, Plugin API of Table 35 to 38 may be provided from ACR Object recognized as a MIME type.

MIME Type: application/x-netcast-acr

When the video display device 100 obtains information on an available enhanced service from the content providing server 10 through a broadcast network, or obtains information on an available enhanced service on the basis of Service discovery and selection (SD&S) through an IP based network, Plugin API of Table 35 to Table 38 may be provided from HbbTV Object recognized as the following MIME type.

MIME Type: application/oipfPairedDevice

An enhanced service execution request message may have an HTTP request format as shown in Table 39.

TABLE 39

POST /hdcp/api/dtv_wifirc HTTP/1.1
Host: target_ip:8080
Content-Type:application/atom+xml
<?xml version="1.0" encoding="utf-8"?>
<command>
<session>session id</session>
<type>TransferAppTo2ndDevice</type>
<value>app url for 2nd screen</value>
</command>

As shown in Table 39, the enhanced service execution request message includes a command element for indicating that the video display device 100 transmits a command to the terminal device 100 through the HTTP request. The command element includes a session element, a type element (or a name element), and a value element. The session element contains a value that the video display device 100 issues to the terminal device 400. The type element contains "TransferAppTo2ndDevice", which is a text value indicating that this message is an enhanced service execution request message. The value element contains URL of an enhanced service transferred to the terminal device 400.

The terminal device 400 executes an enhanced service according to an enhanced service execution request message in step S2821. The terminal device 400 may execute an enhanced service when receiving a user input for enhanced service execution.

In a case that pairing between the terminal device 400 and the video display device 100 is released, the terminal device 400 may performs pairing with the video display device 100 in step S2823. Especially, an executed enhanced service may perform pairing.

The terminal device 400 transmits an enhanced service execution response message including an enhanced service execution result (i.e. OK/ERROR) to the video display device 100 in step S2825. At this point, the terminal device 400 may be or may not be paired with the video display device 100. During an unpaired state, the terminal device 400 may transmit an execution response message to a video display device through push notification mechanism on the basis of stored video display device information.

The video display device 100 controls an enhanced service executed in the video display device 100 on the basis of the enhanced service execution response message including an enhanced service execution result in step S2827. For example, if the type of an enhanced service executed in the terminal device 400 is the enhanced service transfer type, the video display device 100 may deactivate an executed enhanced service. Also, if the type of an enhanced service executed in the terminal device 400 is the control function transfer type, the video display device 100 may deactivate an executed enhanced service, and activates a display function.

Figure 68:
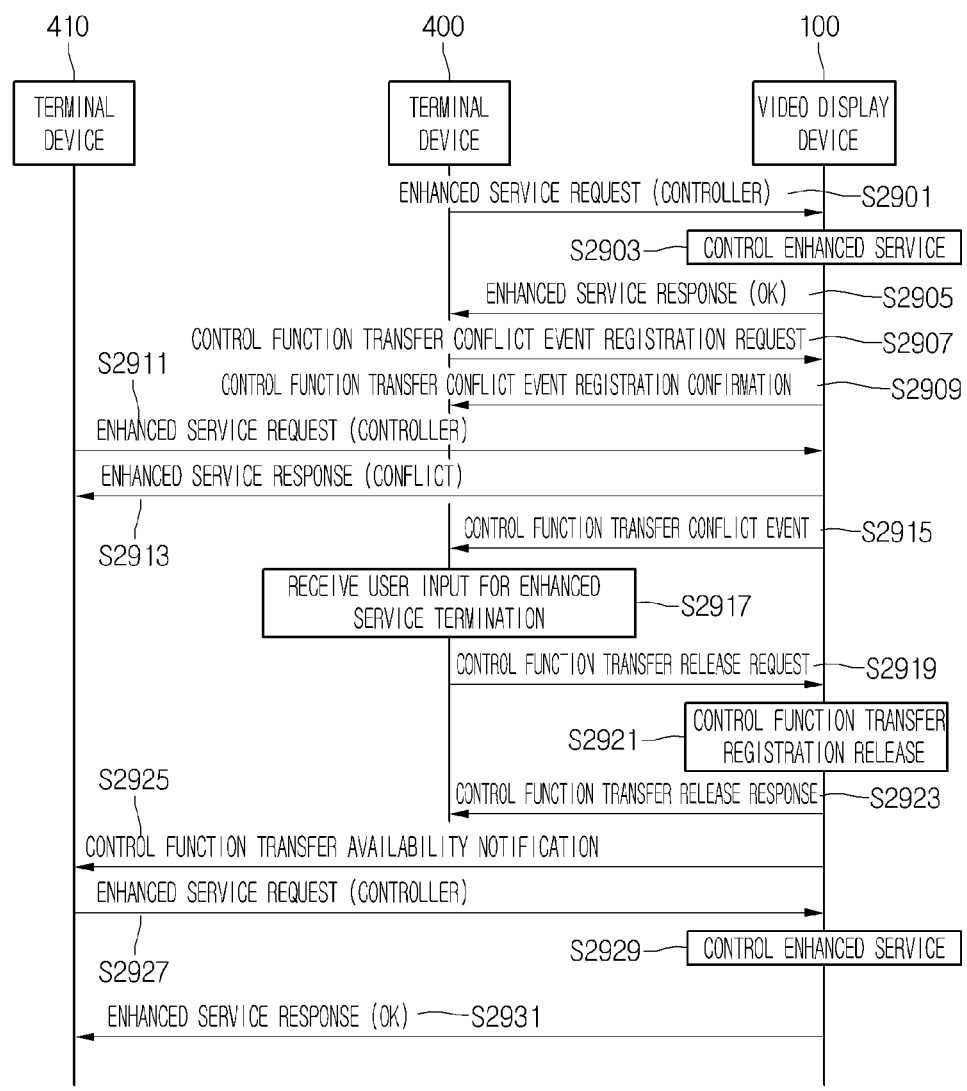
FIG. 68 is a ladder diagram illustrating an interworking process between devices according to another embodiment.

FIG. 68 is a ladder diagram illustrating an interworking process between devices according to another embodiment.

Especially, FIG. 68 illustrates an interworking process between devices in order to adjust conflict occurring when the maximum number of terminal devices to which the control function of an enhanced service executed in the video display device 100 is transferred is greater than the number of terminal devices requiring the transferring of the control function of a corresponding enhanced service.

In order to describe FIG. 68, it is assumed that the maximum number of terminal devices to which the control function of an enhanced service related to current main AV content is one.

The terminal device 400 provides an enhanced service request message in which the type element value is "controller" to the video display device 100 in order to request the control function transfer of an enhanced service from the video display device 100 in step S2901.

The video display device 100 controls an enhanced service according to an enhanced service request message in step S2903. Since the maximum number of terminal devices to which the control function of an enhanced service related to current main AV content is one and the number of terminal devices to which the control function of an enhanced service is transferred is zero, the video display device 100 may transfer the control function of an enhanced service to the terminal device 400. Since the terminal device 40 requests transferring of the control function of an enhanced service, the video display device 100 activates the display function of the requested enhanced service, and generates an enhanced service transfer response message including an enhanced service URL corresponding to the control function of the requested enhanced service, the requested enhanced service type, and the capability of the terminal device 400.

The video display device 100 transmits an enhanced service transfer response message in which a value of the result element is OK to the terminal device 400 in step S2905.

The terminal device 400 transmits a control function transfer conflict event registration request message to the video display device 100 in step S2907. A control function transfer conflict event registration request message may have an HTTP request format as shown in Table 40.

TABLE 40

POST /acr/api/cmd HTTP/1.1
Host: target_ip:8080
Content-Type: application/atom+xml
<?xml version="1.0" encoding="utf-8"?>
<acrCommand>
<session>12345<session>
<name>RegisterControllerConflictEvent</name>
<appId>A123</appId>
</acrCommand>

As shown in Table 40, the additional control function transfer conflict event registration request message includes a command element for indicating that the video display device 100 transmits a command to the terminal device 100 through the HTTP request. The acrCommand element includes a session element, a name element, and an appId element. The session element contains a session value that the video display device 100 issues to the terminal device 400. The name element contains "RegisterControllerConflictEvent", which is a text value indicating that this message is an additional control function transfer conflict event registration request message. The appId element contains the identifier of an enhanced service corresponding to a control function transfer conflict event registration.

The video display device 100 transmits a control function transfer conflict event registration confirmation message to the terminal device 400 in step S2909. The control function transfer conflict event registration confirmation message may have an HTTP response format as shown in Table 41.

TABLE 41

HTTP/1.1 200 OK
Content-Type: application/atom+xml; charset=utf-8
<?xml version="1.0" encoding="utf-8"?>
<acrResponse>
<session>12345<session>
<name>RegisterControllerConflictEvent</name>
<appId>A123</appId>
<result>OK</result>
</acrResponse>

As shown in Table 41, control function transfer conflict event registration confirmation message includes an acrResponse element (or a response element) for indicating that the video display device 100 transmits a response to the terminal device 400 through the HTTP response. The acrResponse element includes a session element, a name element, an appID element, and a result element. The session element contains a session value that the video display device 100 issues to the terminal device 400. The name element contains "RegisterControllerConflictEvent", which is a text value indicating that this message is an enhanced service transfer release response message. The appId element contains the identifier of an enhanced service corresponding to a control function transfer conflict event registration. The result element contains a control function transfer conflict event registration result. A value of the result element may be one of OK representing that the control function transfer conflict event registration release is successfully completed or NotOK representing that it is not.

Additionally, another terminal device 410 provides an enhanced service request message in which a value of the type element is "controller" to the video display device 100 in order to request a control function transfer of an enhanced service to the video display device 100 in step S2911.

Since the maximum number of terminal devices to which the control function of an enhanced service related to current main AV content can be transferred is one and the number of terminal devices having the transferred control function of an enhanced service is one, the video display device 100 cannot transfer the control function of an enhanced service to the additional terminal device 410. Accordingly, the video display device 100 transmits an enhanced service transfer response message in which a value of the result element is Conflict to the terminal device 400 in step S2913.

Furthermore, since the terminal device 400 registers the control function transfer conflict event in the video display device 100 and a control function transfer conflict event occurs, the video display device 100 transmits a control function transfer conflict event to the terminal device 400 in step S2915. The control function transfer conflict event may have the following format as shown in Table 42.

TABLE 42

POST /acr/api/evt HTTP/1.1
Host: target_ip:8080
Content-Type: application/atom+xml
<?xml version="1.0" encoding="utf-8"?>
<acrEvent>
<session>12345<session>
<name>ControllerConflictEvent</name>
<appId>A123</appId>
</acrEvent>

As shown in Table 42, the control function transfer conflict event message includes an acrEvent element for indicating that the video display device 100 transmits an event to the terminal device 400 through the HTTP response. The acrEvent element includes a session element, a name element, and an appId element. The session element contains a session value that the video display device 100 issues to the terminal device 400. The name element contains "ControllerConflictEvent", which is a text value indicating that this message is a control function transfer conflict event message. The appId element contains the identifier of an enhanced service where a control function transfer conflict event occurs.

When receiving a control function transfer conflict event, the terminal device 400 has an authority to determine whether to maintain or terminate the control function of an executed enhanced service. When receiving a user input for terminating the executed enhanced service, the terminal device 400 transmits a control function transfer release request message to the video display device 100 in step S2919.

The video display device 100 releases the control function transfer on the terminal device 400 that transmits the control function transfer release request message in step S2921. The video display device 100 may reduce the number of terminal devices registered due to the control function transfer by one.

The video display device 100 transmits a control function transfer release response message including a control function transfer release result to the terminal device 400 in response to the control function transfer release request message in step S2923.

Since the maximum number of terminal devices to which the control function of an enhanced service related to current main AV content can be transferred is one and the number of terminal devices having the transferred control function of an enhanced service is zero, the video display device 100 may transfer the control function of an enhanced service to the additional terminal device 410. Accordingly, the video display device 100 transmits a control function transfer availability notification message to the terminal device 400 in step S2925.

The terminal device 410 provides an enhanced service request message in which a value of the type element is "controller" to the video display device 100 in order to request a control function transfer of an enhanced service from the video display device 100 in step S2927.

The video display device 100 may control an enhanced service according to the enhanced service request message in step S2929 Since the maximum number of terminal devices to which the control function of an enhanced service related to current main AV content can be transferred is one and the number of terminal devices having the transferred control function of an enhanced service is zero, the video display device 100 may transfer the control function of an enhanced service to the additional terminal device 410. Since the terminal device 410 request the transferring of the control function of an enhanced service, the video display device 100 activates a display function of the requested enhanced service, and generates an enhanced service transfer response message including an enhanced service URL corresponding to the control function of the requested enhanced service, the requested enhanced service type, and the capability of the terminal device 400. The video display device 100 may activate or deactivate the requested control function of the enhanced service.

The video display device 100 transmits an enhanced service transfer response message in which a value of the result element is OK to the terminal device 400 in step S2913.

Figure 69:
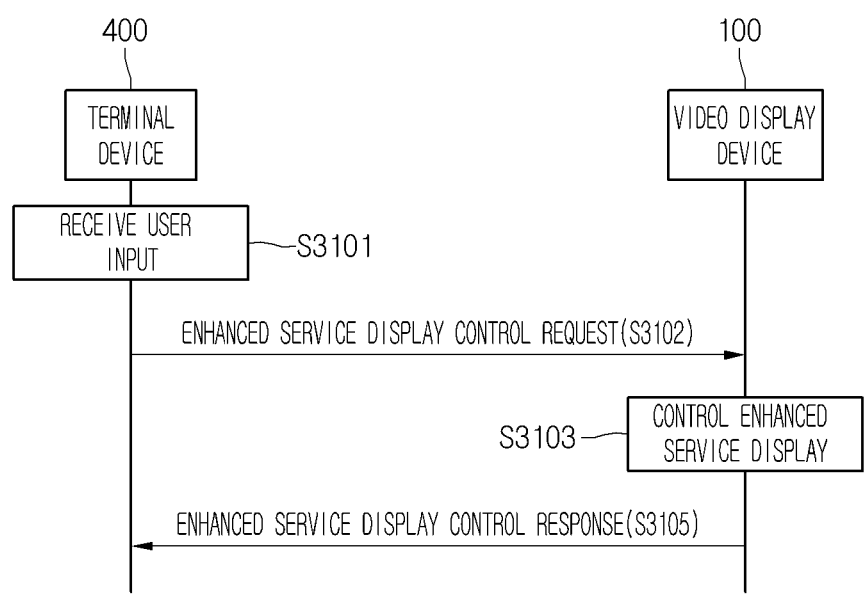
FIG. 69 is a ladder diagram illustrating an interworking process between devices according to another embodiment.

FIG. 69 is a ladder diagram illustrating an interworking process between devices according to another embodiment.

Even when an enhanced service related to main AV content is transferred to the terminal device 400, the video display device 100 may not terminate but deactivate, or may activate a corresponding enhanced service. Even when an enhanced service related to main AV content is transferred to the terminal device 400, the video display device 100 may activate a display function of a corresponding service. Additionally, the video display device 100 may be executing a plurality of enhanced services related to main AV content.

The terminal device 400 may display or hide an enhanced service that the video display device 100 executes currently or some functions of an enhanced service.

First, the terminal device 400 receives a user input for the enhanced service selection of a control target and a user input for the display control of the selected enhanced service in step S3101. At this point, the user input for a display control may relate to showing or hiding an enhanced service.

The terminal device 400 transmits an enhanced service display control request message to the video display device 100 in step S3102. The enhanced service display control request message may have an HTTP request format as shown in Table 43.

TABLE 43

POST /acr/api/cmd HTTP/1.1
Host: target_ip:8080
Content-Type: application/atom+xml
<?xml version="1.0" encoding="utf-8"?>
<acrCommand>
<session>12345<session>
<name>ShowACRApp</name>
<appId>A123</appId>
<show>true</show>
</acrCommand>

As shown in Table 43, the enhanced service display control request message includes an acrCommand element (or a command element) for indicating that the terminal device 400 transmits a command to the video display device 100 through this HTTP request. The acrCommand element includes a session element, a name element, an appID element, and a show element. The session element contains a session value that the video display device 100 issues to the terminal device 400. The name element contains "ShowACRApp", which is a text value indicating that this message is an enhanced service display control request message.

The appId element contains the identifier of a display control target enhanced service. If there is no appId element or a value thereof is empty (i.e. <appId></appId>), a display control target enhanced service may be all enhanced services that the video display device 100 executes.

The show element contains information on whether the video display device 100 shows an enhanced service corresponding to a value of the appId element. A value of the show element may be true or false. The show element having a value of true indicates that the video display device 100 shows an enhanced service corresponding to a value of the appId element, and the show element having a value of false indicates that the video display device 100 hides an enhanced service corresponding to a value of the appId element.

The video display device 100 controls displaying an enhanced service according to the enhanced service display control request in step S3103. When receiving an enhanced service display control request message in which the show element has a value of true, the video display device 100 shows an enhanced service corresponding to the value of the appId element. When receiving an enhanced service display control request message in which the show element has a value of false, the video display device 100 hides an enhanced service corresponding to the value of the appId element.

The video display device 100 transmits an enhanced service control response message for the selected enhanced service to the terminal device 400 in step S3105. The enhanced service display control response message may have an HTTP response format as shown in Table 44.

TABLE 44

HTTP/1.1 200 OK
Content-Type: application/atom+xml; charset=utf-8

TABLE 44-continued

<?xml version="1.0" encoding="utf-8"?>
<acrResponse>
<session>12345<session>
<name>ShowACRApp</name>
<appId>A123</appId>
<result>OK</result>
</acrResponse>

As shown in Table 44, the enhanced service display control response message includes an acrResponse element (or a response element) for indicating that the video display device 100 transmits a response to the terminal device 400 through the HTTP response. The acrResponse element includes a session element, a name element, an appID element, and a result element. The session element contains a session value that the video display device 100 issues to the terminal device 400. The name element contains "ShowACRApp", which is a text value indicating that this message is an enhanced service display control response message.

The appId element contains the identifier of a display control target enhanced service. If there is no appId element or a value thereof is empty (i.e. <appId></appId>), a display control target enhanced service may be all enhanced services that the video display device 100 executes.

The result element contains an enhanced service display control result. A value of the result element may be one of OK representing that the enhanced service display control is successfully completed or NotOK representing that it is not.

Figure 70:
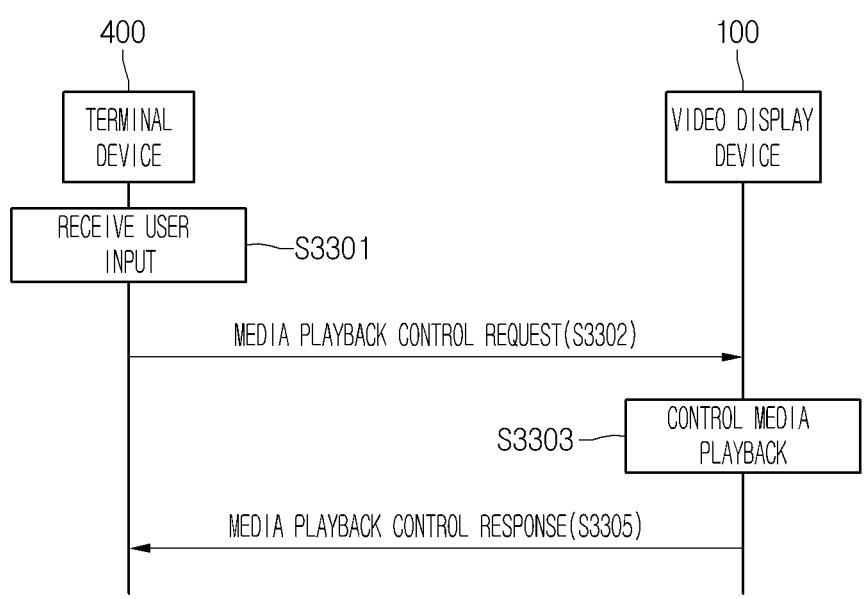
FIG. 70 is a ladder diagram illustrating an interworking process between devices according to another embodiment.

FIG. 70 is a ladder diagram illustrating an interworking process between devices according to another embodiment.

The terminal device 400 receives a user input for the selection of control target media and a user input for the control command of the selected media in step S3301. For example, the user input may be clicking a specific URL in an enhanced service that the terminal device 400 executes or clicking a control button for specific media. At this point, an enhanced service in execution may be an automatic playback application, a video display device's manufacturer application, and the above mentioned enhanced service such as an enhanced service related to main AV content.

The terminal device 400 transmits a media playback control request message for the selected control target media to the video display device 100 in step S3302. The media playback control request message may have an HTTP request format as shown in Table 45.

TABLE 45

POST /acr/api/streaming HTTP/1.1
Host: target_ip:8080
Content-Type: application/atom+xml
<?xml version="1.0" encoding="utf-8"?>
<acrCommand>
<session>12345<session>
<name>Play</name>
<url>http://hello.com/stream1.mp4</url>
</acrCommand>

As shown in Table 45, the media playback control request message includes an acrCommand element (or a command element) for indicating that the terminal device 400 transmits a command to the video display device 100 through this HTTP request. The acrCommand element includes a session element, and a name element. The session element contains a session value that the video display device 100 issues to the terminal device 400.

The name element contains a control command that the message indicates. A list of values that the name element has is shown in Table 46.

TABLE 46

| Control command | url element | speed element | offset element |
|---|---|---|---|
| Playback | 0 | X | 0 |
| Pause | X | X | X |
| Stop | X | X | X |
| Seek | X | X | 0 |
| FF | X | 0 | X |
| REW | x | 0 | X |

If a value of the name element is 'playback', the acrCommand element further includes a url element and an offset element. The url element contains the url of control target media. The Offset element contains information on a playback start position.

If a value of the name element is 'seek', the acrCommand element further includes an offset element. The Offset element contains information on a position to move. The position may be represented with time or byte offset.

If a value of the name element is 'FF', the acrCommand element further includes a speed element. The speed element contains information on a playback speed.

If a value of the name element is 'REW', the acrCommand element further includes a speed element. The speed element contains information on a playback speed.

The video display device 100 controls a media playback according to the media playback control request message in step S3303.

When a value of the name element is "playback", the video display device 100 fetches media from url corresponding to a value of the url element, and starts to playback the media from a position corresponding to a value of the offset element.

When a value of the name element is "pause", the video display device 100 may pause the media in playback.

When a value of the name element is "stop", the video display device 100 may terminate the media in playback.

When a value of the name element is "seek", the video display device 100 may move the playback position of media in playback into a position corresponding to the offset element value.

When a value of the name element is "FF", the video display device 100 may change the playback speed of media in playback into a speed corresponding to the speed element value.

When a value of the name element is "REW", the video display device 100 may change the playback speed of media in playback into a speed corresponding to the speed element value.

The video display device 100 transmits a media playback control response message including a media playback control result to the terminal device 400 in step S3305. The media playback control response message may have an HTTP response format as shown in Table 47.

TABLE 47

HTTP/1.1 200 OK
Content-Type: application/atom+xml; charset=utf-8
<?xml version="1.0" encoding="utf-8"?>
<acrResponse>
<session>12345<session>
<name>Play</name>

TABLE 47-continued

<result>OK</result>
</acrResponse>

As shown in Table 47, the media playback control response message includes an acrResponse element (or a response element) for indicating that the video display device 100 transmits a response to the terminal device 400 through the HTTP response. The acrResponse element includes a session element, a name element, and a result element. The session element contains a session value that the video display device 100 issues to the terminal device 400.

The name element contains a text value indicating that this message is a response message to a control command.

The result element contains a media playback control result. A value of the result element may be one of OK representing that the media playback control is successfully completed or NotOK representing that it is not.

Figure 71:
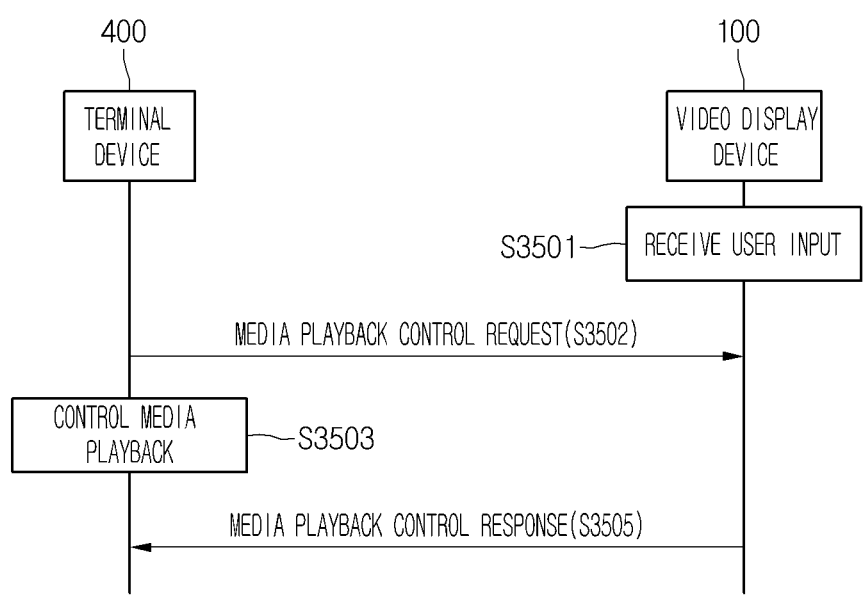
FIG. 71 is a ladder diagram illustrating an interworking process between devices according to another embodiment.

FIG. 71 is a ladder diagram illustrating an interworking process between devices according to another embodiment.

The video display device 100 receives a user input for the selection of control target media and a user input for the control command of the selected media in step S3501. For example, the user input may be clicking a specific URL in an enhanced service that the terminal device 100 executes or clicking a control button for specific media. At this point, an enhanced service in execution may be an automatic playback application, a video display device's manufacturer application, and the above mentioned enhanced service such as an enhanced service related to main AV content. The video display device 100 receives such a user input through a remote controller.

The video display device 100 transmits a media playback control request message for the selected control target media to the terminal device 400 in step S3502. The media playback control request message may have the same or similar format as the following message as shown in Table 45.

The terminal device 400 may control media playback according to a media playback control request message in step S3503. The terminal device 400 may perform the same or similar operation as the video display device 100 according to operation S3303.

The terminal device 400 transmits a media playback control response message including a media playback control result to the terminal device 400 in step S3505. This media playback control response message may have the same or similar format as the following message as shown in Table 47.

Figure 72:
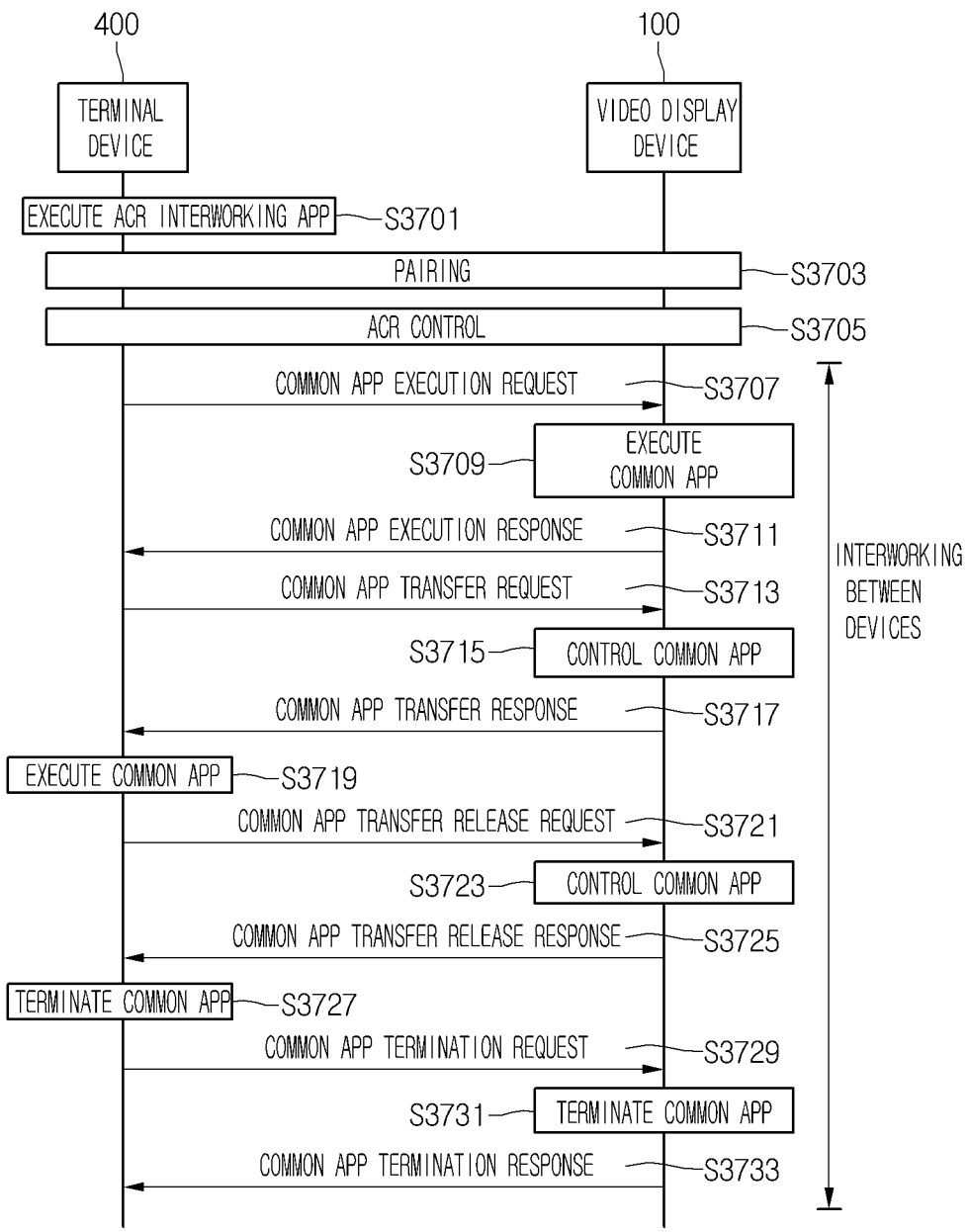
FIG. 72 is a ladder diagram illustrating an interworking process between devices according to another embodiment.

FIG. 72 is a ladder diagram illustrating an interworking process between devices according to another embodiment.

First, the terminal device 400 executes an interworking application in step S3701.

Figure 73:
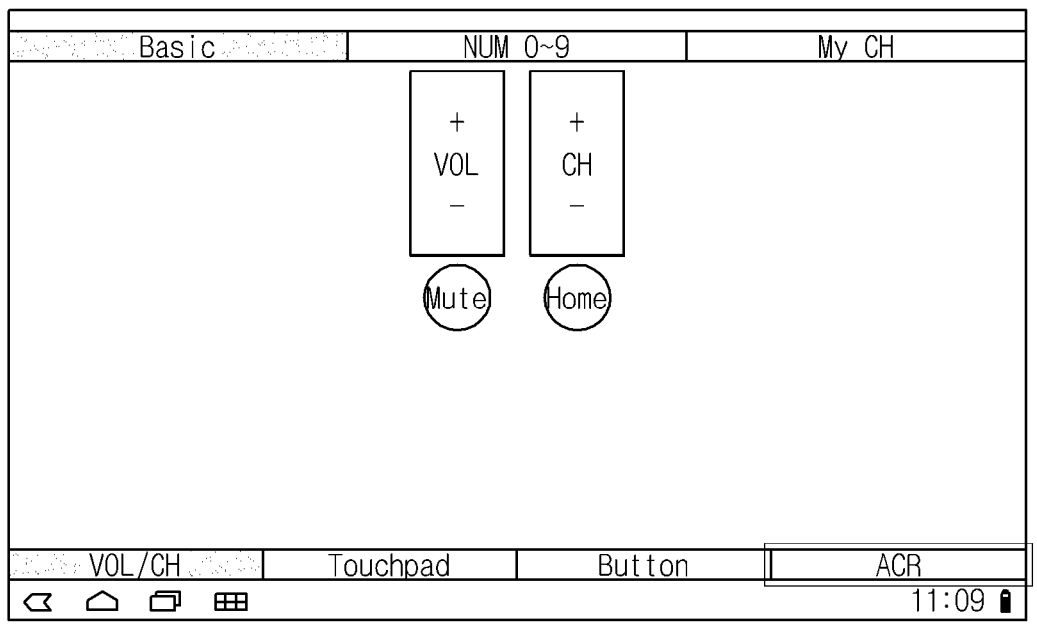
FIG. 73 is a front view of a terminal device where an interworking application is executed according to another embodiment.

FIG. 73 is a front view of a terminal device where an interworking application is executed according to another embodiment.

As shown in FIG. 73, the interworking application displays a video display device control UI. At this point, the video display device control UI includes various function buttons for controlling the video display device 100 at the top and a plurality of tap change buttons at the bottom. The video display device control UI includes a VOL/CH tap change button for controlling the volume and channel of the video display device 100, an ACR tap change button, and a setting tap change button for changing the setting of the interworking application. Once the VOL/CH tap change button is clicked, the video display device control UI may display as a function button a volume increase button, a volume decrease button, a channel number increase button, a channel number decrease button, a mute button, and a home button.

FIG. 72 is described again.

The interworking application of the terminal device 400 and the video display device 100 perform the above-mentioned pairing process in step S3703.

The interworking application of the terminal device 400 and the video display device 100 perform the above-mentioned ACR control process in step S3705.

Figure 74:
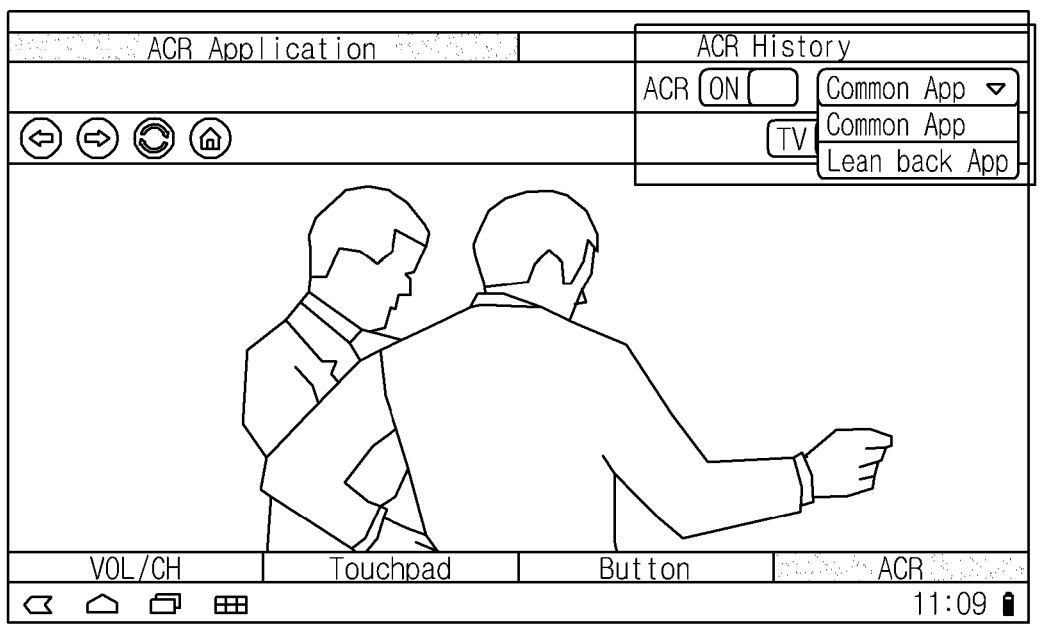
FIG. 74 is a front view of a terminal device where an interworking application is executed according to another embodiment.

FIG. 74 is a front view of a terminal device where an interworking application is executed according to another embodiment.

During the ACR control process of the terminal device 400, the interworking application of the terminal device 400 may receive a user input for turning on the ACR function of the video display device 100 through the button of FIG. 74. When receiving a user input for turning on the ACR function of the video display device 100, the terminal device 400 transmits the ACR ON request message of FIG. 56 to the video display device 100.

FIG. 72 is described again.

When receiving a user input for the execution of a video display device's manufacturer application, the interworking application of the terminal device 400 transmits an execution request message of the video display device's manufacturer application to the video display device 100 in step S3707. The interworking application of the terminal device 400 may receive a user input for the execution of a video display device's manufacturer application through the buttons as shown in FIG. 74.

When receiving the execution request message of a video display device's manufacturer application, the video display device 100 executes the video display device's manufacturer application in step S3709, and transmits an execution response message of the video display device's manufacturer application including an execution result of the video display device's manufacturer application to the terminal device 400 in step S3711.

The interworking application of the terminal device 400 transmits an application transfer request message that requests the transferring of the video display device's manufacturer application to the video display device 100 in step S3713. The application transfer request message may have an HTTP request format as shown in Table 29. At this point, the application transfer request message may request the transferring of the video display device's manufacturer application, or may request the transferring of some functions or some contents of the video display device's manufacturer application. At this point, one of some functions may be a control function.

The video display device 100 controls an enhanced service according to the video display device's manufacturer application transfer request message in step S3715.

When the terminal device 400 requests the transferring of some functions of the video display device's manufacturer application, the video display device 100 may generate a video display device's manufacturer application transfer response message including a video display device's manufacturer application URL corresponding to some functions of the requested video display device's manufacturer application and the capability of the terminal device 400. The video display device 100 may activate or deactivate some functions of the requested video display device's manufacturer application.

When the terminal device 400 requests the transferring of some contents of the video display device's manufacturer application, the video display device 100 may generate a video display device's manufacturer application transfer response message including a video display device's manufacturer application URL corresponding to some contents of the requested video display device's manufacturer application and the capability of the terminal device 400. The video display device 100 may activate or deactivate some contents of the requested video display device's manufacturer application.

When the terminal device 400 requests the transferring of the video display device's manufacturer application, the video display device 100 deactivates, hides, or terminates the requested video display device's manufacturer application in order not to display it, displays main AV content on a full screen, and generates a video display device's manufacturer application transfer response message including a video display device's manufacturer application URL corresponding to the requested video display device's manufacturer application and the capability of the terminal device 400.

The video display device 100 transmits a video display device's manufacturer application transfer response message to the terminal device 400 in step S3717. The video display device's manufacturer application transfer response message may have an HTTP response format as shown in Table 30. The video display device's manufacturer application transfer response message may include state information on a video display device's manufacturer application executed in the video display device 100.

The interworking application of the terminal device 400 obtains and executes the video display device's manufacturer application on the basis of the video display device's manufacturer application URL in step S3719. If the video display device's manufacturer application transfer response message includes state information on a video display device's manufacturer application executed in the video display device 100, the interworking application of the terminal device 400 may provide service continuously by executing the video display device's manufacturer application according to the state information.

The terminal device 400 transmits a video display device's manufacturer application transfer release request message to the terminal device 400 in step S3721. The video display device's manufacturer application transfer release request message may have an HTTP request format as shown in Table or Table 33. The video display device's manufacturer application transfer release request message may include state information on a video display device's manufacturer application executed in the video display device 400.

The video display device 100 releases the transferring of the video display device's manufacturer application with respect to the terminal device 400 that transmits a video display device's manufacturer application transfer release request message in step S3723. Especially, if the video display device's manufacturer application transfer release request message includes state information on a video display device's manufacturer application executed in the terminal device 400, the video display device 400 may provide service continuously by activating the video display device's manufacturer application according to the state information.

Then, the video display device 100 transmits a video display device's manufacturer application transfer release response message including a video display device's manufacturer application transfer release result to the terminal device 400 in response to the video display device's manufacturer application transfer release request message in step S3725. The video display device's manufacturer application transfer release response message may have an HTTP response format as shown in Table 32 or Table 34.

When receiving the video display device's manufacturer application transfer release response message, the interworking application of the terminal device 400 terminates a video display device's manufacturer application in step S3727.

When receiving a user input for the termination of a video display device's manufacturer application, the interworking application of the terminal device 400 transmits a termination request message of the video display device's manufacturer application to the video display device 100 in step S3729. The interworking application of the terminal device 400 may receive a user input for the termination of a video display device's manufacturer application through the buttons as shown in FIG. 74.

When receiving the termination request message of a video display device's manufacturer application, the video display device 100 terminates the video display device's manufacturer application in step S3731, and transmits a termination response message of the video display device's manufacturer application including a termination result of the video display device's manufacturer application to the terminal device 400 in step S3733.

FIG. 74 is described mainly based on the video display device's manufacturer application. However, another application such as automatic playback application may be applied to FIG. 74.

UIs and use cases according to various embodiments will be described with reference to FIGS. 75 to 82.

Figure 75:
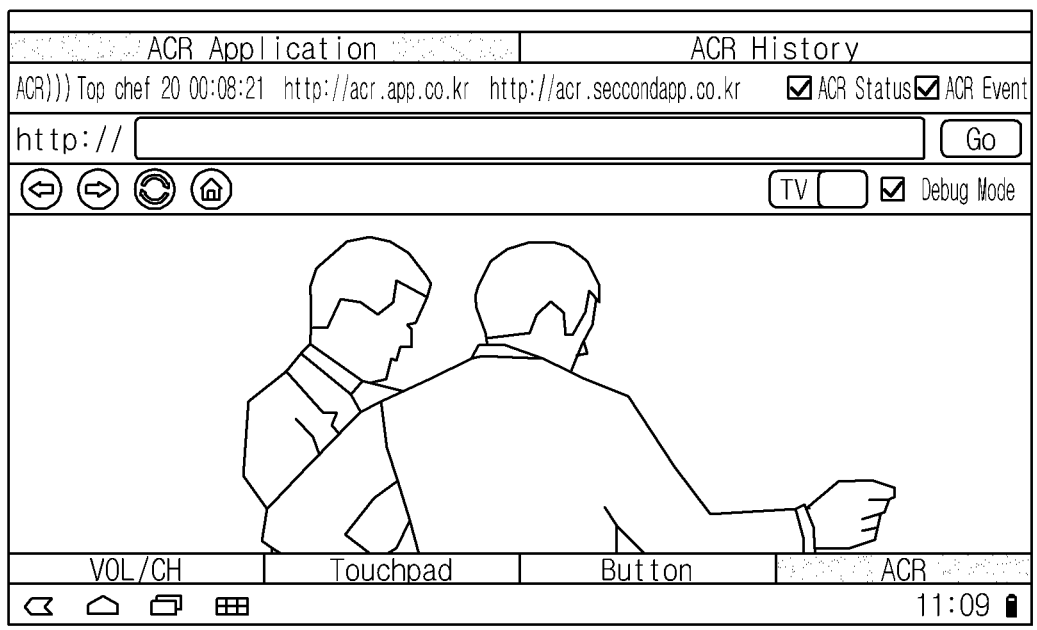
FIG. 75 is a front view of a terminal device where an interworking application is executed according to another embodiment.

FIG. 75 is a front view of a terminal device where an interworking application is executed according to another embodiment.

As shown in FIG. 75, the terminal device 400 may display a content_identifier, content time information, and the URL of an available enhanced service as UI on an interworking application, which are obtained through a content recognition state response message, an enhanced service occurrence event message, an enhanced service transfer response message, or a content recognition state change event message.

Figure 76:
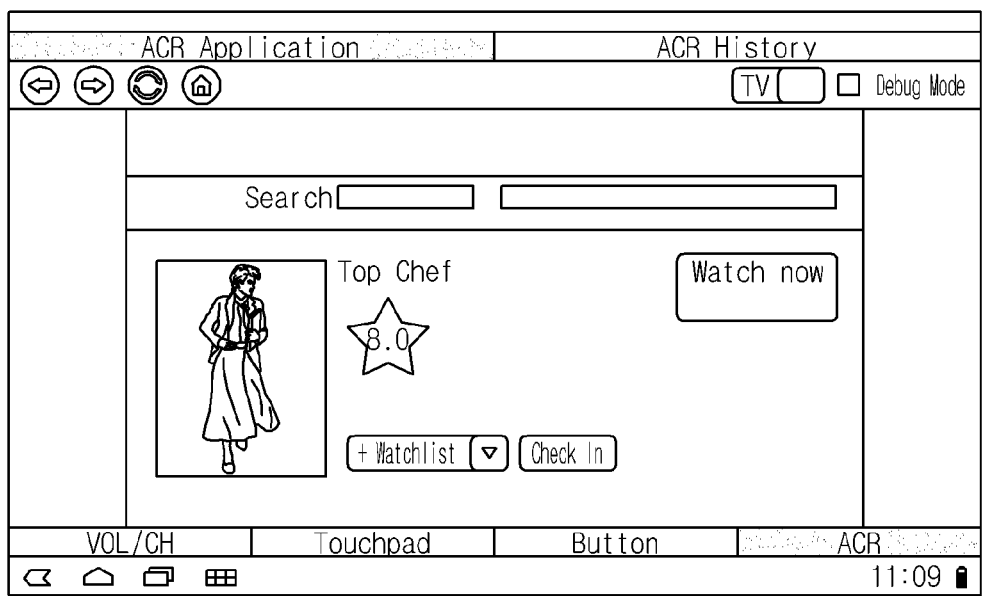
FIG. 76 is a front view of a terminal device where an interworking application is executed according to another embodiment.

FIG. 76 is a front view of a terminal device where an interworking application is executed according to another embodiment.

As shown in FIG. 76, when the video display device 100 transmits a main AV content search related event to the terminal device 400, and thus, the terminal device 400 obtains and displays a search result. Based on this, a user may perform additional search. Through this, a user may use search service freely without experiencing inconvenience such as limited input of a TV remote controller and a TV browser that blocks a viewing screen.

Figure 77:
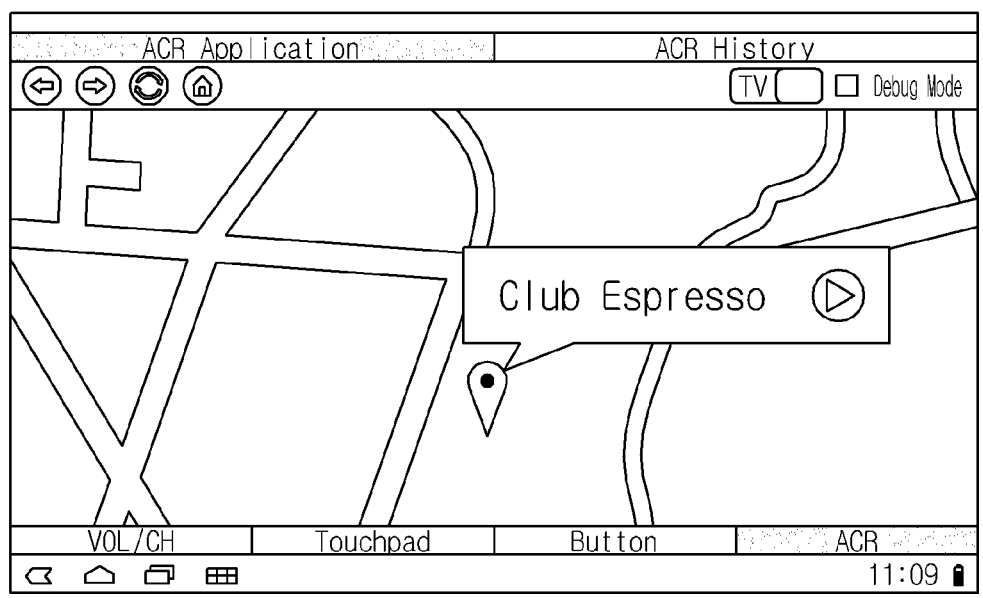
FIG. 77 is a front view of a terminal device where an interworking application is executed according to another embodiment.

FIG. 77 is a front view of a terminal device where an interworking application is executed according to another embodiment.

As shown in FIG. 77, the terminal device 400 may obtain and display map data of a place related to main AV content. Moreover, the terminal device 400 may additionally display detailed position information related to the main AV content on the map.

Figure 78:
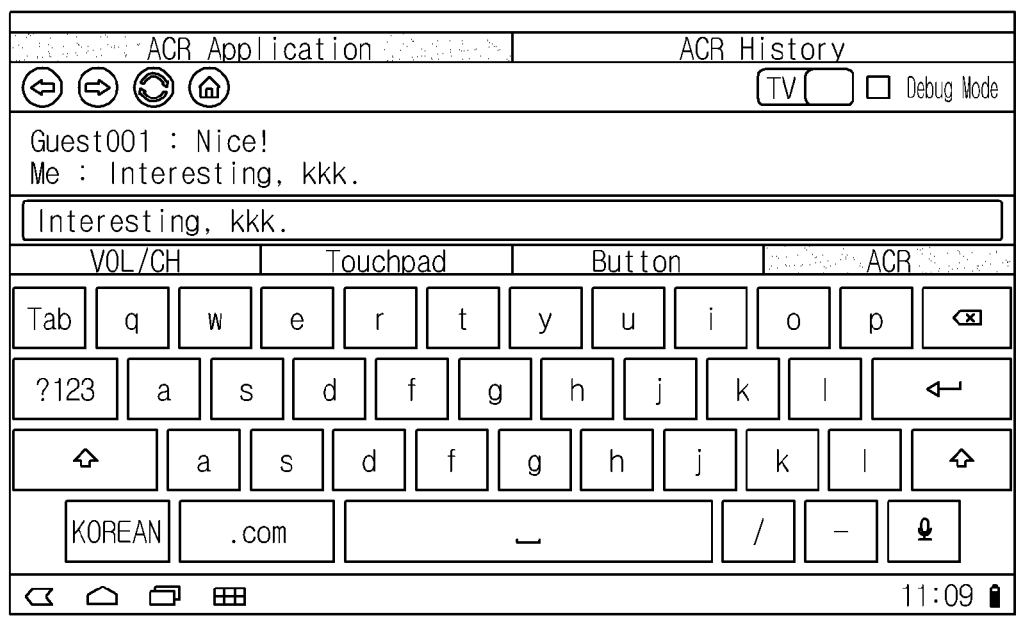
FIG. 78 is a front view of a terminal device where an interworking application is executed according to another embodiment.

FIG. 78 is a front view of a terminal device where an interworking application is executed according to another embodiment.

As shown in FIG. 78, once a chatting service in a video display device's manufacturer application is selected, the video display device 100 transmits an event related to the selection to the terminal device 400, and thus, the terminal device 400 obtains and displays the control function of the video display device's manufacturer application. At this point, the control function of the video display device's manufacturer application may be a keyboard or a keypad displayed on a touch screen.

Figure 79:
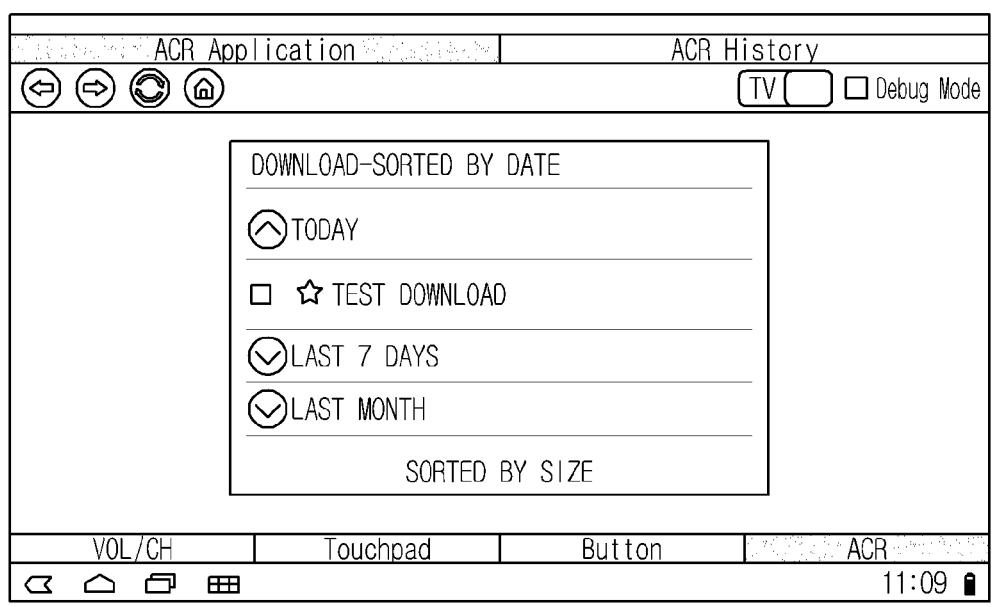
FIG. 79 is a front view of a terminal device where an interworking application is executed according to another embodiment.

FIG. 79 is a front view of a terminal device where an interworking application is executed according to another embodiment.

As shown in FIG. 79, when a download service in a video display device's manufacturer application is selected, the video display device 100 transmits an event related to the selection to the terminal device 400, and thus, the terminal device 400 downloads the selected item, and then, stores, manages, and plays it.

FIG. 80 is a front view of a terminal device where an interworking application is executed according to another embodiment.

The interworking application of the terminal device 400 may store a notified event in a history form. Then, as shown in FIG. 80, the terminal device 400 may display a list of events stored by a user selection. Items on a list of stored events may be visited again, or may be deleted. When visiting one of the items on the list of stored events is selected, the terminal device 400 may perform an operation according to an event corresponding to the selected item.

Figure 81:
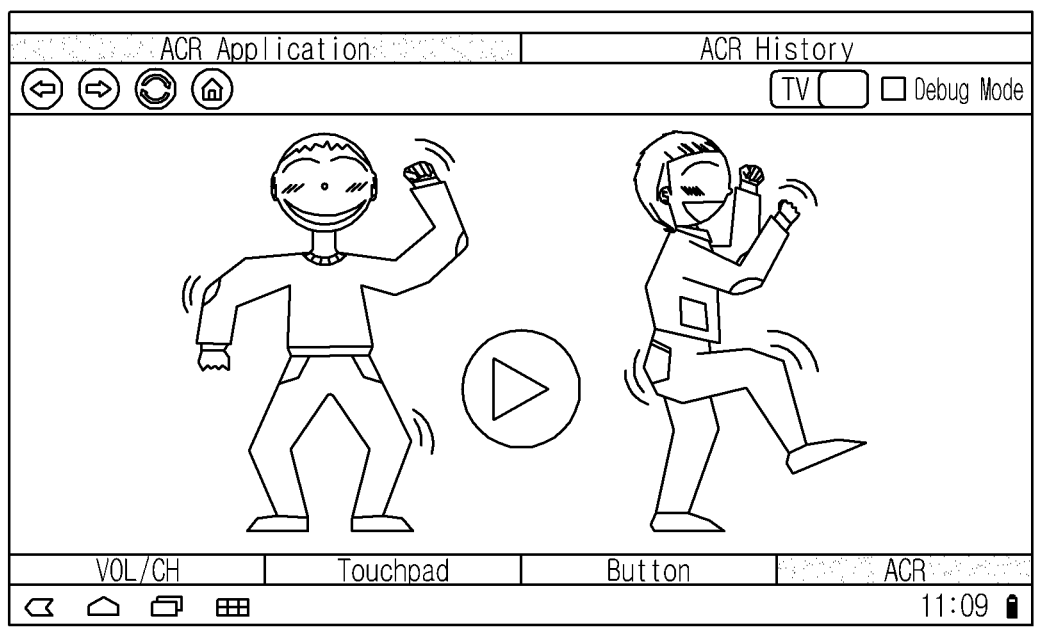
FIG. 81 is a front view of a terminal device where an interworking application is executed according to another embodiment.

FIG. 81 is a front view of a terminal device where an interworking application is executed according to another embodiment.

As shown in FIG. 81, the terminal device 400 may playback a video, which is an enhanced service related to main AV content being played in the video display device 100.

Figure 82:
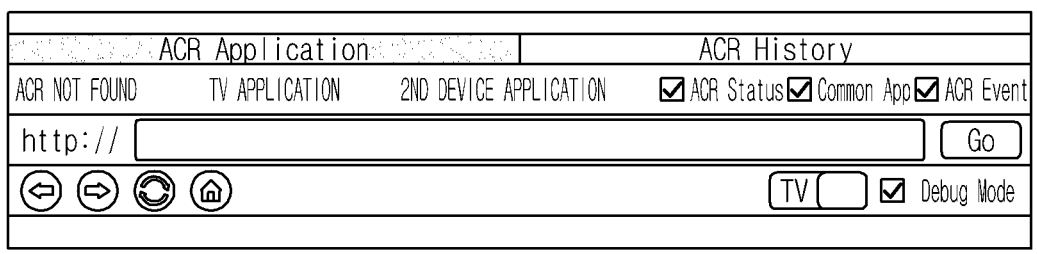
FIG. 82 is a top front view of a display unit in a terminal device where an interworking application is executed according to another embodiment.

FIG. 82 is a top front view of a display unit in a terminal device where an interworking application is executed according to another embodiment.

The video display device 100 transmits an event in a web application form to the terminal device 400. Accordingly, an interworking application may provide additional UI in order to allow user's additional navigation to be convenient. As shown in FIG. 82, an interworking application may provide a Reload button for reloading web application, a Home button for viewing a home page, a Back button for viewing a previous page, a Forward button for viewing the next page, and an address window for directly inputting a web address in order for user's additional search.

Additionally, as shown in FIG. 82, the interworking application may provide an ACR state check box, a Common App check box, an ACR event check box, and a selection box for application between the video display device 100 and the terminal device 400.

When the ACR state check box is checked, the terminal device 400 may provide a content recognition state request message to the video display device 100.

When the ACR state check box is unchecked, the terminal device 400 may provide a content recognition state request release message to the video display device 100.

When the Common App check box is checked, the terminal device 400 may provide a Common App execution request message to the video display device 100.

When the Common App check box is unchecked, the terminal device 400 may provide a Common App termination request message to the video display device 100.

When the ACR event check box is checked, the terminal device 400 may provide an event registration request message to the video display device 100.

When the ACR event check box is unchecked, the terminal device 400 may provide an event registration release message to the video display device 100.

When the video display device 100 is selected through the selection box for application between the video display device 100 and the terminal device 400, an enhanced service executed in the terminal device 400 may be transferred to the video display device 100. For example, the terminal device 400 may provide an enhanced service transfer release request message or a Common App transfer release request message to the video display device 100.

When the terminal device 400 is selected through the selection box for application between the video display device 100 and the terminal device 400, an enhanced service executed in the video display device 100 may be transferred to the terminal device 400. For example, the terminal device 400 may provide an enhanced service transfer request message or a Common App transfer request message to the video display device 100.

Then, a method of obtaining an application information table (AIT) through an IP based network according to an embodiment will be described with reference to FIG. 83.

Figure 83:
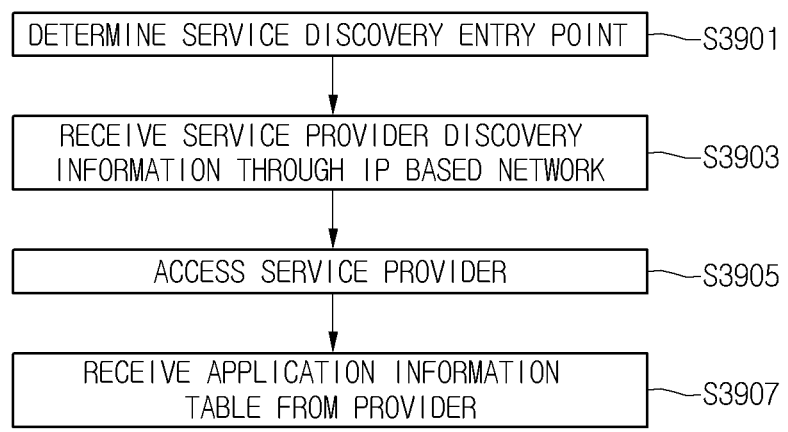
FIG. 83 is a flowchart illustrating a method of obtaining an AIT through an IP based network according to an embodiment.

FIG. 83 is a flowchart illustrating a method of obtaining an AIT through an IP based network according to an embodiment.

Especially, FIG. 83 is a view illustrating a method of the video display device 100 to obtain an AIT on the basis of Service discovery and selection (SD&S).

First, the video display device 100 determines a service discovery entry point in step S3901. According to an embodiment, the video display device 100 may determine a well-known multicast address as a service discovery entry point. According to another embodiment, the video display device 100 may receive lists of SD&S entry points, and then, may determine one of them as a service discovery entry point.

The video display device 100 receives service provider discovery information from the determined service discovery entry point through an IP based network in step S3903. The service provider discovery information may include at least one service provider information element. Each service provider information element may include the name of a service provider, detailed information on a service provider, and the domain name of a service provider.

The video display device 100 accesses one among one or more service providers in the service provider discovery information on the basis of the domain name of a service provider in step S3905.

The video display device 100 receives an AIT from the accessed service provider through an IP based network in step S3907. The video display device 100 receives SD&S information from the accessed service provider, and parses the obtained SD&S information in order to obtain the AIT.

Next, SD&S information according to an embodiment will be described with reference to FIGS. 84 to 86.

Figure 84:
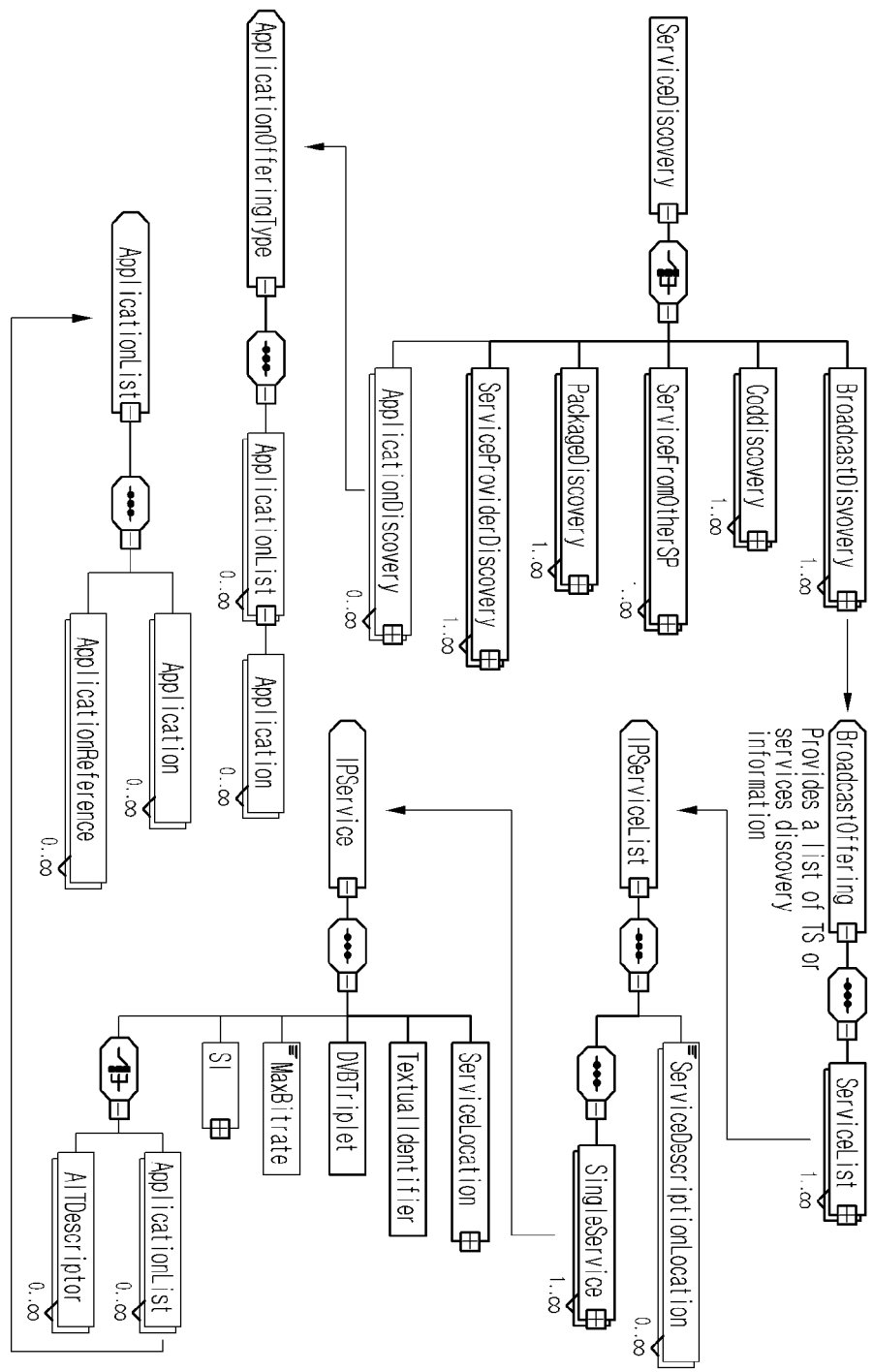
FIG. 84 is view illustrating a structure of SD&S information according to an embodiment.

FIG. 84 is view illustrating a structure of SD&S information according to an embodiment.

As shown in FIG. 84, the video display device 100 receives an XML document including a ServiceDiscovery element as SD&S information.

The ServiceDiscovery element selectively includes at least one BroadcastDiscovery element, at least one CodDiscovery element, at least one ServiceFromOtherSP element, at least one PackageDiscovery element, at least one ServiceProviderDiscovery element, and zero or at least one ApplicationDiscovery element.

What kind of an element is included in the ServiceDiscovery element may be identified by a payload identifier. Table 48 shows a relationship between types of a payload identifier and SD&S information.

TABLE 48

| PayLoad ID value | SD & S record carried |
| --- | --- |
| 0x00 | Reserved |
| 0x01 | Service Provider Discovery Information |
| 0x02 | Broadcast Discovery Information |
| 0x03 | COD Discovery Information |
| 0x04 | Services from other SPs |
| 0x05 | Package Discovery Information |
| 0x06-0xC0 | Reserved |
| 0xC1 | Application Discovery Information |
| 0xC2-0xEF | Reserved |
| 0xF0-0xFF | User Private |

A BroadcastDiscovery element includes information necessary for the video display device 100 to search for a real-time media broadcast service.

A CodDiscovery element provides information necessary for the video display device 100 to discover an available CoD service.

A ServiceFromOtherSP element provides information on a service that another service provider provides.

A PackageDiscovery element provides information on a set of services. One service may belong to at least one package. The service may not necessarily belong to an arbitrary package.

A ServiceProviderDiscovery element includes information on a service provider.

An ApplicationDiscoveryelement includes information on an available application that a service provider provides.

A BroadcastDiscovery element has a BroadcastOffering type, and an element of the BroadcastOffering type includes at least one ServiceList element.

The ServiceList element has a ServiceList type, and an element of the ServiceList type includes zero or at least one ServiceDescriptionLocation element and at least one SingleService element.

The SingleService element has an IPService type, and an element of the IPService type includes a ServiceLocation element, a TextualIdentifier element, a DVBTriplet element, a MaxBitrate element, and a SI element. Additionally, an element of the IPService type selectively includes zero or at least one ApplicationList element and zero or at least one AITDescriptor element.

The video display device 100 may receive an AIT using MPEG2 syntax through an IP based network on the basis of information that the AITDescriptor element includes. In this case, the video display device 100 may further perform an operation shown in FIG. 87.

A ServiceLocation element includes a position where a service may be found. The ServiceLocation element may include an IP multicast address or a real-time streaming protocol (RTSP) URL.

A TextualIdentifier element includes a textual identifier defined in MHP.

A DVBTriplet element includes an original network identifier, a transport stream identifier, and a service identifier as defined in DVB.

A MaxBitrate element includes the maximum bitrate of overall stream that carries a service.

An SI element includes information on a service.

The ApplicationList element has an ApplicationList type, and includes zero or at least one ApplicationList element and zero or at least one ApplicationReference. The ApplicationReference element has an ApplicationIdentifier type, and refers to application elements in the ApplicationDescovery element.

Moreover, the ApplicationDiscovery element has an ApplicationOfferingType type and includes zero or at least one ApplicationList element. The ApplicationList element in the ApplicationDiscovery element includes zero or at least one Application element.

Figure 85:
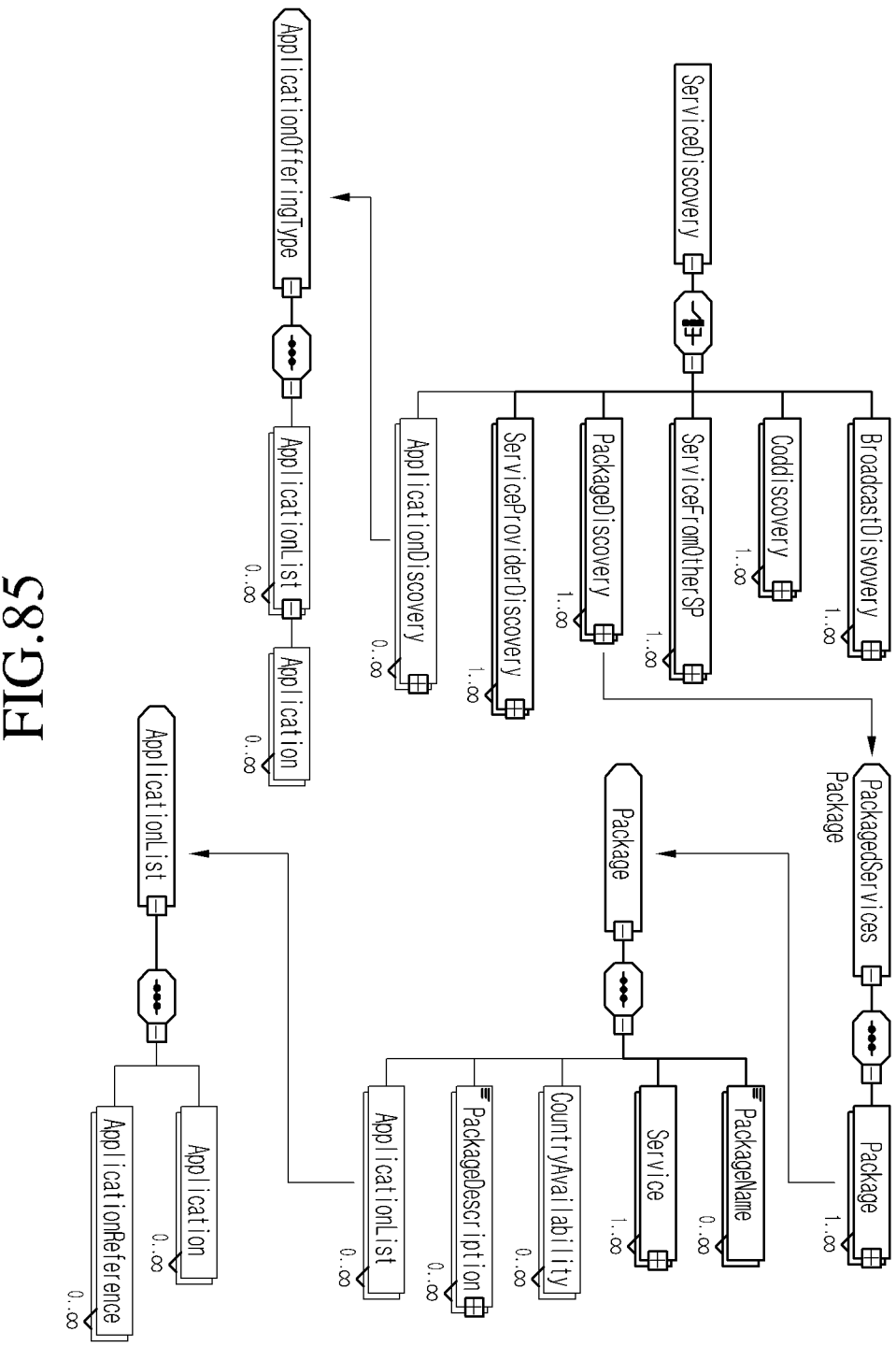
FIG. 85 is view illustrating a structure of SD&S information according to another embodiment.

FIG. 85 is view illustrating a structure of SD&S information according to another embodiment.

As shown in FIG. 85, the video display device 100 receives an XML document including a ServiceDiscovery element as SD&S information.

The ServiceDiscovery element selectively includes at least one BroadcastDiscovery element, at least one CodDiscovery element, at least one ServiceFromOtherSP element, at least one PackageDiscovery element, at least one ServiceProviderDiscovery element, and zero or at least one ApplicationDiscovery element.

The PackageDiscovery has a PackagedServices type, and includes at least one Package element.

The Package element includes at least one Package element, at least one Service element, zero or at least one CountryAvailability element, zero or at least one PackageDescription element, and at least one ApplicationList element.

The ApplicationList element has an ApplicationList type, and includes zero or at least one ApplicationList element and zero or at least one ApplicationReference. The ApplicationReference element has an ApplicationIdentifier type, and refers to application elements in the ApplicationDescovery element.

Moreover, the ApplicationDiscovery element has an ApplicationOfferingType type and includes zero or at least one ApplicationList element. The ApplicationList element in the ApplicationDiscovery element includes zero or at least one Application element.

Figure 86:
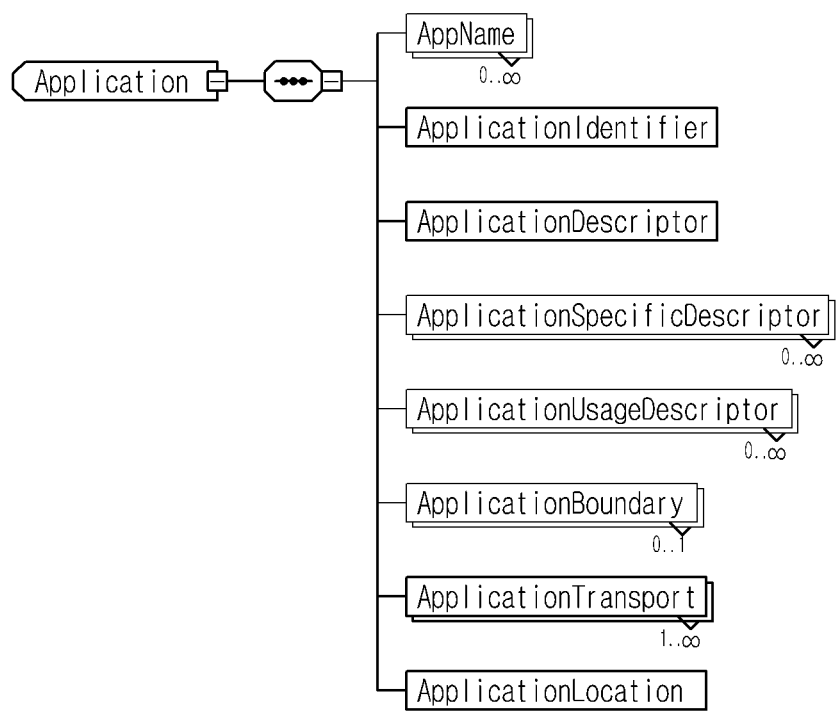
FIG. 86 is view illustrating a structure of SD&S information according to an embodiment.

FIG. 86 is view illustrating a structure of SD&S information according to an embodiment.

The Application element has an Application type, and includes zero or at least one appName element, an applicationIdentifier element, an applicationDescriptor element, zero or at least one applicationSpecificDescriptor element, zero or at least one applicationUsageDescriptor element, zero or at least one applicationBoundary element, at least one applicationTransport element, and an applicationLocation element.

The appName element includes the name of an application.

The applicationIdentifier element includes the identifier of an application.

The applicationTransport element includes information on whether an application identified by the applicationIdentifier element is obtained through a broadcast network or an IP based network.

If an application is obtained through an IP based network, the applicationLocation element may include an IP address such as URL, which is used to obtain an application identified by the applicationIdentifier element.

Next, a method of obtaining information on an available enhanced service through a broadcast network according to an embodiment will be described with reference to FIG. 87.

Figure 87:
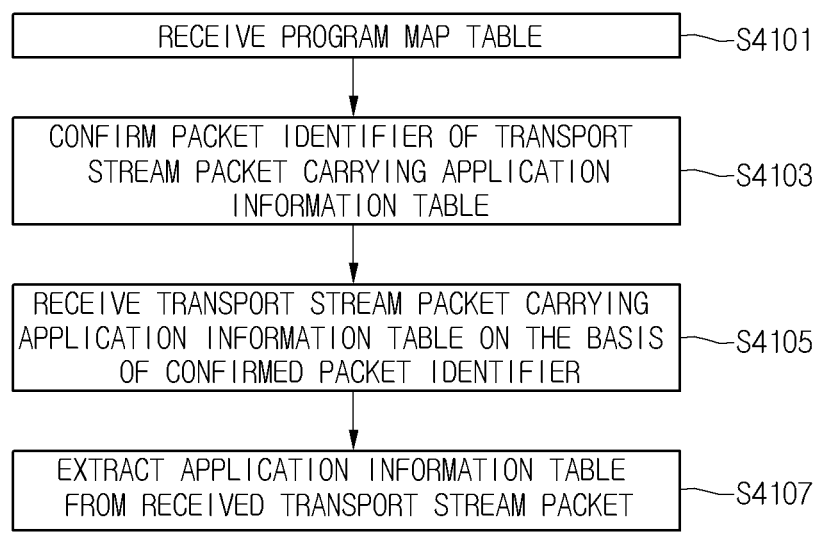
FIG. 87 is a flowchart illustrating a method of obtaining information on an available enhanced service through a broadcast network according to an embodiment.

FIG. 87 is a flowchart illustrating a method of obtaining information on an available enhanced service through a broadcast network according to an embodiment. Especially, the video display device 100 of FIG. 87 receives an AIT as an available enhanced service.

First, the video display device 100 receives a program map table in step S4101. The program map table may have a syntax as shown in Table 49.

TABLE 49

| Syntax | No. of bits | Mnemonic |
|---|---|---|
| TS_program_map_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_ length | 12 | uimsbf |
|   for(i=0;i<N;i++) { | | |
|     descriptor( ) | | |
|   } | | |
|   for (i=0; i<N1; i++) { | | |
|     stream_type | 8 | uimsbf |
|     reserved | 3 | bslbf |
|     elementary_PID | 13 | uimsbf |
|     reserved | 4 | hslbf |
|     ES_info_length | 12 | uimsbf |
|     for(i=0;i<N2;i++) { | | |
|       descriptor( ) | | |
|     } | | |
|   } | | |
|   CRC_32 | 32 | rpchof |
| } | | |

As shown in Table 49, the program map table includes a table_id field, a Section_syntax_indicator field, a section_length field, a program_number field, a version_number field, a current_next_indicator field, a section_number field, a last_section_number field, a PCR_PID field, a program_info_length field, a descriptor loop, an elementary stream loop, and a CRC_32 field.

The table_id field of the program amp table is set with 0x02, and the section_syntax_indicator field is set with 1.

The section_length field indicates the number of bytes right after the section_length field until the CRC_32 field.

The program_number field indicates a program to which program_map_PID is applicable.

The version_number field indicates the version number of a program map table.

The current_next_indicator field indicates whether a program map table is applicable currently.

The section_number field may be set with 0x00.

The section_number field may be set with 0x00.

The PCR_PID field indicates a packet identifier (PID) of a transport stream packet including an effective program clock reference (PCR) field for a program that the program_number field indicates.

The program_info_length field indicates that a descriptor loop has N descriptor( ) fields.

The CRC_32 field includes a cyclic redundancy checking (CRC) value for a program map table.

The elementary stream loop has N1 loop items. Each loop item has a stream_type field, an elementary_PID field, an ES_info_length field, and N2 descriptor( ) fields.

The stream_type field may indicate the type of a program element carried through a packet having PID defined by the elementary_PID field. When a related program element is an AIT, a value of the stream_type field is 0x05.

The elementary_PID field may indicate a packet identifier of a transport stream packet carrying a related program element.

The ES_info_length field may indicate the number of bytes of descriptors of a related program element.

The descriptor( ) field may include a descriptor of a related program element. The descriptor( ) field may include an application signaling descriptor for AIT. Table 50 shows an application signaling descriptor.

TABLE 50

| Syntax | No. of bits | Mnemonic |
|---|---|---|
| application_signalling_descriptor( ) { | | |
|   descriptor_tag | 8 | uimsbf |
|   descriptor_length | 8 | uimsbf |
|   for( i=0; i<N; i++ ){ | | |
|     reserved_future_use | 1 | |
|     application_type | 15 | uimsbf |
|     reserved_future_use | 3 | bslbf |
|     AIT_version_number | 5 | uimsbf |
|   } | | |
| } | | |

As shown in Table 50, the application signaling descriptor includes a descriptor_tag field, a descriptor_length field, N application_type fields, and N AIT_version_number fields.

The descriptor_tag field may include information for identifying the descriptor. If the descriptor is an application signaling descriptor, a value of the descriptor_tag field may be 0x6F.

The descriptor_length field may indicate the number of bytes following the descriptor_length field.

The application_type field may indicate the application type of an AIT sub-table.

The AIT_version_number field may indicate the current version number of an AIT sub-table identified by the application_type field.

The video display device 100 confirms the packet identifier of a transport stream packet which carries an AIT corresponding to enhanced service information in an elementary stream loop of a program map table, in step S4103. The video display device 100 may determine a value of the elementary_PID field of an elementary stream loop, where a value of the descriptor_tag field is 0x6F, as the packet identifier of a transport stream packet carrying an AIT.

The video display device 100 receives a transport stream packet carrying the AIT, i.e. enhanced service information, from a broadcast network on the basis of the confirmed packet identifier in step S4105.

The video display device 100 extracts the AIT, i.e. enhanced service information, from the received transport stream packet on the basis of the confirmed packet identifier in step S4107. Table 51 shows an AIT.

TABLE 51

| Syntax | No. of bits | Mnemonic |
|---|---|---|
| application_information_section( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   test_application_flag | 1 | bslbf |
|   application_type | 15 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for(i=0;i<N;i++) { | | |
|     descriptor( ) | | |
|   } | | |
|   reserved_future_use | 4 | bslbf |
|   application_loop_length | 12 | uimsbf |
|   for (i=0; i<N; i++) { | | |
|     application_identifier( ) | | |
|     application_control_code | 8 | uimsbf |
|     reserved_future_use | 4 | bslbf |
|     application_descriptors_loop_length | 12 | uimsbf |
|     for(j=0;j<N;j++){ | | |
|       descriptor( ) | | |
|     } | | |
|   } | | |
|   CRC_32 | 32 | rpchof |
| } | | |

As shown in Table 51, the AIT includes a table_id field, a section_syntax_indicator field, a section_length field, a test_application_flag field, an application_type field, a version_number field, a current_next_indicator field, a section_number field, a last_section_number field, a common_descriptors_length field, a descriptor loop, an application_loop_length field, and an application loop.

A value of the table_id field may be 0x74 identifying an AIT.

The section_syntax_indicator field may be set with 1.

The section_length field indicates the number of bytes right after the section_length field until the CRC_32 field.

The test_application_flag field indicates whether an application is for a test.

The application_type field may indicate the application type described in the AIT sub-table.

The version_number field indicates the version number of the AIT sub table.

The current_next_indicator field may be set with 1.

The section_number field may indicate a section number. The section_number field of the first section in the AIT sub table may be set with 0x00. The additional section_number field may be increased by one with respect to an additional section having the same table_id field and application_type field.

The last_section_number field indicates the last section number of the AIT sub table.

The common_descriptors_length field may indicate the length of a descriptor loop.

The application_loop_length field may indicate the length of an application loop.

The application loop includes an application_identifier( ) field, an application_control_code field, an application_descriptors_loop_length field, and an application descriptor loop.

The application_identifier( ) field may indicate an application identifier.

The application_control_code field may control a state of an application.

The application_descriptors_loop_length field may indicate the length of an application descriptor loop.

The application descriptor loop may include detailed description on an application identified by the application_identifier( ) field.

The application descriptor loop includes information on whether an application identified by the application_identifier( ) field is obtained through a broadcast network or an IP based network. If an application is obtained through an IP based network, the application descriptor loop may include an IP address such as URL, which is used to obtain an application.

Next, a method of providing an enhanced service according to another embodiment will be described with reference to FIGS. 88 and 93.

Figure 88:
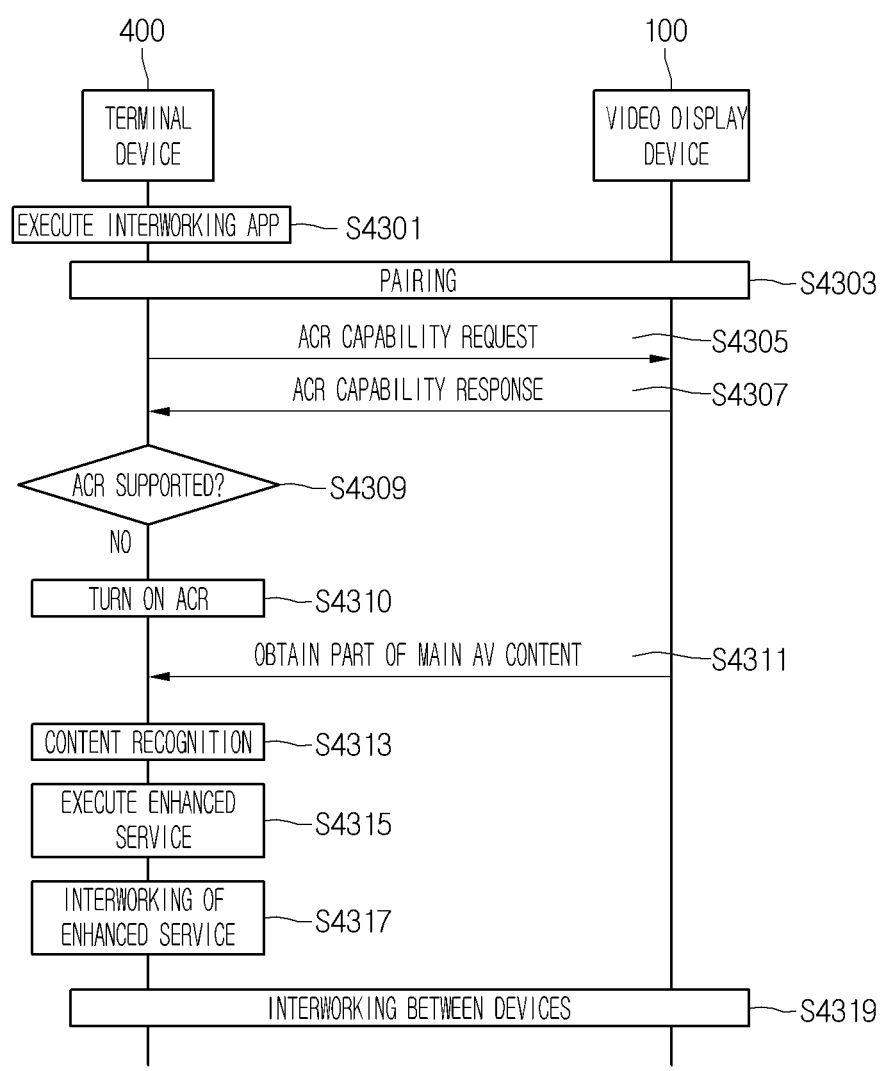
FIG. 88 is a ladder diagram illustrating a method of providing an enhanced service according to another embodiment.

FIG. 88 is a ladder diagram illustrating a method of providing an enhanced service according to another embodiment.

First, the terminal device 400 executes an interworking application in step S4301. An interworking application according to an embodiment will be described with reference to FIG. 89.

Figure 89:
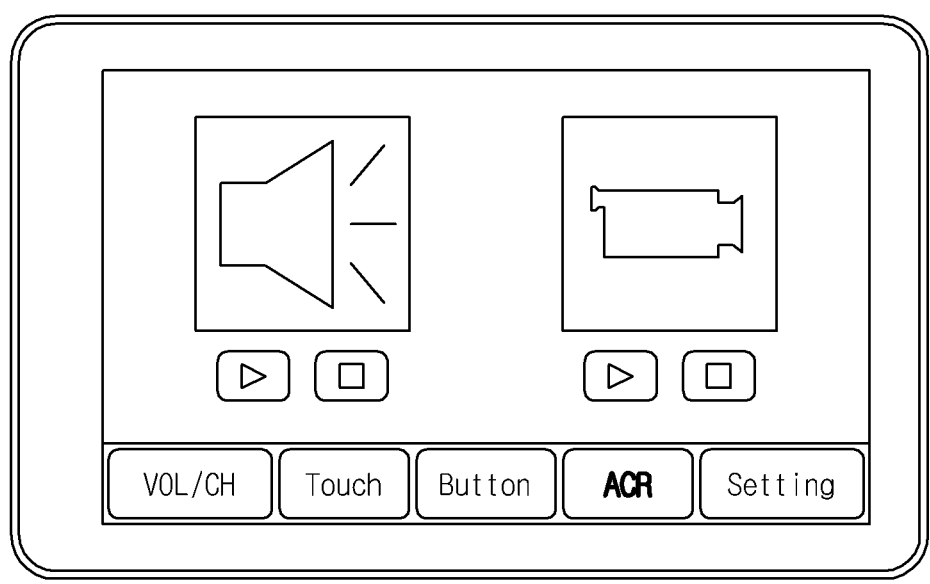
FIG. 89 is a front view of a terminal device where an interworking application is executed according to another embodiment.

FIG. 89 is a front view of a terminal device where an interworking application is executed according to another embodiment.

As shown in FIG. 89, the interworking application displays a video display device control UI. At this point, the video display device control UI includes various function buttons for controlling the video display device 100 at the top and a plurality of tap change buttons at the bottom. The video display device control UI includes a VOL/CH tap change button for controlling the volume and channel of the video display device 100, an ACR tap change button, and a setting tap change button for changing the setting of the interworking application. Once the VOL/CH tap change button is clicked, the video display device control UI may display as a function button a volume increase button, a volume decrease button, a channel number increase button, a channel number decrease button, a mute button, and a home button.

FIG. 88 is described again.

The interworking application of the terminal device 400 and the video display device 100 perform a pairing process in step S4303.

Then, the interworking application of the terminal device 400 transmits an ACR capability request message to the video display device 100 in step S4305 in order to inquiry whether the video display device 100 supports ACR.

The video display device 100 transmits an ACR capability response message to the terminal device 400 in response to the ACR capability request message in step S4307. The ACR capability response message includes information on whether the video display device 100 supports ACR.

Then, the interworking application of the terminal device 400 determines whether the video display device 100 supports ACR on the basis of an ACR capability response message in step S4309.

When the video display device 100 does not support ACR, the terminal device 400 turns on an ACR function in step S4310, and obtains capture data of a section of AV content that the video display device 100 outputs in step S4311. According to an embodiment, the terminal device obtains capture data by capturing a section of video or audio that the video display device 100 outputs through a mike or a camera. According to another embodiment, the terminal device 400, which includes a communication module for communicating with the video display device 100, requests AV content capture data from the video display device 100, and thus, receives AV content that the video display device 100 captures through a pairing session in order to obtain capture data.

The terminal device 400 obtains content information on main AV content by performing ACR like the video display device 100 supporting ACR on the basis of the capture data in step S4313. For example, according to an embodiment, the terminal device 400 may perform operations S109 to S125 of FIG. 3. According to another embodiment, the terminal device 400 may perform operations S213 to S225 of FIG. 6. According to another embodiment, the terminal device 400 may perform operations S313 to S325 of FIG. 9.

The terminal device 400 transmits the obtained content information to the video display device 100. In this case, the video display device 100 may further perform the above-mentioned operation on the basis of the obtained content information.

The terminal device 400 obtains an enhanced service through an IP based network on the basis of the obtained content information, and then, executes the obtained enhanced service in step S4315. The enhanced service may be one of chatting service, service for showing a photographer's position, service for showing content information, and download service. The service for showing content information will be described with reference to FIG. 90.

Figure 90:
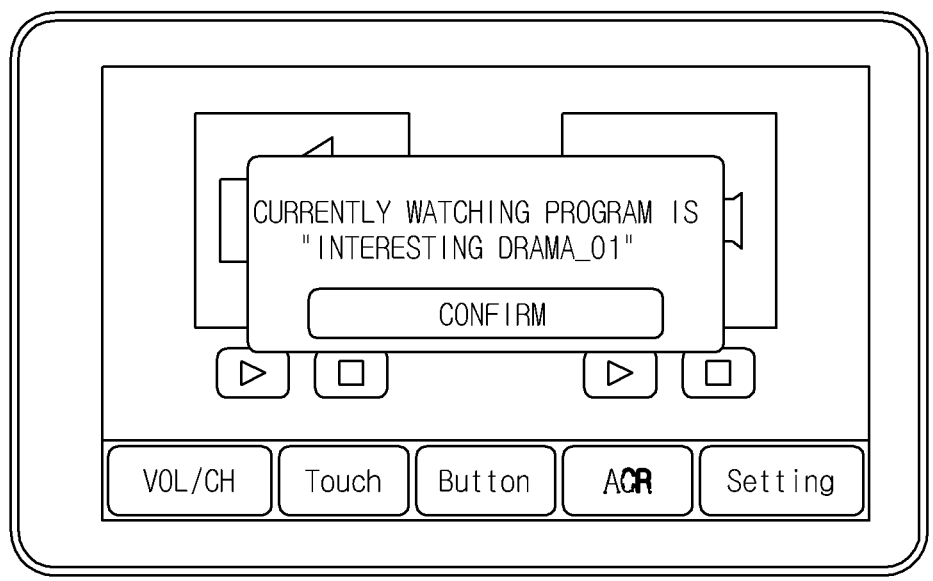
FIG. 90 is a front view of a terminal device executing the service for showing content information according to another embodiment.

FIG. 90 is a front view of a terminal device executing the service for showing content information according to another embodiment.

As shown in FIG. 90, the terminal device 400 may display the obtained content information through a message box.

FIG. 88 is described again.

Then, the terminal device 400 performs an enhanced service interworking in step S4317, and performs an interworking between devices through a pairing session in step S4319. The terminal device 400 may perform the above-mentioned enhanced service interworking. The terminal device 400 may perform the above-mentioned interworking between devices.

Figure 91:
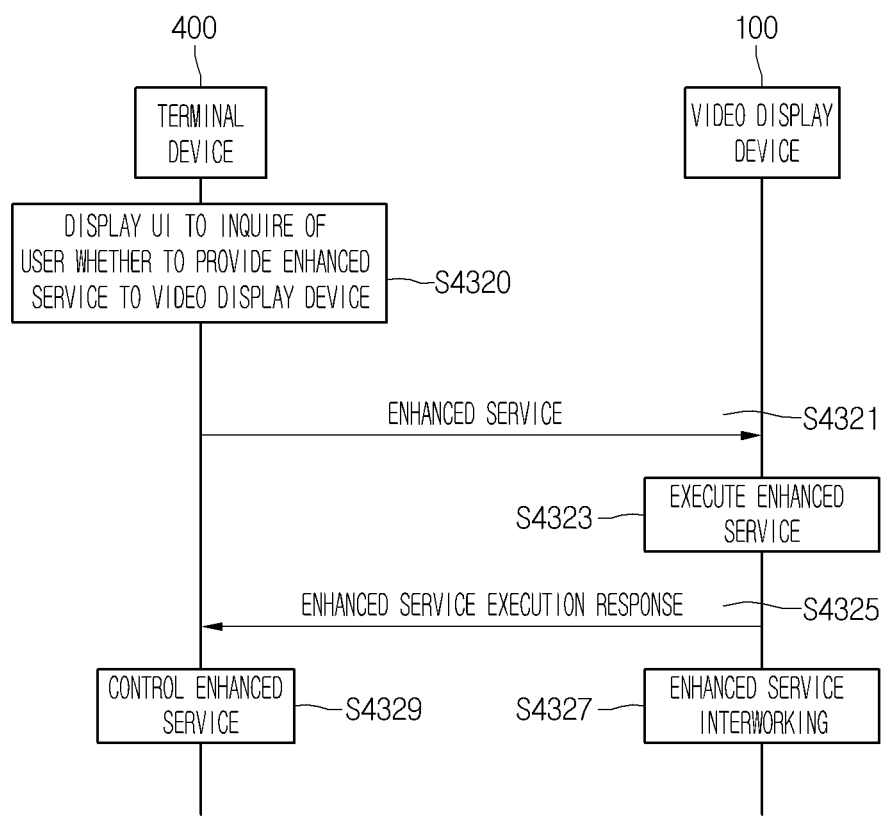
FIG. 91 is a ladder diagram illustrating an interworking method between devices according to another embodiment.

FIG. 91 is a ladder diagram illustrating an interworking method between devices according to another embodiment.

The interworking application of the terminal device 400 displays UI that inquires of a user to determine whether to provide an obtained enhanced service to the video display device 100 in step S4320. The UI will be described with reference to FIG. 92.

Figure 92:
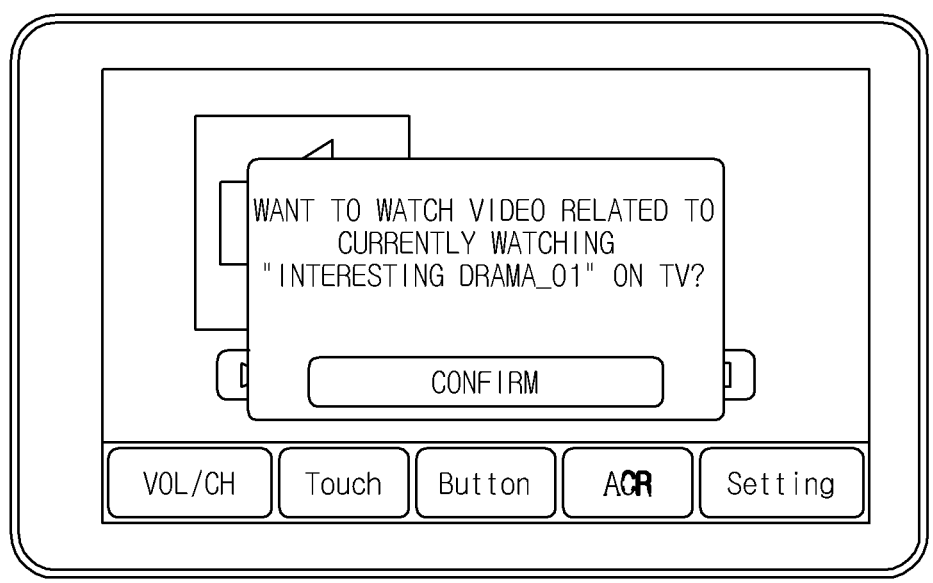
FIG. 92 is a front view of a terminal device displaying UI that inquires of a user to determine whether to provide an enhanced service to a video display device according to an embodiment.

FIG. 92 is a front view of a terminal device displaying UI that inquires of a user to determine whether to provide an enhanced service to a video display device according to an embodiment.

As shown in FIG. 92, the terminal device 400 may inquire of a user to determine whether to provide an enhanced service to a video display device through a message box.

FIG. 91 is described again.

If a user wants to provide an enhanced service to the video display device 100, the terminal device 400 provides the obtained enhanced service to the video display device 100 through a pairing session in step S4321. The terminal device 400 may provide the URL of the obtained enhanced service to the video display device 100 or may provide the obtained enhanced service data to the video display device 100. The terminal device 400 may provide the URL of an enhanced service corresponding to the capability of the video display device 100 to the video display device 100 or may provide enhanced service data corresponding to the capability of the video display device 100 to the video display device 100.

According to an embodiment, the terminal device 400 transmits the entire obtained enhanced service to the video display device 100.

According to another embodiment, the terminal device 400 may provide a display function of the obtained enhanced service to the video display device 100. Especially, an enhanced service of this case may be a chatting service.

The video display device 100 executes an enhanced service that the terminal device 400 provides in step S4323. If the terminal device 400 provides the URL of an enhanced service to the video display device 100, the video display device 100 obtains enhanced service data on the basis of the URL, and then, executes the obtained enhanced service data.

The video display device 100 transmits an enhanced service execution response including an enhanced service execution result to the terminal device 400 through a pairing session in step S4325. Additionally, the video display device 100 performs an enhanced service interworking in step S4327.

The video display device 100 executing the enhanced service will be described with reference to FIG. 93.

Figure 93:
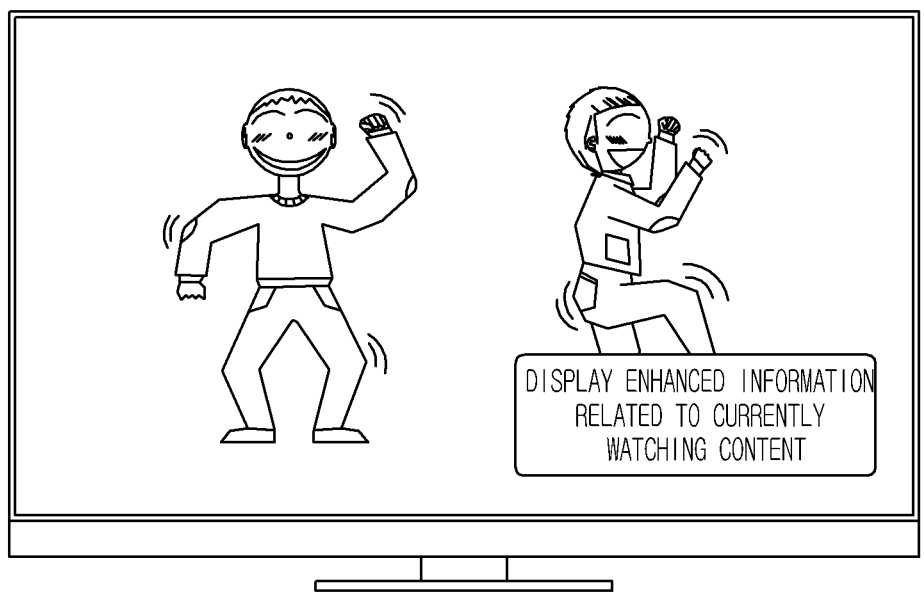
FIG. 93 is a front view of a video display device receiving an enhanced service from a terminal device and executing it.

FIG. 93 is a front view of a video display device receiving an enhanced service from a terminal device and executing it.

As shown in FIG. 93, the video display device 100 obtains an enhanced service from the terminal device 400 and displays the obtained enhanced service through part of a screen.

FIG. 91 is described again.

The terminal device 400 controls an enhanced service on the basis of an enhanced service execution result of an enhanced service execution response in step S4329. When the terminal device 400 provides the entire obtained enhanced service to the video display device 100, it may activate or deactivate the executed enhanced service. When the terminal device 400 provides a display function of the obtained enhanced service to the video display device 100, it may activate or deactivate the provided display function or may simplify UI of the display function.

Then, the terminal device 400 and the video display device 100 perform an enhanced service interworking process between devices.

Next, a structure of a video display device according to various embodiments will be described with reference to FIGS. 94 and 95.

Figure 94:
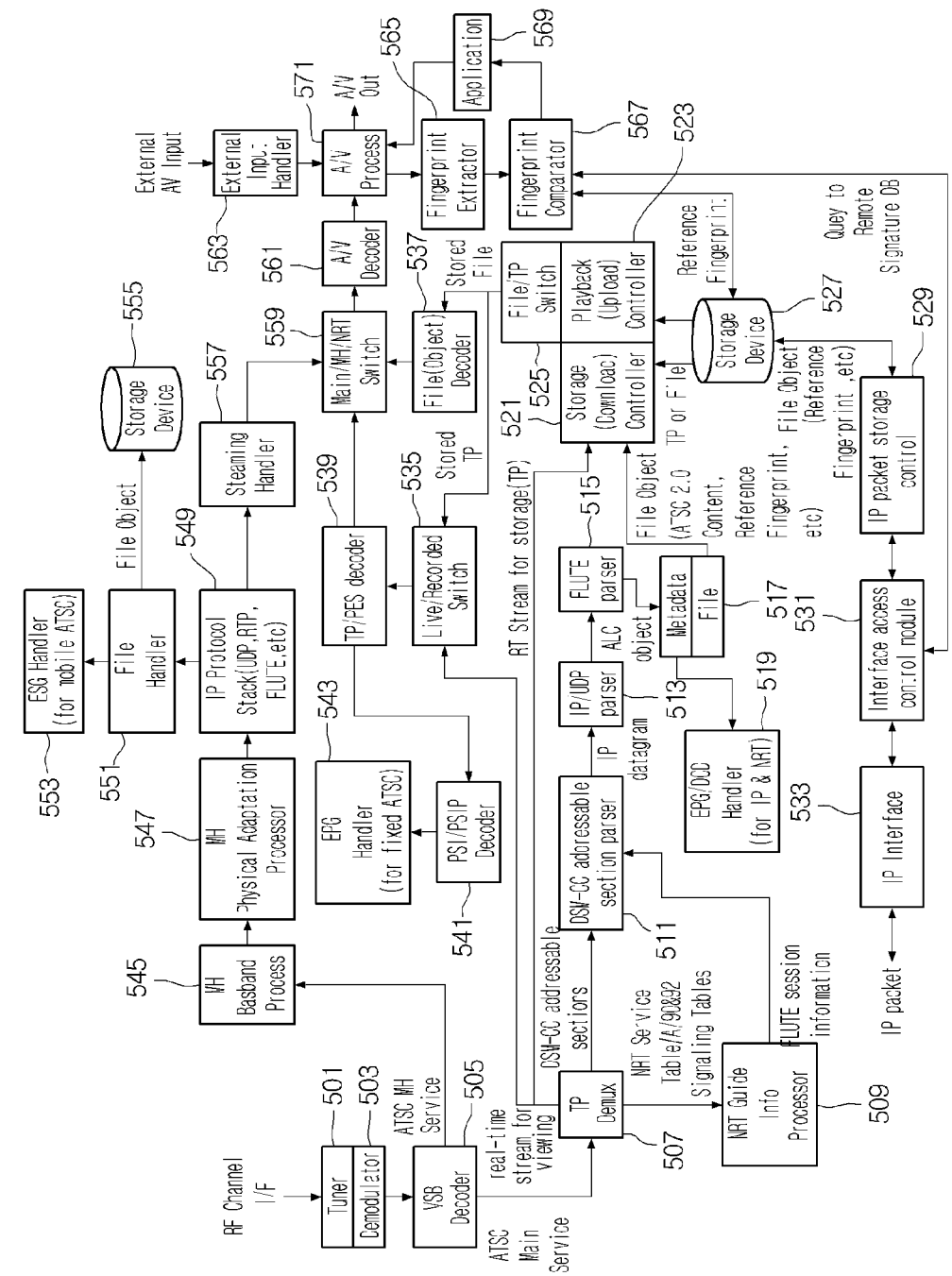
FIG. 94 is a block diagram illustrating a structure of a fingerprint based video display device according to another embodiment.

FIG. 94 is a block diagram illustrating a structure of a fingerprint based video display device according to another embodiment.

As shown in FIG. 94, a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint characteristic information from an AV stream.

The Fingerprint Comparator 567 compares the characteristic information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

Figure 95:
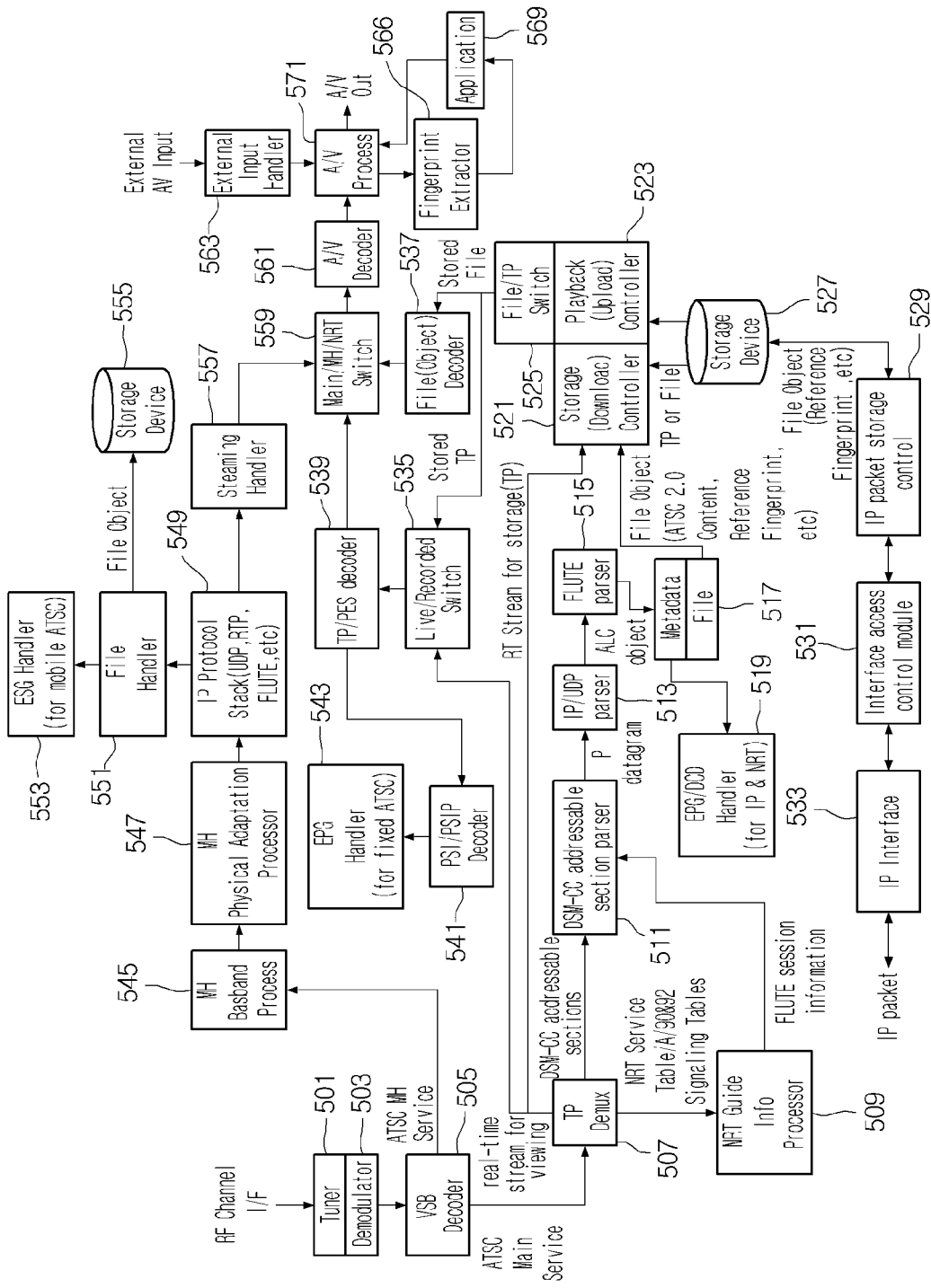
FIG. 95 is a block diagram illustrating a structure of a watermark based video display device according to another embodiment.

FIG. 95 is a block diagram illustrating a structure of a watermark based video display device according to another embodiment.

Although the watermark based video display device of FIG. 95 is similar to the fingerprint based video display device of FIG. 94, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

Next, a structure of a terminal device according to an embodiment will be described with reference to FIG. 96.

Figure 96:
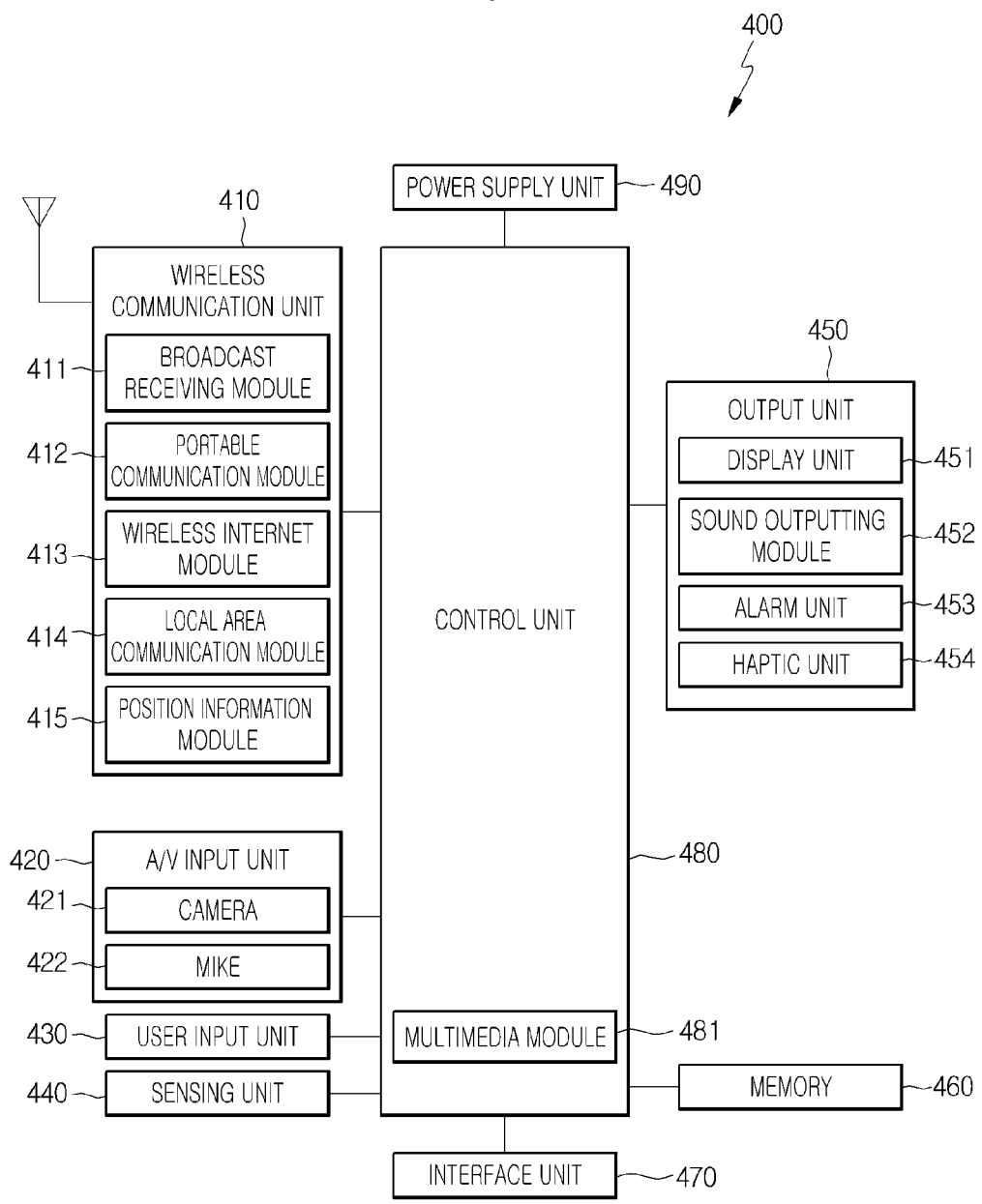
FIG. 96 is a block diagram of a terminal device according to an embodiment.

FIG. 96 is a block diagram of a terminal device according to an embodiment.

The terminal device 400 includes a wireless communication unit 410, an Audio/Video (A/V) input unit 420, a user input unit 430, a sensing unit 440, an output unit 450, a memory 460, an interface unit 470, a control unit 480, and a power supply unit 490. Since the terminal device 100 is not limited to the components shown in FIG. 96, it may be implemented with more or less components.

Hereinafter, the components will be described sequentially.

The wireless communication unit 410 may include at least one module that allows wireless communication between the terminal device 400 and a wireless communication system or between the terminal device 400 and a network that the terminal device 400 belongs. For example, the wireless communication unit 410 may include a broadcast receive module 411, a mobile communication module 412, a wireless internet module 413, a local area communication module 414, and a position information module 415.

The broadcast receive module 411 receives a broadcast signal and/or broadcast related information from an external broadcast management server through a broadcast channel.

The broadcast channel may include a satellite channel a terrestrial channel. The broadcast management server may refer to a server that generates and transmits a broadcast signal and/or broadcast related information or a server that receives a pre-generated broadcast signal and/or broadcast related information and transmits it/them to a terminal. The broadcast signal may include a broadcast signal in the combination form of a data broadcast signal and a TV broadcast signal or a radio broadcast signal, in addition to a TV broadcast signal, a radio broadcast signal, and a data broadcast signal.

The broadcast related information may refer to information on a broadcast channel, a broadcast program, or a broadcast service provider. The broadcast related information may be provided through a mobile communication network. In this case, the broadcast related information may be received by the mobile communication module 412.

The broadcast related information may exist in various forms. For example, the broadcast related information may be in forms such as Electronic Program Guide (EPG) of DMB (Digital Multimedia Broadcasting) or Electronic Service Guide (ESG) of Digital Video Broadcast-Handheld (DVB-H).

The broadcast receiving module 411 may receive a digital broadcast signal by using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcast- Handheld (DVB-H), and Integrated Services Digital Broadcast-Terrestrial (ISDB-T). Of course, the broadcast receiving module 411 may be configured to be appropriate for the digital broadcast system and other broadcast systems.

A broadcast signal and/or broadcast related information received through the broadcast receiving module 411 may be stored in the memory 460.

The mobile communication module 412 transmits/receives a wireless signal to/from at least one of a base station, an external terminal, and a server on a mobile communication network. The wireless signal may include various forms of data according to a voice call signal, video call signal, or character/multimedia message transmission. The control unit 480 may communicate with an IP based network through the mobile communication module 412. Additionally, the control unit 480 may communicate with the video display device 100 through the mobile communication module 412.

The wireless internet module 413 refers to a module for wireless internet access, and may be embedded in or externally mounted on the terminal device 400. A wireless internet technique includes Wireless LAN (WLAN), i.e. Wi-Fi, Wireless broadband (Wibro), World Interoperability for Microwave Access (Wimax), and High Speed Downlink Packet Access (HSDPA). The control unit 480 may communicate with an IP based network through the wireless internet module 413. Additionally, the control unit 480 may communicate with the video display device 100 through the wireless communication module 413.

The local area communication module 414 refers to a module for local area communication. A local area communication technique includes Bluetooth, Radio Frequency Identification (RFID), infrared Data Association (IrDA), Ultra Wideband (UWB), and ZigBee. The control unit 480 may communicate with the video display device 100 through the local area communication module 414.

The position information module 415 is a module for obtaining the position of the terminal device, and its representative example includes a Global Position System (GPS) module.

The A/V input unit 420 is used for an audio signal or video signal input, and may include a camera 421 and a mike 422. The camera 421 processes an image frame of a still image or a moving image obtained by an image sensor during a video call mode or a capture mode. The processed image frame may be displayed on a display unit 451.

The image frame processed in the camera 421 may be stored in the memory 460 or transmitted to an external through the wireless communication unit 410. At least two cameras 421 may be equipped depending on a usage environment.

The mike 422 receives an external sound signal through a microphone during a call mode, a recording mode, or a voice recognition mode, and then, processes the received signal as electrical voice data. In the case of a call mode, the processed voice data may be converted into a format available for transmission to a mobile communication base station by using the mobile communication module 412, and then, may be outputted. Various noise canceling algorithms may be implemented in the mike 422 in order to cancel the noise occurring while an external sound signal is received.

The user input unit 430 generates input data for an operation control of a terminal by a user. The user input unit 430 may include a key pad, a dome switch, a touch pad (resistive/capacitive), a jog wheel, and a jog switch.

The sensing unit 440 generates a sensing signal for controlling an operation of the terminal device 400 by sensing a current state of the terminal device 400 such as the close/open state of the terminal device 400, the position of the terminal device 400, the user contact of the terminal device 400, the orientation of the terminal device 400, and the acceleration/deceleration of the terminal device 400. For example, if the terminal device 400 is the form of a slide phone, the sensing unit 140 senses whether the slide phone is opened/closed. Additionally, the sensing unit 140 senses whether the power supply unit 490 supplies power or whether the interface unit 470 is combined with an external device. Moreover, the sensing unit 440 may include a proximity sensor 441.

The output unit 450 generates a visual, auditory or tactile output, and includes a display unit 451, a sound outputting module 452, an alarm unit 453, and a haptic module 454.

The display unit 451 displays (outputs) information processed by the terminal device 400. For example, when the terminal device 400 is in a call mode, the display unit 451 displays call related UI or GUI. When the terminal device 400 is in a video call mode or a capture mode, the display unit 451 displays a captured or/and received image, UI, or GUI.

The display unit 451 includes at least one of a liquid crystal display (LCD), a thin film transistor-liquid crystal display (TFT LCD), an organic light-emitting diode (OLED), a flexible display, and a 3D display.

Some displays may be configured with a transparent type or a light transmission type in order to see an external through them. This may be called a transparent display, and its representative example is a Transparent OLED (TOLED). The display unit 451 may be configured with a rear structure or a light transmission type structure. According to such a structure, a user may see an object at the rear of a terminal body through an area that the display unit 451 of the terminal body occupies.

At least two display units 451 may be provided according to an implementation form of the terminal device 400. For example, a plurality of display units may be spaced from each other on one side, may be integrally disposed on one side, or may be disposed at different sides, respectively, in the terminal device 400.

When the display unit 451 and a touch operation sensing sensor (hereinafter, referred to as a touch sensor) have a mutual layer structure (hereinafter, referred to as a touch screen), the display unit 451 may serve as an input device in addition to an output device. A touch sensor may have a form such as a touch film, a touch sheet, and a touch pad.

The touch sensor may be configured to convert a change of a pressure applied to a specific portion of the display unit 451 or a change of a capacitance occurring at a specific portion of the display unit 451 into an electrical input signal. The touch sensor may be configured to detect a pressure during touching in addition to a touched position and area.

If a touch input is provided for a touch sensor, signal(s) corresponding thereto is (are) transmitted to a touch controller. The touch controller processes the signal(s) and then transmits corresponding data to the control unit 480. By doing so, the control unit 480 recognizes which area of the display unit 451 is touched.

The proximity sensor 441 may be disposed in an inner area of the terminal device 400 surrounded by the touch screen or near the touch screen. The proximity sensor 441 is a sensor for detecting an object that approaches a predetermined detection side or an object that exists near the proximity sensor 141, by using electromagnetic force or infrared without mechanical contact. The proximity sensor 441 has a longer lifecycle and a higher utilization than a contact type sensor.

The proximity sensor 441 may include a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, and an infrared proximity sensor. If the touch screen is a capacitive type, it is configured to detect the proximity of the pointer by using the change in an electric field according to the proximity of the pointer. In this case, the touch screen (i.e., a touch sensor) may be classified as a proximity sensor.

For convenience of description, an action for recognizing that the pointer is positioned on the touch screen is called "proximity touch", and an action that a pointer actually contacts the touch screen is called "contact touch". The position where a pointer contacts the touch screen through proximity touch means that the pointer contacts the touch screen vertically through proximity touch.

The proximity sensor detects proximity touch and a proximity touch pattern (for example, proximity touch distance, proximity touch direction, proximity touch speed, proximity touch time, proximity touch position, and proximity touch moving state). Information on the detected proximity touch operation and proximity touch pattern may be outputted on a screen.

The audio output module 452 may output audio data received from the wireless communication unit 410 or stored in the memory 460 during call signal reception, a call mode, a recording mode, a voice recognition mode, or a broadcast receiving mode. The sound outputting module 452 outputs a sound signal, which is related to a function of the terminal device 400 (for example, a call signal incoming sound and a message incoming sound). The sound outputting module 452 may include a receiver, a speaker, and a buzzer.

The alarm unit 453 outputs a signal notifying an event occurrence of the terminal device 400. Examples of the event occurring in the terminal device 400 include call signal reception, message reception, key signal input, and touch input. The alarm unit 453 may output a signal notifying event occurrence through vibration in addition to a video signal or an audio signal. Since the video signal or the audio signal may be outputted through the display unit 451 or the sound outputting module 452, they 451 and 452 may be classified as part of the alarm unit 453.

The haptic module 454 generates various haptic effects that a user can feel. A representative example of a haptic effect that the haptic module 454 generates includes vibration. The intensity and pattern of vibration that the haptic module 454 generates is controllable. For example, different vibrations are combined and outputted or are sequentially outputted.

The haptic module 454 may generate various haptic effects such as pin arrangement that vertically moves with respect to a skin contact surface, injection or suction power of air through an injection inlet or a suction inlet, rubbing for skin surface, electrode contact, an effect by stimuli such as electrostatic force, and an effect by cold/warm sense reproduction using a device that suctions or emits heat, in addition to the vibration.

The haptic module 454 may be implemented to deliver a haptic effect through direct contact and also allows a user to feel a haptic effect through a muscle sense of a finger or an arm. At least two haptic modules 454 may be equipped according to a configuration aspect of the portable terminal 400.

The memory 460 may store a program for an operation of the control unit 480, and may temporarily store input/output data (for example, a phone book, a message, a still image, and, a moving image. The memory 460 may store data regarding the vibrations and sounds of various patterns, which are outputted during touch input on the touch screen. The memory may include an authentication information storage unit for storing authentication information.

The memory 460 may include at least one storage medium of a flash memory type, a hard disk type, a multimedia card micro type, a card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The terminal device 400 may operate in relation to a web storage that performs a storage function of the memory 460 on internet.

The interface unit 470 serves as a path to all external devices connected to the terminal device 400. The interface unit 470 receives data from an external device or power to deliver it to each component in the terminal device 400, or transmits data in the terminal device 400 to an external device For example, the interface unit 470 may include a wire/wireless headset port, an external charging port, a memory card port, a port for connecting to a device having an identification module, an audio Input/Output (I/O) port, a video I/O port, and an earphone port.

The identification module is a chip for storing various information to certify the usage permission of the terminal device 400, and may include User Identify Module (UIM), Subscriber Identity Module (SIM), and Universal Subscriber Identity Module (USIM). A device having an identification module (hereinafter, referred to as an identification device) may be manufactured with a smart card type. Accordingly, the identification device may be connected to the terminal device 400 through a port.

When the terminal device 400 is connected to an external cradle, the interface unit may serve as a path through which power from the cradle is supplied to the terminal device 400, or a path through which various command signals inputted from the cradle is delivered to the terminal device 400. The various command signals or power inputted from the cradle may operate as a signal that recognizes that the terminal device 400 is properly mounted on the cradle.

The control unit 480 generally controls overall operations of the terminal device 400. For example, the control unit 480 controls and processes operations related to voice call, data communication, and video call. The control unit 480 executes the above-mentioned various enhanced services, and performs a pairing procedure, an ACR control procedure, an ACR procedure, an interworking procedure between devices, and an enhanced service interworking procedure through the wireless communication unit 410. Additionally, the control unit 480 may capture a part of AV content that the video display device 100 plays through a mike or a speaker.

The control unit 480 may include a multimedia module 481 for playing multimedia. The multimedia module 481 may be implemented in the control unit 480, and may be implemented, being separated from the control unit 480.

The control unit 480 may perform a pattern recognition process for recognizing handwriting input and picture drawing input on the touch screen as a character and an image, respectively.

The power supply unit 490 receives external power and internal power according to a control of the control unit 480, and then, supplies power necessary for an operation of each component.

One embodiment enables the enhanced service led by the broadcasting station without causing inconvenience for a user to watch contents.

Moreover, according to another embodiment, the video display apparatus transfers only a control function of an enhanced service to the terminal device so that the user can control the enhanced service within the video display apparatus through various input means of the terminal device.

Additionally, another embodiment enables an enhanced service over the bandwidth limitation of the wireless channel.

Various embodiments described herein may be implemented using a computer or similar device thereto readable medium through software, hardware or a combination thereof.

In terms of hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions. In some cases, embodiments may be implemented by the control unit 480.

In terms of software implementation, embodiments related to a procedure or function may be implemented with an additional software module for performing at least one function or operation. A software code may be implemented by a software application written using a proper program language. The software code is stored in the memory 460, and is executed by the control unit 480.

Moreover, embodiments of the present invention can also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

What is claimed is:

1. An operating method of a first display device interworking with a second display device having a display unit, comprising:

pairing, by the first display device, the first display device with the second display device via Hypertext Transfer Protocol (HTTP);

acquiring, by the first display device, audio-visual content;

extracting, by the first display device, a characteristic information from watermark information embedded to the audio-visual content;

wherein the characteristic information includes watermark type information indicating at least one of usage reporting or obtaining enhanced service;

obtaining, by the first display device, an address of a first server;

obtaining, by the first display device, a response including an address of an available enhanced service application by using the address of the first server;

transmitting, by the first display device, the address of the available enhanced service application to the second display device;

transmitting, by the first display device, a message for media playback to the second display device;

receiving, by the first display device, a request for transfer of a control function of the enhanced service that is being outputted on the second display device;

transferring, by the first display device, the control function of the enhanced service;

transmitting, by the first display device, a control function transfer conflict event to the first terminal device, if a maximum number of terminal devices to which the control function can be transferred is equal to a number of terminal devices to which the control function has been transferred; and releasing, by the first display device, transfer of the control function to the second display device based on a control function transfer release request of the second display device, wherein the message for media playback includes a first element indicating at least one of playing, paused, or stopped, and wherein the message for media playback further includes a second element indicating playback speed for forward playback or backward playback, wherein the characteristic information further comprises a content identifier of the audio-visual content and Universal Resource Locator (URL) information on an usage report server for reporting an usage report of the audio-visual content and enhanced service gathered by the first display device, wherein the pairing, by the first display device, of the first display device with the second display device comprises:

receiving, by the first display device, an authentication number generation request from the second display device; generating, by the first display device, a first authentication number for the second display device, in response to the authentication number generation request;

transmitting, by the first display device, an authentication number generation result to the second display device, wherein the second display device receiving the authentication number generation result displays an authentication number input window;

displaying, by the first display device, the first authentication number on the display unit;

receiving, by the first display device, an authentication request message including a second authentication number from the second display device;

generating, by the first display device, a session value for the second display device, when the second authentication number is identical to the first authentication number; and transmitting, by the first display device, the session value to the second display device, wherein the authentication number input window comprises a text box for inputting an authentication key, a combo box for inputting a user type, and a text box for inputting a password of the first display device, and wherein the user type includes a family user type indicating the first display device assigns a unrestricted authorization to the second display device, and a guest type indicating the first display device assigns only view authorization to the second display device.

2. The operating method of claim 1, further comprising:
receiving, by the first display device from the second display device, a query on whether the first display device can acquire contents information of the audio-visual content based on at least one frame of the audio-visual content; and
transmitting, by the first display device, to the second display device a response that the first display device cannot acquire contents information of the audio-visual content based on at least one frame of the audio-visual content.

3. The operating method of claim 1, wherein the authentication request message further includes a password, and wherein generating the session value comprises:
generating, by the first display device, the session value, when the second authentication number is identical to the first authentication number and the password of the authentication request message is identical to a password of the first display device.

4. A display device, comprising:
a display unit;
a communication unit paring the display device with a second display device via Hypertext Transfer Protocol (HTTP); and
a controller acquiring audio-visual content, extracting characteristic information from watermark information embedded to the audio-visual content, obtaining an address of a first server, obtaining a response including an address of an enhanced service and an identifier of the enhanced service by using the address of the first server, transmitting the address of the enhanced service to the second display device, transmitting a message for media playback to the second display device, receiving a request for transfer of a control function of the enhanced service that is being outputted on the second display device, transferring the control function of the enhanced service, transmitting a control function transfer conflict event to the first terminal device, if a maximum number of terminal devices to which the control function can be transferred is equal to a number of terminal devices to which the control function has been transferred, and releasing transfer of the control function to the second display device based on a control function transfer release request of the second display device,
wherein the message for media playback includes a first element indicating at least one of playing, paused, or stopped, and
wherein the message for media playback further includes a second element indicating playback speed for forward playback or backward playback,
wherein the characteristic information includes watermark type information indicating at least one of usage reporting or obtaining enhanced service,
wherein the characteristic information further comprises a content identifier of the audio-visual content and Universal Resource Locator (URL) information on an usage report server for reporting an usage report of the audio-visual content and the enhanced service gathered by the first display device,
wherein the communication unit receives an authentication number generation request from the first terminal device, generates a first authentication number for the first terminal device, in response to the authentication number generation request, transmits an authentication number generation result to the first terminal device, wherein the first terminal device receiving the authentication number generation result displays an authentication number input window, displays the first authentication number, receives an authentication request message including a second authentication number from the first terminal device, generates a session value for the first terminal device, if the second authentication number is identical to the first authentication number; and
transmits the session value to the first terminal device,
wherein the authentication number input window comprises a text box for inputting an authentication key, a combo box for inputting a user type, and a text box for inputting a password of the video display device, and wherein the user type includes a family user type indicating the video display device assigns a unrestricted authorization to the first terminal device, and a guest type indicating the video display device assigns only view authorization to the first terminal device.

* * * * *